Figure 3B:
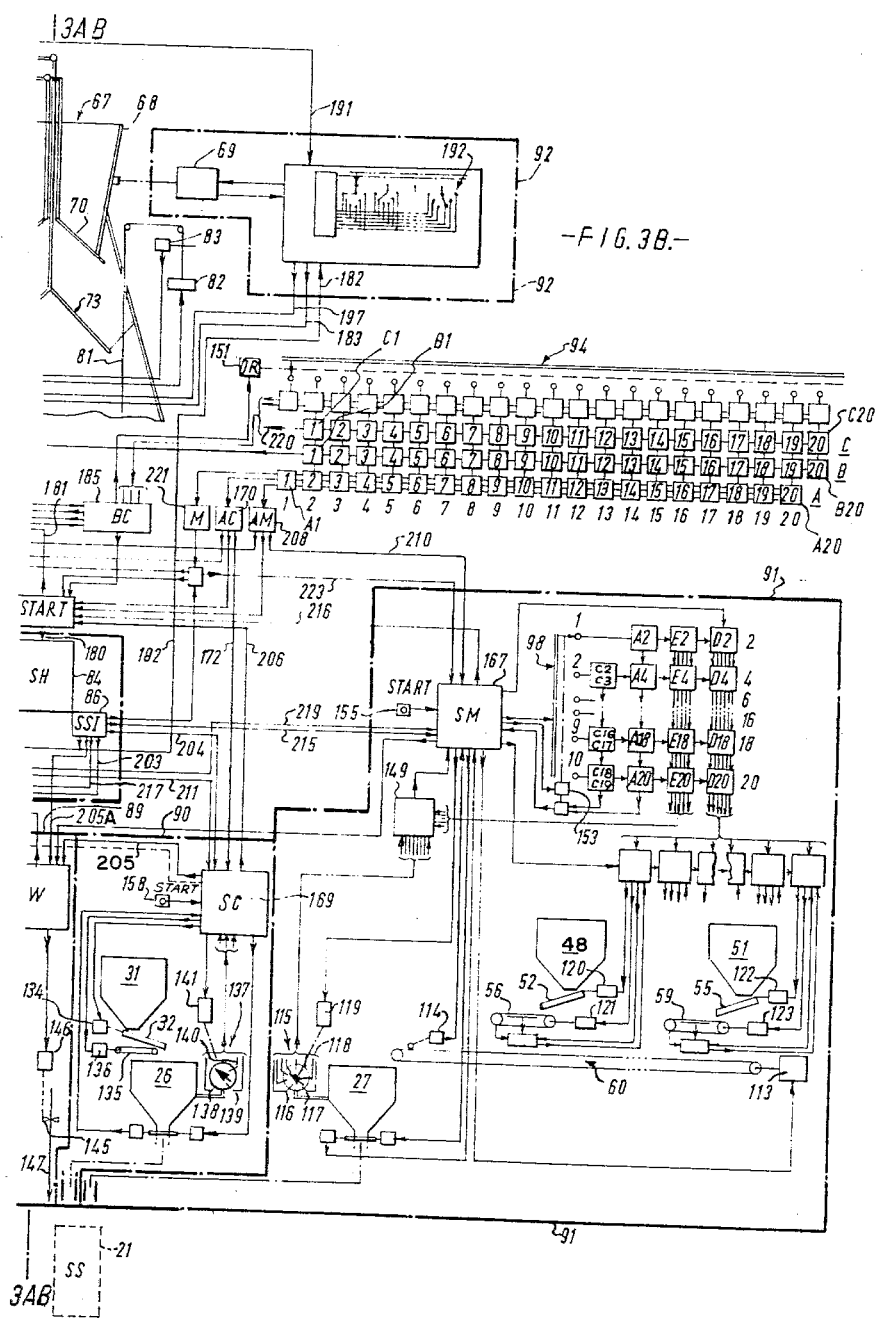

March 1, 1966    F. R. HOLMES ET AL    3,237,785
CHARGING APPARATUS FOR SHAFT FURNACES
Filed Sept. 26, 1961    59 Sheets-Sheet 1
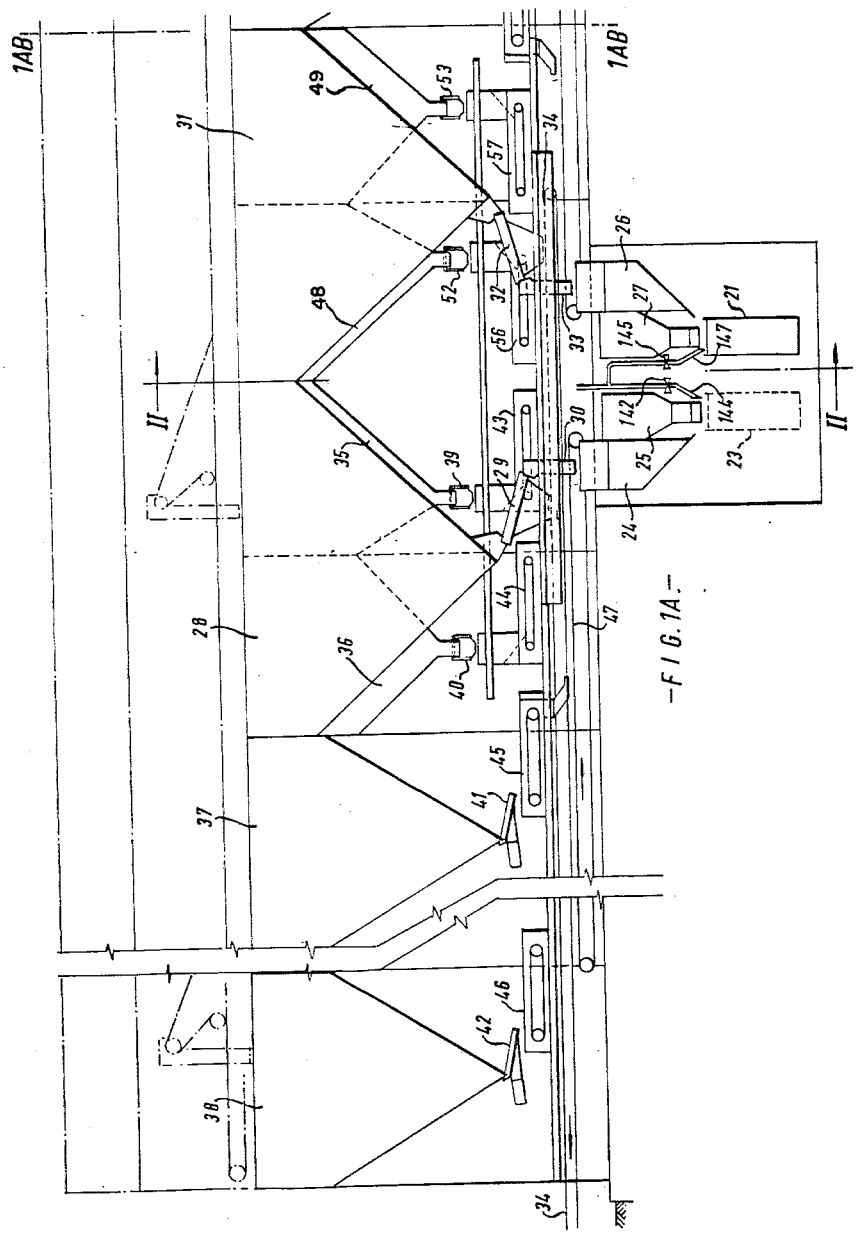
-FIG.1A.-

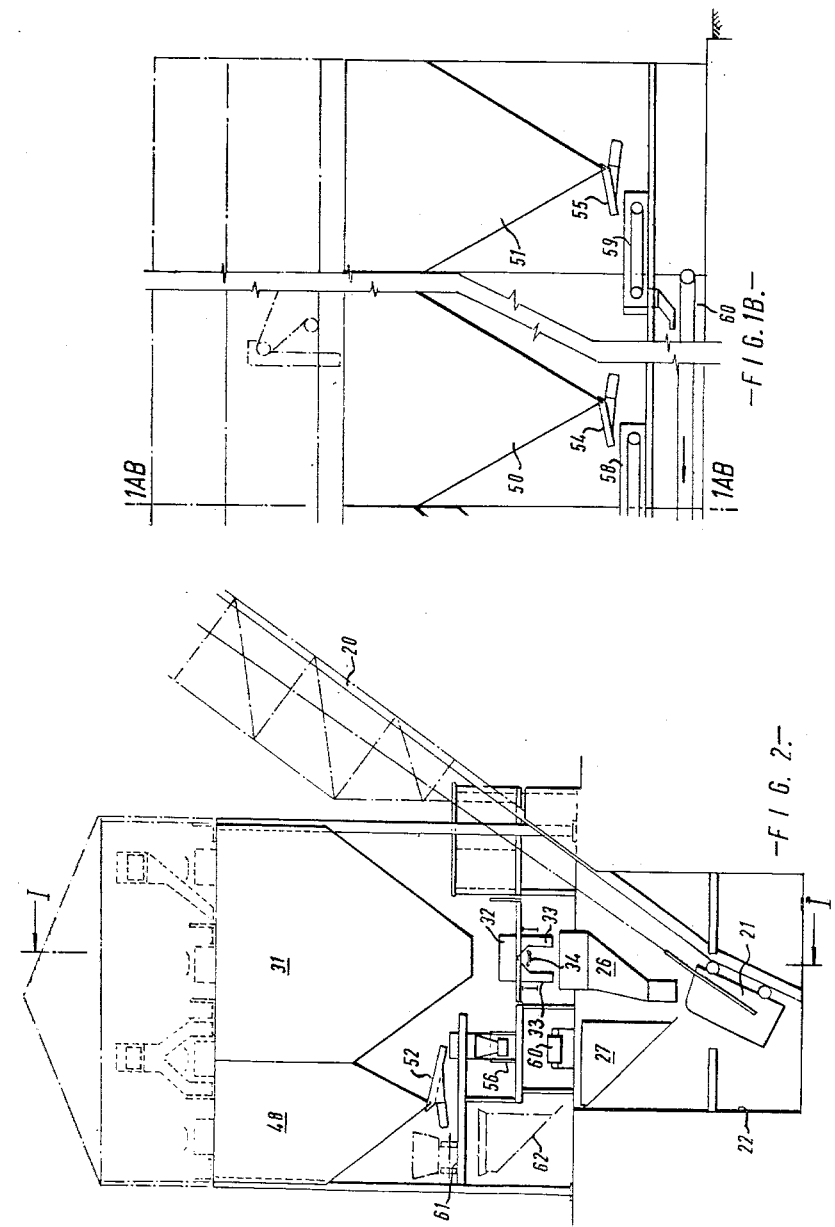

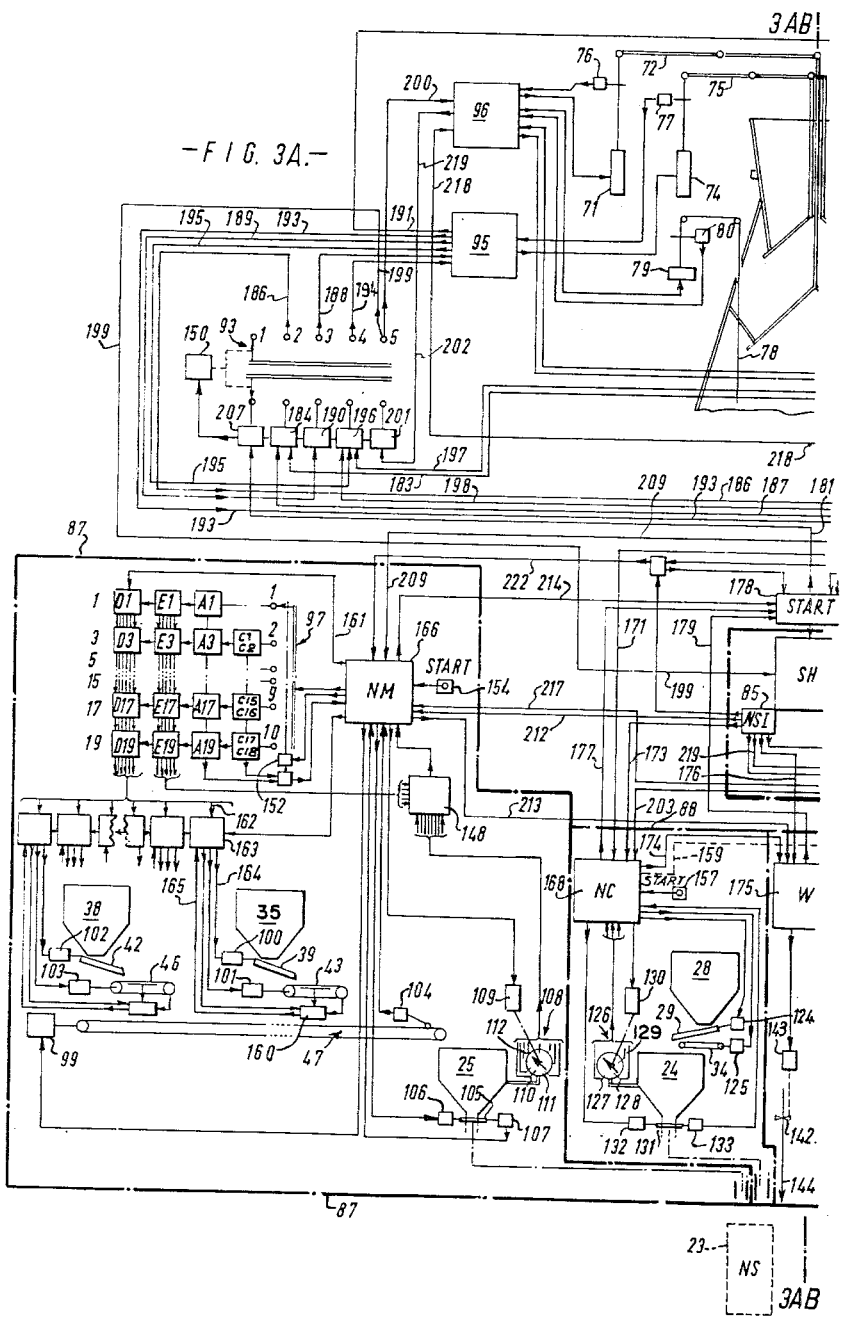

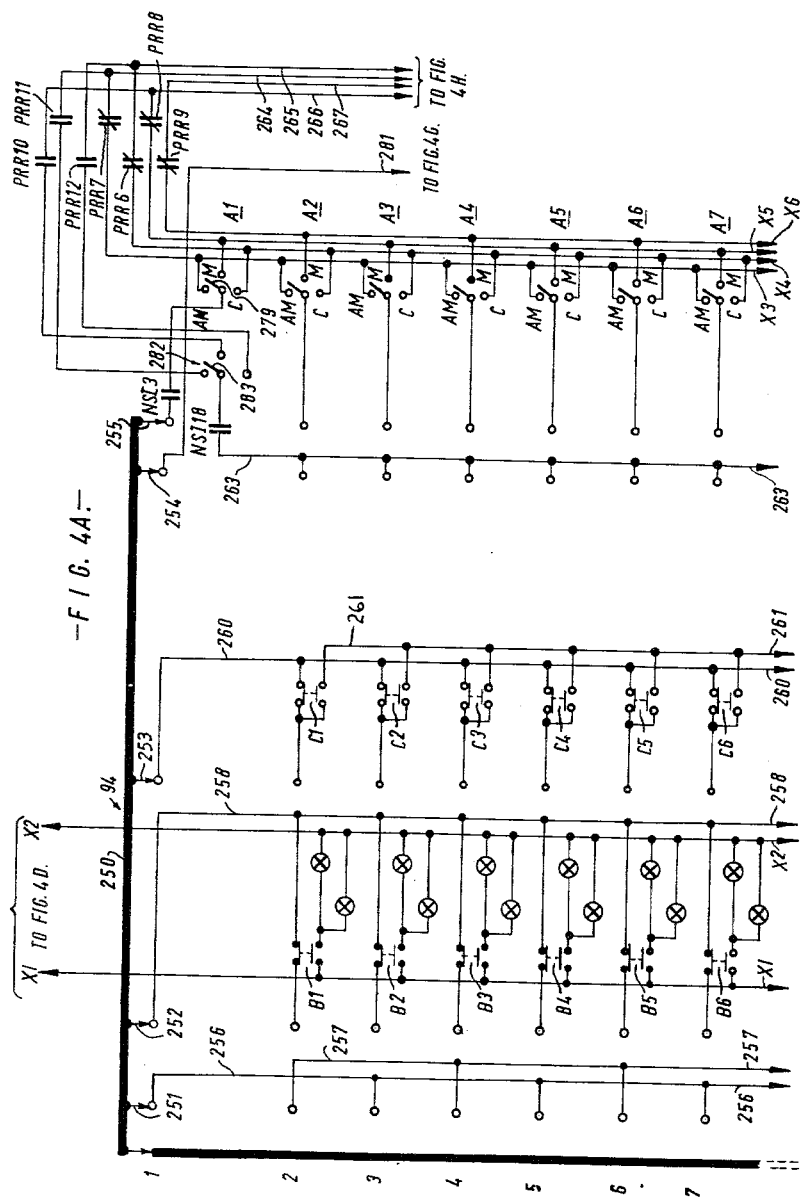

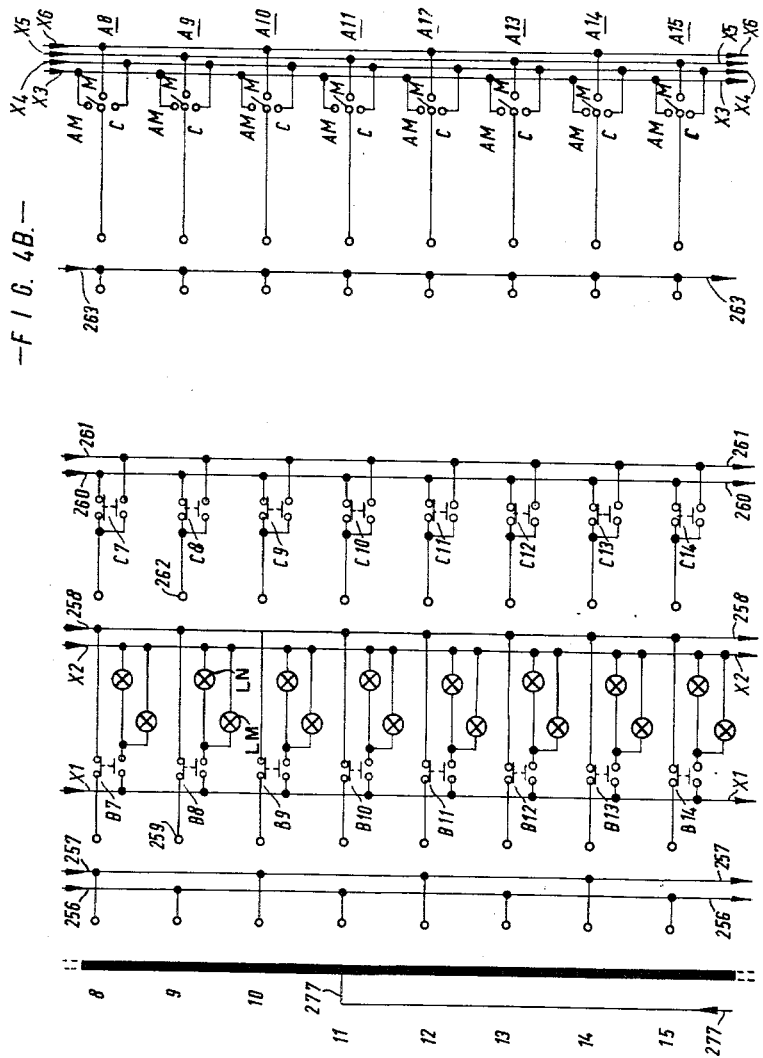

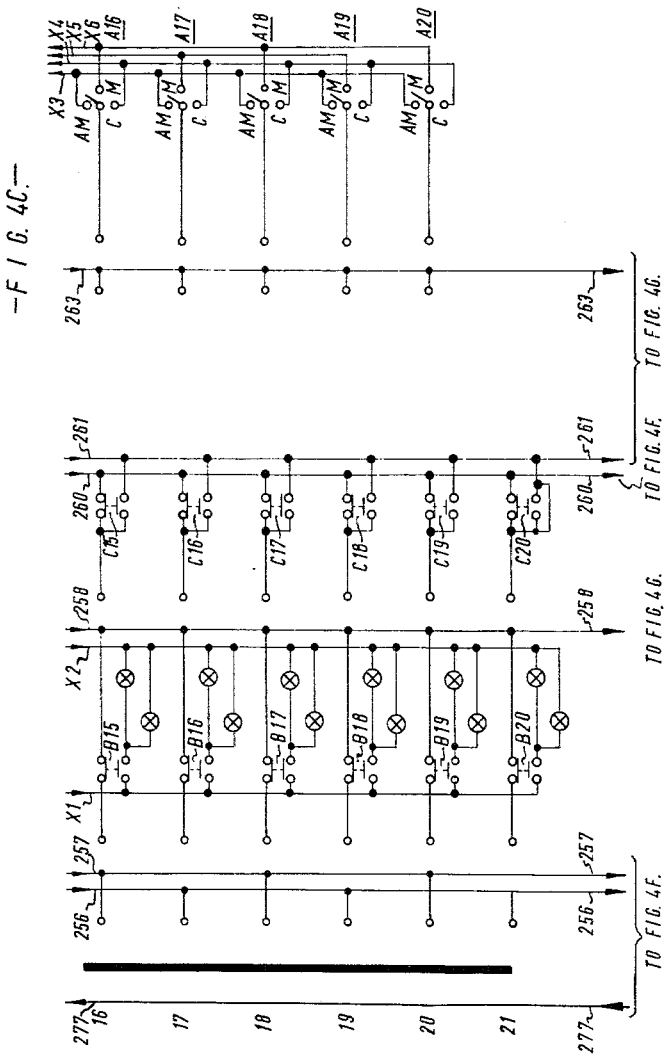

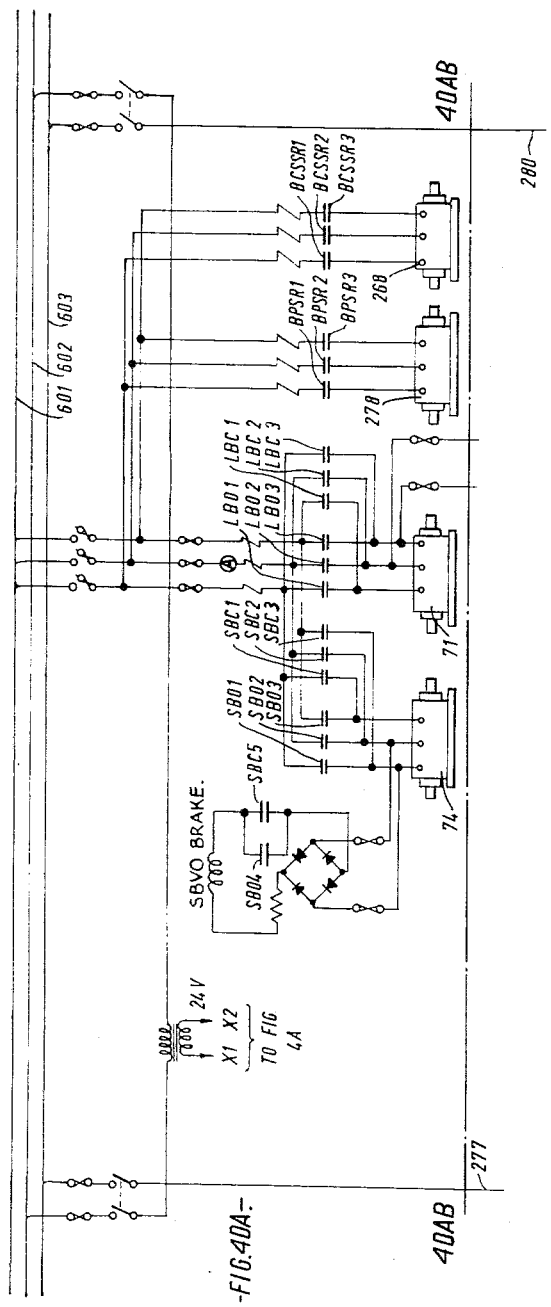

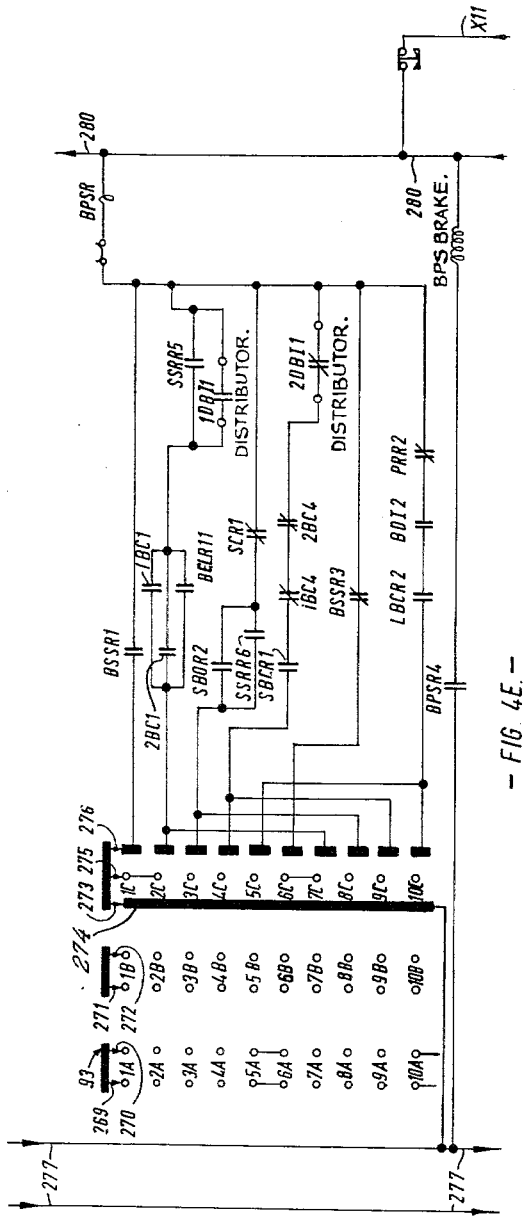
- FIG. 4E. -

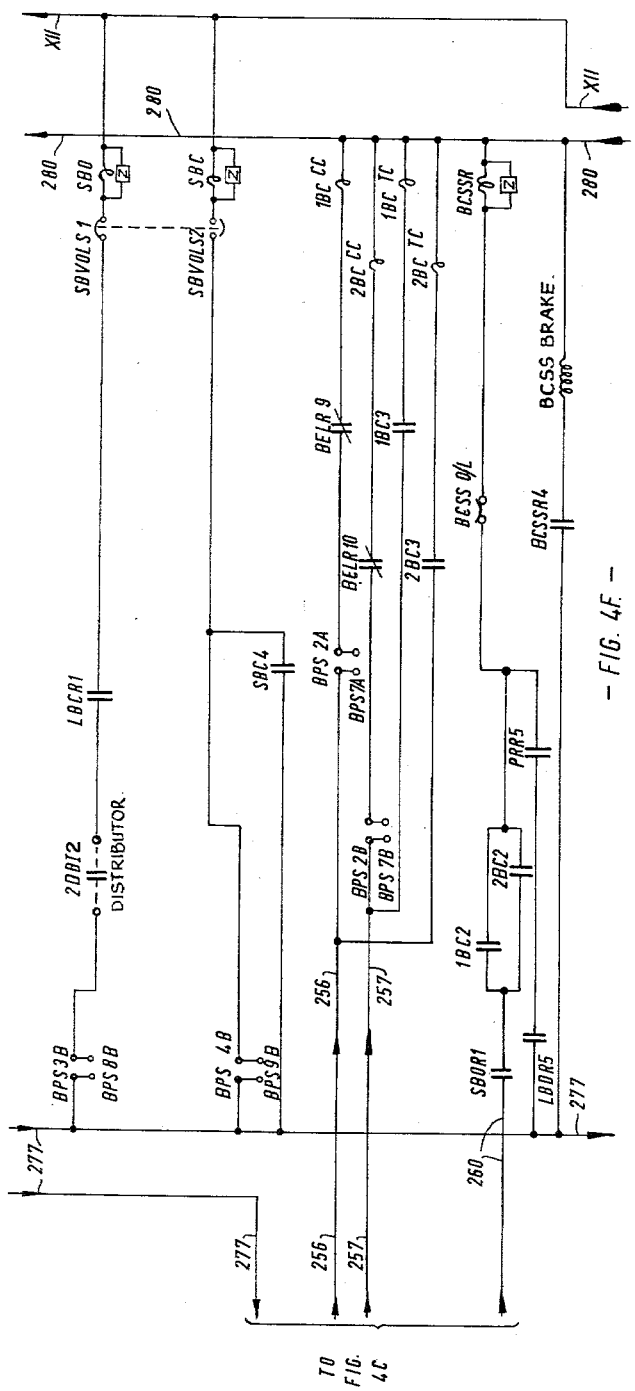

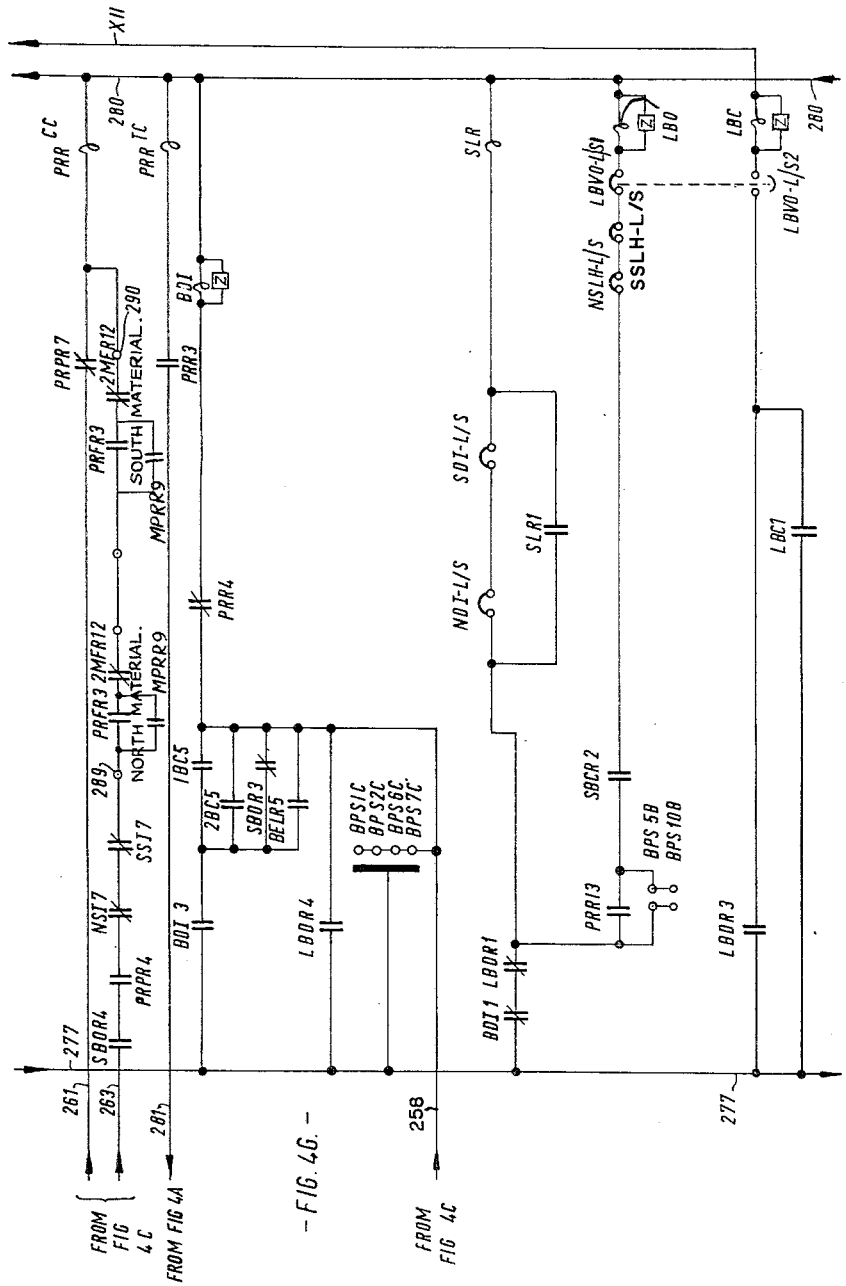

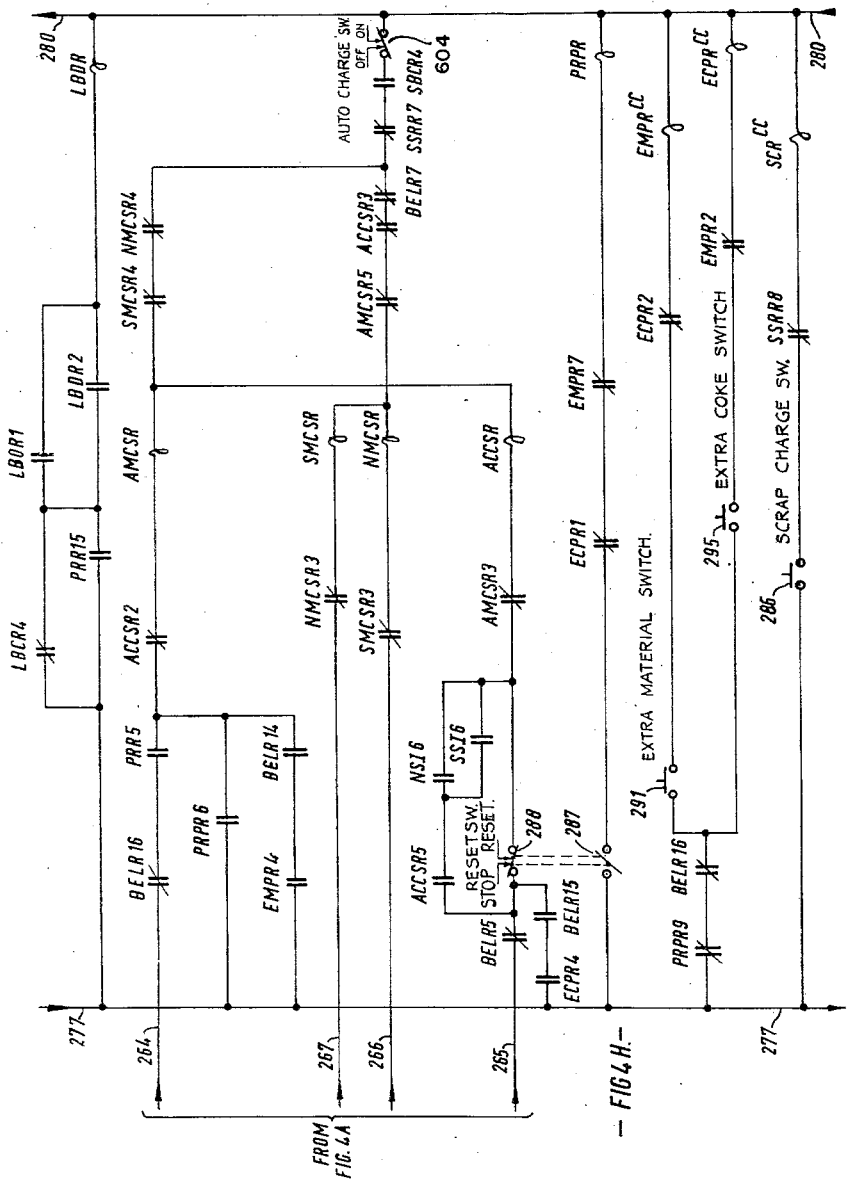

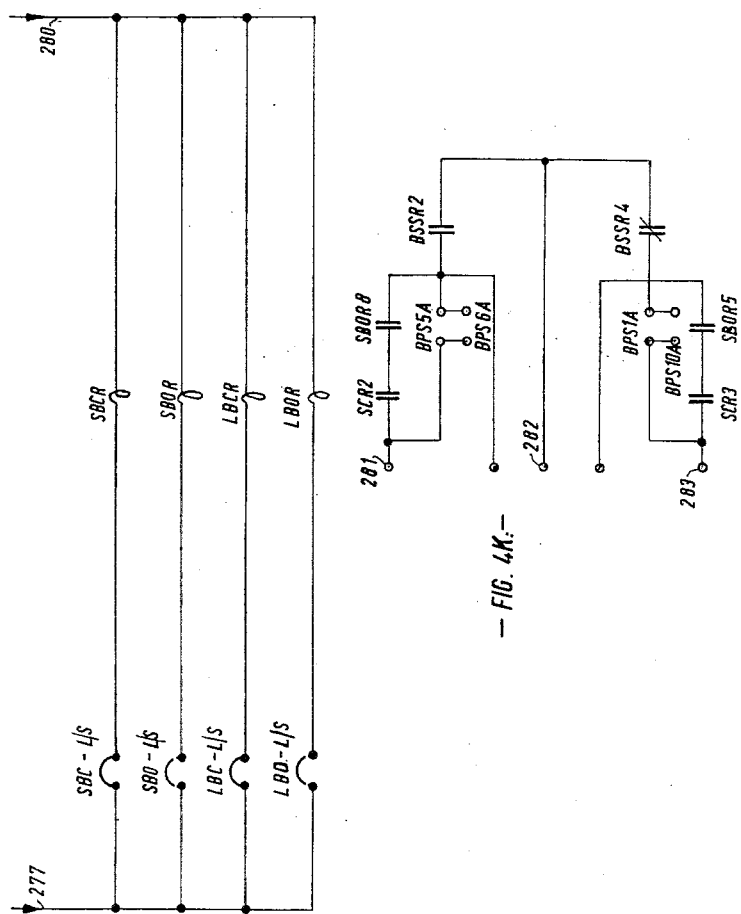
FIG. 4.K.

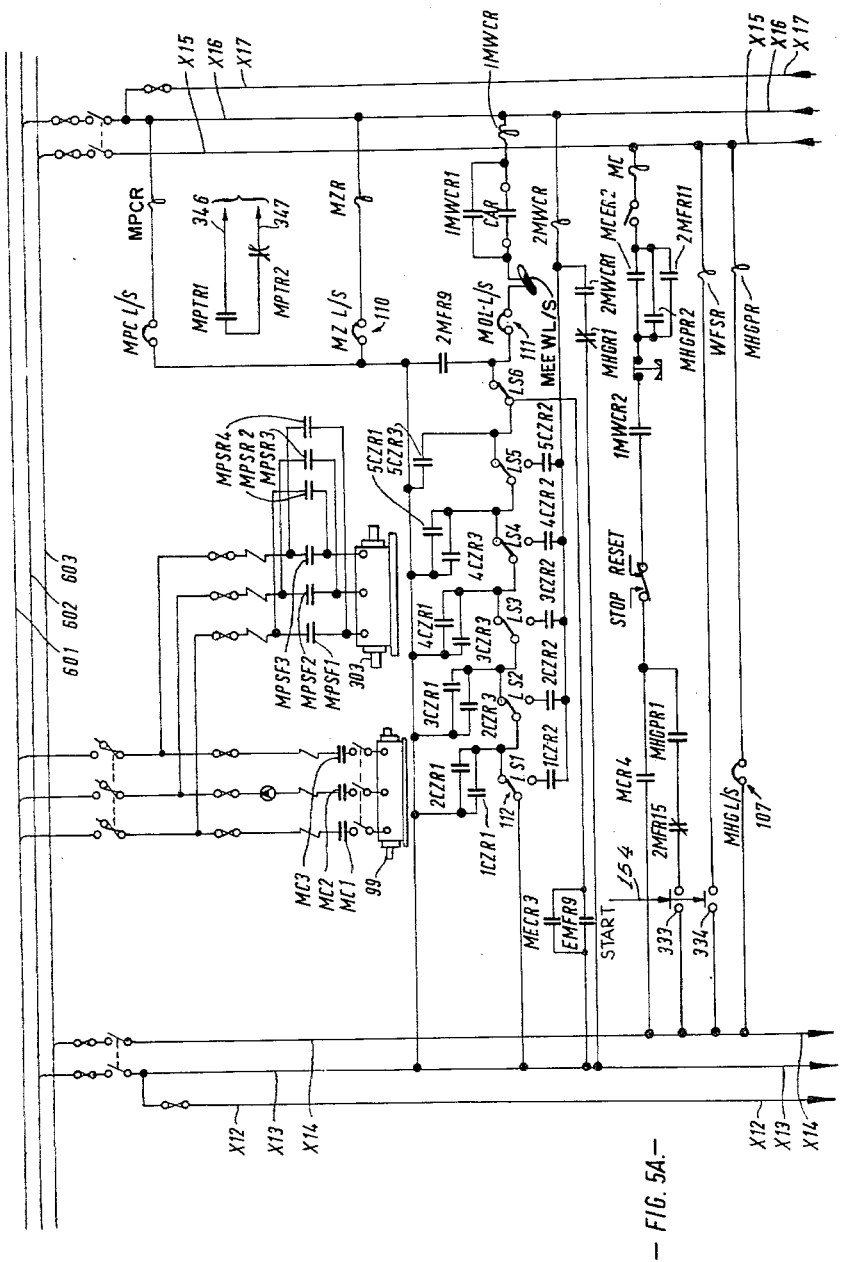
- FIG. 5A.-

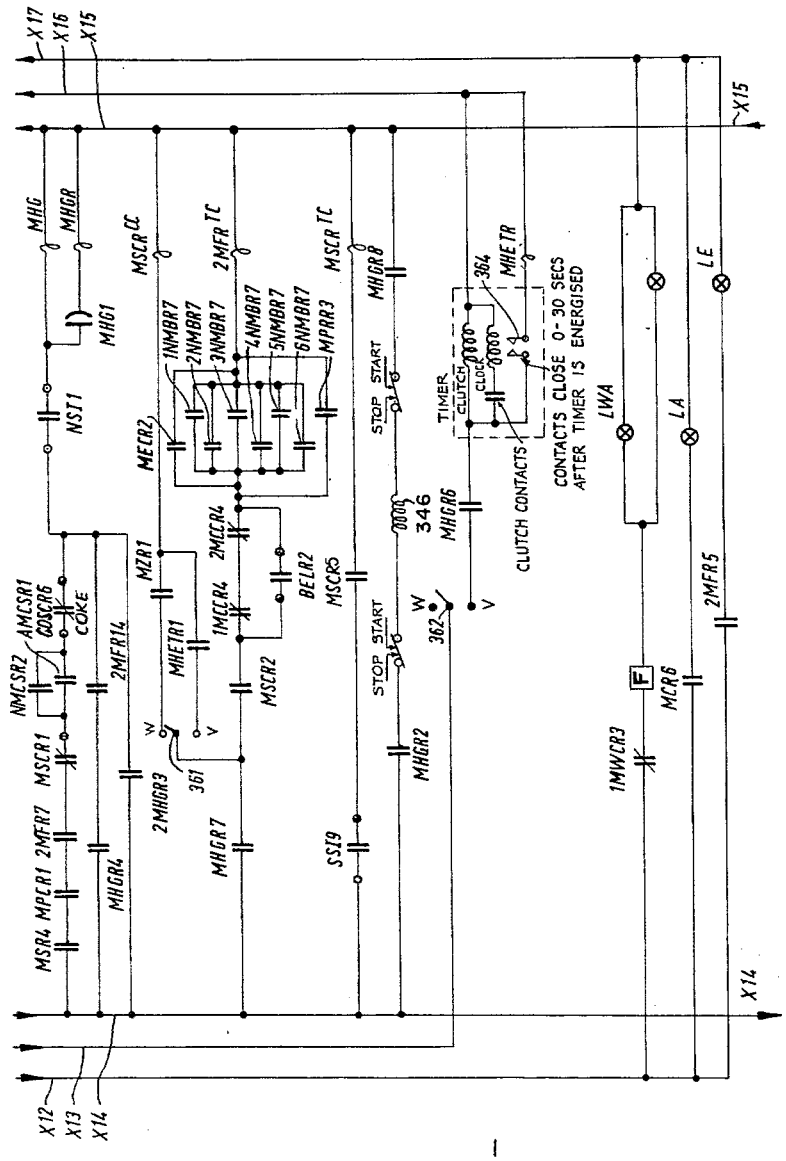
- FIG. 5C. -

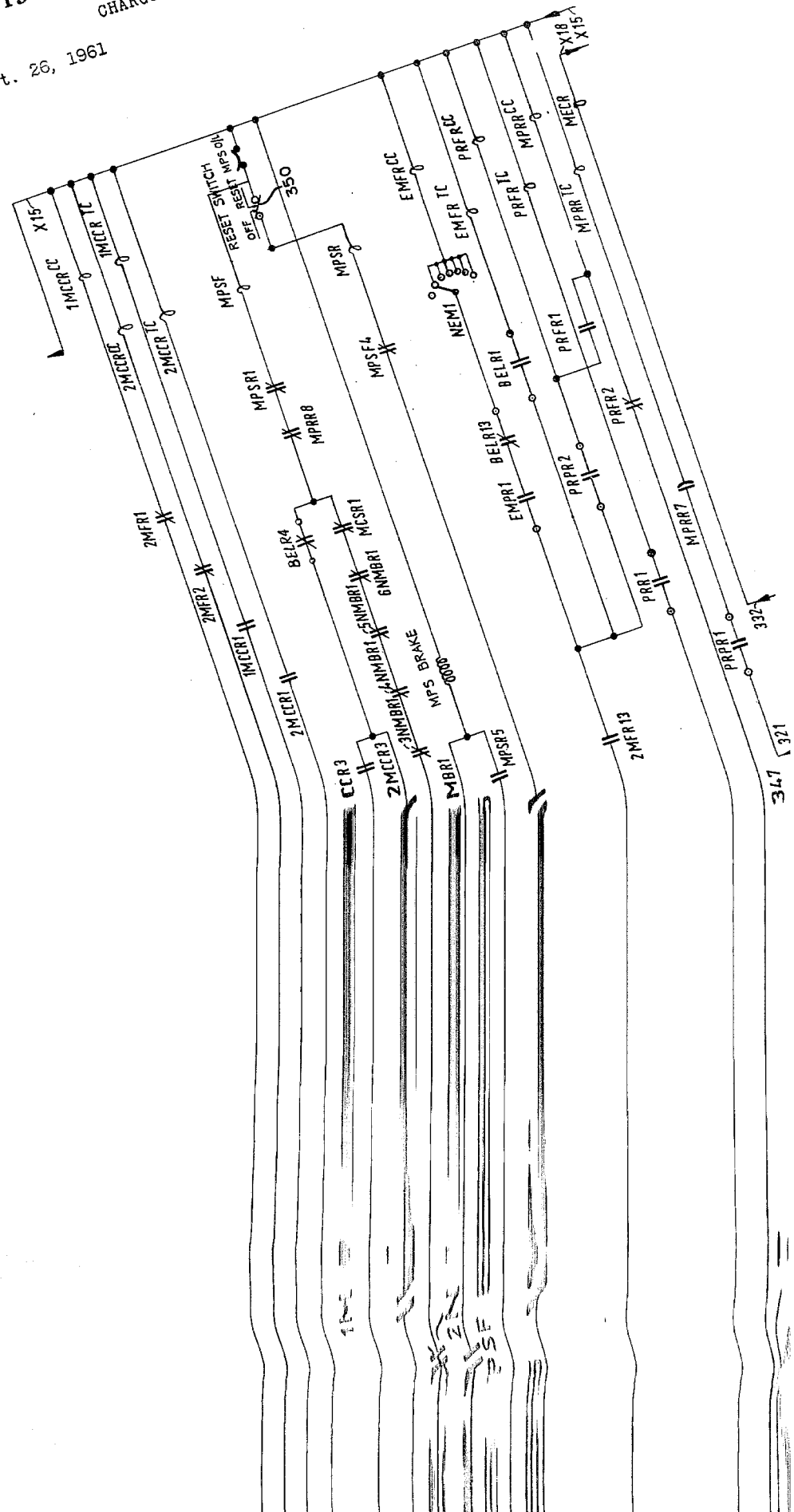

March 1, 1966
Filed Sept. 26, 1961
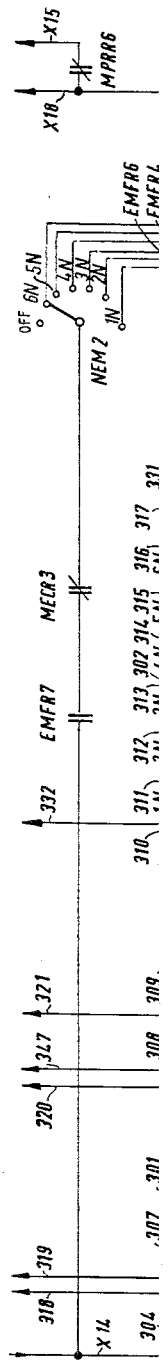

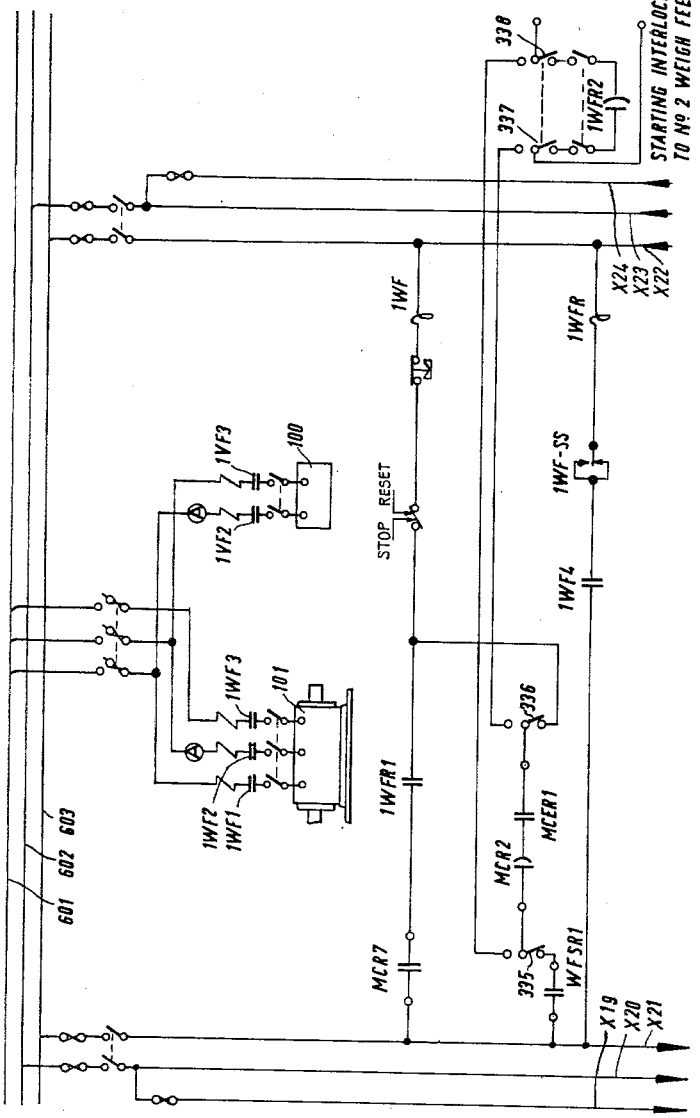

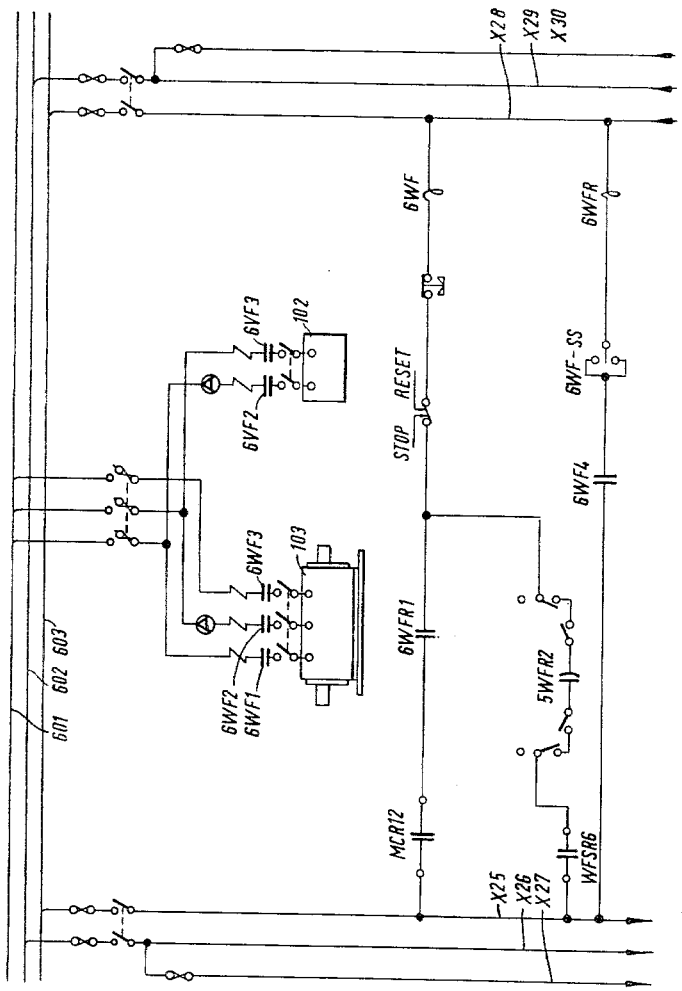

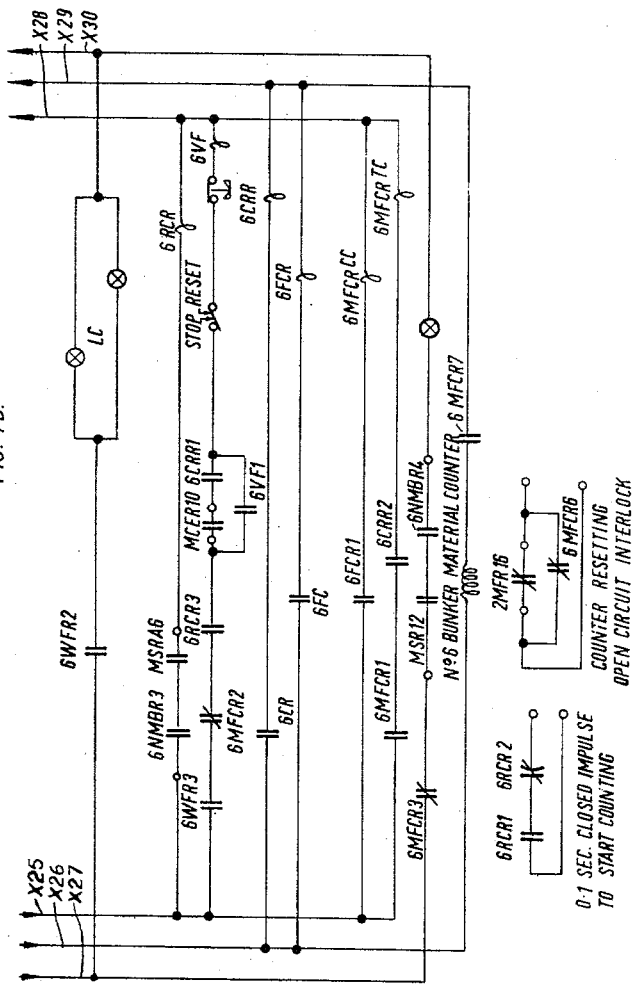

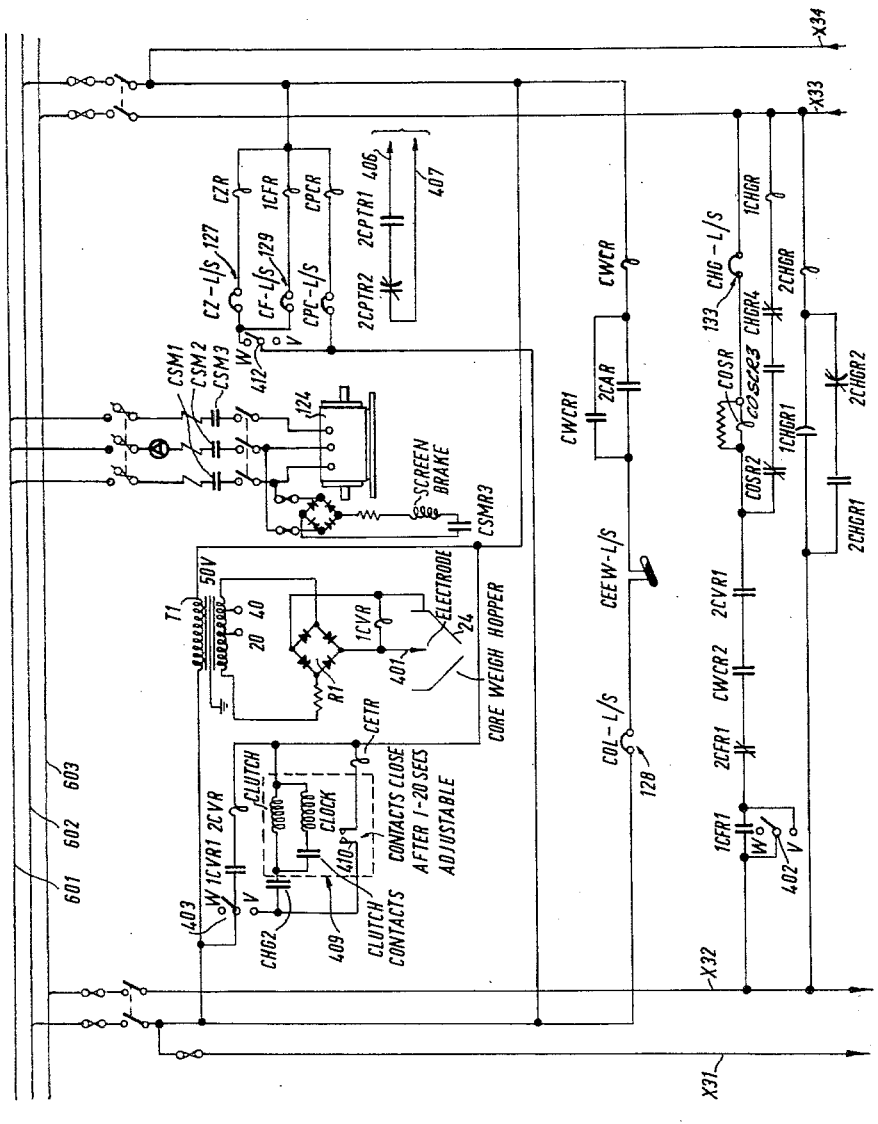

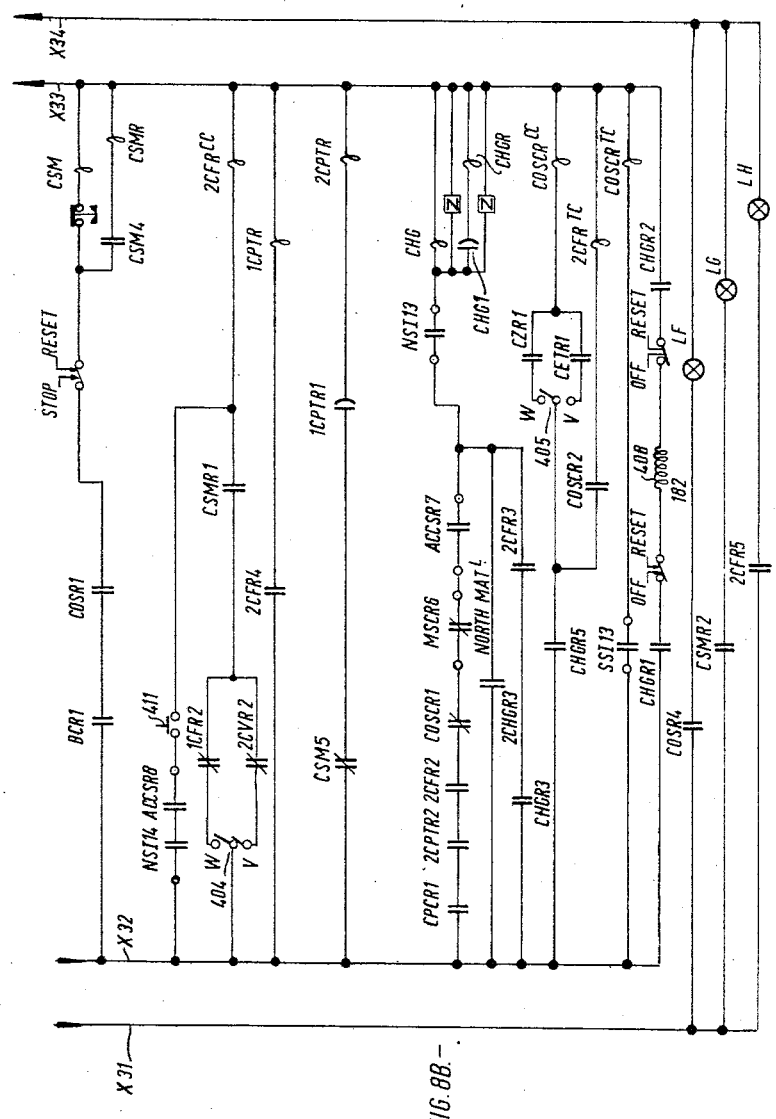
-FIG. 8B.-

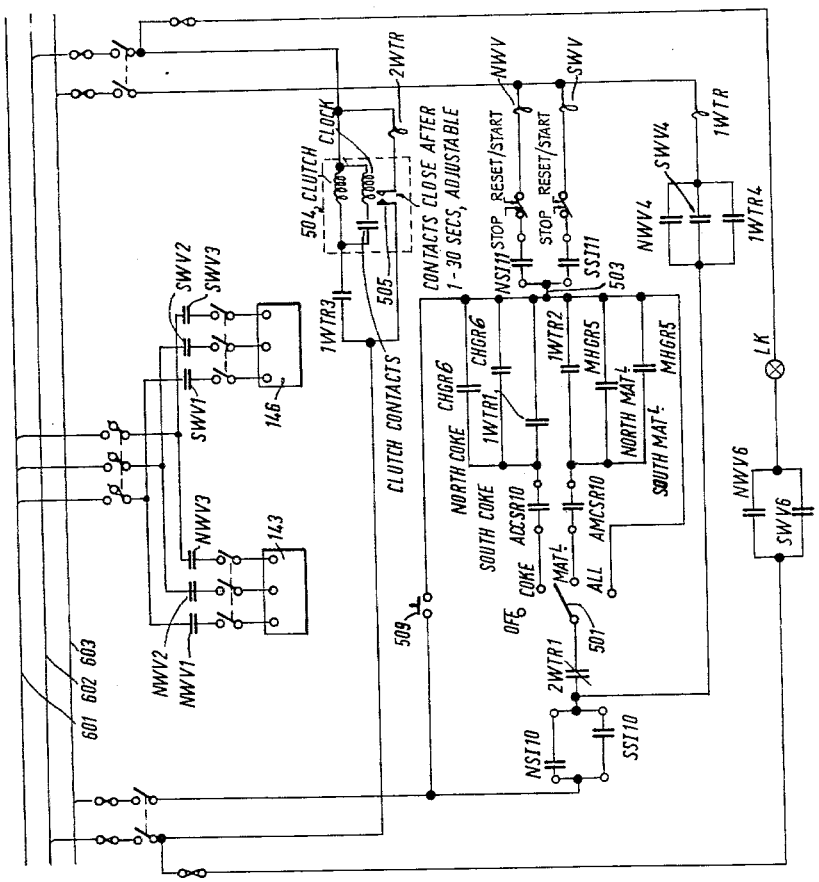
-FIG. 9.-

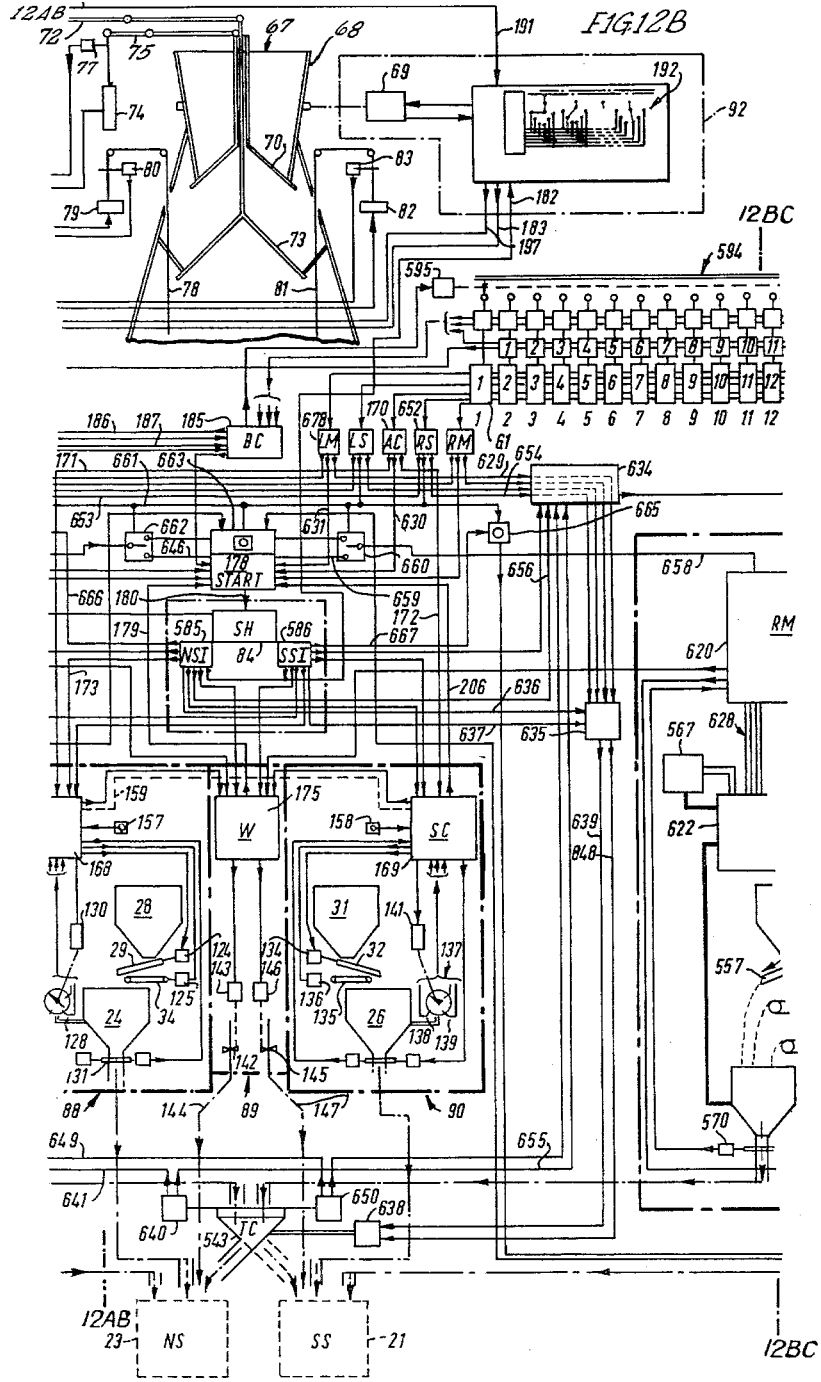

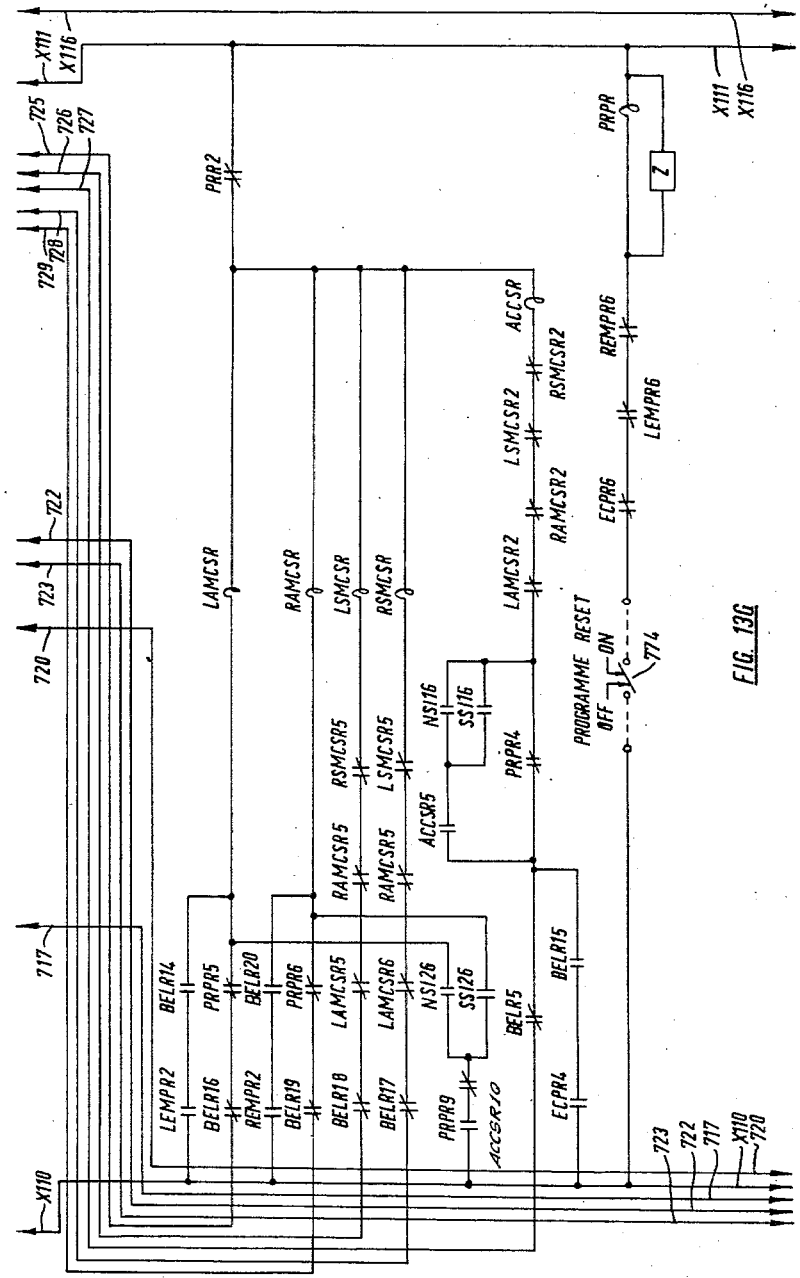

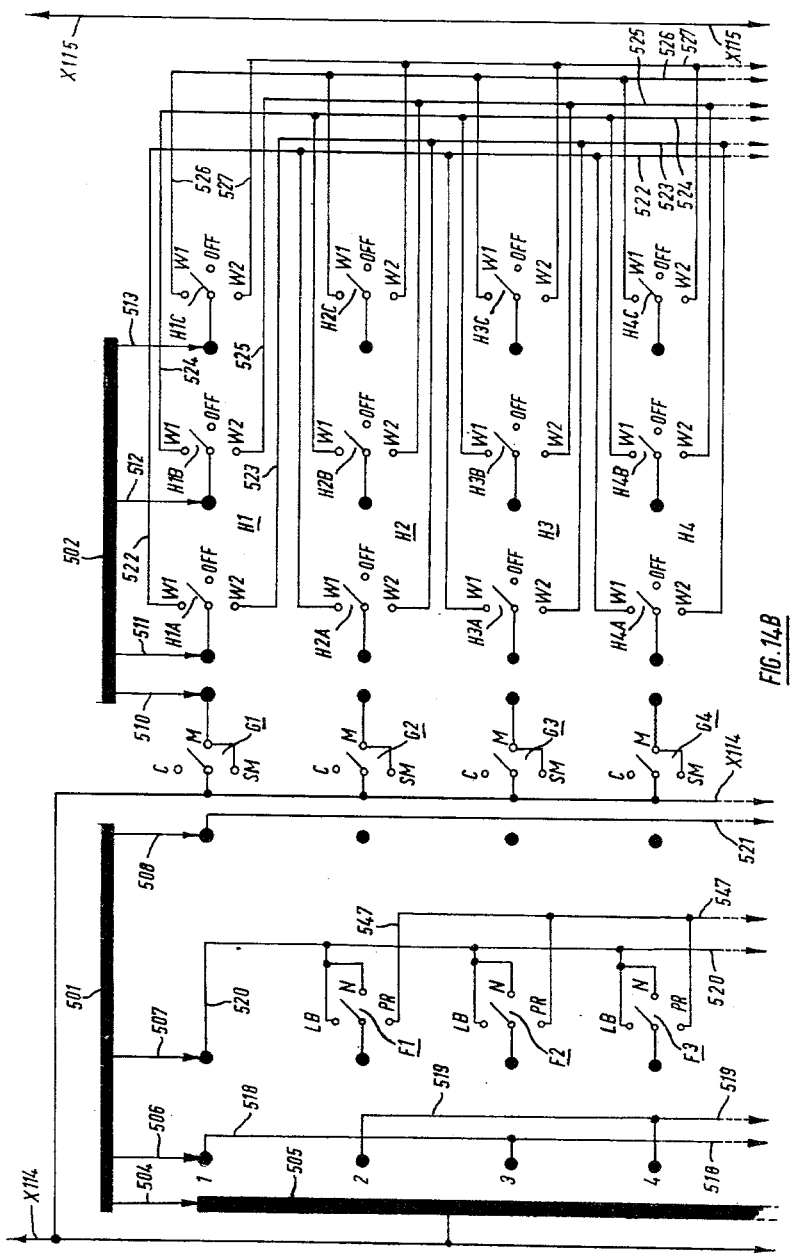

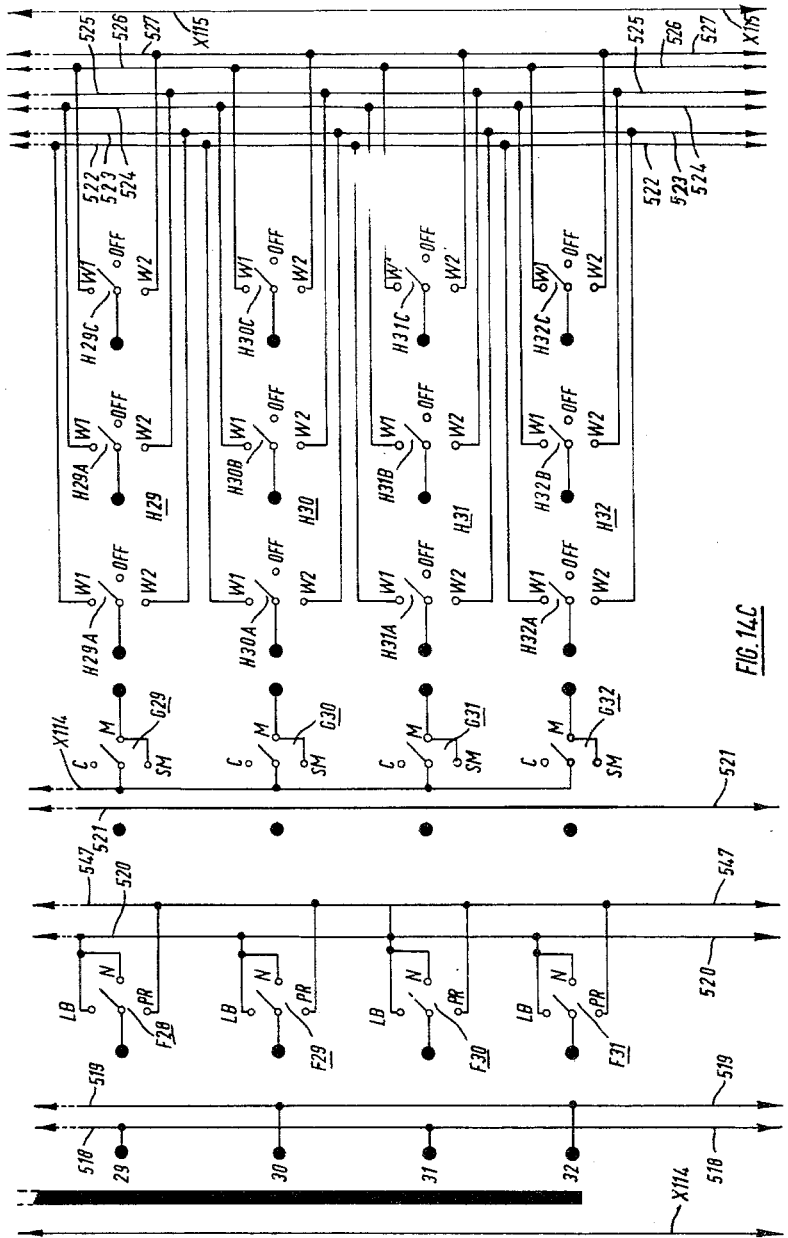

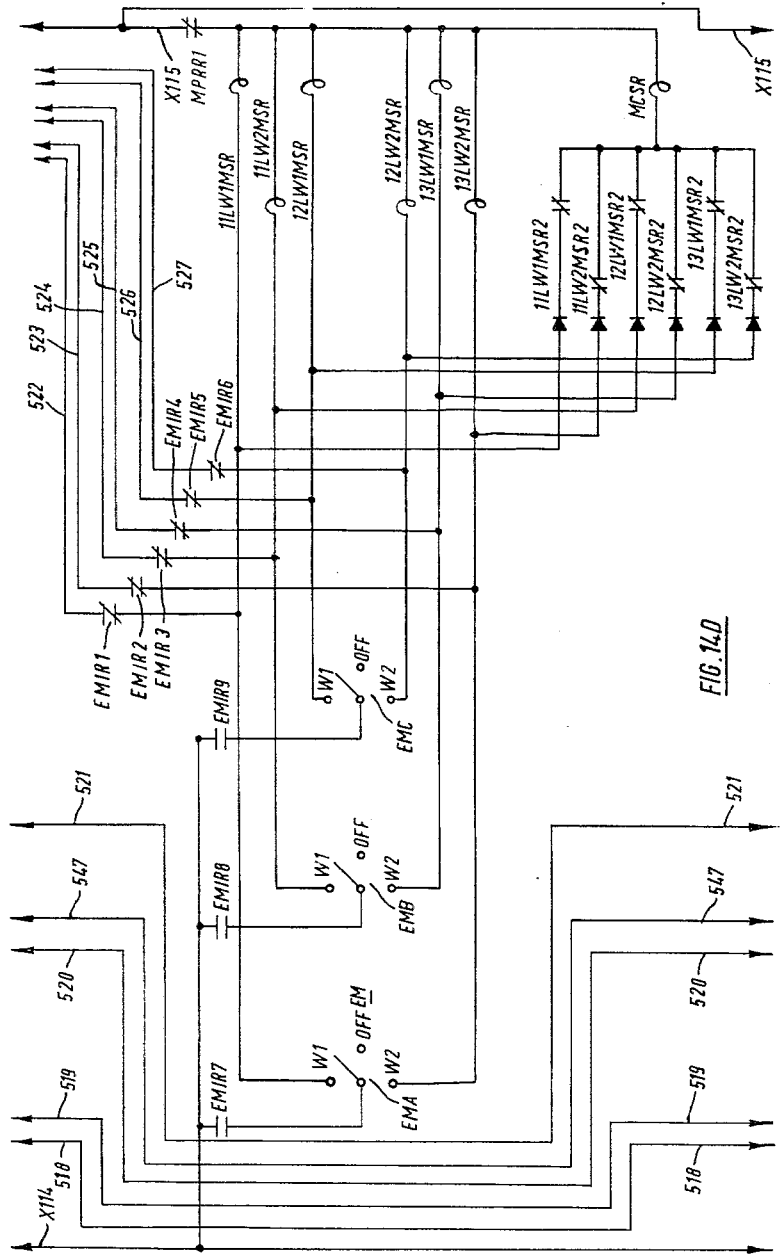
FIG. 14.0

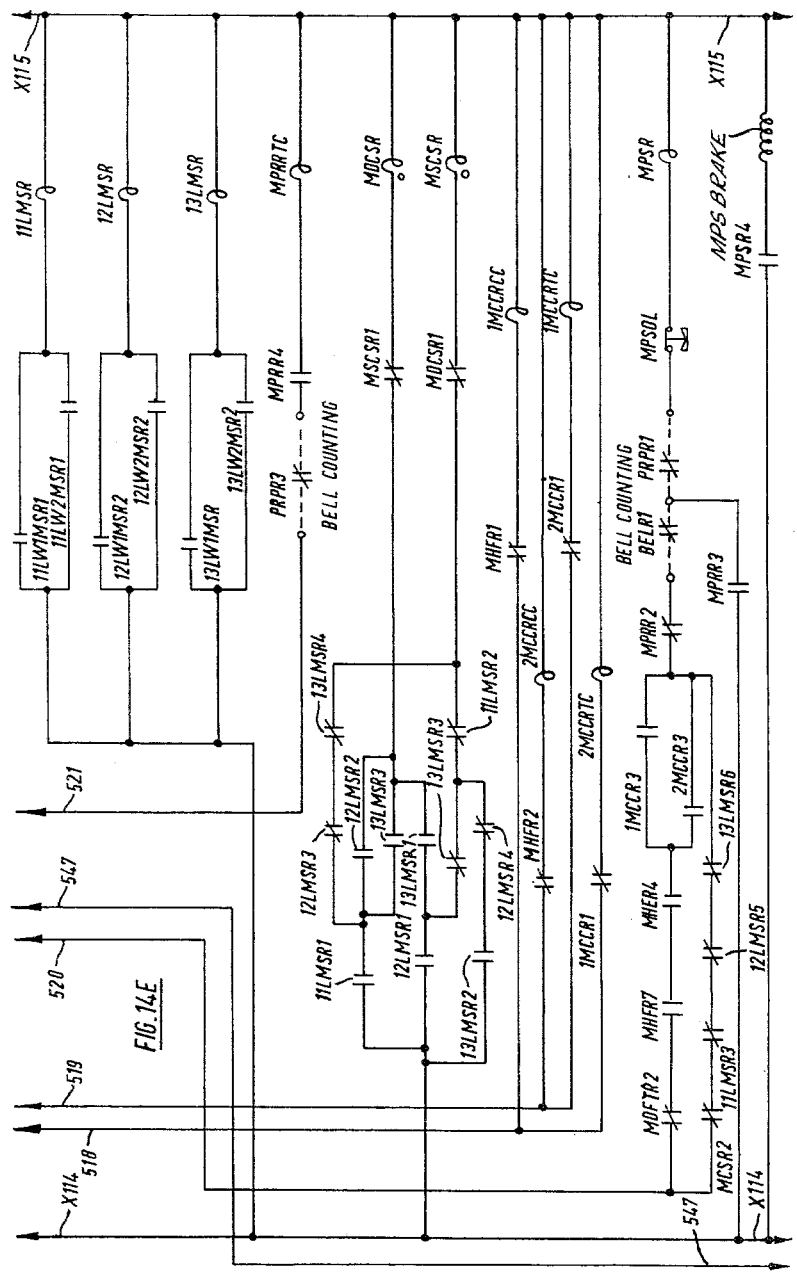
FIG. 14.E

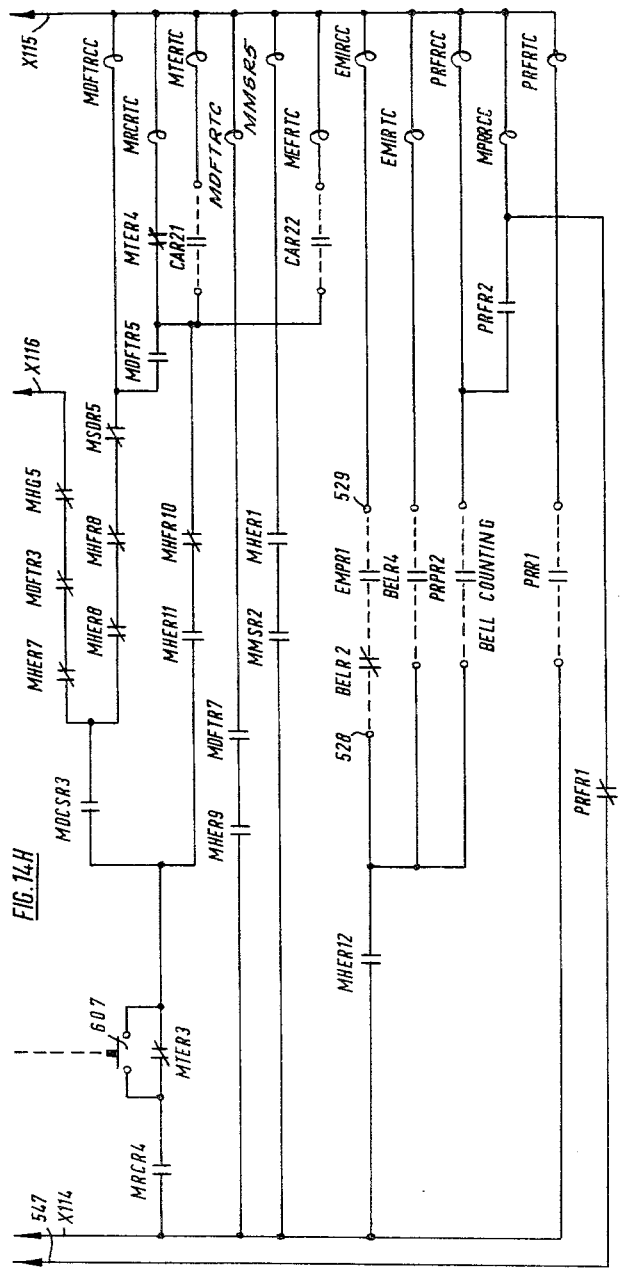

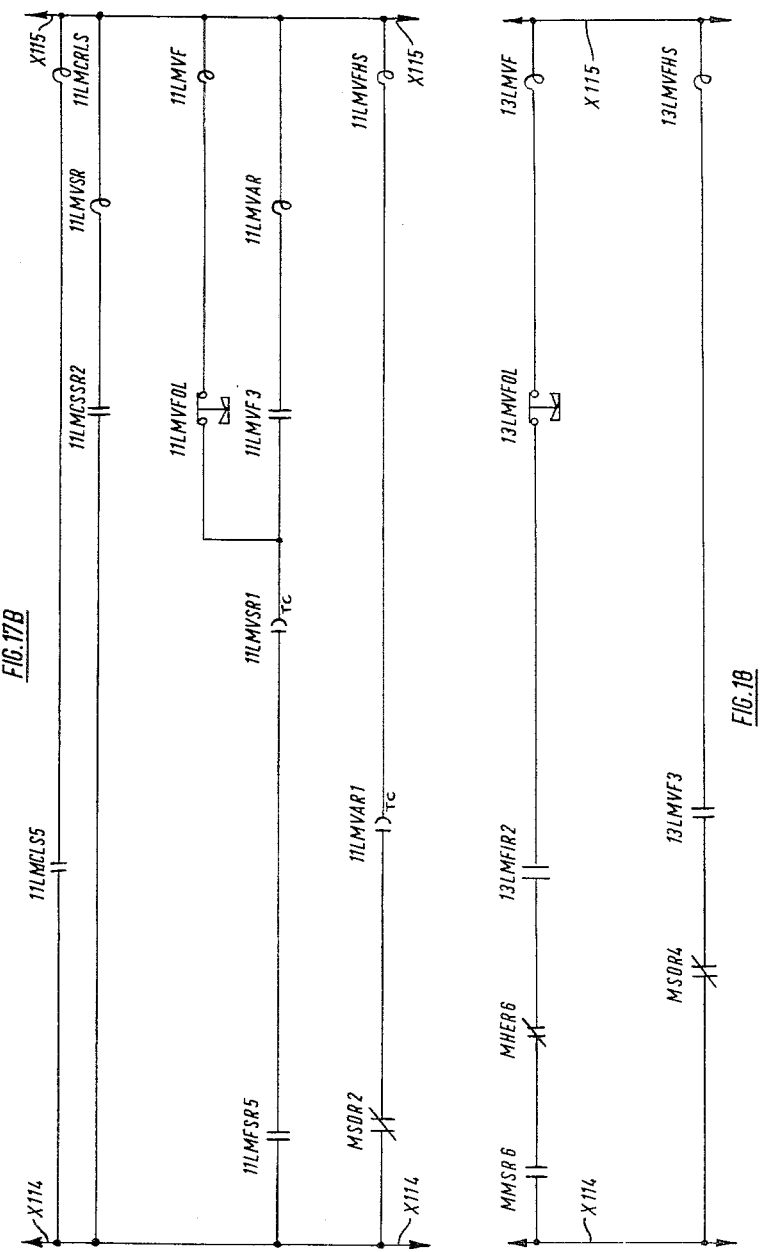

United States Patent Office 3,237,785
Patented Mar. 1, 1966

3,237,785
CHARGING APPARATUS FOR SHAFT FURNACES
Frank Richmond Holmes, Darlington, County Durham, and Armstrong Lincoln Stoddart, Sunderland, County Durham, England, assignors to Ashmore, Benson, Pease and Company Limited, Stockton-on-Tees, County Durham, England
Filed Sept. 26, 1961, Ser. No. 140,880
Claims priority, application Great Britain, Oct. 1, 1960, 33,756/60
38 Claims. (Cl. 214—2)

The present invention relates to charging apparatus for shaft furnaces and is particularly applicable to furnaces equipped with a skip hoist and is applicable to charging apparatus for a blast furnace.

According to one feature of the present invention, charging apparatus for a shaft furnace equipped with a skip hoist includes means for automatically feeding to the skip predetermined quantities of solid fuel and water and predetermined quantities of at least two other materials, such as metal ore and flux, in a predetermined sequence programme.

According to another feature of the invention, charging apparatus for a blast furnace equipped with a skip hoist includes means for automatically feeding to the skip predetermined quantities of coke and water and predetermined quantities of at least two other materials, such as iron ore and limestone, in a predetermined sequence programme.

According to another feature of the invention, charging apparatus for a blast furnace equipped with a skip hoist and with means for automatically feeding to the skip predetermined quantities of coke and water, includes means for automatically feeding to the skip predetermined quantities of at least two other materials, such as iron ore and limestone, and programme control means for rendering all said feeding means individually operative singly or in combinataion in a preselected sequence.

According to a still further feature of the present invention charging apparatus for a blast furnace equipped with a skip hoist includes means for automatically feeding to the skip predetermined quantities of coke and water and predetermined quantities of at least two other materials, such as iron ore and limestone, and control means for rendering each of said feeding means individually operative in a preselected sequence programme and initiating successive skip hoisting operations upon completion of each sequence in said programme.

Preferably the apparatus includes means for automatically feeding to the skip predetermined quantities of sinter, said control means also rendering the sinter feeding means operative in said preselected sequence programme.

The means for feeding iron ore may comprise a bin for receiving a supply of ore, means for starting and stopping delivery of ore from said bin, and weighing means responsive to receipt or passage of said preselected quantity of ore for controlling stopping of said delivery means, but preferably comprises a plurality of bins, each for receiving ore, delivery means for withdrawing ore from each bin responsive to said control means for starting delivery of material from that bin and responsive to weighing means associated with and individual to that bin and responsive to receipt or passage of a preselected quantity of ore from that bin for stopping delivery of material from that bin.

The means for feeding limestone may comprise a bin for receiving a supply of limestone, means for starting and stopping delivery of limestone from said bin, and weighing means responsive to receipt or passage of said preselected quantity of limestone for controlling stopping of said delivery means, but preferably comprises a plurality of bins, each for receiving limestone, delivery means for withdrawing limestone from each bin responsive to said control means for starting delivery of material from that bin and responsive to weighing means associated with and individual to that bin and responsive to receipt or passage of a preselected quantity of limestone from that bin for stopping delivery of material from that bin.

The means for feeding sinter may comprise a bin for receiving a supply of sinter, means for starting and stopping delivery of sinter from said bin, and weighing means responsive to receipt or passage of said preselected quantity of sinter for controlling stopping of said delivery means, but preferably comprises a plurality of bins, each for receiving sinter, delivery means for withdrawing sinter from each bin responsive to said control means for starting delivery of material from that bin and responsive to weighing means associated with and individual to that bin and responsive to receipt or passage of a preselected quantity of sinter from that bin for stopping delivery of material from that bin.

The means for feeding another material may comprise a bin for receiving a supply of another material such as scrap iron, means for starting and stopping delivery of another material, such as scrap iron from said bin, and weighing means responsive to receipt or passage of said preselected quantity of sinter for controlling stopping of said delivery means, but preferably comprises a plurality of bins, each for receiving another material, such as scrap iron, delivery means for withdrawing another material, such as scrap iron, from each bin responsive to said control means for starting delivery of material from that bin and responsive to weighing means associated with and individual to that bin and responsive to receipt or passage of a preselected quantity of another material, such as scrap iron, from that bin for stopping delivery of that material from that bin.

In a preferred embodiment each delivery means for withdrawing ore or limestone or sinter or said another material from a bin is an electrically operated vibratory feeder, and each weighing means comprises a continuously movable conveyor for receiving material from a delivery means, weight responsive means carrying at least a part of said conveyor, tachometric means responsive to the speed of said conveyor, and switching means responsive to said weight responsive means and said tachometric means for providing a delivery means stopping signal when a preselected quantity of ore or sinter or limestone or said another material has been passed.

When the skip hoist is a double skip hoist having a first skip and a second skip the skips being hoisted alternately, two material check weigh hoppers are provided, a first hopper being associated with the first skip and the second hopper with the second skip and two conveyors are provided, the first conveyor for receiving material from a first group of said weighing means and feeding said material into the first material check weigh hopper and the second conveyor the second for receiving material from a second group of said weighing means and feeding that material into the second material check weigh hopper. Each material check weigh hopper conveniently has weighing means responsive to the weight of material in said hopper, and provided with at least two limit switching means, one adapted to be actuated when the hopper is substantially empty and another adapted to be actuated when the weight of material in the hopper is in excess of a predetermined value, and has a plurality of additional limit switches each operable at individually predetermined values of weight of material in the hopper. Preferably the means for feeding coke comprises for each skip a bin for receiving a supply of coke, a coke screen for withdrawing coke from said bin and responsive to said control means for starting delivery of coke from that bin and feeding it to a coke check hopper, means responsive to the quantity of coke in said check hopper for stopping the coke screen, a coke discharge gate for said coke check hopper, and means responsive to said control means for opening said coke discharge gate for discharge of coke from said coke check hopper into a skip of the skip hoist when in registration therewith.

The programme control means in a preferred embodiment includes at least one step by step operated switch having a number of positions related to the maximum number of sequences in a programme and a plurality of separately and individually adjustable switch means are provided for each sequence in the programme. For each sequence in the programme one switch can be operated to select an automatic material charge. If a material charge is selected another switch means can be operated to select the constituents of the material charge. Thus any one of ore, sinter, limestone or other material or any combination of ore, sinter, limestone or other material may be selected.

Still further switch means associated with each sequence in the programme can be operated to select an opening and closing of the large bell for that sequence. The number of sequences in the programme is not restricted within the maximum and yet further switch means may be operated to determine which sequence shall denote the end of the programme.

Still further switch means may be provided to select a weight range or zone within which a charge of material should lie in any sequence for which an automatic material charge has been selected. In a preferred arrangement the control means includes one step by step material programme switch associated with the feeding of material charges to the first skip and a second step by step material programme switch associated with the feeding of material charges to the second skip.

Two further step by step switches are included, one for counting the sequences and normal operations of the small bell and the other for governing the sequence of operations of the small bell, large bell, skip hoist, distributor and the bell counting step by step switch.

Control means responsive to stock line levels are also included for restraining opening of the large bell unless the level of burden in the furnace as detected by the stock lines is sufficiently low.

In a further embodiment of the invention greater flexibility is achieved by providing a transfer chute to receive a charge of material from either of two weigh hoppers, each of which is associated with a separate group of bins for material, and arranging the transfer chute to be moved selectively into one of two positions so as to discharge material into whichever of the two skips of the double skip hoist is in the pit ready to receive a material charge. In such arrangement it is possible for two successive material charges, one into the north skip and the other into the south skip, to be drawn from a bin or bins in the same group of bins. Preferably an individual coke charging unit is associated with each of the skips and is arranged to discharge a charge of coke into its associated skip. In the material charging controls associated with each group of bins, material is withdrawn from each bin, as required, by a vibro feeder, and is delivered directly or by conveyor means into a weigh hopper common to that group of bins, and a weigher associated with the weigh hopper is conditioned according to the bin from which material is to be withdrawn and also according to the preselected weight of material to be so delivered. Material may be withdrawn from any combination of two bins or from a single bin of one group at any one sequence in the programme at which a material charge from that group of bins is pre-selected. Where two charges from different bins are pre-selected the material charging control conditions the weigher for a first charge from one of the bins selected and, after a pre-selected weight of material from that bin has been delivered and the weight thereof recorded, conditions the weigher for a pre-selected weight of material from a second bin.

The number of bins in each group can be the same or different. One bin in a group may be subdivided into two sub-bins and when that bin is selected material can be withdrawn from either or both of the sub-bins, either sequentially or simultaneously, or in a time-separated relationship. Two hoppers for scrap material may be provided, one associated with each skip, and the material programme may be arranged to include one or more sequences during which a charge of material is delivered to a skip through the transfer chute and a charge of scrap material is delivered to the same skip directly.

Each material charging control includes a step-by-step operated switch having a number of positions equal to the total number of possible sequences in a programme.

Figure 4J:
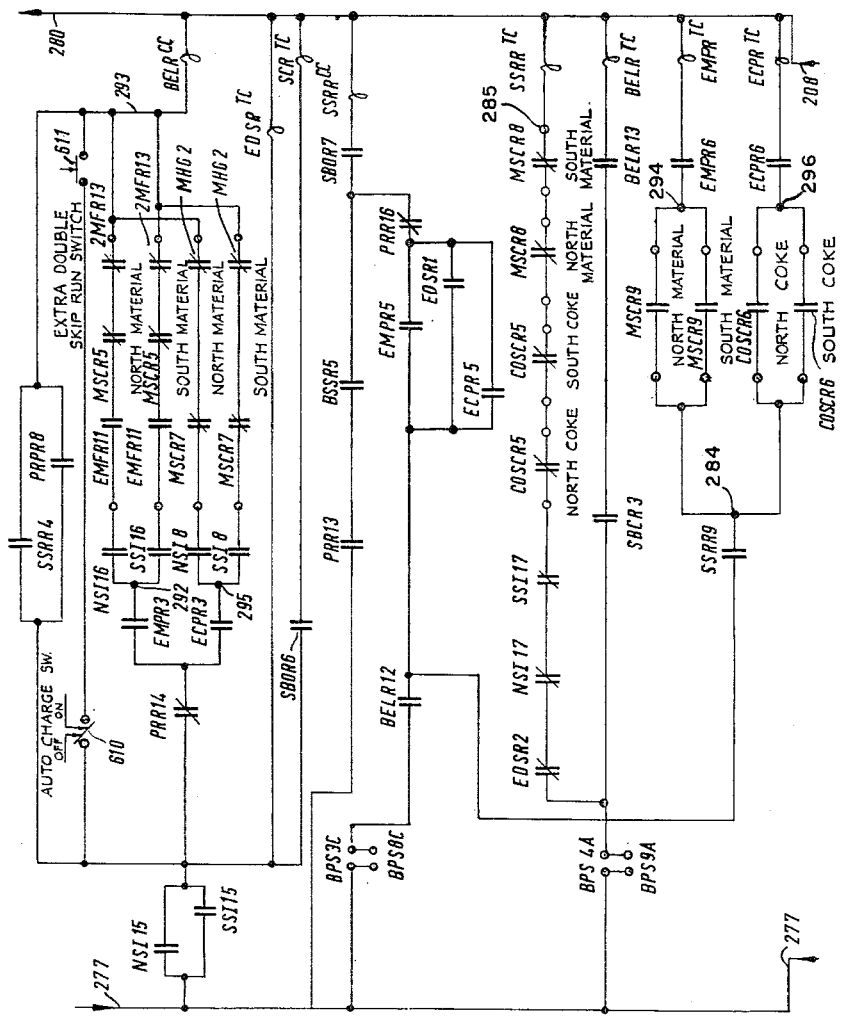
Figure 4D:
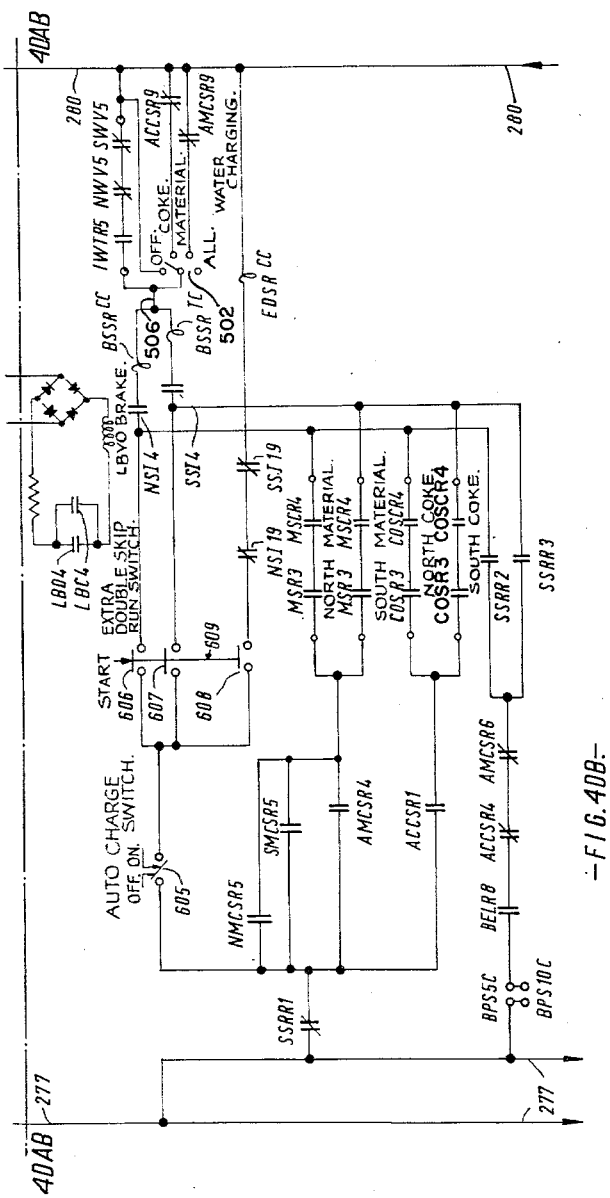
Figure 5B:
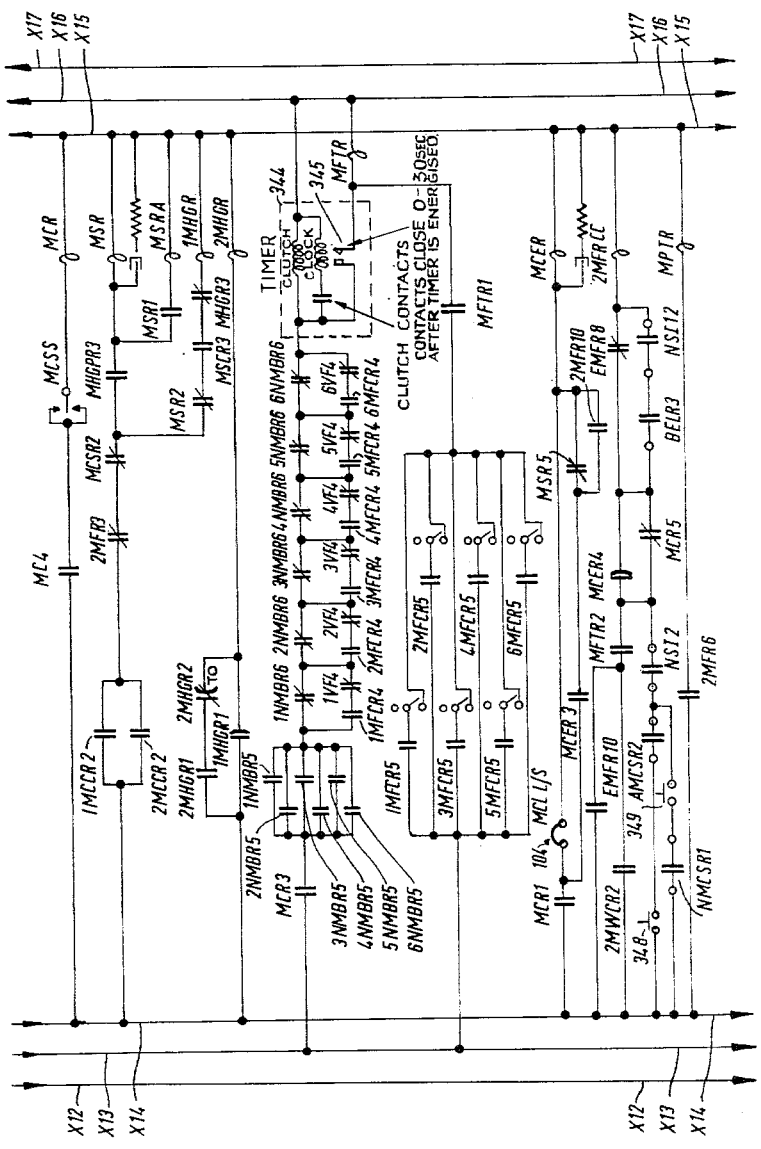
Figure 5F:
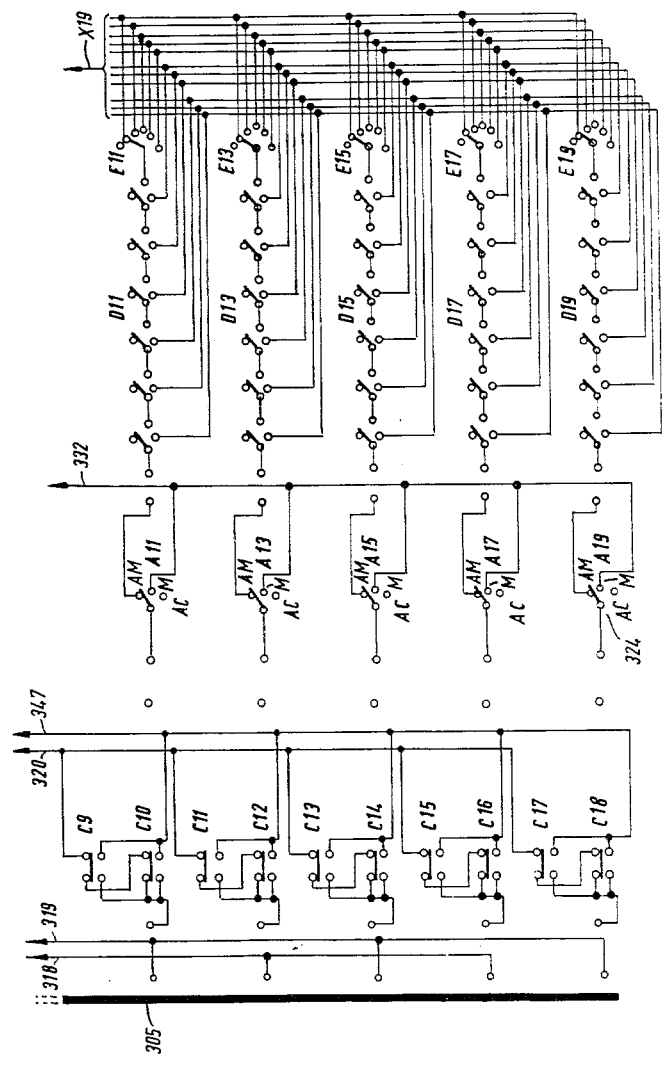
Figure 6B:
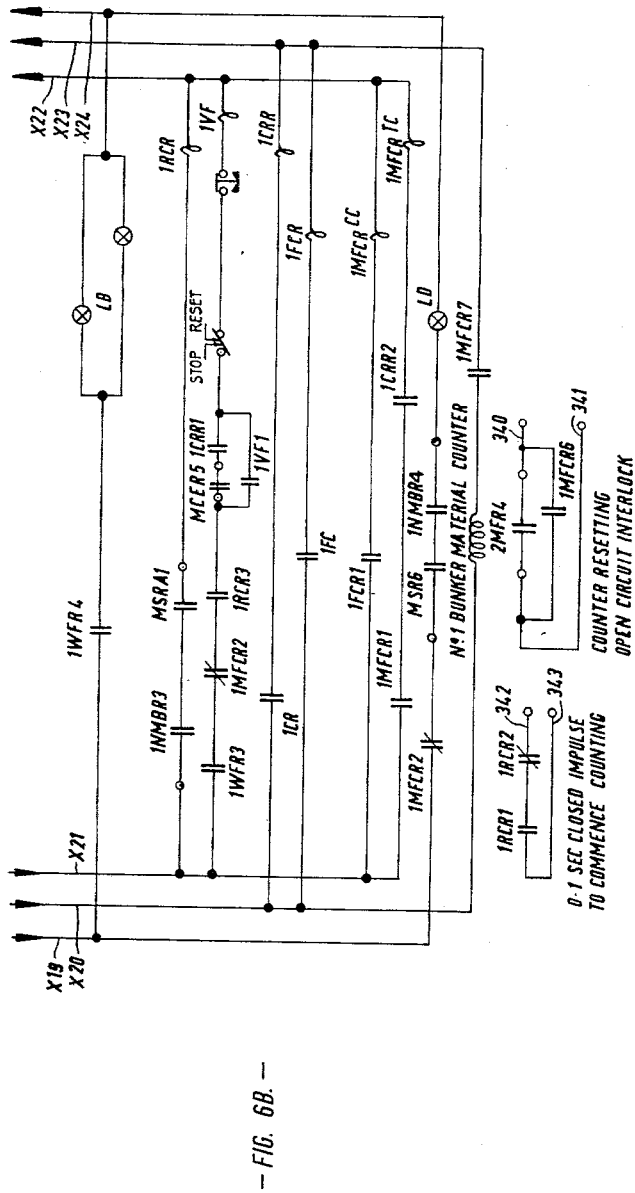
Figure 10A:
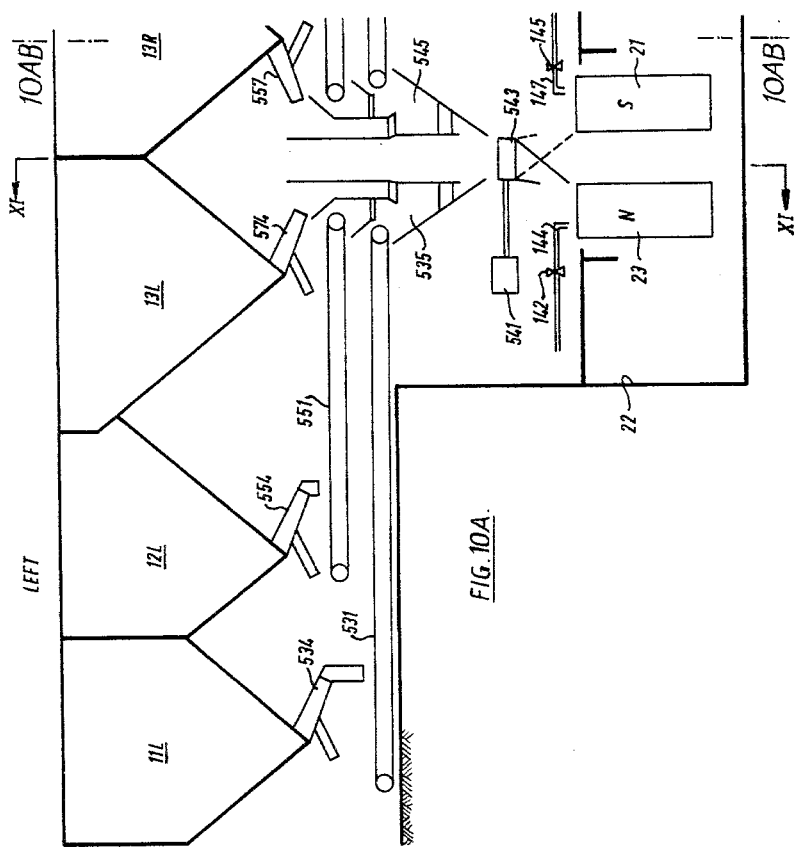
Figure 10B:
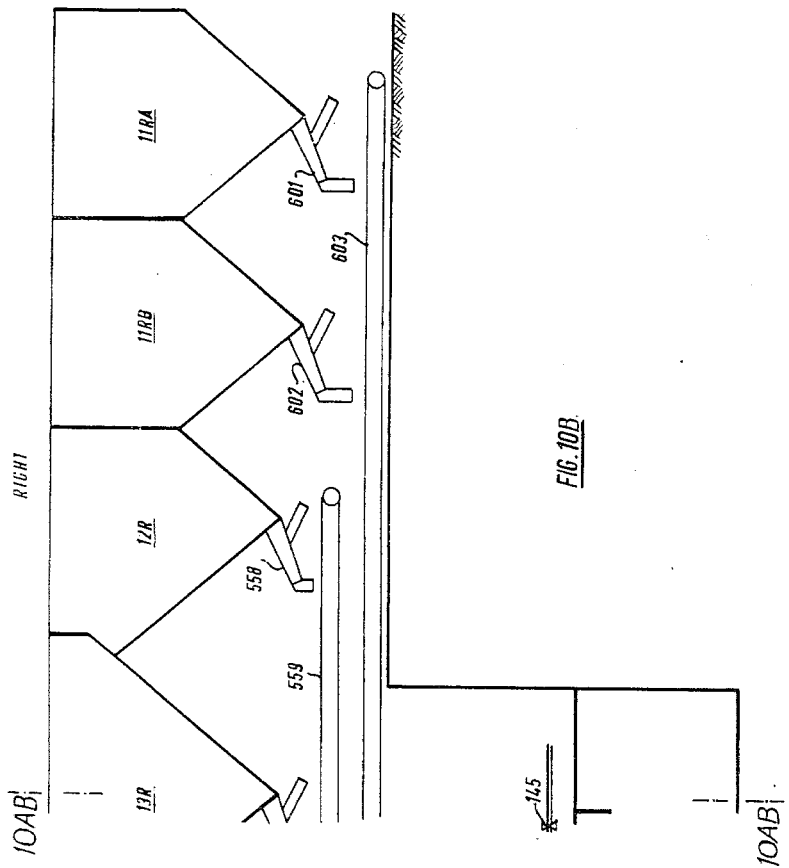
Figure 11:
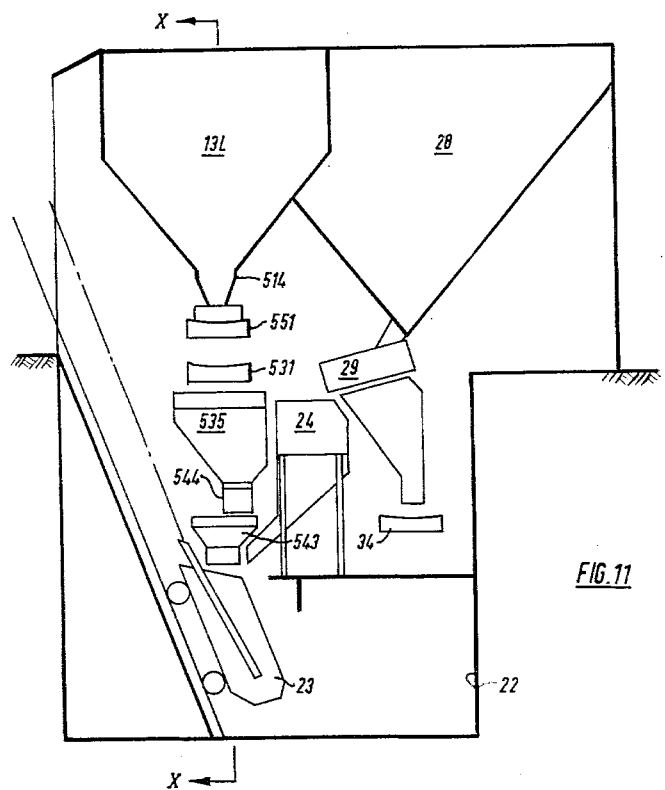
Figure 12A:
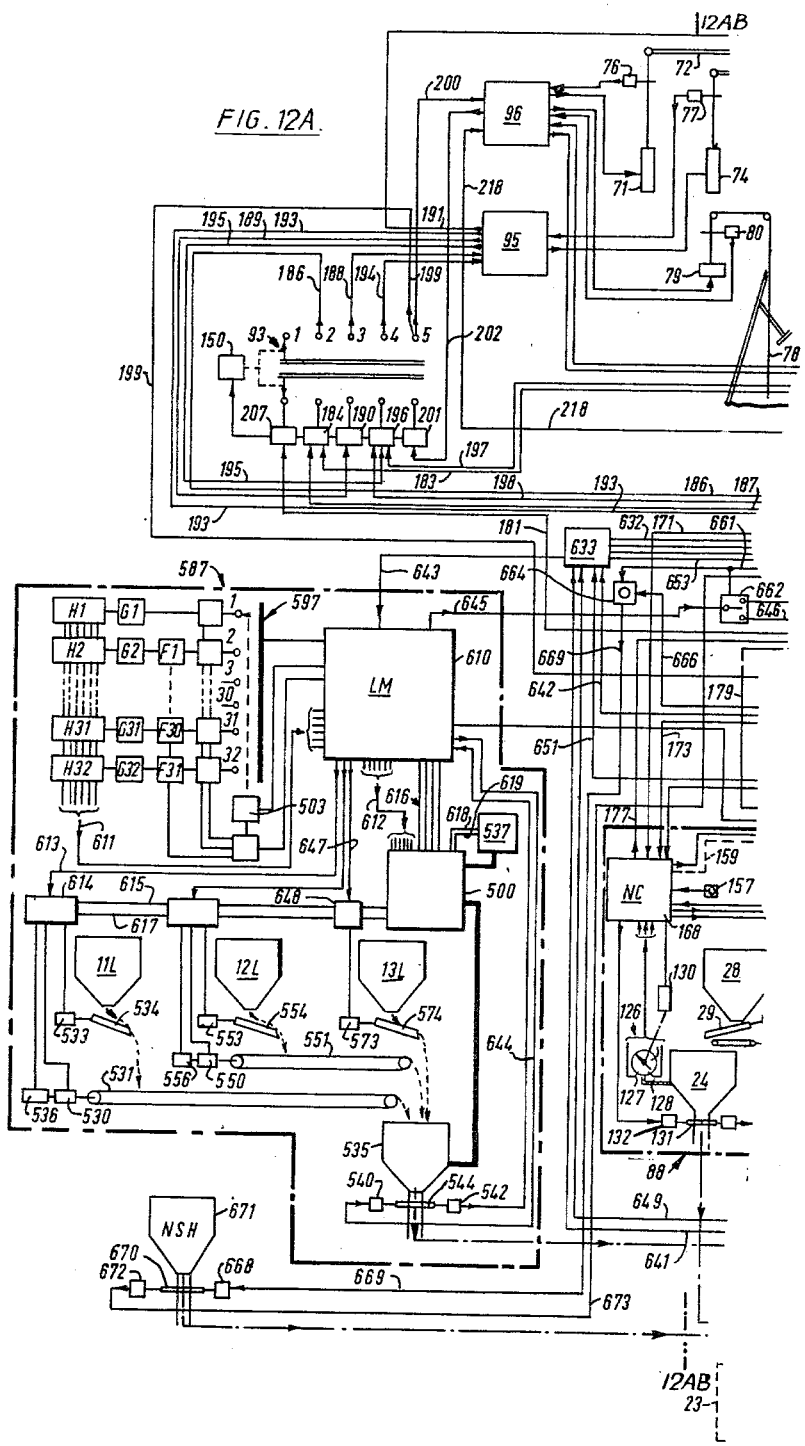
Figure 12C:
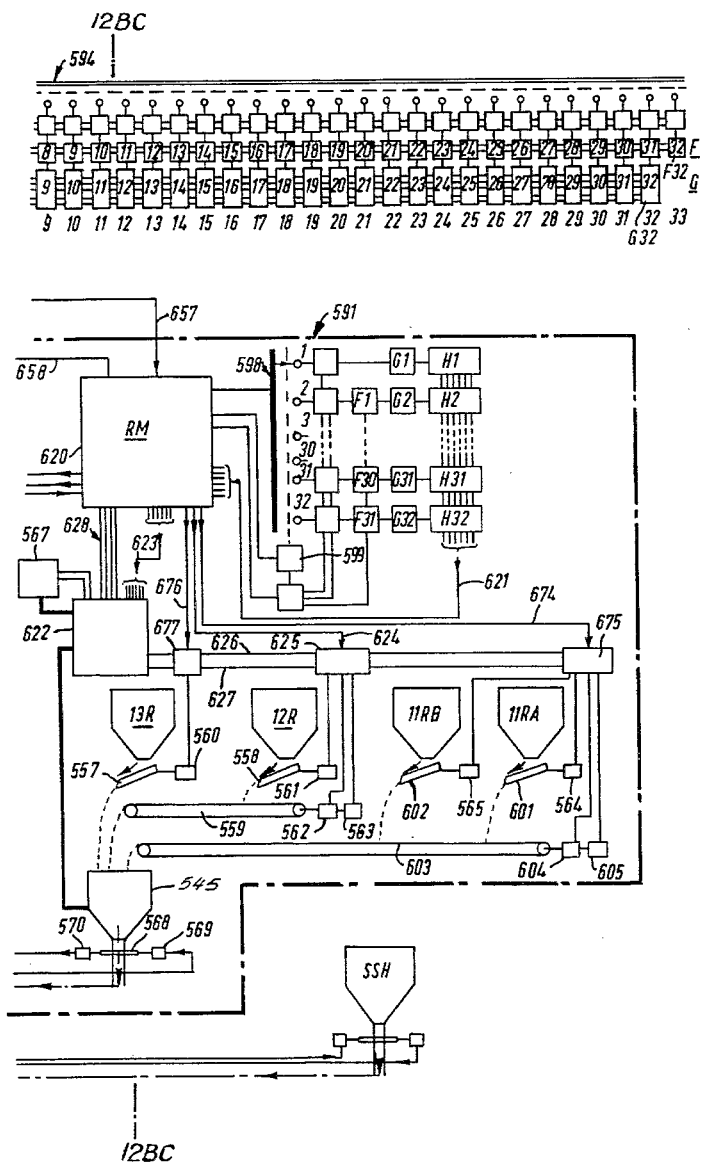
Figure 13A:
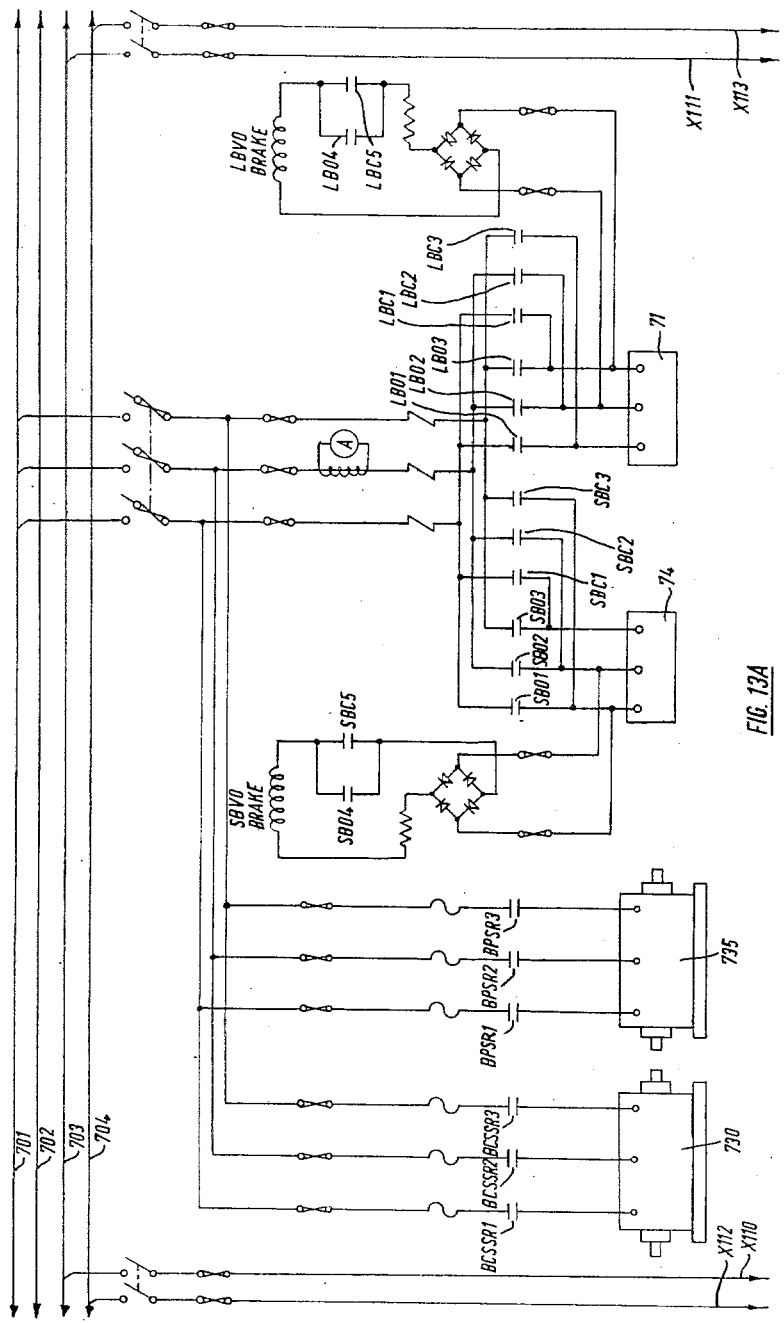
Figure 13B:
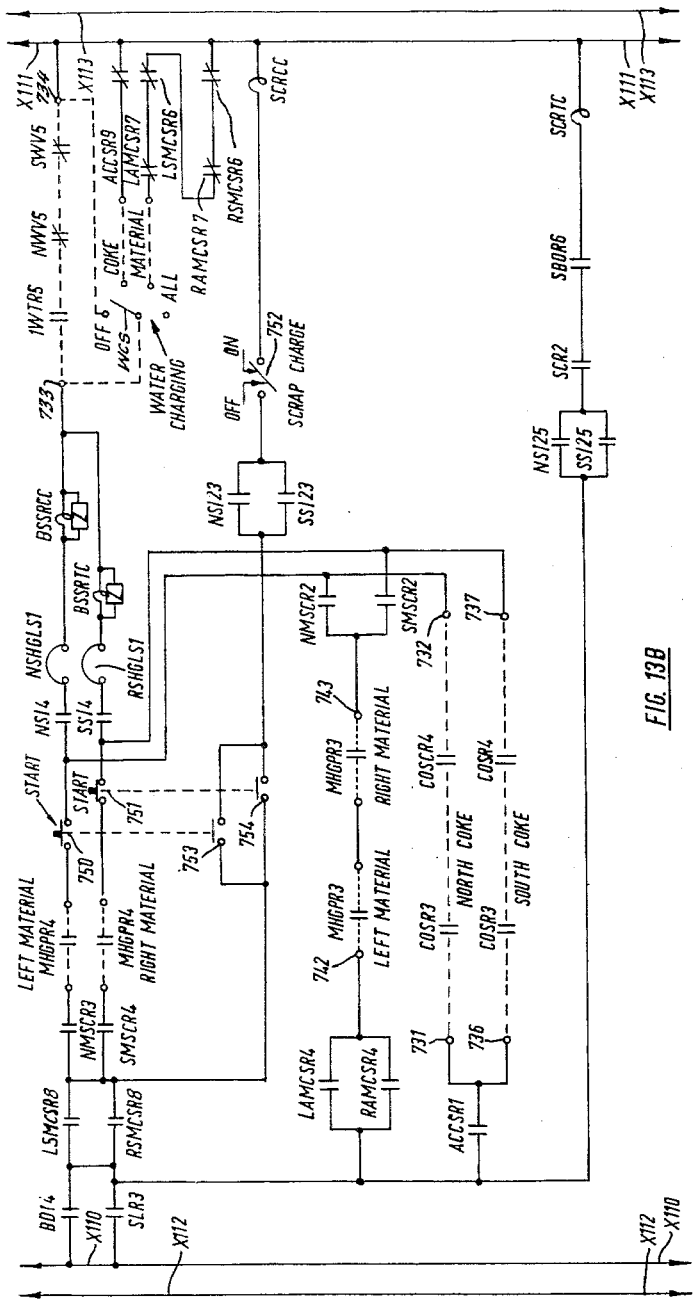
Figure 13C:
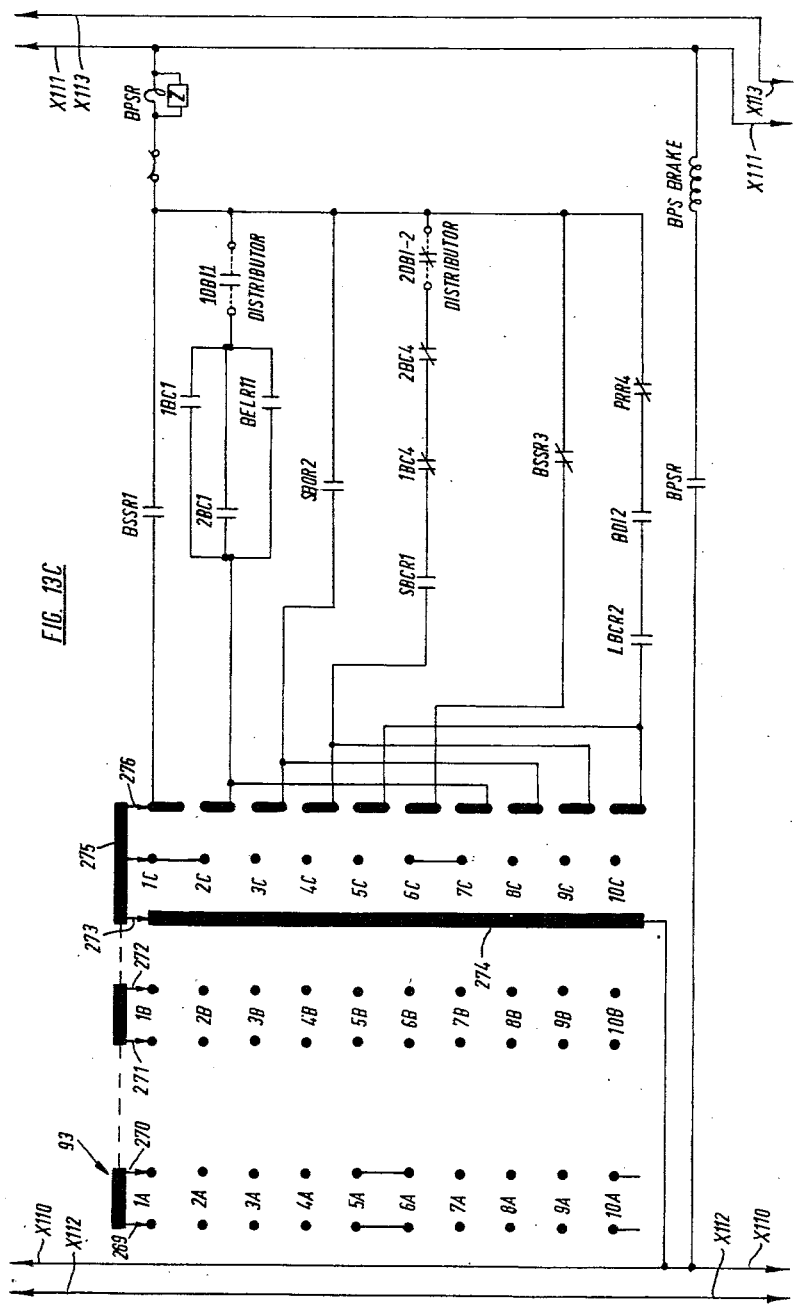
Figure 13D:
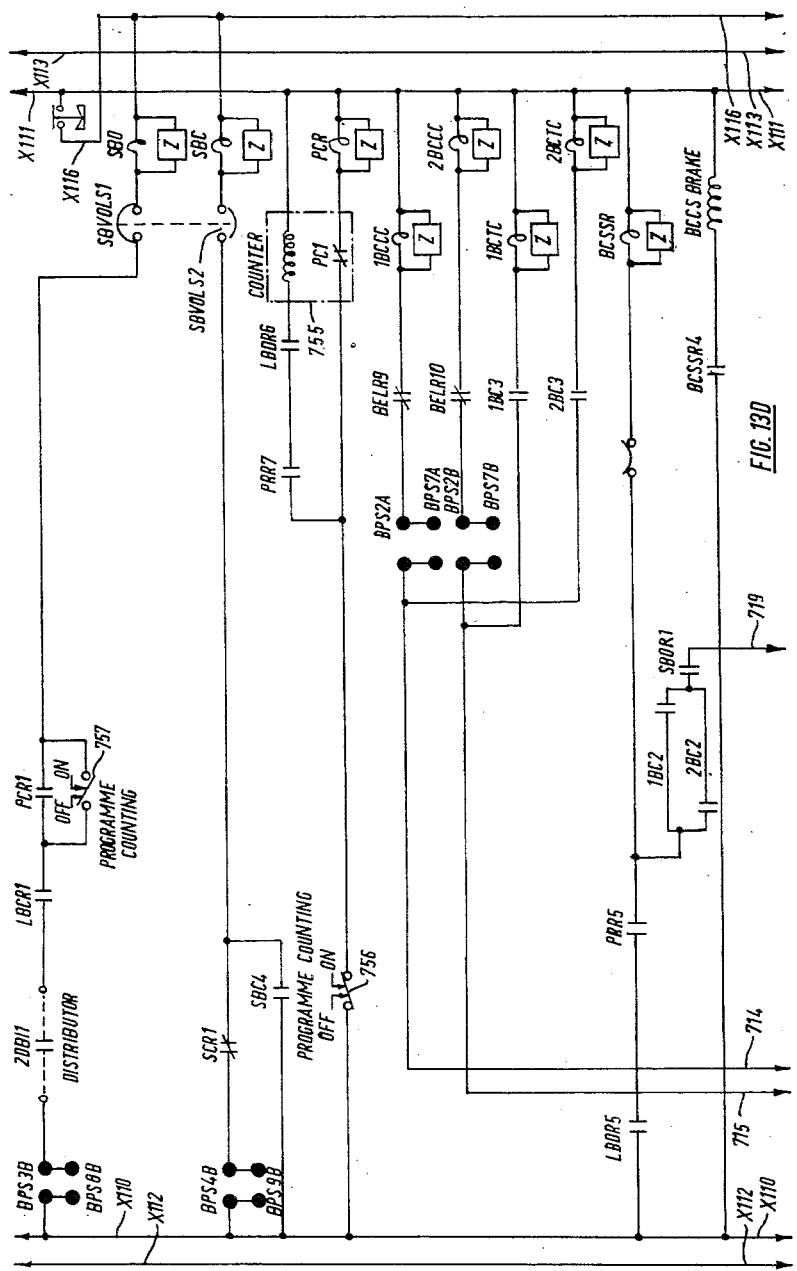
Figure 13E:
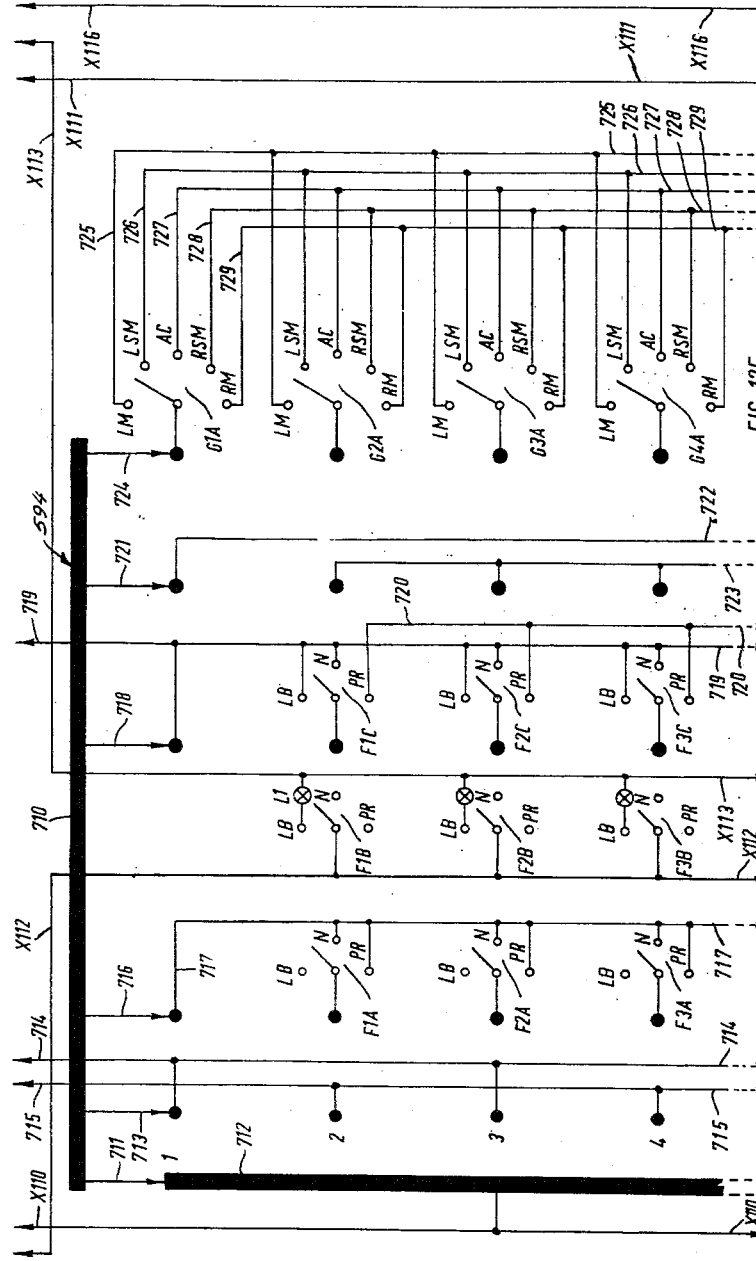
Figure 13F:
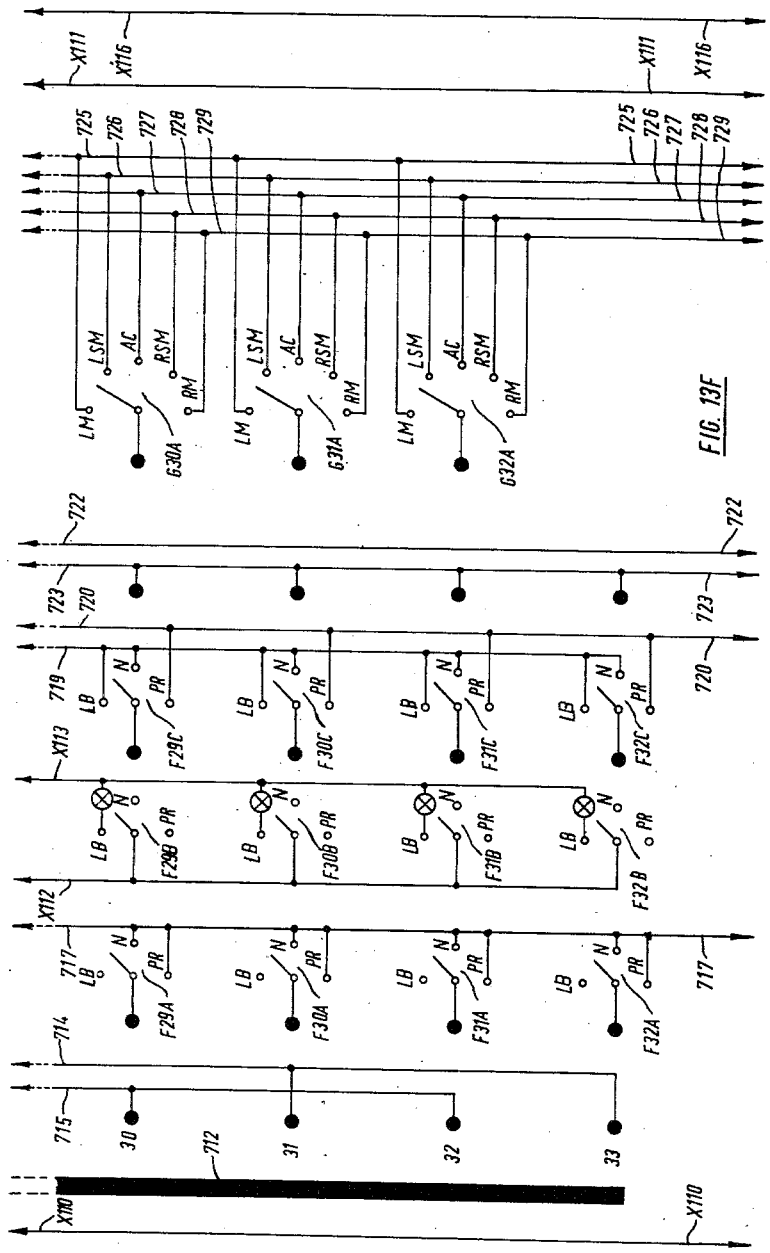
Figure 13H:
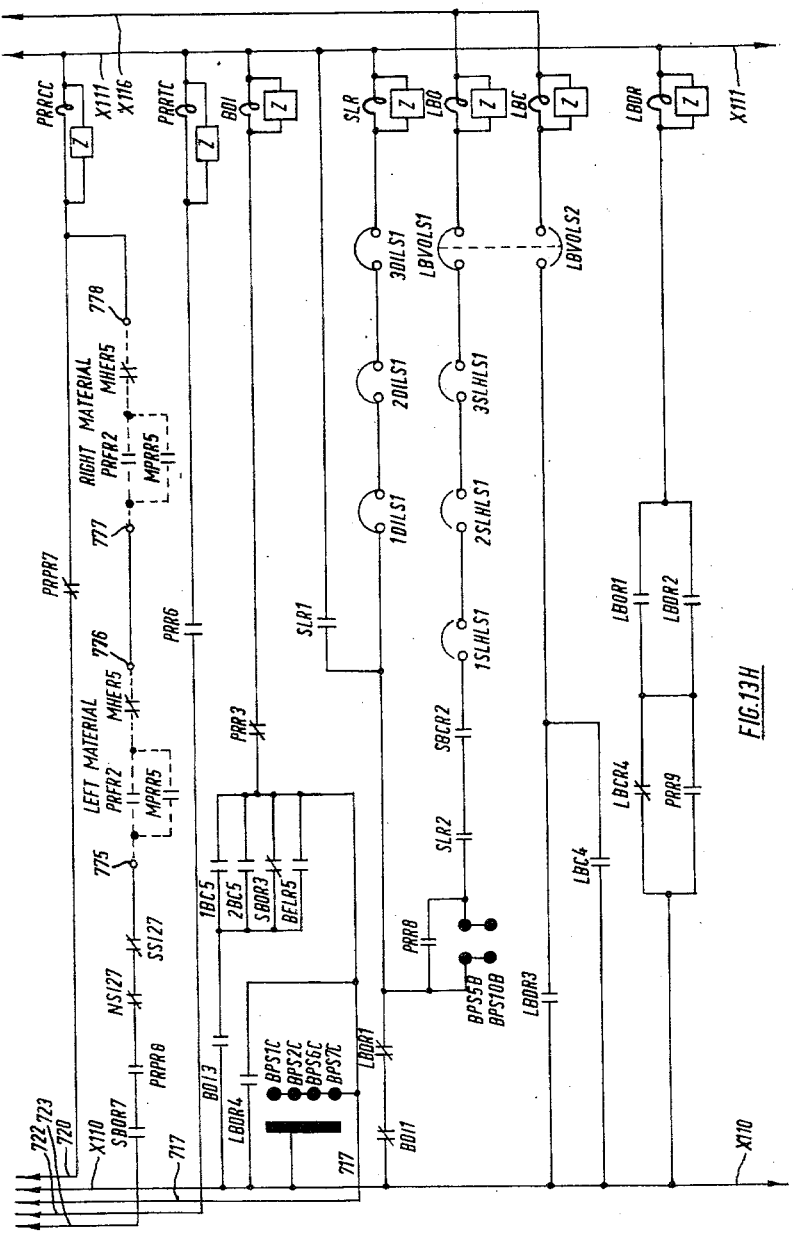
Figure 13J:
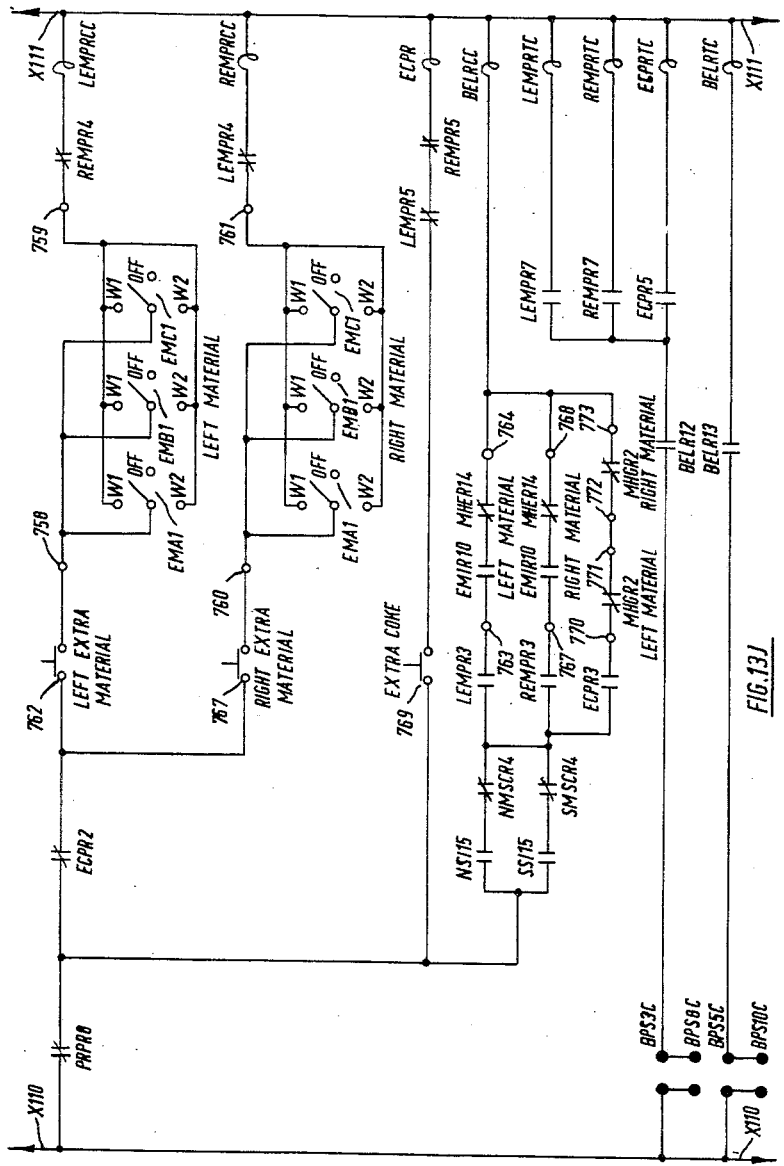
Figure 13K:
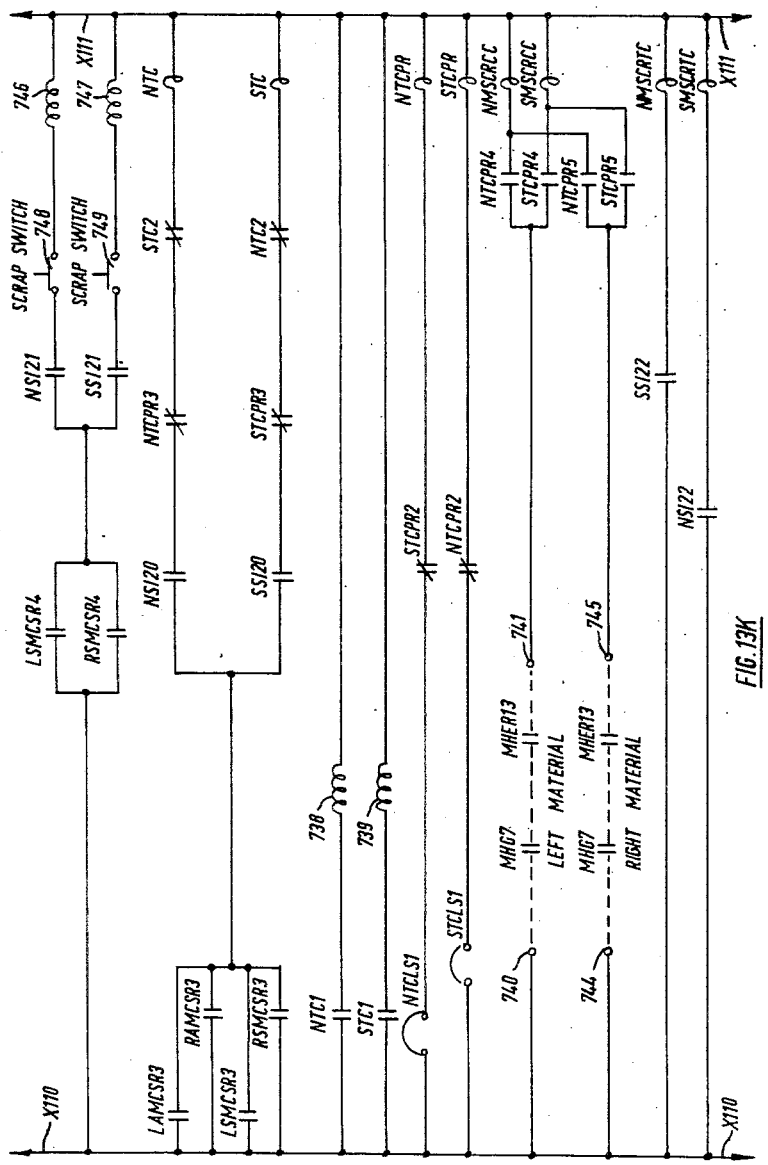
Figure 13L:
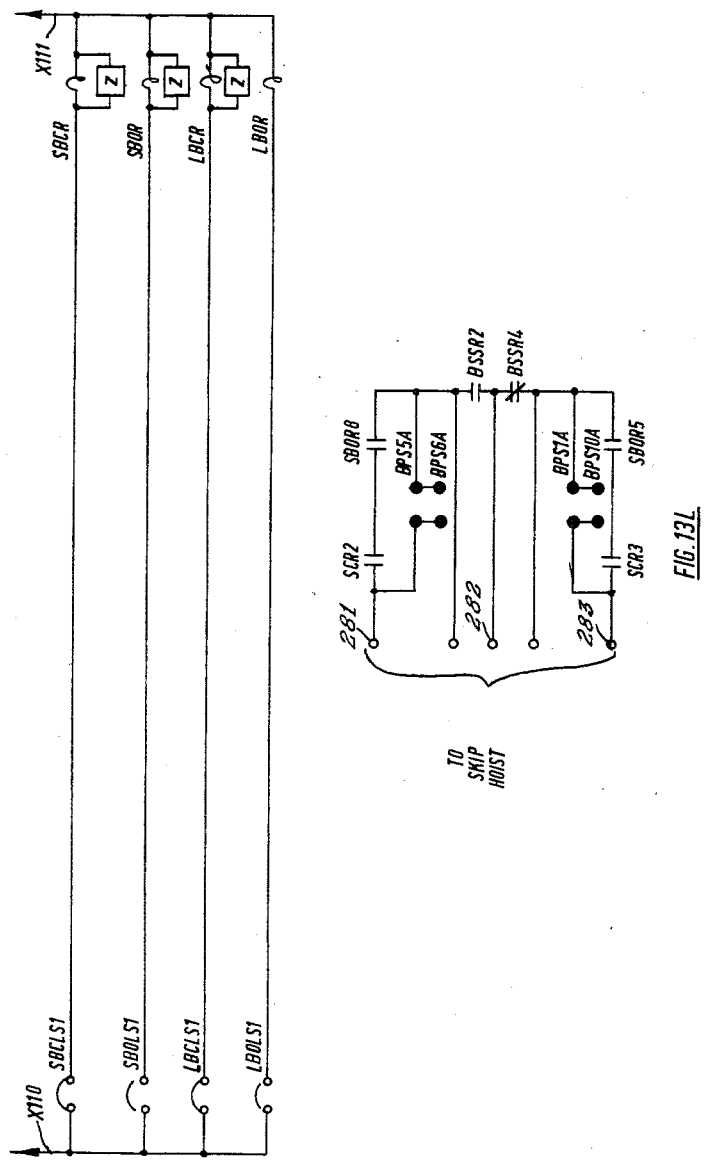
Figure 14A:
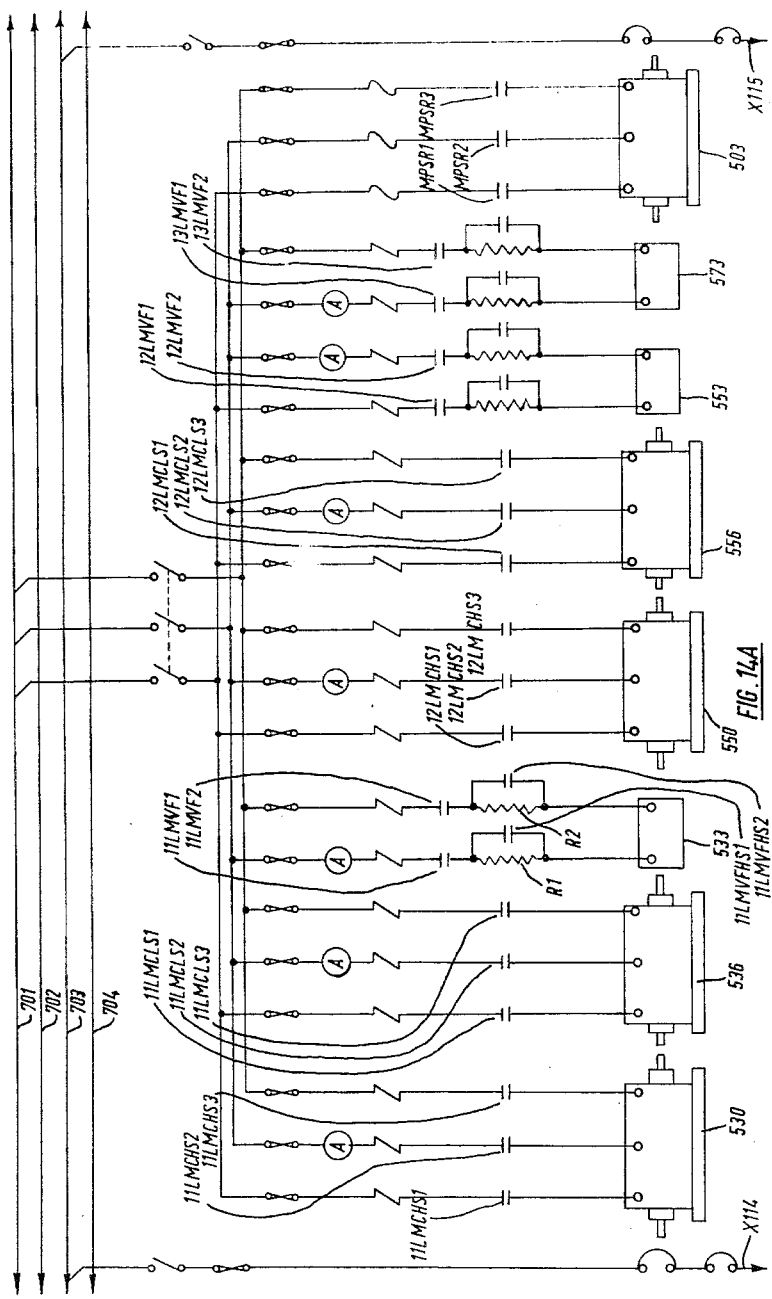
Figure 14F:
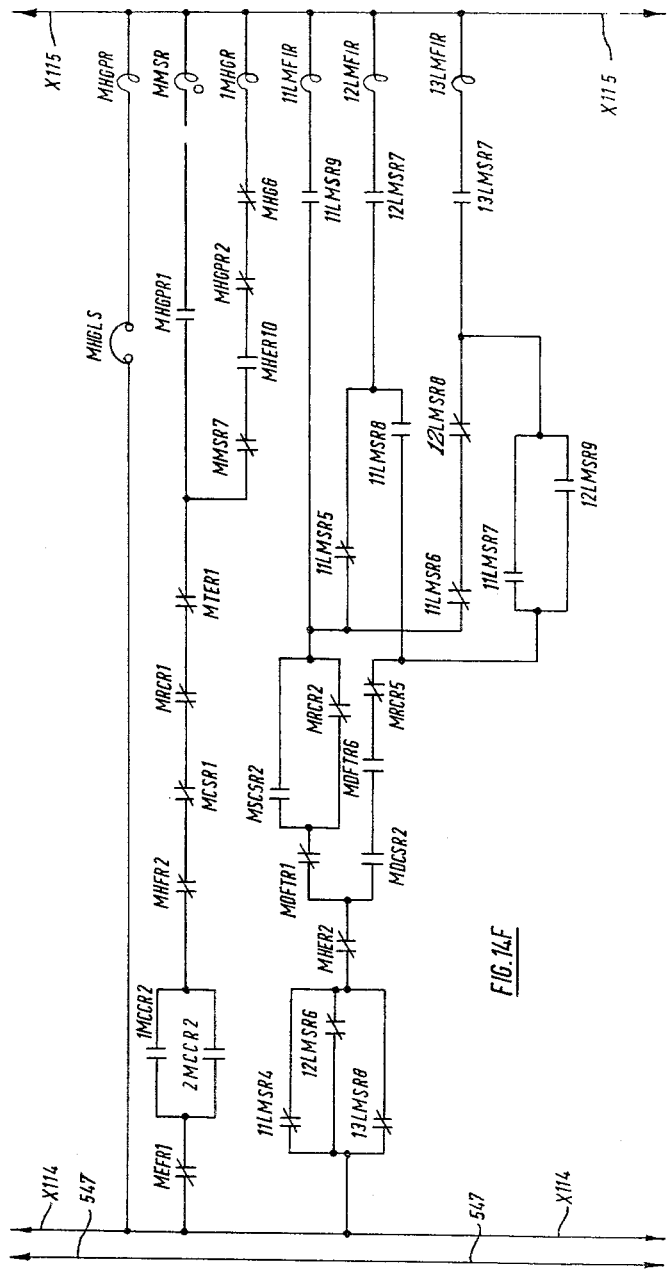
Figure 14G:
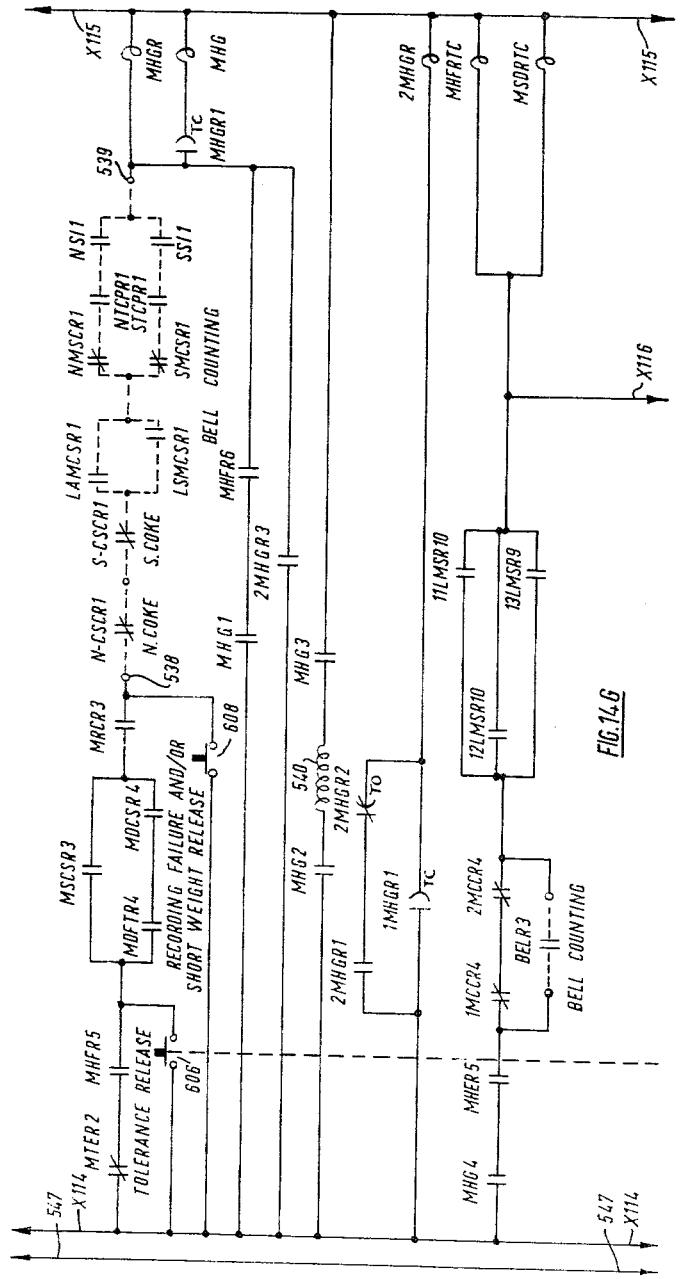
Figure 15:
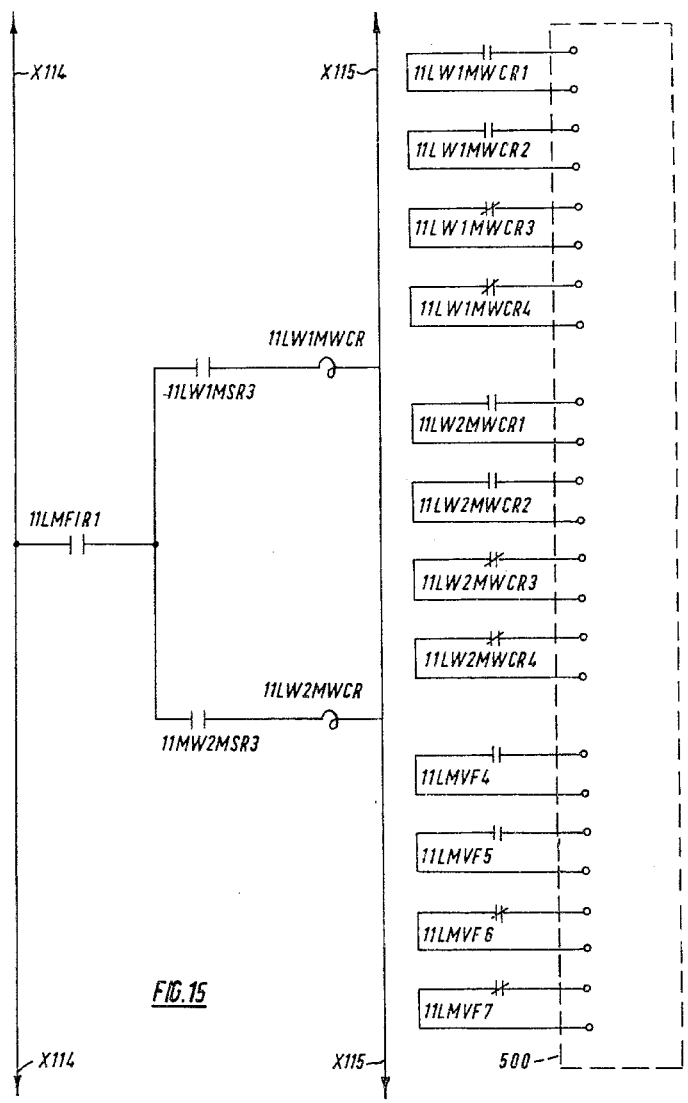
Figure 16:
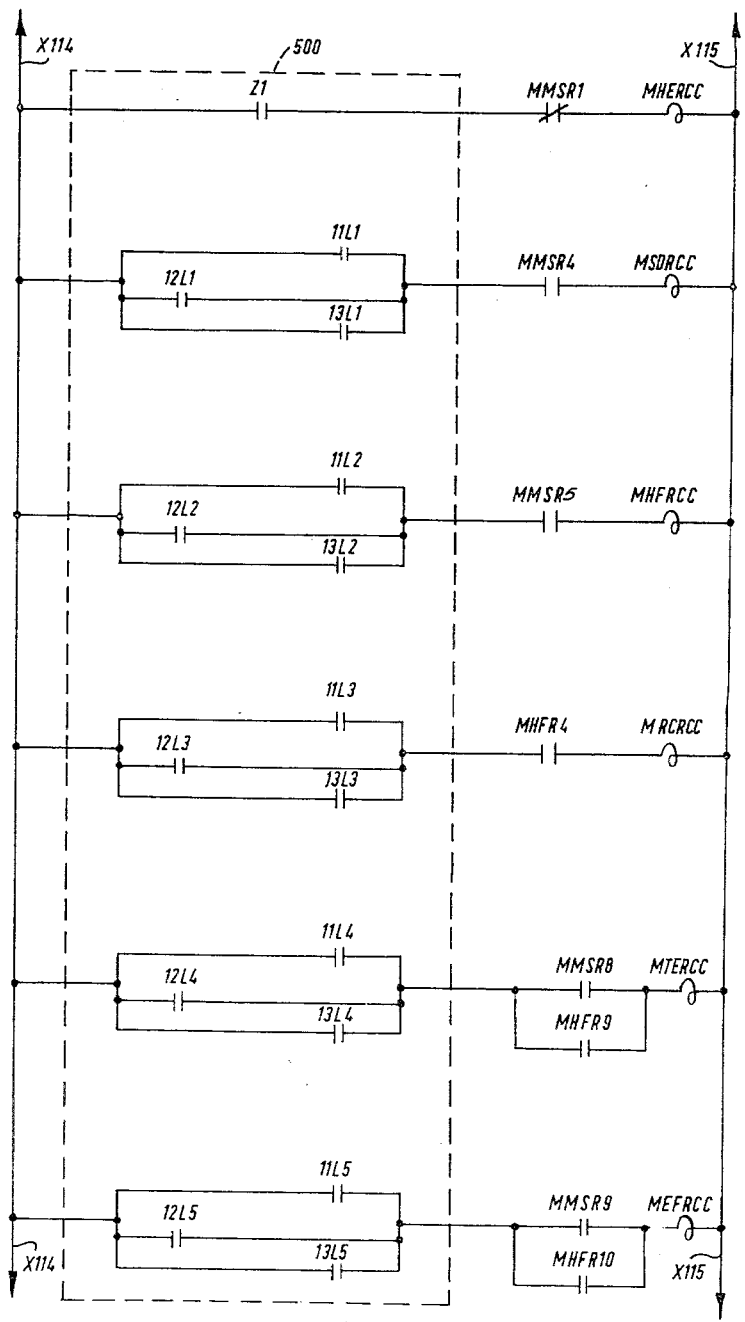
Figure 17A:
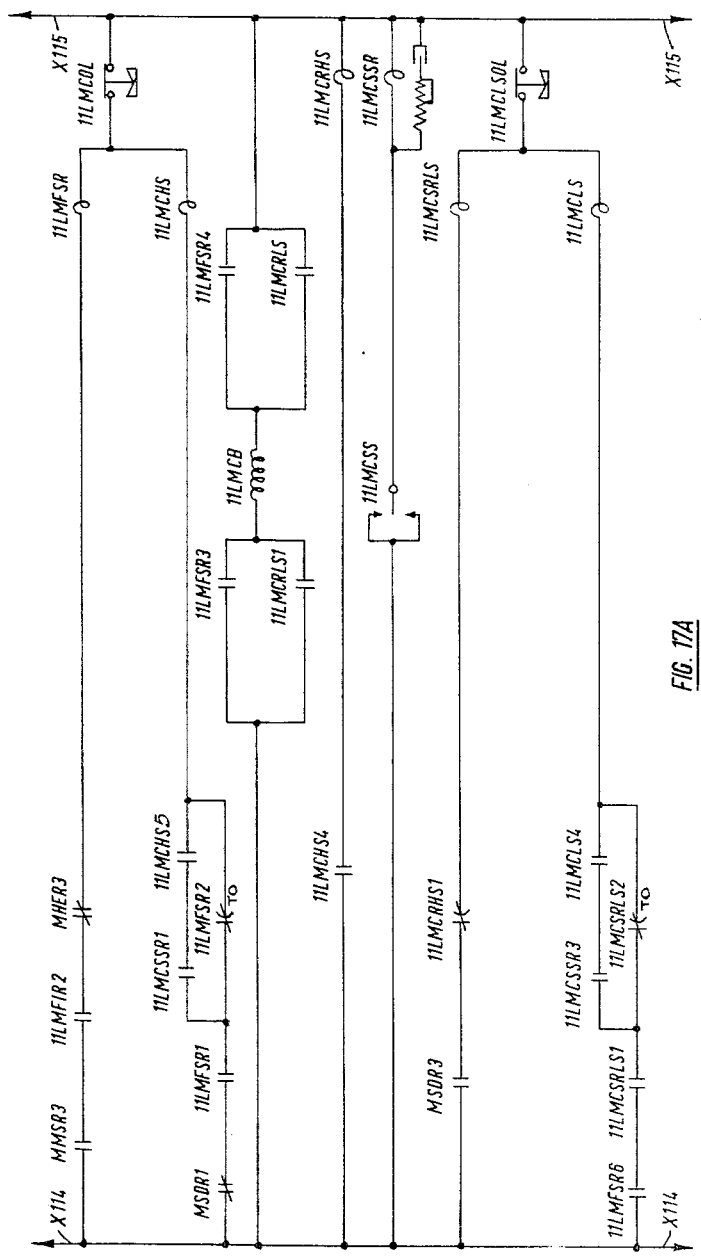
Figure 19A:
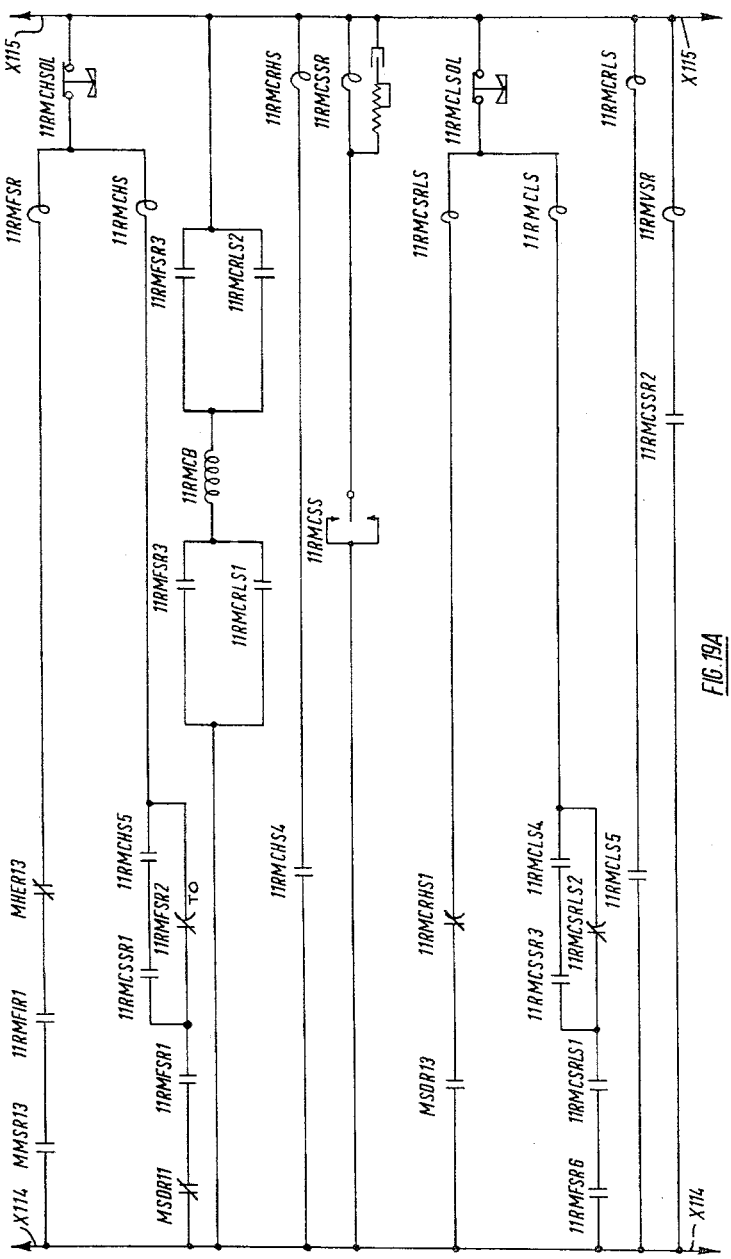
Figure 19B:
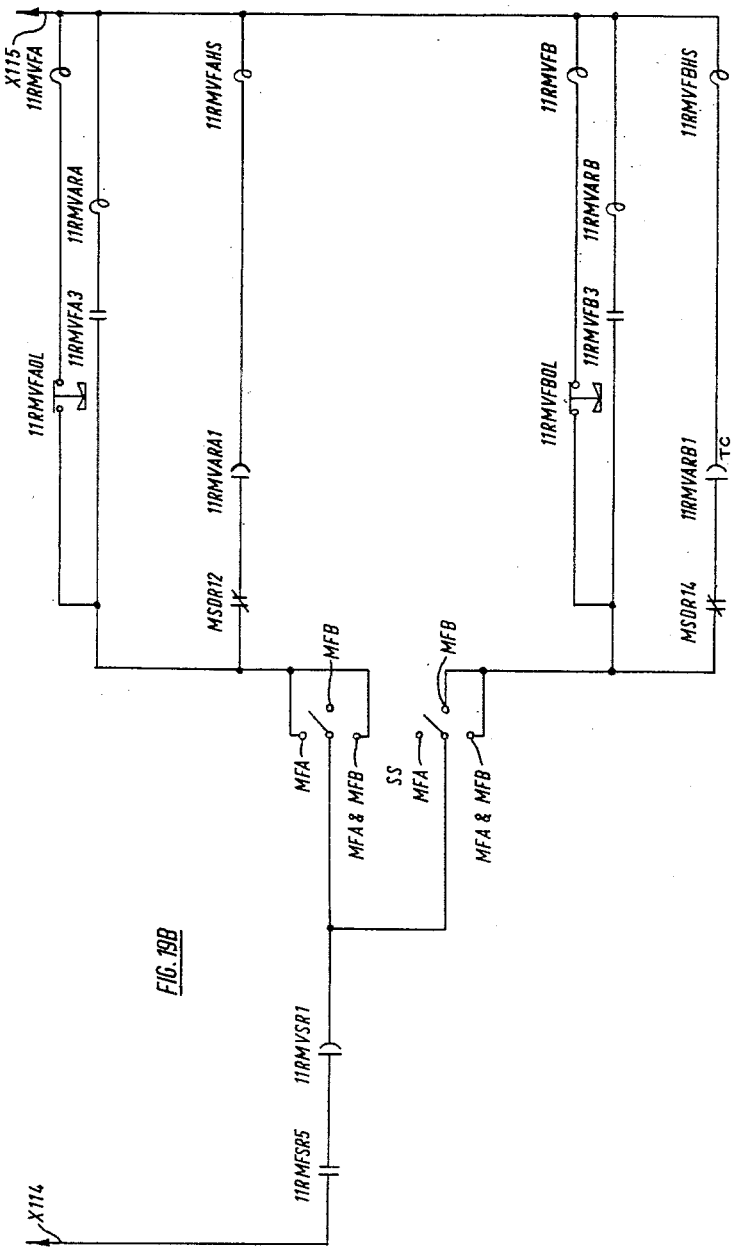

The invention will be further described by way of example with reference to the accompanying drawings, in which:

FIGS. 1A and 1B (hereinafter referred to as FIG. 1) are an elevation of part of a skip charging plant according to a first embodiment of the present invention, the two figures joining along the line 1AB–1AB, FIG. 2 is a section along the line II—II of FIG. 1, showing the bottom parts of the skip hoist, FIGS. 3A and 3B (hereinafter referred to as FIG. 3) are a block diagram of control means for controlling the plant of FIGS. 1 and 2, and other associated parts of a blast furnace, the two figures joining along the line 3AB—3AB, FIGS. 4A, 4B, 4C, 4D, 4E, 4F, 4G, 4H, 4J and 4K are a detail circuit diagram of the bell counting switch and bell programme switch of the block diagram of FIG. 3, FIG. 4D being in two parts designated FIG. 4DA and FIG. 4DB, joining along the line 4DAB—4DAB (but hereinafter referred to as FIG. 4D), FIGS. 5A, 5B, 5C, 5D, 5E and 5F are a detail circuit diagram of the north material programme control of the block diagram of FIG. 3, FIG. 6A and FIG. 6B are a detail circuit diagram of a vibrating feeder and weighing feeder associated with a first material bin, FIG. 7A and FIG. 7B are a detailed circuit diagram of a vibrating feeder and weighing feeder associated with a last material bin, FIGS. 8A and 8B are together a detail circuit of apparatus associated with a coke supply bin, FIG. 9 is a detail circuit diagram of water charging apparatus, FIGS. 10A and 10B, hereinafter referred to as FIG. 10, are an elevation of part of a skip charging plant according to a second embodiment of the invention, the two figures joining along the line 10AB—10AB, FIG. 11 is a section along the line XI—XI of FIG. 10, showing the bottom parts of a double skip hoist, FIGS. 12A, 12B and 12C hereinafter referred to as FIG. 12, are a block diagram of a control means for controlling the plant of FIGS. 11 and 12 and other associated parts of a blast furnace, the figures joining along the lines 12AB—12AB, 12BC—12BC, FIGS. 13A, 13B, 13C, 13D, 13E, 13F, 13G, 13H, 13J, 13K and 13L, hereinafter referred to as FIG. 13, are a detailed circuit diagram of a bell counting switch of the block diagram of FIG. 12, FIGS. 14A, 14B, 14C, 14D, 14E, 14F, 14G and 14H, hereinafter referred to as FIG. 14, are a detailed circuit diagram of the material programme control associated with the left group of material bins of the block diagram of FIG. 12, FIG. 15 is a circuit diagram of inter-locks provided by the material control of FIG. 14 to a weigher, FIG. 16 is a circuit diagram of inter-locks provided by the weigher to the material charging control of FIG. 14, FIGS. 17A and 17B, hereinafter referred to as FIG. 17, are a detailed circuit diagram of a vibro-feeder and conveyor associated with one of the bins in the left-hand group with which the material programme control of FIG. 14 is associated, FIG. 18 is a detailed circuit diagram of a vibro feeder associated with another bin of the left-hand group with which the material control FIG. 14 is associated, and FIGS. 19A and 19B, hereinafter referred to as FIG. 19, are a detailed circuit diagram of vibro feeders and conveyor associated with two sub-bins in the right-hand group of bins.

Referring initially to FIGS. 1 and 2, a blast furnace (not shown in these figures, but of which parts are indicated diagrammatically in FIG. 3, to which reference will be made hereinafter) is charged with coke and other materials by a skip hoist indicated generally at 20, embodying two skips of which one, 21, is indicated in FIG. 2 as being at its lowermost level in a pit 22. The skips are hoisted alternately in a well known manner, so that when one skip is in the pit, the other is at the top of the hoist, in which position it is arranged to tip its contents on to a small bell at the top of the blast furnace.

For the sake of convenience the two skips will hereinafter be referred to respectively as the north skip and the south skip, though it will be understood that such terms have no references to geographical locations and are used merely for the sake of clarity and convenience.

The position which would be occupied by the north skip when in the pit is indicated diagrammatically in broken lines at 23 in FIG. 1, in which by the south skip 21 is indicated as being in the pit. Associated with the north skip 23 are a coke weigh hopper 24 and a material check weigh hopper 25. Associated with the south skip 21 are a coke weigh hopper 26 and a material check weigh hopper 27. Each of the hoppers terminates in a discharge gate (not shown).

A bin 28, adapted to receive coke, communicates with a coke screen 29 for feeding coke through a chute 30 into the coke weigh hopper 24. Likewise a hopper 31 adapted to receive coke communicates with a coke screen 32 for discharging coke through a chute 33 into the coke weigh hopper 26. Beneath the coke screens is a breeze disposal conveyor 34 for removing particles passing through the coke screens. In operation, in order to provide a charge of coke for the north skip 23, the coke screen 29 is operated to feed coke into the coke weigh hopper 24 and the coke screen is operated until weighing means associated with the coke weigh hopper 24 have indicated that a preselected quantity of coke has been fed into the hopper. Subsequently, when the north skip 23 is in the pit and in register with the outlet of the coke weigh hopper, and it is desired to feed a charge of coke into that skip, the discharge gate at the bottom of the coke weigh hopper is opened to permit the coke to flow from that hopper into the skip. In like manner, a charge of coke for the south skip 21 is withdrawn from the bin 31.

Also associated with the north skip 23 are a number of additional bins for charging other materials to that skip. The number of such additional bins provided is not limited, and whilst it is generally desirable that there should be at least four bins for feeding other material to the north skip, one bin being used for ore, a second bin for limestone, a third bin for sinter and a fourth bin for another material, additional bins may be provided, for example for receiving different grades of ore, or for receiving different kinds of other material, the number of bins so provided being effectively limited by considerations of space and economics.

In like manner, additional bins are provided for feeding other material to the south skip, and whilst, in general, at least four such additional bins are provided, the number of bins is likewise not limited.

Associated with the north skip and substantially coextensive with the coke bin 28 are two additional bins 35, 36, and adjoining them a plurality of further bins, commencing with bin 37 and ending with bin 38. Associated with each additional bin is an electrically operated vibratory feeder 39, 40, 41, 42, each adapted to feed material onto a weigh feeder 43, 44, 45, 46 individual thereto. All of the weigh feeders discharge onto a material conveyor 47 for feeding material from the weigh feeders to the material hopper 25.

In operation, in order to prepare a material charge for the north skip 23, one or more of the electrically operated vibratory feeders 39, 40, 41, 52 is or are operated to withdraw material from the bin or bins associated therewith and feed it to the associated weigh feeders. When a preselected quantity of material has been received by a weigh feeder, it provides a signal to effect the stopping of the associated vibratory feeder. Material passed by the weigh feeders is fed by the material conveyor 47 into the material check weigh hopper 25, and a further check can be made on the total weight of material so received. Subsequently, when the north skip is in the pit and the charge of material is required, the hopper gate of the material check weigh hopper 25 is opened to discharge material into the skip.

In like manner, additional bins 48, 49, 50, 51 and associated electrically operated vibratory feeders 52, 53, 54, 55 and weigh feeders 56, 57, 58 59 are provided, together with a material conveyor 60 for feeding charges of material into the material check weigh hopper 27 associated with the south skip 21.

In order to cater for circumstances under which it might be necessary or desirable for a charge of material to be fed to a skip manually, a runway 61 is provided below the material bins, and below the runway is a chute 62 leading into the material check weigh hopper 27 associated with the south skip 21. In like manner, a similar chute is provided in connection with the material check weigh hopper 25 associated with the north skip. As will be subsequently described, the control means can be arranged, not only for delivering charges of coke and material to the skips automatically in a preselected sequence, but also may provide for one or more charges to be delivered manually, or yet again for the interruption of a given sequence of charges to enable an additional charge to be interpolated. For example if, owing to unforeseen circumstances, a bin for feeding ore to the north skip were to become empty and it were necessary that a charge of ore should be delivered to the furnace by the north skip, it would be possible for a charge of ore to be withdrawn from another source, and delivered manually by means such as a dumper wagon, into the material check weigh hopper 25.

Water may be added into the skips by pipes 144, 147, controlled by valves 142, 145.

One form of control system suitable for controlling the operation of charging apparatus for a blast furnace in conjunction with the operation of the small bell, large bell, distributor and stock lines, is illustrated schematically in FIG. 3.

In FIG. 3, the upper part of a blast furnace is illustrated diagrammatically and generally at 67, and includes a distributor 68 rotated by a driving mechanism 69, a small bell 70, lowered by a small bell operator 71 through linkage 72, and a large bell 73 operated by a large bell operator 74 through linkage 75. Associated with the small bell are limit switches 76 and limit switches 77 are associated with the large bell. A north stockline is indicated generally at 78 and is operated by a north stockline winch 79 and limit switches 80 are associated therewith. A south stockline 81 is controlled by a hoist 82 and limit switches 83 are associated therewith.

The skips, the positions of which when in the pit are indicated diagrammatically in broken lines at 21 and 23, are operated by a skip hoist 84. The skip hoist includes two limit switches 85, 86 which are operated respectively when the north skip is in the pit and when the south skip is in the pit, and it will be appreciated that when limit switch 83 is operated, indicating that the north skip is in the pit, the south skip will be at the top of the hoist, and will have tipped its charge onto the small bell 70. The control system can be subdivided into a number of units, including a north material programme control as delineated by the block 87, a north coke charging control delineated by a block 88, a water charging control delineated by the block 89, a south coke charging control delineated by the block 90, a south material programme control delineated by the block 91, a distributor programme control delineated by the block 92 and the remainder, which may be described as a bell counting and sequence control.

The bell sequence control includes a step by step bell sequence switch 93 and a step by step bell counting switch 94, a small bell control 95 and a stockline and large bell control 96. Each of the material programme controls includes a step by step material programme switch 97, 98. Whilst any suitable form of control can be used for the skip hoist 84, in a preferred embodiment the control is of the type disclosed in British patent specification No. 693,205, and may embody the improvements disclosed in British patent specification No. 881,913. Each of the step by step switches are likewise of the type described and illustrated in FIGS. 4 and 5 of British patent specification No. 693,205, but for the sake of simplicity and clarity, the fixed contacts are illustrated diagrammatically in FIG. 4 and in FIG. 5 as being disposed in columns and rows, with the moving contacts moving in rectilinear paths.

In the north material programme control is included the material conveyor 47, driven by an electric motor 99, and the additional bins for charging other materials to the north skip.

Whilst the invention is not restricted to the number of additional material bins, for the sake of example, the control system herein described is suitable for use with six material bins for feeding material to the north skip and six material bins for feeding material to the south skip. For the sake of convenience, the bin 35 will be referred to as No. 1 north material bin and the bin 38 as No. 6 north material bin. Likewise bin 48 will be referred to as No. 1 south material bin, and bin 51 as No. 6 south material bin.

The vibratory feeder 39, for delivering material from No. 1 north material bin 35, is driven by an electric driving mechanism 100, and the associated weigh feeder 43 by an electric motor 101. The vibratory feeder 42, for delivering material from No. 6 north material bin 38 is driven by an electric driving mechanism 102 and the associated weigh feeder 46 by an electric motor 103. Associated with the material conveyor 47 is a conveyor level limit switch 104 for detecting the presence of material on the conveyor. Material is fed by the material conveyor 47 into the check weigh hopper 25, having at its bottom a hopper gate 105, opened or closed by an operator 106, and having associated with it limit switches 107. Associated with the check weigh hopper 25 is a weighing mechanism, indicated generally at 108, with which is associated a weight recorder 109. The weighing mechanism 108 is provided with a plurality of limit switches, including a hopper empty limit switch 110, an overload limit switch 111 and a plurality of intermediate adjustable limit switches 112.

In like manner the south material programme control 91 includes the material conveyor 60 driven by an electric motor 113, a conveyor level limit switch 114, weighing means 115 associated with the material check weigh hopper 27 and having a hopper empty limit switch 116, an overload limit switch 117 and a plurality of pre-set intermediate limit switches 118, and a weight recorder 119 associated with the weighing mechanism 115. The vibratory feeder 52 associated with No. 1 south material bin 48 is driven by an electric driving mechanism 120 and the associated weigh feeder 56 by an electric motor 121. The vibratory feeder 55, associated with No. 6 south material bin 51 is operated by an electric driving mechanism 122 and the associated weigh feeder 59 by an electric motor 123.

In the north coke charging control 88 the coke screen 29 for feeding coke from the coke bin 28 is driven by an electric driving mechanism 124 and the breeze conveyor 34 by an electric motor 125. Associated with the coke weigh hopper 24 is a weighing mechanism 126 having a hopper empty limit switch 127, an overload limit switch 128 and a pre-set intermediate limit switch 129. A weight recorder 130 is associated with the weighing mechanism 126. The bottom of the coke weigh hopper 24 is opened and closed by a hopper gate 131 which is opened and closed by an operator 132, and limit switches 133 are associated with the hopper gate.

Likewise in the south coke control 90, the coke screen 32 associated with the coke bin 31, is driven by an electric driving mechanism 134. Whilst the breeze conveyor 34 associated with the north coke control may be extended to serve the south coke control, a second breeze conveyor 135, driven by an electric motor 136, may be provided for the south coke control. Associated with the coke weight hopper 26 is a weigh mechanism 137 having a hopper empty limit switch 138, an overload limit switch 139 and a pre-set intermediate switch 140. A weight recorder 141 is associated with the weighing mechanism 137.

The water charging control 89 includes a valve 142 controlled by an electrically operated thrust exerting operator 143 controlling a pipe 144 for delivering water to the north skip and a valve 145 operated by an electrically operated thrust exerting operator 146 controlling a pipe 147 for delivering water to the south skip.

The control system to be described provides for a programme of up to twenty skip charges, and for the sake of convenience, it is arranged that the first sequence in any programme will start with the north skip in the pit so that the first charge in a programme, whether it be of material or of coke, is delivered to the north skip, a second charge, whether it be of material or of coke, to the south skip, and the remaining charges in the programme alternately to the north and south skips.

A number of selector switches are provided for each sequence in the programme. With a maximum possible number of sequences of twenty in the programme, twenty sets of switches are provided. For each sequence one switch, which will be designated switch A, can be pre-set to select either an automatic coke charge, or an automatic material charge, or a manual material charge, a second switch, which will be designated switch B, can be pre-set to determine whether the large bell should be opened to dump charges into the furnace after the small bell has been opened to dump that charge onto the large bell, a third switch, which will be designated switch C, can be pre-set to indicate whether or not that sequence shall determine the end of the programme; a fourth switch, which will be designated switch D, can be pre-set to determine from which bins material shall be drawn if an automatic material charge is called for in the sequence to which it relates. Each of the fourth switches comprises a plurality of switches, each individual to one of the material bins from which a material charge could be drawn at that sequence in the programme, so that an automatic material charge can be drawn from more than one material bin.

Since, in the case of an automatic material charge, the the material may be withdrawn from more than one of the north material bins, or south material bins as appropriate, and since each of the weigh feeders associated with the material bins is normally pre-set to pass only a predetermined quantity of material from the bin with which it is associated, it is desirable to provide a further check of the weight of material to be fed to a skip. Intermediate limit switches 112 in the weighing mechanism 108 associated with the north material check weigh hopper 25 serve to divide the range of the weighing mechanism into a plurality of zones. For each sequence in the programme, therefore, a fifth switch, which will be designated switch E, is provided for pre-selecting the appropriate weight zone and conditioning a check weigh relay 148 associated with the weighing mechanism 108 in the case of the north material programme control, or a check weigh relay 149 associated with the weighing mechanism 115 associated with the material check weigh hopper 27 in the case of the south material programme control.

The bell squence switch 93 has five positions, and is driven sequentially from one position to the next generally in response to completion of the operations which it initiates at each position, and thus serves to relate the operation of the bell counting switch 94, the north and south material programme controls 87 and 91, the north and south coke charging controls 88 and 90, the water charge control 89, the distributor control 92 with the distributor 68, the small bell 70, the large bell 73 and the skip hoist 84 into appropriate timed relationship with one another.

The moving contacts of the bell sequence switch 93 are driven step by step by an electric motor 150. The moving contacts have five positions, are always driven forward in the same direction so that the moving contacts are in the 1st, 2nd, 3rd, 4th, 5th positions and then re-engage the first position. The moving contacts of the bell counting switch 94 have twenty-one positions, one more than the maximum number of sequences in a programme, and are driven step by step by an electric motor 151 and are always driven step by step in the same direction. At the start of the programme they are in the first position and are then driven step by step until they reach a position where switch C associated with that position has been operated to indicate the end of a programme, whereupon they are driven forwards in the same direction until they return to their first or starting position. Their twenty-first position is inherently a re-setting position. The moving contacts of the north material programme switch are driven by an electric motor 152 which, unlike that driving the moving contacts of the bell counting switch, is reversible. The moving contacts of the south material programme switch 98 are driven by an electric motor 153 which is reversible. In the case of both of the north and south material programme switches, the moving contacts at the beginning of a programme are in the first position and then are advanced step by step into the second and third and successive positions until they reach a position at which the switch C associated with that position has been operated to indicate the end of the programme whereupon they are driven in the reverse direction back to the first or starting position.

SEQUENCE OF OPERATIONS

By way of example let it be assumed that a programme of a sequence of eight charges is to be operated. In the first sequence a charge of coke is to be delivered by the north skip, in the 2nd sequence a charge of coke is to be delivered by the south skip, in the 3rd sequence a charge of material, namely ore drawn from No. 1 north bin, is to be delivered by the north skip. In the 4th sequence a charge of material, namely ore and limestone drawn respectively from No. 1 south and No. 6 south bins, are to be delivered by the south skip and that the large bell is to be opened after the opening of the small bell in the 4th sequence. In the 5th sequence of the programme, coke is to be delivered by the north skip. In the 6th sequence of the programme coke is to be delivered by the south skip. In the 7th sequence of the programme a charge of material, namely sinter, drawn from No. 6 north bin, is to be delivered by the north skip and finally in the 8th sequence of the programme a charge of limestone drawn from No. 6 south bin is to be delivered by the south skip and that the large bell is to open after the opening of the small bell in this sequence.

INITIAL SET-UP

As the control system is arranged that the first charge in any programme must be delivered by the north skip it is necessary as a prelude for the north skip to be in the pit and it may be necessary for the skip hoist 84 to be started manually in order to achieve this. Upon manual operation of a starting switch 154 associated with the north material programme control the motor 99 driving the north material conveyor 47 is started up and when this has run up to speed the motor 101 driving the weigh feeder 43 associated with No. 1 north material bin is started. When this has run up to speed a starting condition is applied to the motor driving the weigh feeder associated with No. 2 north material bin. The remaining weigh feeders are started up in sequence one after the other until finally the weigh feeder 46 associated with No. 6 north material bin is started and running. In order to avoid the risk of material being fed in an unscheduled manner into the north skip, the material conveyor 47 cannot be started unless the hopper gate 105 is closed and the conveyor level switch 104 indicates the absence of material on the conveyor. Likewise the weigh feeders cannot be started until the material conveyor is running. In like manner operation of a start switch 155 in connection with the south material programme control brings about the starting of the south material conveyor 60 and the sequential starting of the weigh feeders associated with the south material bins starting with the first weigh feeder 56 and ending with the last weigh feeder 59.

Whilst separate start switches 157 and 158 can be provided for each of the north and south coke controls, it is preferable for only one to be provided. Manual operation of the starting switch 157 associated with the north coke control causes energisation of the motor 125 driving the breeze conveyor 34. When the conveyor 34 has run up to speed a starting signal is sent along line 159 to the south coke control and the motor 136 driving the breeze conveyor 135 is started. Pilot lights are preferably provided for indicating when the breeze conveyors are running up to speed whereupon the starting switch 157 can be released.

In accordance with the programme taken by way of illustration the switch A corresponding to the first sequence in the programme, and which has been denoted as A1, will have been operated into the position corresponding to a coke charge. This switch A1 has contacts associated with the bell counting switch 94 and also with the north material programme switch 97. As the second sequence is to be a charge of coke in the south skip the switch A corresponding to the second sequence, and denoted A2, will be adjusted into the position corresponding to a coke charge. This switch also has contacts in the bell counting switch 94 and also associated with the south material programme switch 98. As the 3rd sequence is to be a charge of ore from No. 1 north material bin the switch A corresponding to the 3rd sequence, and denoted A3, will be operated into the position corresponding to an automatic material charge. The switch A3 has contacts associated with the bell counting switch 94 and also contacts associated with the north material programme switch 97. In addition the switch D corresponding to the 3rd sequence and denoted D3, though comprising a plurality of switches each individual to a separate material bin, will be operated to correspond with No. 1 north material bin being selected. As the 4th sequence is to be a charge of ore and limestone drawn from No. 1 south material bin and No. 6 south material bin respectively, the switch A associated with the 4th sequence, and denoted A4, will be operated into the position corresponding to an automatic material charge. Switch A4 has contacts associated with the bell counting switch 94 and also contacts associated with the south programme switch 98. In addition, the switch D corresponding to the 4th sequence, and denoted D4, though comprising a plurality of switches each individual to a separate material bin, will be operated to correspond with No. 1 south material and No. 6 south material bin being selected. As the large bell is to dump following on the opening of the small bell in the 4th sequence in the programme, switch B associated with this sequence of the programme and denoted B4, will be operated to correspond to a large bell dump. In like manner switches A5, A6, A7 and A8 are operated appropriately and switches D7 and D8 likewise.

The magnitude of a charge of coke is determined by the setting of the adjustable limit switches 129 in the case of the north coke control and 140 in the case of the south coke control. Prior to the start of a programme these limit switches will be adjusted to the weight of coke charge required. In the case of the material charges the magnitude of a charge drawn from any one material bin is determined by the setting of a counter associated with the weigh feeder to which material from that bin is fed. Thus, for example in the case of the No. 1 north material bin, associated with the weigh feeder 43 is a counter 160 responsive to two signals, of which one is a function of the weight of material carried by a given length of the conveyor of the weigh feeder and the other is a function of the speed of the conveyor of the weigh feeder. Each of the counters associated with the weigh feeders which are in use, that is to say those associated with material bins from which material is to be drawn in any one or more sequences of the programme will have been set each to the weight of material required in a charge. As the 3rd sequence in the programme requires material drawn from No. 1 north material bin the weight of that charge will be known, and this will be indicative of the weight zone in which the weight of that material should lie when in the check weigh hopper 25. The switch E associated with the 3rd sequence of the zone and denoted E3 can, therefore, be operated appropriately to select the check weigh zone required. In like manner, as the 4th sequence in the programme requires a combined charge of material to be drawn from No. 1 south and No. 6 south material bins and since the weight of each of these charges from the No. 1 south and the No. 6 south material bins respectively will be known, the sum of the weights of these two charges will indicate the zone in which the combined weight of the two charges should lie when in the material check weigh hopper 27 and the switch E associated with this 4th sequence and denoted E4 can likewise be operated to select the appropriate check weight zone. In a similar manner switches E7 and E8 associated with the 7th and 8th sequences will be operated to select the appropriate check weight zones.

As the programme is to end after the 8th sequence, the switch C corresponding to this sequence and denoted C8 will be operated to indicate the end of the programme. Switch C8 has contacts associated with the bell counting switch 94, contacts associated with the north material programme switch 97 and contacts associated with the south material programme switch 98.

The north material programme switch 97 will have its moving contacts initially standing in the first position and contacts of switch A1 will be rendered operative. As this switch has been set to the position indicating a coke charge for this sequence of the programme, the switches D1 and E1 are effective and a circuit is completed to the driving motor 152 to step the moving contacts into the second position. Since alternate charges are normally effected by the north skip, in any programme having a maximum of twenty sequences only ten sequences concern the north skip. With the first charge in a programme being delivered to the north skip, the first sequence, the third sequence, the fifth sequence and all other odd numbered sequences are concerned with the north skip. For similar considerations only the even numbered sequences concern the south skip. Therefore, the second position of the moving contacts of the north material programme switch 97 corresponds to the 3rd sequence in the programme, and likewise the third position of the moving contacts corresponds to the 5th sequence in the programme. The first position of the moving contacts of the south material programme switch corresponds to the 2nd sequence in the programme, the second position to the 4th sequence, the third position to the 6th sequence and so on. When the moving contacts of the north material programme switch reach their second position contacts of switch A associated with the third sequence become operative and this switch A3 has been set for an automatic material charge. The drive circuit to the motor 152 is interrupted and switches D3 and E3 rendered operative. As switch D3 has been set to indicate that material is to be drawn from No. 1 north material bin a start signal on lead 161 is delivered by lead 162 to control switches 163 controlling the vibratory feeder and weigh feeder associated with No. 1 north material bin. A supply is extended by lead 164 to the mechanism 100 driving the vibratory feeder 39. Material is withdrawn from the bin 35 and fed to the weigh feeder 43. When a quantity of material corresponding to that pre-selected has been passed or received by the weigh feeder, the counter 160 associated therewith sends a signal on lead 165 to the switches 163 and the supply to the operating mechanism 100 of the vibratory feeder is stopped and a signal is sent to control switches 166 indicating the completion of the feeding of material from the bin to the weigh feeder. With the conveyor of the weigh feeder continuously running any material on it is passed onto the material conveyor 47 by which it is conveyed and delivered to the check weigh hopper 25. After a time delay of duration sufficient to allow for any material of the weigh feeder furthermost from the weigh hopper 25 to be conveyed by the material conveyor 47 into the hopper and after the conveyor level limit switch 104 has been operated to indicate that the material conveyor is empty, a circuit is prepared for a switch indicating that the feed of material through the check weigh hopper has been completed. As the material has been passed by the material conveyor 47 into the check weigh hopper 25 the weigh pointer of the weighing mechanism 108 will have moved off the zero position, re-operating the limit switch 110. As the weight of material has increased each of the intermediate limit switches 112 will be operated momentarily in turn, and provided that the pointer of the weighing device lies in the zone selected by the switch E3 and all material has been fed by the conveyor 47 into the check weigh hopper 25, the weight checking relay 148 will be correctly operated to permit operation of the material feed completed relay.

When the moving contacts of the north material programme switch 97 were moved into the second position, contacts of switches C1 and C2 will have been rendered operative to test whether switch C1 or switch C2 had been operated to indicate the end of the programme. As the material selected for the 3rd sequence of the programme has now been fed into the check weigh hopper 25, the motor 152 driving the moving contacts of the north material programme switch is energized to drive the moving contacts into the next position which corresponds in this case to the 5th sequence in the programme. Contacts of switches C3 and C4 are rendered operative to determine whether either of these switches has been operated to denote the end of the programme. Contacts of switch A3 are now rendered effective and as this switch has been positioned to correspond to a charge of coke switches E5 and D5 are not effective and a circuit is completed step the moving contacts forward to the next position which corresponds to the seventh sequence of the programme. Contacts of switches C5 and C6 are now rendered operative to determine whether either of these switches has been operated to indicate the end of the programme. Contacts of switch A7 are now rendered operative and as this switch has been operated into a position corresponding to an automatic material charge the drive circuit to the motor 152 is arrested and switches D7 and E7 are rendered operative but no further action of the vibratory feeder can follow until the check weigh hopper 25 has been emptied in due course.

In a similar manner the moving contacts of the south material programme switch 98 are initially standing on the first position wherein contacts of the switch A2 are rendered operative, but, as this switch has been set into a position corresponding to an automatic charge of coke, switches D2 and E2 are rendered inoperative and a drive circuit is completed to the motor 153 to step the moving contacts on to the second position. In the second position the moving contacts of switches C2 and C3 are rendered operative to determine whether either of these switches has been operated into a position to indicate that the sequence to which they relate is the end of the programme. With neither of these switches having been so operated, contacts of switch A4 become operative and as the 4th sequence in the programme is to be a charge of material this switch will have been operated into a corresponding position. The drive by the motor 153 is interrupted and switches D4 and E4 become operative. The vibratory feeders associated with No. 1 south and No. 6 south material bins are started and the preselected quantities of material, namely ore and limestonee respectively, are fed onto the south material conveyor 60 and thence into the check weigh hopper 27. As the material builds up in the check weigh hopper 27 the hopper empty limit switch 116 is operated and then each of some of the intermediate limit switches 118 is momentarily operated in sequence as the weight of material increases. When each of the weigh feeders has received or passed the predetermined quantity of material the associated counters bring about the stopping of the vibratory feeders and when all the vibratory feeders have stopped a signal is sent to the control switches 167. After a time delay sufficient to enable material fed by the weigh feeder furthermost from the check weigh hoper 27 to have been delivered by the material conveyor 60 into the check weigh hopper 27, and provided that the conveyor level switch 114 has been operated to indicate the absence of material on the conveyor 60, and provided that the material weight checking relay 149 has indicated that the weight of material in the check weigh hopper is within the zone preselected by the position of the switch E4, a material feed completed relay is operated. A circuit is now established to the motor 153 driving the moving contacts of the south material programme switch 98, the counters associated with the weigh feeders are reset and the moving contacts are advanced to the next position. The third position of the moving contacts of the south material programme switch corresponds to the sixth sequence in a programme. When the moving contacts reach the third position contacts of the switches C4 and C5 are rendered effective to determine whether either of these switches has been operated to indicate that the sequence to which it corresponds is the end of the programme. As neither of these switches have been so operated in the programme being described, the contacts of the switch A6 are rendered operative. As the 6th sequence in the programme corresponds to a charge of coke this switch will have been so operated and switches D6 and E6 will be ineffective and a circuit will be completed to the motor 153 driving the moving contacts to advance them into their fourth position. In the fourth position contacts of the switches C6 and C7 are rendered operative to determine whether either of the sequences to which they correspond is to be the end of the programme. In the present instance neither of these switches have been so operated and the contacts of the switches A8 will be rendered operative and as this switch will have been moved into a position corresponding to an automatic material charge the drive to the motor 153 will be interrupted and the contacts of switches D8 and E8 rendered operative. Since, however, the check weigh hopper 27 contains a quantity of material no further operation of the vibratory feeders is possible until the hopper has been emptied.

In the north coke control, with the breeze conveyor 34 running and the check weigh hopper 24 empty, a circuit will be completed in control switches 168 for the motor 124 driving the coke screen 29. Coke will be withdrawn from the bin 28 and after screening fed into the coke check weigh hopper 24. As the coke flows into the hopper the hopper empty limit switch 127 of the weighing means 126 will be operated and, in due course, when the pointer of the weighing mechanism indicates that the quantity of coke preselected has been fed into the hopper the adjustable preset limit switch 129 will be operated to cause the control switches 168 to interrupt the supply to the motor 124 and stop the coke screen 29. The recorder 130 will be operated to record the weight of coke fed into the hopper and a feed completed relay will be operated.

In a similar manner, in the south coke control the motor 134 driving the coke screen 32 will be energised and a quantity of coke as determined by the position of the adjustable limit switch 140 will be fed into the check weigh hopper 26. The recorder 141 will record the weight of coke and a coke feed completed relay will be operated in the control switches 169.

Thus it will be appreciated that a charge of coke is fed into each of the coke check weigh hoppers and that there is fed into the north material check weigh hopper 25 the first charge of material to be required for the north skip and that likewise there has been fed to the south material check weigh hopper 27 the first charge of material to be required for the south skip. Each of these charges of coke and material is held in the appropriate check weigh hopper until called for.

START OF PROGRAMME

The moving contacts of the bell counting switch are initially in their first position and other contacts of the switch A1 are rendered operative. As this switch will have been operated to call for an automataic charge of coke an automatic coke charge selector relay 170 is operated. From this relay a starting signal is sent to each of the coke charging control switches 168, 169 by leads 171, 172. Neither of these, however, is effective by intself. At the start of the programme the north skip is in the pit, the limit switch 85 is operated but the limit switch 86 is not. A signal from the limit switch 85 on lead 173 completes the starting signal to the north coke control and the operator 132 is energised to open the hopper gate 131. Coke discharges from the check weigh hopper 24 into the north skip and completion of the discharge is determined by the operation of the empty limit switch 127 whereupon the operator 132 is reversed to close the hopper gate 131. Water may be added as desired to every skip charge or to only those skip charges which comprise coke or to only those skip charges which require material or yet again to no skip charges. The water charge control 89 includes a selector switch which may be operated to determine the conditions under which water is added to the skips. If it should be that water is to be added with a coke charge then when the operator 132 is energised to open the coke hopper gate a signal is sent on the line 174 to control switches 175 of the water charge control 89 to which a signal on line 176 from the limit switch 85 indicates that the north skip is in the pit and that the valve 142 is to be opened. A signal of timed duration is sent to the electrically operated thrust mechanism 143 to open the valve 142 for a predetermined period of time.

SKIP HOISTING AND BELL SEQUENCE

When reclosure of the hopper gate 131 is detected by the limit switch 133 a coke charge completed relay is operated in the control switches 168 and a signal sent on line 177 for a skip hoist starting circuit 178. When the water valve 142 has been closed a signal is also passed to the starting circuit 178 along the line 179. The receipt of both these signals on lines 177 and 179 indicates that charging of the north skip is completed and the skip hoist 84 is started over the line 180. At the same time a signal is passed on line 181 to the bell sequence switch 93 and a circuit is extended to the motor 150 to advance the moving contacts of the bell sequence switch from the first to the second position.

At the start of operation, the limit switch 85 corresponding to the north skip being in the pit will have been operated and a signal forwarded on line 182 to cause the distributor control to bring about energisation of the driving motor 69 and rotate the distributor 68 through a predetermined angle. Upon completion of such rotation a signal is sent on line 183 to an interlock 184 associated with the second position of the moving contacts of the bell sequence switch 93.

The presence of moving contacts of the bell counting switch 94 in a position within a programme is determined by bell counting relays 185 in response to a signal received on line 186 from the second position of the bell sequence switch, and a signal is forwarded on line 187 to interlock 184. The interlock 184 then re-energises the driving motor 150 to advance the moving contacts of the bell sequence switch to the third position.

In the third position of the moving contacts, a signal is sent on line 188 to small bell control 95 to initiate the opening of the small bell; the small bell operator 74 is caused to open the small bell and completion of its opening is detected by limit switch 77, whereupon the small bell control sends a signal on line 189 to an interlock 190 associated with the third position of the bell sequence switch to bring about re-energisation of the motor 150 to drive the moving contacts to the fourth position. The small bell control also sends a signal on line 191 to the distributor control 92 to cause a distributor angle selector switch 192 therein to advance to a subsequent position.

Finally, a signal is sent on from the small bell control on line 193 to the bell counting relays 185 to bring about energisation of the motor 151 to drive the moving contacts of the bell counting switch from the first to the second position.

When the moving contacts of the bell sequence switch are advanced to the fourth position, a signal is sent on line 194 to the small bell control to initiate closing of the small bell. The small bell operator 74 is now operated in the direction to close the small bell and the completion of the closing operation is detected by the limit switch 77 to enable the small bell control 95 to send a signal on line 195 to an interlock 196 associated with the fourth position of the bell sequence switch 93. Before this interlock 196 can complete a circuit for the motor 150 of the bell sequence switch a signal must also be received on line 197 from the distributor control 92 to indicate that the distributor angle switch 192 has been advanced to the next position, and a signal on line 198 from the bell counting relays 185 to indicate that the bell counting switch 94 has been advanced to its next position. On receipt of all three signals the interlock 196 provides for the re-energisation of the motor 150 and the moving contacts of the bell sequence switch 93 are advanced to the fifth position. Since it is undesirable that a skip charge should normally be tipped onto an open small bell, it is necessary to ensure that the small bell has been closed before the skip hoist 84 is allowed to complete a hoisting operation. Since the moving contacts of the bell sequence switch cannot be moved from their fourth to the fifth positions until the small bell has been closed, the fifth position of the bell sequence switch provides an interlock signal on line 199 to the skip hoist 84 to enable a hoisting operation to be completed. A signal is also sent from the fifth position of the bell sequence switch on line 200 to the large bell control 96 to initiate the opening of the large bell should that be required. Since the moving contacts of the bell counting switch 94 have already been advanced to their second position, the switch B1 which determines whether the large bell is to be opened, after the first opening of the small bell, is associated with the second position of the moving contacts. In addition, the switch C which determines whether the program is to end following a particular sequence, is likewise associated with the position of the moving contacts following that corresponding to that sequence. Switch B1 now determines whether the large bell is to be opened or not. If the large bell is not to be opened, the fact that it is in its closed position will be detected by limit switch 76 and a signal sent on line 202 by the large bell control to interlock 201 associated with the fifth position of the bell sequence switch.

SECOND SEQUENCE

As soon as the moving contacts of the bell counting switch 94 reach their second position, contacts of the switch A2 are rendered operative, and as this switch has been set to correspond to an automatic coke charge, the automatic coke charge selector relay 170 is re-operated. On completion of the skip hoisting operation, the limit switch 86 is operated to indicate that the south skip is in the pit.

From the limit switch 86 a signal is sent on line 203 to the north coke control to release the coke charge completed relay to permit the coke screen to be re-operated to enable a fresh charge of coke to be fed to the coke check weigh hopper 24 in readiness for a future requirement. A signal is also sent to the control switches 169 of the south coke control 90 along line 204 and this, in combination with the signal from the automatic coke charge selector relay 170 along the line 172, causes the hopper gate of the coke check weigh hopper 26 to be opened and a charge of coke delivered therefrom into the south skip. Completion of the delivery of the charge of coke is detected by re-operation of the limit switch 138, whereupon the coke gate is reclosed. Upon the opening of the coke hopper gate, a signal is sent to the water control 89 along line 205 and this, in combination with a signal along line 205A from the limit switch 86, brings about the opening of the valve 145 to feed a charge of water into the skip if the feeding of such a charge is then scheduled. On completion of the closing of the coke hopper gate, a start signal is sent on line 206 to the skip hoist starting switch 178, and on completion of a water charging operation, a similar signal is sent along the line 179.

The starting switch 178 sends a starting signal along the line 180 to the skip hoist 84 and also a signal along the line 181 to the interlock 207 associated with the first position of the moving contacts of the bell sequence switch 93.

The sequence of operation of the bell sequence switch 93, the distributor 67, the bell counting switch 94, the bell counting relays 185, the small bell control 95, the large bell control 96, is then repeated substantially as hereinbefore described. When the moving contacts of the bell counting switch 94 are advanced to the third position, contacts of the switch A3 are rendered effective. As the third sequence in the programme is to be a charge of material in the north skip, an automatic material charge selector relay 208 is operated. This relay sends start signals on line 209 to the control switches 166 of the north material control 87, and on line 210 to the control switches 167 of the south material control 91.

THIRD SEQUENCE

The end of the second sequence of the programme is denoted by the completion of the hoisting of the south skip at which time the north skip is in the pit and the limit switch 85 is operated. The operation of the limit switch 85 sends a signal to the control switches 169 of the south coke control 90 via line 211 to releases the coke charge completed relay therein and enable the screen 32 to be restarted to feed a fresh charge of coke to the coke check weight hopper 26. As the moving contacts of the bell counting switch 94 will be now be standing in their third position the automatic material charge selector relay 208 will have been operated and a start signal sent by it on the line 209 to the control switches 166 of the north material control 87 and this signal combined with a signal from the limit switch 85 on line 212 will bring about the energisation of the operator 106 to open the north material hopper gate 105 and enable the material already in that hopper to be discharged into the north skip. Simultaneously with the opening of the hopper gate 105 the signal is sent to the water control 89 on line 213 and if water is called for at this time the valve 142 will be opened to provide a charge of water into the north skip. When reclosing of the hopper empty limit switch 110 has indicated that the charge of material has flowed from the hopper 25 into the skip 23, the operator 106 is reversed to closed the hopper gate 105, and a material charge completed relay is operated: when the hopper gate is closed, as detected by the limit switch 107, a starting signal is sent to the skip hoist starting switch 178 on line 214 and when a similar starting signal is received on the line 179 from the water control 89 skip hoist 84 is started over line 180. The sequence of operations then takes place as hereinbefore described including step by step operation of the bell sequence switch 93, stepping of the moving contacts of the bell counting switch 94, operation of the distributor control 92 and of the small bell control 95. At the end of the third sequence of the programme the south skip will be in the pit and the limit switch 86 operated. The bell counting switch 94 will have its moving contacts in the fourth position and, through contacts of switch A4, the automatic material charge selector relay 208 will be re-operated. The control switches 167 of the south material control 91 now now receive a starting signal from the automatic material charge selector relay 208 over line 210 and also a starting signal from the limit switch 86 over the line 215. In a manner similar to that hitherto described with the north material control the hopper gate of the south material check weigh hopper 27 is opened to discharge material to the south skip and the valve 145 in the water control 89 will be opened if water is called for with this charge. When all the material has been discharged from the hopper 27 as determined by the reclosing of the hopper empty limit switch 116 a material charge completed relay will be operated in the control switches 167 and when the hopper gate is closed a starting signal will be sent to the skip hoist starting switch 178 over line 216 and when a similar starting signal is received from the water control 89 over the line 179 the skip hoist will be restarted.

FOURTH SEQUENCE

Upon operation of the limit switch 86 when the south skip is in the pit, a signal is sent over line 217 to the control switches 166 of the north material control 87 to release the material charge completed relay and permit the restarting of the vibratory feeders to feed further material into the check weigh hopper 25. The moving contacts of the north material switch 97 have been moved into the fourth position which corresponds to the seventh sequence in the programme upon completion of the feeding of material into the check weigh hopper 25. A start signal is now sent out by the control switches 166 on the line 161 and in the present instance the operator 102 is energised to restart the vibratory feeder associated with the No. 6 north material bin and material of prescribed quantity as determined by the weigh feeder 46 is fed to the material conveyor 47 and thence into the north material check weigh hopper 25. The check weight relay 148 will operate if the weighing means 108 associated with the check weigh hopper indicates that the weight of material lies in the zone selected by the switch E7. Provided that the check weight relay indicates that the weight is in the correct zone, and that the conveyor level switch 104 indicates that the material conveyor is empty, and that sufficient time has elapsed for material on the furthermost weigh feeder to have been delivered onto the material conveyor 47 and delivered by that conveyor into the check weigh hopper 25, the recorder 109 is operated to record the weight of material and then the material feed completed relay is operated. As the material feed has been completed a circuit is extended to the motor 152 and the moving contacts of the north material programme switch are advanced to their next position. In the present instance this will be the fifth position and switches C associated with the seventh and eighth sequences are rendered operative. As the switch associated with the eighth sequence namely C8 will have been operated to indicate that the 8th sequence is the last sequence in the programme, motor 152 driving the moving contacts is reversed and the contacts are returned to the home or starting position. As no contacts of any C switches are associated with the moving contacts when in their first position contacts of switch A1 are rendered operative and if the programme is to be repeated this switch will not have been changed since the last programme and will indicate that the first sequence in the programme is to be a coke charge. The motor 152 will be energised to drive the moving contacts in a forward direction to their next position and the sequence of operations so far as the north material programme control is concerned will be repeated in due course.

LARGE BELL OPENING

Referring back now to the fourth sequence in the programme, namely a charge of material delivered by the south material control into the south skip, on completion of the skip charging operation the starting switch 178 sends a start signal to the skip hoist 84 and to the bell sequence switch 93 and the moving contacts thereof are stepped to their second, third, fourth and fifth position, and perform the functions hereinbefore described. When the moving contacts of the bell counting switch 94 are stepped into their fifth position contacts of the switch B4 are rendered operative and as this switch has been operated to indicate that an opening of the large bell is now required, a signal is sent to the large bell control 96 over line 218.

In order to ascertain that conditions inside the blast furnace are suitable for opening of the large bell to dump further charges thereinto the level of the burden in the furnace is checked by means of the stocklines 78 and 81.

If the level of the burden, as indicated by limit switches 80 and 83, is sufficiently low to enable further charges of material to be dumped into the furnace, the stockline winches 79 and 82 are operated by the large bell control 96 to raise and withdraw stocklines. When the stocklines have been fully withdrawn, the large bell operator 71 is operated in conjunction with limit switch 76 first to lower and open the large bell 73, and thereafter to raise and close the large bell. When completion of the closing operation is detected by the limit switch 76 a signal is sent by the large bell control on line 202 to the interlock 201 and the bell sequence switch is advanced to its first position.

When the bell sequence switch was advanced into its fifth position completion of the hoisting of the south skip by the skip hoist was permitted, bringing the north skip into the pit and operating the limit switch 85. With the moving contacts of the bell counting switch 94 in the fifth position the switch A5 which has been set for an automatic coke charge will effect reoperation of the automatic coke charge selector relay 170 and a further charge of coke will be delivered from the coke check weigh hopper 24 into the north skip by the north coke control 88 as hereinbefore described. The operation of the limit switch 85 also sends a signal on line 219 to the south material control 91 to release the material charge completed relay and enable the appropriate vibratory feeder or feeders to be operated in accordance with the next material charge sequence for the south skip. In the present case as switch D8 has been operated to select a charge of limestone from No. 6 south material bin the vibratory feeder 55 will be operated and the south material control will function essentially in the manner already described. Upon operation of the material feed completed relay the motor 153 is energised to step the moving contacts of the south material switch 98 into their next position in which the contacts of switches C8 and C9 are rendered operative. As switch C8 has been operated to indicate that the sequence is to be regarded as the last in the programme, the motor 153 is now reversed and the moving contacts are driven back to the first or starting position. As there is no C switch associated with the first position the contacts of switch A2 are rendered operative and assuming that the programme is to be repeated, the sequence of operations as hereinbefore described will ensue.

OTHER SEQUENCES

It is believed that the feeding of a coke charge to the north skip during the fifth sequence of the programme and the feeding of a coke charge to the south skip during the sixth sequence of the programme, the feeding of a material charge to the north skip during the seventh sequence of the programme and the feeding of a material charge to the south skip during the eighth sequence of the programme will be apparent and readily understood from the foregoing description. However, when, during the hoisting of the south skip in the eighth sequence of the programme, the moving contacts of the bell counting switch 94 are advanced to the ninth position, contacts of switch B8 and of switch C8 associated with the bell counting switch 94 becomes effective. Switch C8 has been operated to indicate that this sequence is the last sequence in the programme and switch B8 to indicate that the large bell is to be opened. The bell counting relays 185 in response to a signal on line 220 energise the motor 151 and the moving contacts of the bell counting switch 94 are driven on until they reach the home or starting or first position.

If desired, the control system may be arranged so that an opening of the large bell is automatically called for at the end of a programme without the corresponding switch B having to be operated.

MANUAL CHARGES

A sequence in the programme may call for a charge to be delivered manually into a skip, for example if it should be required to insert a charge of a material which is not contained in any material bin, e.g. scrap metal. The switch A corresponding to the sequence at which such charge is required is operated into a position denoting a manual charge. When that switch is rendered operative by the moving contacts of the bell counting switch 94 a manual material charge relay 221 is operated. The A switch also has contacts associated with one position of the moving contacts of the north material programme switch 97 in the case of an odd numbered sequence or with a position of the moving contacts of the south material programme switch 98 in the case of an even numbered sequence and such contacts when the switch is in the position corresponding to a manual charge interrupt the advance of the moving contacts in like manner as if an automatic material charge had been selected for that sequence but the associated D and E switches are rendered inoperative. Depending on whether the limit switch 85 or the limit switch 86 is operated, that is to say whether the north skip is in the pit or the south skip is in the pit, a conditioning signal is sent to the north material control 87 on line 222 or to the south material control 91 on line 223. The required charge may be brought along by an operator in, for example, a dumper wagon and tipped into the north material check weigh hopper 25 or the south material check weigh hopper 27 whichever is appropriate. The subsequent operation of a manually operable starting switch sends a starting signal to the starting switch 178 to initiate the operation of the skip hoist.

OTHER FACILITIES

The control system may also provide for the interruption of the programme at any time to insert an extra charge of material or an extra charge of coke and thereafter automatically hoist an empty skip in order that the programme can be resumed without omitting any selected sequence.

The control system also enables an entire programme to be readily reset at any time. For this purpose the feeding of any further charges of coke to either skip is interrupted. Any material in the north or south check weigh hoppers 25, 27 is discharged in the north or south skip respectively and when the last material charge is being hoisted by the skip hoist the bell counting switch and both of the material programme switches have their moving contacts driven to their No. 1 or starting positions. The switches A, B, C, D and E can then be readjusted in order to set up a fresh programme.

The control system will give an alarm if the weight of material delivered into a material check weight hopper lies above the zone which was selected by the switch E or if it exceeds the normal maximum working load for the skip. Similar provisions are made in each of the north and south coke controls 88 and 90. The control system may also provide for the inclusion of a charge of scrap metal.

CONTROL SYSTEM

For the sake of clarity the additional features described above have not been illustrated in FIG. 3, but it is believed that they will be clearly understood and apparent from the circuit diagrams in FIGS. 4, 5, 6, 7, 8 and 9. Whilst FIGS. 4, 5, 6, 7, 8 and 9 are circuit diagrams of a preferred form of control system embodying electromagnetic switches in the form of relays and contactors, it is to be understood that the invention is not limited to the use of such relays and contactors; for example, gaseous discharge tubes or transistors or so-called contactless relays may be employed. Likewise, magnetic storage systems may be employed for storing details of the sequences required in a programme. Furthermore, the bell sequence switch, the bell counting switch and material programme switches need not necessarily be in the form of moving contacts and series of fixed contacts, other forms of sequence switches being possible such as a cam shaft carrying a plurality of cams co-operating with a plurality of cam operated switches.

The complete control system can be subdivided into a number of units and though such units are interconnected and interdependent, it is believed that their operation can best be described unit by unit. One such unit comprising the bell counting switch, bell sequence switch, small bell control and large bell control will be described by way of example with reference to the circuit diagram of FIG. 4, that is to say FIGS. 4A, 4B, 4C, 4D, 4E, 4F, 4G, 4H 4J and 4K. Subsequently there will be described a second unit comprising a material programme control with reference to FIG. 5; a third unit comprising feeders associated with material bins with reference to FIGS. 6 and 7; a fourth unit comprising coke supply apparatus with reference to FIG. 8; and a fifth unit comprising water charging apparatus with reference to FIG. 9.

The bell counting switch 94 comprises a set 250 of moving contacts 251 252, 253, 254, 255, co-operating with five columns of fixed contacts. Alternate contacts in the first column are connected to leads 256, 257 which can be extended to closing coils 1BCCC, 2BCCC and trip coils 1BCTC, 2BCTC of first and second bell counting relays (FIG. 4F). Associated with the second column of fixed contacts are contacts of the switches B1 to B20 which indicate whether the large bell is to be opened following the opening and closing of the small bell associated with the sequence to which they relate. If opening of the large bell is not required a B switch connects a fixed contact in the second column with a line 258. If an opening of the large bell is required the fixed contact is disconnected from the line 258. For example, if switch B8 were operated to indicate that an opening of the large bell were required at that sequence in the programme, the fixed contact 259 would be disconnected from the line 258 and for indicating purposes pilot lights LM and LN switched on. The line 258 is extended to a circuit including a coil BDI of a bell dump interlock relay (FIG. 4G). Associated with the third column of fixed contacts are contacts of the C switches C1 to C20 for indicating which sequence is to be regarded as the last sequence in a programme. If a sequence is not the last sequence in the programme, the relevant fixed contact in the third column is extended to a line 260 which leads to a circuit including coil BCSSR of the bell counting switch drive relay (FIG. 4F). When a C switch is operated to indicate that the sequence to which it relates is to be the last sequence in the programme the relevant fixed contact in the third column is extended to a line 261 which leads to a circuit including coil PRRCC of a programme repeat relay (FIG. 4G). Thus, for example, if switch C8 is operated to indicate that the eighth sequence is the last sequence in the programme fixed contact 262 is extended to the line 261. All the contacts in the fourth column except the first are connected to a common line 263. The contacts in the fifth column are extended to contacts of the A switches, being the switches for selecting whether a sequence is to include an automatic material charge, an automatic coke charge or a manual charge. The uppermost fixed contacts as seen in FIGS. 4A, 4B and 4C, which contacts correspond to an automatic material charge, of all the switches A1 to A20 are connected to a common line 264 which leads to a circuit including coil AMCSR of an automatic material charge selection relay (FIG. 4H). All the lowermost contacts as shown in FIGS. 4A, 4B and 4C of the switches A1 to A20, which contacts correspond to an automatic coke charge selection, are connected to a common line 265 which leads to a circuit including coil ACCSR of an automatic coke charge selection relay (FIG. 4H). All the middle fixed contacts of the odd numbered switches, that is to say switches A1, A3, A5 etc., and which contacts correspond to selection of a manual material charge into the north skip, are connected to a common line 266 which leads to a circuit including coil NMCSR of a north manual charge selection relay (FIG. 4H). All the middle fixed contacts as seen in FIGS. 4A, 4B and 4C of the even numbered A switches, that is to say A2, A4, A6 etc., which contacts correspond to selection of a manual material charge into the south skip, are connected to a common line 267 which extends to a circuit including coil SMCSR of a south manual charge selection relay. It will be noted that for the reasons explained in connection with the description of FIG. 3 the B and C switches relevant to a sequence are associated with the row of fixed contacts of the bell counting switch following that to which the A switch relating to that sequence is connected.

The moving contacts of the bell counting switch 94 are driven by an electric motor 268 controlled by contacts BCSSR1, BCSSR2, BCSSR3 of the bell counting switch drive relay (FIG. 4D).

The bell sequence switch 93 (FIG. 4E) comprises three sets of moving contacts of which the first set comprises moving contacts 269, 270 connected to one another, the second set comprises moving contacts 271, 272, similarly connected to one another, and the third set comprises a moving contact 273 making permanent connection with a contact strip 274 and connected electrically to two further moving contacts 275, 276. The first two sets of moving contacts control the sequential operation of associated controls and for the sake of convenience the contacts which they short-circuit when in the different positions are detached from the bell sequence switch and shown in the circuits to which they relate. The contacts are designated by the legend BP5 and are identified by the indicia 1A, 1B, 2A, 2B, etc. with the legend A applied to contacts associated with the moving contacts 269 and 270 and the legend B applied to contacts associated with the moving contacts 271 and 272. The moving contacts of the bell sequence switch have ten positions, 1 being the first or starting position corresponding to the north skip being in the pit, 6 being an intermediate starting position corresponding to the south skip being in the pit, and 10 being the last position prior to return to position 1. The numerals in the indicia indicate the position with which they are concerned. The fixed contacts associated with the moving contacts 275 are concerned with a circuit including the coil BDI of a bell dump interlock relay (FIG. 4G) and with the moving contacts in positions 1, 2, 6 and 7, connect a supply line 277 to the line 258. Fixed contacts associated with the moving contacts 276 are associated with interlocking contacts all leading to coil BPSR of a bell sequence switch relay (FIG. 4E) having contacts BPSR1, BPSR2, BPSR3 controlling a motor 278 (FIG. 4D) driving the moving contacts of the bell sequence switch. The motor 278 in FIG. 4D corresponds to the motor 150 in the block diagram of FIG. 3.

It is believed that the operation of the bell counting switch and associated circuits in FIGS. 4A and 4E can best be described with reference to the programme described in connection with the description of FIG. 3. Initially the north skip is in the pit. Switches A1, A2, A5 and A6 have been set to select an automatic coke charge. Switches A3, A4, A7 and A8 have been set to select an automatic material charge. Switch B4 has been set to select opening of the large bell in the fourth sequence; switch C8 has been operated to select the 8th sequence as the last in the programme.

FIRST SEQUENCE

Referring to FIG. 4A, when the north skip is in the pit contacts NSI3 of limit switch 85 are closed and a supply is extended from line 277 and moving contact 255 of the bell counting switch to moving contact 279 of switch A1 and thence to the line 265 as an automatic coke charge has been selected. In FIG. 4H a circuit is completed through normally closed contacts BELR5, normally closed contacts AMCSR3 of the automatic material charge selection relay, normally closed contacts SMCSR4 and normally closed contacts NMCSR4 of the south and north manual charge selection relays respectively to the coil ACCSR of the automatic coke charge selection relay (FIG. 4H). Contacts on this relay enable a coke charging control to feed a charge of coke into the north skip.

Referring now to FIG. 4D contacts ACCSR1 prepare a circuit from line 277 through normally closed contacts SSRR1 of a skip sequence reset relay and contacts NSI4 to closing coil BSSRCC of a skip hoist starting relay. When the charge of coke has been discharged into the north skip and the hopper gate of the coke check weigh hopper is closed contacts COSR3 and contacts COSCR4 of the coke start relay and a coke skip charge relay in the north coke control 88 are closed and if a charge of water has been scheduled to be fed into the north skip at the same time as a coke charge and has been so fed a circuit is completed through normally open contacts 1WTR5, NWV5 and SWV5 of the water control which will be described hereinafter. A circuit is now established between the line 277 and line 280 for energisation of the coil BSSRCC of the skip hoist starting relay. This relay operates and latches in the operated position. Contacts of this relay are associated with the skip hoist 84 and start operation of the skip hoist to hoist the north skip. As soon as the skip is hoisted out of the pit contact NSI4 of the limit switch 85 are opened to disconnect the closing coil.

There will at this time (unless this sequence happens to be the very first sequence in any programme) already be a charge of material on the small bell.

Referring now to FIG. 4E, on operation of the skip hoist starting relay contacts BSSR1 complete a circuit from line 277, moving contacts 273 and 276 of the bell sequence switch 93, to the coil BPSR of the bell sequence switch drive relay and the motor 278 is energised to advance the moving contacts to the second position.

Referring to FIG. 4F, contacts BPS2A extend the coil 1BCCC to the line 256 and the contacts BPS2B extend the coil 2BCCC to the line 257. Since the line 277 is extended to the line 256 by moving contacts of the bell counting switch in their first position the coil 1BCCC is energised and the No. 1 bell counting relay operates and latches in the operated position.

Referring to FIG. 4E, contacts 1BC1 prepare a circuit for the re-operation of bell sequence switch drive relay through coil BPSR.

Operation of the distributor is initiated by limit switch 85 or limit switch 86 at the end of a skip hoisting operation. The completion of operation of the distributor is indicated by the closing of contacts 1DBI1 and the circuit to coil BPSR is not completed until contacts 1DBI1 are closed and the motor 278 then drives the moving contacts to the third position.

With the moving contacts of the bell sequence switch in the third position contacts BPS3A (not shown other than in FIG. 4E) bring about operation of a relay in the distributor angle switch 192 to cause it to advance to the next position. Referring to FIG. 4K, when the large bell is closed contacts LBCLS of the limit switch 76 are closed to complete a circuit for coil LBCR of a large bell closed relay. Contacts BPS3B (FIG. 4F) extend a circuit through contacts LBCR1 of the large bell closed relay and contacts SBVOLS1 of a small bell valve operator limit switch to coil SBO of the small bell operator 74 which now operates to open the small bell. When the small bell is fully open contacts SBOLS (FIG. 4K) close and energise coil SBOR of a small bell open relay which now operates. Contacts SBOR1 (FIG. 4F) complete a circuit through contacts 1BC2 to coil BCSSR of the bell counting switch drive relay which operates and connects the motor 268 to drive the moving contacts of the bell counting switch to the second position. Referring to FIG. 4E contacts SBOR2 are closed and energise the coil BPSR of the bell sequence switch drive relay and motor 278 drives the moving contacts of the bell sequence switch into their fourth position.

When the small bell operator has completed its operation contacts SBVOLS1 open and disconnect the coil SBO. At the same time contacts SBVOLS2 are closed to prepare a circuit for coil SBC for closing the small bell. Contacts BPS4B complete a circuit to the coil SBC and the small bell is closed. When the small bell is closed limit switch contacts SBCLS (FIG. 4K) are closed to energise coil SBCR of a small bell closed relay.

When the moving contacts of the bell counting switch were advanced into their second position the line 256 was disconnected and the line 257 connected to the line 277 by the moving contact 251. A circuit is extended through contacts 1BC3 (FIG. 4F) to trip coil 1BCTC of the No. 1 bell counting relay which is now released. When the distributor angle switch has been stepped to its next position 2DBI1 (FIG. 4E) are closed and thus only when the small bell is closed and the bell counting switch has been stepped to its next position and the distributor angle switch has been stepped to its next position a circuit completed through contacts SBCR1, 1BC4, 2BC4, 2DBI1 to the coil BPSR of the bell sequence switch drive relay to energise the motor 278 and drive the moving contacts into the fifth position.

Since it is normally necessary that the small bell should have been opened and closed before a charge is dumped onto the small bell by a skip, contacts BPS5A in series with normally open contacts BSSR2 provide an interlock between lines 281 and 282 (FIG. 4K) to restrain the completion of operation of the skip hoist 84 until the small bell has closed.

As opening and closing of the large bell is not required at the end of the first sequence switch B1 has not been operated and thus with the moving contacts of the bell counting switch in their second position the moving contact 252 (FIG. 4A) connects with the line 258 and the coil BDI (FIG. 4G) of the bell dump interlock relay remains energised. Contacts BDI1 remain open and energisation of coil LBC of the large bell operator is prevented. Referring to FIG. 4E a circuit is now re-established through contacts LBCR2 of the large bell close relay and contacts BDI2 of the bell dump interlock relay, normally closed contacts PRR2 of a programme repeat relay, to the coil BPSR, and the motor 278 drives the moving contacts into their sixth position. Since at this time the skip hoist starting relay is still latched in the operated position contacts BSSR3 are open and further movement of the moving contacts is not possible.

SECOND SEQUENCE

Since the second sequence in the programme is also an automatic coke charge, with the moving contacts of the bell counting switch in their second position the coil ACCSR of the automatic coke charge selection relay is again energised and with the south skip in the pit and contacts SSI4 closed (FIG. 4D) on completion of the feed of a charge of coke to the south skip together with a charge of water if so pre-selected, a circuit is completed through contacts ACCSR1 and SSI4 to trip coil BSSRTC of the skip hoist starting relay which is now released. The release of this relay starts the skip hoist hoisting the south skip and the closing of contacts BSSR3 (FIG. 4E) re-energises coil BPSR of the bell sequence switch drive relay to enable the motor 278 to drive the moving contacts into the sixth position. The interlocks in series with the coil BPSR for the 6th, 7th, 8th, 9th and 10th positions of the moving contacts of the bell sequence switch are the same as those for the 2nd, 3rd, 4th and 5th positions and with the exception of contacts BPS6A and BPS10A (FIG. 4K) corresponding contacts in the 6th, 7th, 8th, 9th and 10th positions are connected in parallel with those in the 1st, 2nd, 3rd, 4th and 5th positions. As can be seen from FIG. 4K, however, contacts BPS5A are connected in parallel with contacts BPS6A to provide an interlock for the skip hoist during the hoisting of the north skip when contacts BSSR2 are closed and contacts BPS1A are connected in parallel with contacts BPS10A and in series with normally open contacts BSSR4 which are closed during the hoisting of the south skip to provide an interlock between lines 282 and 283 during the hoisting of the south skip. During the hoisting of the south skip the sequence of operations controlled by the bell sequence switch is substantially the same as those during the hoisting of the north skip and it is believed that this will be apparent without further description.

THIRD AND FOURTH SEQUENCES

During the 3rd and 4th sequences of the programme the sequence of operations is repeated with the difference that coil AMCSR of the automatic material charge selection relay is energised and that relay is operated instead of the automatic coke charge selection relay and that the circuit to the closing coil BSSRCC is completed through contacts AMCSR4 of the automatic material charge selection relay and through contacts MSR3 in series with contacts MSCR4 from a material control. However, when, during the 4th sequence the moving contacts of the bell counting switch are advanced to their 5th position switch B4 which has been operated to call for opening and closing of the large bell disconnects the moving contacts 252 from the line 258 and when the moving contacts of the bell sequence switch have moved off their 7th position the coil BDI (FIG. 4G) of the bell dump interlock relay is no longer energised through contacts of the bell sequence switch but remains energised through contacts BDI3 and contacts 2BC5 until the 2nd bell counting relay is released or until contacts SBOR3 of the small bell open relay are open.

When the bell dump interlock relay is released contacts BDI1 (FIG. 4G) extend a circuit through normally closed contacts LBDR1 of a large bell dump relay to coil SLR of a stock line relay. In this circuit are contacts NDILS of a north dump interlock limit switch and contacts SDILS of a south dump interlock limit switch. Both these limit switches only have their contacts closed if the stock lines have descended through a predetermined distance and thus serve to indicate whether the level of burden in the furnace is sufficiently low to enable further charges to be added to the furnace by opening of the large bell. These limit switches are indicated at 80 and 83 in FIG. 3. If the level of the burden is low enough both at the north stock line 78 and at the south stock line 81, a circuit is completed to coil SLR and the stock line relay operates. Contacts SLR1 by-pass the limit switch contacts NDILS and SDILS and the stock line relay causes the stock line winches to raise the stock lines fully. When the stock lines are fully withdrawn additional limit switch contacts NSLHLS in the case of the north stock line and SSLHLS in the case of the south stock line are closed and a circuit is prepared for coil LBO associated with the large bell operator 71. When the small bell has been closed contacts SBCR2 are closed and when the moving contacts of the bell sequence switch are in their tenth position contacts BPS10B complete a circuit for coil LBO. The large bell operator 71 now opens the large bell and after completion of its stroke contacts LBVOLS1 are opened to disconnect the coil LBO. When the large bell is fully open contacts LBOLS (FIG. 4K) are closed to energise coil LBOR of a large bell open relay. Contacts LBOR1 (FIG. 4H) complete a circuit to coil LBDR of a large bell dump relay through normally closed contacts LBCR4 of the large bell closed relay, the coil LBCR of which was de-energised as soon as limit switch contacts LBCLS were opened as soon as the large bell moved from its closed position. Contacts LBDR2 provide a holding circuit for the large bell dump relay against the opening of contacts LBOR1, and contacts LBDR3 (FIG. 4G) extend a circuit through contacts LBVOLS2 to coil LBC of the large bell operator and effect closing of the large bell. Contacts LBC1 provide a holding circuit against the release of the large bell dump relay. Upon operation of the large bell dump relay contacts LBDR1 (FIG. 4G) are opened to release the stockline relay and this causes the stockline hoists to allow the stocklines to descend into the furnace and contact the burden. Contacts LBDR4 restore the circuit to coil BDI of the bell dump interlock relay which re-operates. Contacts LBCR2 and BDI2 (FIG. 4E) are now both closed to complete the interlock associated with the 5th and 10th positions of the moving contacts of the bell sequence switch and re-energise coil BPSR of the bell programme switch driving relay and enable the motor 278 to drive the moving contacts to their 1st or 6th positions.

REMAINING SEQUENCES AND END OF PROGRAMME

During the 5th, 6th, 7th sequences of the programme the procedure will be substantially as hereinbefore described as will be the procedure during the 8th sequence until the moving contacts of the bell counting switch are stepped forward to their next position, in this instance their 9th position, in which the moving contact 253 makes contact with fixed contact 262 connected to contacts of switch C8. Switch C8 has been operated to indicate that the 8th sequence is the last in the programme and the fixed contact 262 is extended to the line 261 (FIG. 4B). Line 261 completes a circuit (FIG. 4G) to the closing coil PRRCC of the programme repeat relay. Contacts PRR3 prepare a circuit for the trip coil PRRTC of this relay, contacts PRR4 disconnect the circuit of coil BDI of the bell dump interlock and thus ensure that opening and closing of the large bell take place at the end of the sequence forming the last sequence in the programme irrespective of whether the corresponding switch B has been operated to denote a large bell dump or not. The bell sequence switch moving contacts are advanced to the fourth position to bring about closing of the small bell and into the 5th position. The small bell being closed and the stock lines withdrawn the large bell is opened and closed in the manner hereinbefore described. The advance of the moving contacts of the bell sequence switch from the 5th position is restrained by contacts PRR2 (FIG. 4E) in the circuit of coil BPSR. Contacts PRR5 prepare a circuit for coil BCSSR of the bell counting switch drive relay and this circuit is completed through contacts LBDR5 (FIG. 4F) when the large bell is fully opened. The motor 268 now drives the moving contacts of the bell counting switch until they are restored to their No. 1 or 1st position, wherein a circuit is established by the moving contact 254 to line 281 which extends to the trip coil PRRTC (FIG. 4G) of the programme repeat relay. The trip coil is now energized and the relay released.

In order not to hold up operation of other sections of the system during the return of the moving contacts of the bell counting switch to their 1st or start position, switch A1 is provided with an additional duplicate set of contacts indicated generally at 282 and the programme repeat relay is provided with four normally closed contacts PRR6, PRR7, PRR8, PRR9 and the three normally open contacts PRR10, PRR11, PRR12, which substitute the additional set of contacts 282 for the normal set of contacts. Moving contact 283 is extended by contacts NSI18 of the limit switch 85 and line 263 to all the fixed contacts in the third column with the exception of the first. If, during the process of returning the moving contacts of the bell counting switch to their start position, the end of the hoisting operation of the south skip should occur resulting in the north skip being in the pit and the closing of contacts NSI18 the auxiliary contacts 282 of switch A1 become effective to operate either the automatic material charge selector relay, the automatic coke charge selector relay or the manual charge selector relay.

Upon release of the programme repeat relay contacts PRR2 (FIG. 4E) restore the circuit to the coil BPSR and contacts PRR4 (FIG. 4G) restore the circuit to the coil BDI of the bell dump interlock relay which can now reoperate through contacts LBDR4. The bell sequence switch drive relay can now reoperate and motor 278 drives the moving contacts to their next position.

MANUAL CHARGES

When a manual charge is selected for a sequence in a programme, the relevant switch A has its moving contact in the middle position, and a circuit is extended to line 266 in the case of a manual charge to the north skip or to line 267 in the case of a manual charge to the south skip (FIGS. 4A, 4B, 4C). Line 266 extends (FIG. 4H) through normally closed contacts SMCSR3 of the south manual charge selector relay, normally closed contacts AMCSR5 and ACCSR3 of the automatic material charge selector relay and automatic coke charge selector relay respectively, normally closed contacts BELR7 of a bell extra load relay, through contacts SSRR7 of the skip sequence re-set relay, contact SBCR4, to coil NMCSR of the north manual charge selector relay. Line 267 similarly extends the circuit to coil SMCSR of the south manual charge selector relay. Normally closed contacts SMCSR4 and NMCSR4 break the operating circuits to coils AMCRS and ACCSR of the automatic material and automatic coke charge selector relays respectively. Thus the charge selection relays are interlocked with one another so that only one of them can be operating at any one time. The north and south manual selector relays condition the material programme controls for the delivery of a manual charge into the check weigh hopper. Since contacts AMCSR4 (FIG. 4D) are open, as an automatic material charge is not selected, an alternative circuit to the coils BSSRCC and BSSRTC of the skip hoist starting relay is provided by contacts NMCSR5 and SMCSR5 connected in parallel with contacts AMCSR4, to enable the north or south material programme controls to provide a starting signal when a manual charge has been delivered into the skip.

SKIP SEQUENCE RESET

In the programme described by way of illustration the last sequence was an even numbered sequence resulting in the north skip being in the pit at the start of the succeeding programme. Since this is a requirement of the system, arrangements must be made for hoisting an empty skip should the programme include an odd number of sequences. Provision is made for this by means of a skip sequence reset relay of which the closing coil SSRRCC is shown in FIG. 4J. During the hoisting of the north skip the skip hoist starting relay is operated and contacts BSSR5 will be closed, that is to say during part of an odd numbered sequence. With the programme repeat relay operated and contacts PRR13 closed, a circuit is completed through contacts PRR13 and BSSR5 to the closing coil SSRRCC as soon as the small bell has been opened and contacts SBOR7 of the small bell open relay close. Contacts SSRR1 (FIG. 4D) disconnect the normal circuits to the closing and trip coils BSSRCC and BSSRTC through contacts AMCSR4 and ACCSR1 of the automatic material and automatic coke charge selection relays, and contacts SSRR2 and SSRR3 prepare an alternative circuit to these coils. At the completion of hoisting of the north skip the limit switch 86 is operated and contacts SSI15 (FIG. 4J) extend a circuit through contacts SSRR4 to closing coil BELRCC of a bell extra load relay which operates and latches. Contacts BELR16 (FIG. 4H) disconnect the coil AMCSR of the automatic material charge selection relay from the line 264 and contacts BELR5 disconnect the coil ACCSR of the automatic coke charge selection relay from the line 265. Contacts BELR7 render the coils SMCSR and NMCSR of the south and north manual charge selection relays inoperative. With the release of all four of these charge selection relays no coke or material charges can be fed into the south skip which is now in the pit. Since the moving contacts of the bell sequence switch must have been advanced to their 5th position to enable the completion of the skip hoisting operation a circuit now exists (FIG. 4D) from contacts BPS5C, contacts BELR8, ACCSR4, AMCSR6, SSRR3, SSI4 to trip coil BSSRTC of the skip hoist starting relay and this relay is now released to cause the skip hoist to hoist the south skip. With the completion of the closing of the large bell and the reoperation of the bell dump interlock relay as hereinbefore described, the moving contacts of the bell sequence switch will have been moved into the 6th position and contacts BSSR3 (FIG. 4E) complete the circuit to the coil BPSR so that the moving contacts are moved on to the 7th position. In the normal sequence of events one or other of the bell counting relays would now be operated but contacts BELR9 and BELR10 respectively disconnect the coils 1BCCC and 2BCCC (FIG. 4F). The coil BPSR, however, continues to be energised (FIG. 4E) as contacts BELR11 are connected in parallel with contacts 1BC1 and 2BC1, and contacts SSRR5 of the skip sequence re-set relay, which relay is still operated, connected in parallel with contacts 1DBI1 of the distributor. The moving contacts of the bell programme switch are advanced to the 8th position. Contacts SSRR6 by-pass contacts SBOR2 of the small bell open relay so that coil BPSR is still energised and the moving contacts are driven on into their 9th position without awaiting the operation of the small bell open relay. In this way opening of the small bell is avoided. When the moving contacts of the bell sequence switch are stepped into their 9th position, a circuit is established (FIG. 4J) from contacts BPS9A to trip coil SSRRTC of the skip sequence reset relay since a circuit will exist between contacts BPS9A and point 285 due to the fact that neither skip is in the pit and that no charges of either coke or material have been delivered into the pit. The skip sequence reset relay now releases; a circuit is also established (FIG. 4J) from contacts BPS9A through contacts SBCR3 and contacts BELR13 to trip coil BELRTC of the bell extra load relay which now releases. As the small bell is closed and neither of the bell counting relays have been operated, the moving contacts of the bell sequence switch are advanced to their 10th position; the bell dump interlock relay has not released, opening and closing of the large bell does not now occur and the moving contacts of the bell sequence switch are advanced to their 1st position. Conditions are now re-established with the north skip in the pit ready for the commencement of the next programme.

SCRAP MATERIAL

When a charge containing scrap material is being hoisted, it is undesirable that it should be dumped by the skip onto the small bell when in the closed position. A scrap charge switch and relay are provided to cater for this. Operation of a manually operable switch 286 (FIG. 4H) completes a circuit to closing coil SCRCC of a scrap charge relay. This relay operates and latches in the closed position. In the interlock circuits associated with the 3rd and 8th positions of the moving contacts of the bell sequence switch (FIG. 4E) normally closed contacts SCR1 are provided in series with contacts SBOR2. When the moving contacts of the bell sequence switch are stepped to their third or 8th position, they bring about opening of the small bell in the manner hereinbefore described. The stepping of the moving contacts to the fourth position on completion of opening of the small bell is, however, restrained by the contacts SCR1 in the circuit to the coil BPSR. Since the completion of a hoisting operation by the skip hoist is normally dependent upon the moving contacts of the bell sequence switch having reached their 5th or 9th positions contacts BPS5A and BPS6A are by-passed by contacts SCR2 in series with contacts SBOR8 in the case of the hoisting of the north skip and contacts BPS10A and BPS1A are by-passed by contacts SCR3 and contacts SBOR5 in the case of the hoisting of the south skip (FIG. 4K) so that the completion of a skip hoisting operation will be effected once the small bell has opened. On completion of a hoisting operation contacts NSI15 or contacts SSI15 of the limit switch 85 or the limit switch 86 respectively are closed and a circuit is extended through contacts SBOR6 to trip coil SCRTC of the scrap charge relay which then releases (FIG. 4J). The closing of contacts SCR1 (FIG. 4E) enables coil BPSR to be energised and the moving contacts of the bell sequence switch advanced to their next position and the sequence of operations completed as hereinbefore described.

PROGRAMME RE-SET

When it is desired to reset the sequences in a programme in order to establish a new programme, a manually operable switch is operated to a reset position. The switch has contacts 287 (FIG. 4H) which, upon operation of the switch into the reset position, complete a circuit to coil PRPR of a programme reset preselector relay which now operates. This switch also has contacts 288 which, upon operation of the switch into the reset position, break the normal circuit between the line 265 and the coil ACCSR of the automatic coke charge selector relay. Should a coke charge be in process at the time of operation of the reset switch, coil ACCSR will already be energised and contacts ACCSR5 in series with contacts NSI6 in parallel with contacts SSI6 of the limit switches 85 and 86 permit the feeding of a coke charge already in progress to be completed. At the completion of the coke charge when the skip hoist is re-started whichever of contacts NSI6 and SSI6 were closed will be opened and coil ACCSR released. After such a coke charge, if any, any material charges already waiting in the material check weigh hoppers are delivered to the appropriate skip in the normal manner. If a skip is in the pit upon operation of the reset switch or at the next occasion when one of the skips is in the pit, a circuit is established through contacts NSI15 or SSI15 (FIG. 4J) of limit switches 85, 86 and contacts PRPR8 to closing coil BELRCC which operates the bell extra load relay which operates and latches and functions in the manner hitherto described. When the last material charge has been hoisted in the north skip and the last material charge has been hoisted in the south skip, a circuit will exist between points 289 and 290 (FIG. 4G). When the last skip containing a material charge is being hoisted contacts NSI7 and SSI7 of limit switches 85 and 86 will be closed and when the small bell has been opened in the sequence of the bell sequence switch containing the penultimate charge, a circuit is established from moving contacts 254 to the line 263 (FIG. 4A, or FIG. 4B, or FIG. 4C), through contacts SBOR4 (FIG. 4G) contacts PRPR4, contacts NSI7, SSI7 to point 289 and thence from point 290 to coil PRRCC of the programme reset relay which operates and latches. The programme reset relay effects return of the moving contacts of the programme counting switch to their 1st or starting position in a manner hereinbefore described. The switches A, B, C, D and E may now be reset manually to preselect a fresh programme and when this has been effected the reset switch is restored to its normal position. Contacts 287 disconnect the coil PRPR of the programme reset preselector relay which releases contacts 288 re-establish the normal circuit from the line 265 to the coil ACCSR. Since, as will be hereinafter described, in each of the material programme controls the material programme switches now have their moving contacts driven to the first or starting position, a new programme can be set up.

EXTRA MATERIAL CHARGE

If, at any time during a programme, it is desired to insert an extra material charge, a manually operable switch 291 is operated momentarily to energise closing coil EMPRCC (FIG. 4H) of an extra material programme relay. This relay operates and latches in the closed position. The extra material charge may be preselected from either the north material control or from the south material control and as will be hereinafter described contacts of the extra material programme relay condition the selected programme control to insert the preselected extra material charge following any existing material charge which may be progress from that control or which may already be in the check weigh hopper awaiting discharge to a skip. When the selected extra material charge has been fed into the material check weigh hopper and the appropriate skip is in the pit to receive that charge a circuit is established between line 292 and line 293 (FIG. 4J): a circuit is now established through contacts NSI15 or SSI15, contacts PRRI4, contacts EMPR3, line 292, line 293 to the closing coil BELRCC of the bell extra load relay. In addition to performing the functions hereinbefore described additional contacts of the bell extra load relay function in the programme control selected to prepare conditions for the discharge of the extra material charge into the skip. Contacts BELR14 (FIG. 4H) in series with contacts EMPR4 provide an independent operating circuit for coil AMCSR of the automatic material charge selecting relay and operation of this enables the material charge to be dischraged from the check weigh hopper into the skip in the normal manner. When subsequent to the start of a skip hoisting operation the bell sequence switch moving contacts have reached their 3rd or 8th position and the small bell has been opened, a circuit is established through contacts BPS3C or BPS8C (FIG. 4J), contacts BELR12, contacts EMPR5 and contacts SBOR7 to the closing coil SSRRCC of the skip sequence reset relay which operates and latches. When the moving contacts of the bell sequence switch are advanced to their 4th or last position and the small bell is closed, the trip coil BELRTC is energised and the bell extra load relay is released. The moving contacts of the bell sequence switch advance to their 5th or 10th position and permit completion of the skip hoisting operation whereupon contacts NSI15 or SSI15 are operated and the closing coil BELRCC re-energised through contacts SSRR4. Since at the time when the moving contacts of the bell sequence switch were in their 3rd or 8th position a circuit existed between point 284 and point 294 by means of contacts in the selected material control, a circuit was extended from contacts BPS3C or contacts BPS8C through contacts BELR12, SSRR9, point 284, point 294, contacts EMPR6 to trip coil EMPRTC of the extra material programme relay which then released (FIG. 4J). The opening of contacts EMPR4 (FIG. 4H) released the automatic material charge selection relay so that when the moving contacts of the bell sequence switch are advanced to their 5th or 10th positions, a circuit is established (FIG. 4D) from contacts BPS5C or BPS10C to the closing coil BSSRCC or the trip coil BSSRTC of the skip hoist starting switch to cause the skip hoist to hoist an empty skip and to establish the normal skip sequence in the manner substantially as hereinbefore described.

EXTRA COKE CHARGE

A manually operable switch 295 (FIG. 4H) and an extra coke programme relay are also provided to enable an extra coke charge to be inserted at any desired place in a programme. When the switch 295 is operated momentarily closing coil ECPRCC of the extra coke programme relay is energised. The relay operates and latches and the sequence of operations is substantially similar to that described in connection with the extra material charge with the exception that the coke programme controls are concerned in place of the material controls. Contacts ECPR3, ECPR4, ECPR5, ECPR6 are concerned in place of contacts EMPR3, EMPR4, EMPR5, EMPR6; contacts BELR15, instead of contacts BELR14; coil ACCSR instead of coil AMCSR, lines 295 and 293 in place of 292 and 293, and points 284 and 296 instead of points 284 and 294.

MATERIAL PROGRAMME CONTROL

The circuit of a material programme control is illustrated in greater detail in FIG. 5, that is to say in FIGS. 5A, 5B, 5C, 5D, 5E, 5F. As will be appreciated from FIG. 3, two material programme controls are provided, one in connection with the feed of material to the north skip and the other in connection with the feed of material to the south skip. With one minor alteration, which will be referred to hereinafter, both material programme controls are the same, and it is believed that it will be sufficient to describe one of them, namely the north material programme control relating to the feed of material to the north skip.

The material programme control includes a material programme switch, parts of which are illustrated diagrammatically in FIGS. 5E and 5F. The switch involves two sets of moving contacts 301, 302, which can be driven by an electric motor 303 (FIG. 5A).

The first set of moving contacts 301 includes a main contact 304 engaging a common contact bar 305, and also includes additional moving contacts 306, 307, 308 and 309. The second set of moving contacts 302 comprises a feed contact 310, bin selector contacts 311, 312, 313, 314, 315, 316 and a weight zone contact 317. Each of the moving contacts 306 to 317 co-operates with an individual set of fixed contacts which, it will be understood, are disposed along arcs about a common centre, but for the sake of convenience on the circuit diagram the arcs are indicated in columns and rows, the moving contact 306 co-operating with fixed contacts in a first column, moving contact 307 contacts in a second column, moving contact 308 contacts in a third column, and so on, with moving contacts 317 co-operating with fixed contacts in a twelfth column.

The fixed contacts in the first, third, fifth and other odd-numbered rows in the first column are connected to a lead 318, and the contacts in the second, fourth, sixth and other even-numbered rows in the first column are connected to a common lead 319. Associated with all the contacts in the second column is a lead 320, which is connected directly to the contact in the first row of the column, and to the other contacts in the column through contacts of the end-of-programme switches C1 to C20, as will be hereinafter described. Only the fixed contact in the first row of the third column, with which contacts the moving contact 308 co-operates, is connected to a lead 321.

Since in any programme only a maximum of 10 charges can be delivered to the north skip, and a maximum of 10 likewise to the south skip, the material programme switches are provided with ten operative positions. The C switches individual to each sequence in the programme for operation to indicate whether that sequence is to be the end of the programme have additional contacts associated with each of the north and south material programme switches. In each of the material programme switches, the first position is a home or starting position, and the provision of the end of programme C switches enables each of the material programme switches to be returned to its home or starting position at the end of a programme.

Since odd-numbered charges in a programme are to be delivered to the north skip, moving contact 322 of material selector switch A1 relating to the first sequence in the programme is connected to the fixed contact in the first row of the fourth column of the north material programme switch. Moving contact 323 of the material selector switch A3 relating to the third sequence in the programme, is connected to the fixed contact in the second row of the fourth column, and moving contacts of the other material selector switches relating to the other odd-numbered sequences in the programme are connected to the other contacts in the fourth column, the moving contact 324 of the material selector switch relating to the nineteenth sequence in the programme being connected to the fixed contact in the tenth row in the fourth column. Moving contacts 325, 326, 327, 328, 329, 330 of the No. 1, No. 2, No. 3, No. 4, No. 5, No. 6 bin selector switches D1 relating to the first sequence in a programme are connected to fixed contacts in the first row in the sixth, seventh, eighth, ninth, tenth and eleventh columns respectively and the bin selector switches relating to other odd-numbered sequences in the programme are likewise connected to corresponding contacts in other rows in these columns.

Moving contact 331 of check weigh zone selector switch E1 relating to the first sequence in a programme, is connected to the fixed contact in the first row in the twelfth column and moving contacts of check weigh zone switches relating to other odd-numbered sequences in the programme are similarly connected to contacts in corresponding rows in the twelfth column.

Each of the material selector switches has three fixed contacts; one, designated AM, corresponding to the automatic feed of material at the sequence in the programme, is extended to the fixed contact in the fifth column, and in the same row as the fixed contact to which its moving contact is connected. A second fixed contact, designated M, denoting that a charge at that sequence in the programme is to be fed manually is connected to a common lead 332. A third contact, designated AC, denoting that a charge of coke is to be fed automatically at that sequence in the programme, is unconnected.

The fixed contacts of all the No. 1 bin selector switches associated with all the odd-numbered sequences in the programme are extended to the coil 1NMBR of a first north material bin relay and likewise all the contacts of the No. 2 bin, No. 3 bin, No. 4 bin, No. 5 bin, and No. 6 bin switches of the odd-numbered sequences in the programme are extended respectively to the coils 2NMBR, 3NMBR, 4NMBR, 5NMBR and 6NMBR of the No. 2 north material bin relay, No. 3 north material bin relay, No. 4 north material bin relay, No. 5 north material bin relay and No. 6 north material bin relay.

In like manner, corresponding contacts of the check weigh zone selector switches E are extended to the coils 1CZR, 2CZR, 3CZR, 4CZR and 5CZR of No. 1 check zone relay, No. 2 check zone relay, No. 3 check zone relay, No. 4 check zone relay, and No. 5 check zone relay respectively.

INITIAL STARTING

On initial switching on, a material weight check relay will be released. The release of this relay will give an alarm condition, which must be cancelled. Cancellation of the alarm effects closing of normally open contacts CAR (FIG. 5A) in an alarm panel (not shown). Provided that the material check weigh hopper is empty, a circuit will then exist through limit switch contacts LS1, LS2, LS3, LS4, LS5 and LS6, material overload limit switch MOLLS and material emergency excess weight switch MEEWLS, all of which switches are associated with the weighing mechanism of the material check weigh hopper, to the coil 1MWCR of material weight check relay which will operate and providing a holding circuit for itself through normally open contacts 1MWCR1.

Provided the material hopper gate is closed, contacts MHGLS of the limit switch 107 will be closed, and the coil MHGPR of a material hopper gate proving relay MHGPR energised.

If there is substantially no material on the material conveyor, the contacts MCLLS of the material conveyor level limit switch 104 will be closed, and contacts MCR1 complete a circuit for coil MCER (FIG. 5B) of a material conveyor empty relay. On manual operation of the start push button switch 154, contacts 333 (FIG. 5A) are closed and a circuit extended through normally closed contacts 2MFR15 of a material feed completed relay, normally open contacts MHGPR1 of the material hopper gate proving relay, normally open contacts 1MWCR2 of the material weight check relay and contacts MCER2 in parallel with contacts MHGPR2, to the coil MC of a material conveyor contactor. Contacts MC1, MC2 and MC3 extend a supply to the north material conveyor motor 99. When the conveyor has run up to speed, contacts MCSS (FIG. 5B) of a speed responsive switch are closed and a circuit is extended through normally open contacts MC4 to coil MCR of a material conveyor relay.

The conditions are now appropriate for the starting of the weigh feeder conveyors, which can feed material to this material conveyor. Manual operation of the start push button 154 also closes contacts 334 to complete a circuit for coil WFSR of a weigh feeder start relay.

WEIGH FEEDERS

The control circuit of No. 1 weigh feeder control which is associated with No. 1 material bin, is illustrated in detail in FIGS. 6A and 6B and that of No. 6 weigh feeder control, which is associated with No. 6 material bin in FIGS. 7A and 7B.

Referring now to FIGS. 6A and 6B, through normally open contacts WFSR1 of the weigh feeder start relay, a circuit is extended through normally open delayed closing contacts MCR2 of the material conveyor relay and normally open contacts MCER1 of the material conveyor empty relay, to the coil 1WF of weigh feeder contactor. Contacts 1WF1, 1WF2, 1WF3 extend a power supply to the weigh feeder motor 101. When the weigh feeder has run up to speed, contacts 1WFSS of a speed sensitive switch close and through normally open contacts 1WF4 of the weigh feeder contactor extend a circuit to coil 1WFR of a weigh feeder relay. On operation of the weigh feeder relay contacts 1WFR1 in series with contacts MCR7 of the material conveyor relay complete a holding circuit for the weigh feeder contactor. The weigh feeder relay includes time closing contacts 1WFR2 which are extended into a starting circuit for the next, e.g. No. 2, weigh feeder and take the place of the contacts MCR2 and MCER1, which are in the starting circuit of this No. 1 weigh feeder. In this manner the weigh feeders associated with the north material conveyor are started up in succession, and isolating switches 335, 336, 337, 338 are provided, whereby, in the event of No. 1 bin weigh feeder being out of use, the starting interlock circuit formed by contacts MCR2 and MCER1 can be brought in circuit with the weigh feeder contactor of the first weigh feeder in use.

In like manner further interlock switches are provided, whereby in the event of No. 2 weigh feeder not being in use, the contacts 1WFR2 would be placed in circuit with the weigh feeder contactor of the next weigh feeder in use. Thus, in the event of both No. 5 and No. 6 weigh feeders being in use upon the closing of time contacts 5WFR2 (FIG. 7A) of weigh feeder relay associated with No. 5 weigh feeder a circuit will be established through contacts WFSR6 of the weigh feeder start relay to the coil 6WF of No. 6 weigh feeder contactor. In like manner, contacts 6WF1, 6WF2 and 6WF3 extend a supply to the motor 103 of No. 6 weigh feeder and when that feeder has run up to speed, contacts 6WFSS of a speed responsive switch will close and extend a circuit through contacts 6WF4 to coil 6WFR of No. 6 weigh feeder relay, and contacts 6WFR1 in series with contacts MCR12 will provide a holding circuit for the No. 6 weigh feeder contactor.

The progress of starting of the conveyors can be observed by pilot lights LA (FIG. 5C) energised by contacts MCR6 when the material conveyor is running, LB (FIG. 6B) energised through contacts 1WFR4 when the one weigh feeder is running, and LC (FIG. 7B) energised through contact 6WFR2 when No. 6 weigh feeder is running. When the material conveyors of all the weigh feeders in use are running, the start button can be released.

For the sake of description, it will be convenient to describe the operations for the same programme as that which was used for describing the operation of the control system with reference to the block diagram of FIG. 3. At the outset, the moving contacts of the material programme switch will be in their first or starting position, as illustrated in FIG. 5. The moving contact 322 of the material selector switch relating to the first sequence in the programme, and which is designated A1 in FIG. 3, will be in the position corresponding to an automatic coke charge and the circuit between the moving contacts 309 and 310 is interrupted. A circuit will, however, exist from moving contact 307 to line 320 (FIGS. 5E and 5D) and normally closed contacts MECR1, normally closed contacts 1NMBR1, normally closed contacts 2NMBR1, normally closed contacts 3NMBR1, normally closed contacts 4NMBR1, normally closed contacts 5NMBR1, normally closed contacts 6NMBR1, normally closed contacts MCSR1, normally closed contacts MPRR8, normally closed contacts MPSR1 to coil MPSF of material programme switch forward drive contactor; contacts MPSF1, MPSF2, MPSF3 (FIG. 5A) extend a supply to the motor 303 driving the moving contacts of the material programme switch. Normally closed contacts MPSF4 are connected in series with coil MPSR of a material programme switch reverse drive contactor to prevent its operation at the same time. The moving contacts 301, 302 are driven to their second position, which corresponds to the third sequence in the programme.

Associated with the fixed contact in the second row of the second column are contacts of switch C1 (FIG. 5E) and contacts of switch C2, which denote whether the first sequence or second sequence is designated as the last sequence in a programme. If neither of these switches is operated a circuit is extended from the moving contact 307 through contacts of switch C2 in series with contacts of switch C1 to line 320, to prepare for the subsequent further advance of the moving contacts. The moving contact 309 now engages with the fixed contact in the second row of the fourth column and is connected to the moving contact 323 of the charge selector switch A3. As the third sequence in the programme is to be an automatic material charge drawn from No. 1 north bin the moving contact 323 is in the diagrammatically uppermost position and connects with the fixed contact in the second row in the fifth column; this first contact is now engaged by the moving contact 310 and a supply is extended by moving contacts 311, 312, 313, 314, 315 and 316 to six switches forming the switch D3. Switch D31 corresponding to No. 1 north bin will be in the "on" position and switches D32, D33, D34, D35 and D36 associated with the second, third, fourth, fifth and sixth north material bins will be in the "off" position. A circuit will now be extended through switch D31 and normally closed contacts EMFR1 to coil 1NMBR of first north material bin relay. A circuit is also extended by moving contact 317 to the check weight zone selector switch E3, and if this switch is, for the sake of example, in the third position to select the third zone, a circuit is extended to coil 3CZR of the third check weight zone relay.

With its coil energised, the first north material bin relay 1NMBR should operate, and the normally closed contacts 1NMBR1 will interrupt the circuit to the coil MPSF of the material programme switch forward contactor, which will release and disconnect the motor 303. Since in the event of the first material bin relay not operating, the circuit to the coil MPSF would not be interrupted and the motor would continue to be energised to drive the moving contacts into their next position, coil MCSR of a material check selection relay is connected in parallel with the coils of each and all of the north material bin relays through normally closed contacts of each of the north material bin relays and anti-feed back rectifiers. Thus, the coil MCSR is connected in parallel with the coil 1NMBR through a rectifier 339 and normally closed contacts 1NMBR2. Should the first north material bin relay not operate when its coil 1NMBR is energised, a circuit will remain to the coil MCSR of the material check selection relay, which should then operate, and normally open contacts MCSR1 (FIG. 5D) would interrupt the circuit to the coil MPSF of the material programme switch forward contactor.

When the moving contacts were in their first position, a circuit existed from the first moving contact 306 (FIG. 5E) to the line 318 and thence through normally closed contacts 2MFR1 of a material feed complete relay to closing coil 1MCCRCC of a first material charge counting relay. This relay is of the latching type and upon energisation of its closing coil operates and is latched in the operated position until its trip coil 1MCCRTC is energised. Contacts 1MCCR1 prepare a circuit for the trip coil 1MCCRTC. When the moving contacts are advanced to their second position the moving contact 306 (FIG. 5E) is disconnected from line 318 and is extended to line 319, from which a circuit is completed through normally closed contacts 2MFR2 of the material feed completed relay to closing coil 2MCCRCC of a second material charge counting relay, which operates and latches, whilst at the same time a circuit is extended through normally open contacts 1MCCR1 to trip coil 1MCCRTC of the first material charge counting relay, which is then released. Normally open contacts 2MCCR1 prepare a circuit for the trip coil 2MCCRTC of the second material charge counting relay.

Referring now to FIG. 5B, upon operation of either of the material charge counting relays, contacts 1MCCR2 in parallel with contacts 2MCCR2 extend a circuit through normally closed contacts 2MFR3 of the material feed complete relay and normally closed contacts MCSR2 of the material check selection relay to coil MSR of a material start relay provided that the material hopper gate proving relay is operated, and contacts MHGPR3 are closed. Normally open contacts MSR1 of the material start relay complete a circuit to coil MSRA of a relief relay.

Referring now to FIG. 6B normally open contacts 1NMBR3 in series with normally open contacts MSRA1 complete a circuit to coil 1RCR of a recommence counting relay associated with the counter 160 associated with the weigh feeder 43. The counter will have previously been re-set by means of a circuit completed through normally closed contacts 1MFCR6 of a No. 1 bin material feed completed relay between leads 340, 341. When the counter is re-set, contacts 1CR are closed to complete a circuit to coil 1CRR of a counter re-set relay. Upon operation of the recommence counting relay, a circuit is completed for a short period of time between leads 342, 343 by normally open contacts 1RCR1 in series with normally closed contacts 1RCR2 which latter contacts are opened after a short time delay.

Provided that the weigh feeder is running, the material conveyor 47 is empty, and provided that the counter 160 has been re-set, a circuit will then be completed by contacts 1RCR3 through normally open contacts 1WFR3, normally closed contacts 1MFCR2, normally open contacts MCER5, and normally open contacts 1CRR1 to coil 1VF of No. 1 vibratory feeder contactor.

Normally open contacts 1VF1 provide a holding circuit in parallel with contacts MCER5 against the release of that relay when the presence of material is subsequent-ly detected on the material conveyor, and also against the opening of contacts 1CRR1, since as soon as material is delivered to the weigh feeder, the counter will be moved off zero, contacts 1CR will be opened, releasing the No. 1 counter re-set relay and opening contact 1CRR1. Contacts 1VF2 and 1VF3 (FIG. 6A) extend a supply to driving mechanism 100 of the vibratory feeder which now draws material from the bin 35 and delivers it to the weigh feeder. When the counter 160 of the weigh feeder reaches the preselected value, contacts 1FC (FIG. 6B) close to complete a circuit for coil 1FCR of a No. 1 feed completed relay.

Normally open contacts 1FCR1 of this relay complete a circuit to closing coil 1MFCRCC of a No. 1 material feed completed relay, which is then operated and latches. The normally closed contacts 1MFCR2 now open the circuit to coil 1VF of the vibratory feeder contactor. The vibratory feeder contactor releases and contacts 1VF2 and 1VF3 (FIG. 6A) discontinue the supply to the driving mechanism 100. The vibratory feeder is stopped and no more material is withdrawn from the bin. Contacts 1MFCR1 (FIG. 6B) prepare a circuit for the trip coil 1MFCRTC for the subsequent release of the No. 1 material feed completed relay.

Indication of the withdrawal of material from the bin is provided by a pilot light LD which, by means of contacts MSR6 and normally open contacts 1NMBR4, is switched on as the withdrawal of material starts, and by means of normally closed contacts 1MFCR2 is switched off when the No. 1 material feed completed relay is operated.

Referring now to FIG. 5B, when No. 1 material feed completed relay has operated and No. 1 vibratory feeder contactor has released, a circuit is completed through normally open contacts MCR3 of the material conveyor relay, normally open contacts 1NMBR5, normally open contacts 1MFCR4, normally closed contacts 1VF4, normally closed contacts 2NMBR6, 3NMBR6, 4NMBR6, 5NMBR6, 6NMBR6, to a timer 344. The timer 344 is set to close its contacts 345 after a time interval of sufficient duration to enable material drawn from No. 6 material bin, which bin is that furthermost from the check weigh hopper 25, to be entirely received by the material conveyor 47 and delivered by it into the check weigh hopper 25. When the contacts 345 are closed, a circuit is completed to coil MFTR of a material feed timing relay, and contacts MFTR1 provide a holding circuit through normally open contacts 1MFCR5 of the No. 1 material feed completed relay. It will be noted that normally open contacts 2MFCR4, 3MFCR4, 4MFCR4, 5MFCR4, 6MFCR4 each in series with contacts 2VF4, 3VF4, 4VF4, 5VF4, 6VF4, and all connected in series with the timer 344, but that the normally closed contacts such as 2NMBR6 connected in parallel with contacts of the material feed completed relays and vibratory feeder relays with which they are associated, by-pass the contacts associated with those vibratory and weigh feeders which are not selected for operation during any particular sequence. When the conveyor level limit switch 104 is operated corresponding to the material conveyor 47 being empty of material contacts MCLLS are closed, and a circuit is completed through contacts MCR1 to the coil MCER of the material conveyor empty relay, which operates.

As material is delivered by the material conveyor 47 into the material check weigh hopper 25, the weighing mechanism 108 will be moved off zero, the limit switch 110 will be opened and as the weight passes each of the values to which the intermediate limit switches 112 have been pre-set some of these intermediate limit switches will be operated in sequence, each for a short duration of time. The successive limit switches have the contacts LS1, LS2, LS3, LS4, LS5, LS6 (FIG. 5A). In the present instance it has been assumed that the third zone has been selected by switch B3 and that as a consequence the coil 3CZR (FIG. 5E) of the third check zone relay has been energised.

As the weight of material in the hopper increases, first limit switch LS1 (FIG. 5A) will be momentarily operated, but the circuit to the coil 1MWCR of the first material weight check relay will be maintained by normally open contacts 3CZR1. Then limit switch LS2 will be momentarily operated, but the circuit will still be maintained by contacts 3CZR1. However, when limit switch LS3 is operated, a circuit will be completed through limit switch LS1, limit switch LS2, normally open contacts 3CZR2 to coil 2MWCR of a second material weight check relay. Normally open contacts 2MWCR1 will provide a holding circuit for the second material weight check relay in series with normally closed contacts MHGR1 of material hopper gate relay. During the operation of the limit switch LS3 a circuit will still be maintained to the coil 1MWCR through normally open contacts 3CZR3. The operation of the second material weight check relay indicates that the weight of the material has entered the pre-selected zone. If the weight of material were to exceed the upper limit of the pre-selected zone, the limit switch LS4 would be momentarily operated, and the circuit to the coil 1MWCR would be interrupted to release the first material weight check relay to establish alarm conditions, and as will be hereinafter described, by means of the normally open contacts 1MWCR2 interrupt the circuit to the coil MC of the material conveyor and thereby stop the material conveyor 47.

Upon operation of the second material weight check relay and the continued operation of the first material weight check relay, a circuit is prepared by contacts 2MWCR2 (FIG. 5B) for the closing coil 2MFRCC of the material feed completed relay, the circuit to this coil being completed through normally open contacts MFTR2 of the material feed timing relay upon operation of time closing contacts MCER4, and normally closed contacts EMFR8 of an extra material feed relay. The material feed completed relay is a latching relay, and its operation indicates that the feed of material into the check weigh hopper has been completed. This is indicated by a pilot light LE (FIG. 5C), which is switched on by contacts 2MFR5.

The contacts 2MFR6 (FIG. 5B) of the material feed completed relay complete a circuit to a coil MPTR of a material weight printing relay. Normally open contacts MPTR1 (FIG. 5A), in series with normally closed contacts MPTR2 which open after a time delay provide a start circuit pulse on leads 346 and 347 to the weight recorder 109 associated with the weighing mechanism 108. When the recorder has completed the recording of the weight of the charge in the material check weigh hopper 25 contacts MPCLS are closed to complete a circuit to coil MPCR of a material weight printing completed relay. In series with contacts MSR4, normally open contacts MPCR1 (FIG. 5C) of the material weight printing completed relay in series with contacts 2MFR7 of the material feed completed relay in series with normally closed contacts MSCR1 of a material skip charged relay prepare a circuit for coil MHG of a material hopper gate relay. The material charge preselected is in the check weigh hopper ready for the skip but the opening of the hopper gate must await firstly the arrival of the correct skip in the pit and also the sequence in the programme to which it is scheduled.

The moving contacts 301, 302 (FIGS. 5E and 5F) of the material programme switch can now be stepped to their next position in order to search for the next sequence in the programme for which an automatic material charge has been preselected for the north skip. Upon operation of the material feed completed relay a circuit is extended from line 320 by normally open contacts 2MFR8 (FIG. 5D) in series with normally open contacts 2MCCR3 and normally closed contacts BELR4, MPRR8 and MPSR1 to coil MPSF of the material programme switch forward drive contactor. Contacts MPSF1, MPSF2 and MPSF3 (FIG. 5A) extend a supply to the motor 303 which then drives the moving contacts 301, 302 to their next position, in the present instance to the third position. As the moving contact 306 (FIG. 5E) is moved from the second contact in the first column to the third contact in the first column it is disconnected from line 319 and becomes connected to line 318 to complete a circuit through normally open contacts 2MCCR1 (FIG. 5D) to the trip coil 2MCCRTC of the second material charge counting relay which relay is now released. Contacts 2MCCR3 are now opened and interrupt the circuit to the coil 1MPSF of the material programme switch forward drive contactor which releases and disconnects the motor 303. At the same time contacts 2MCCR2 open (FIG. 5B) and break the circuit to the coil MSR of the material start relay and also to the coil MSRA of the relief relay both of which now release. The opening of contacts MSRA1 breaks the circuit to the coil 1RCR of the recommence counting relay in the weigh feeder control circuit (FIG. 6B). With movement of the moving contacts 301 (FIG. 5E) of the material programme switch from the second to the third position the moving contact 307 disengages the second contact in the second column and engages the third fixed contact in that column to render contacts of the switches C3 and C4 operative whereby to check whether either of these switches have been operated to indicate that the third or fourth sequence in the programme is to be the last. Moving contact 309 is now disconnected from the second contact in the fourth column and engages the third contact in that column to connect with contacts of switch A5. As the fifth sequence in the programme is to be an automatic charge of coke this switch will have its moving contacts in its diagrammatically lowermost position and no connection will be extended either to the line 332 or to the moving contact 310. When the moving contact 302 moves off the second row of fixed contacts, the coil 1NMBR of the 1st north material bin relay was disconnected and that relay released. Simultaneously the coil 3CZR of the third weight check zone relay was disconnected and that relay released. The opening of contacts 3CZR1, 3CZR2 and 3CZR3 (FIG. 5A) has no effect on coil 1MWCR of the first material weight check relay which now holds through a normally open contact 2MFR9 or on the coil 2MWCR of the second material weigh check relay which is holding through its normally open contacts 2MWCR1 in series with the normally closed contacts MHGR1. Since no supply is extended to moving contact 310 when the moving contacts are in their third position none of the north material bin relays or the material check selection relay is operated and a circuit is extended from line 320 through normally closed contacts MECR1, 1NMBR1, 2NMBR1, 3NMBR1, 4NMBR1, 5NMBR1, 6NMBR1 and MSCR1 to the coil MPSF of the material programme switch forward drive contactor, the motor 303 is energised and the moving contacts are driven into the next or fourth position. The first moving contact 306 is now extended to line 319 but is ineffective as neither of the material charge counting relays is operated. The second moving contact 307 is extended to contacts of switches C5 and C6 to check whether either of these have been operated to indicate that the fifth or the sixth sequence was the last in the programme. As neither of these switches has been operated in the present instance, the moving contact 307 is extended to the line 320 in preparation for the further energisation of the coil MPSF. The moving contact 309 now engages the fourth contact in the fourth column and is extended to the moving contact of switch A7 which has been set to the position corresponding to an automatic material charge for the seventh sequence. This moving contact is, therefore, in its diagrammatically uppermost position and a circuit is extended by the fourth fixed contact in the fifth column to the moving contact 310 and thence to the remaining moving contacts. As the material charge for the seventh sequence is to be drawn from No. 6 north material bin switch D76 will be in the "on" position and switches D71 and D72, D73, D74 and D75 will be "off." A circuit will now be extended to the coil 6NMBR of No. 6 north material bin relay which should now operate and the contacts 6NMBR1 interrupt the circuit to the coil MPSF of the material programme switch forward drive contactor to effect disconnection of the motor 303.

Referring now to the No. 1 north weigh feder and vibratory feeder circuit (FIG. 6) the opening of normally closed contacts 2MFR4 of the material feed completed relay opens the loop between the leads 340 and 341 since the contacts 1MFCR6 were opened on operation of the No. 1 material feed completed relay to stop the vibratory feeder. Opening of the loop between the lines 340 and 341 brings about resetting of the counter 160 associated with the No. 1 material weigh feeder; when the counter resets the contacts 1CR close to operate the coil 1CRR of the No. 1 counter reset relay. Normally open contacts 1CRR2 complete a circuit through normally open contacts 1MFCR1 to the trip coil 1MFCRTC of the No. 1 material feed completed relay which now releases. Referring now to FIG. 5B, the opening of contacts 1MFCR4 disconnects the timer 344 and the opening of contacts 1MFCR5 disconnects the coil MFTR of the material feed timer relay. The opening of contacts MFTR2 (FIG. 5B) disconnects the circuit to the closing coil 2MFRCC of the material feed completed relay.

Contacts 2MFR10 of the material feed completed relay provide a holding circuit for the coil MCER of the material conveyor empty relay against the subsequent reoperation of the material start relay MSR.

As the material is to be drawn from No. 6 north material bin the contacts 6NMBR3 of the sixth north material bin relay prepare a circuit for the energisation of the coil 6RCR of the recommence counting relay of the counter associated with the weigh feeder 46 but this circuit cannot be completed as contacts MSRA6 of the material start relief relay are now opened (FIGS. 7A and 7B). It will be appreciated that upon the operation of the material feed completed relay the moving contacts of the material programme switch have been advanced to their next position which corresponds with the next sequence in which an automatic material charge has been pre-selected for the north skip.

As has been hereinbefore described when the moving contacts of the bell counting switch 94 are in a position which corresponds to a sequence for which an automatic material charge is selected the coil AMCSR of the automatic material charge selection relay is energised. In the programme being described the first sequence in which an automatic material charge to the north skip is called for is the third sequence. The second sequence is completed by the completion of the hoisting of the south skip at which time the north skip is in the pit and the limit switch 85 is operated. A circuit now exists (FIG. 5C) through contacts MSR4, MPCR1, 2MFR7, MSCR1, AMCSR1 (of the automatic material charge selector relay) normally closed contacts COSCR6 (in the coke control and which are not opened when an automatic material charge is selected) and through contacts NSI1 of the limit switch 85 to the coil MHG of a material hopper gate contactor. After a short time delay contacts MHG1 of the material hopper gate contactor close to complete a circuit to coil MHGR of a material hopper gate relay. Contacts MHGR2 and MHGR8 (FIG. 5C) complete a circuit to a solenoid 346 controlling the operator 106 which now opens the hopper gate 105 to permit material to be discharged from the check weigh hopper 25 into the north skip.

As soon as the hopper gate commences to open contacts MHGLS (FIG. 5A) of the limit switch 107 are opened and the material hopper gate proving relay is released. The opening of contacts MHGPR1 and MHGPR2 both of which are in circuit with the coil MC of the material conveyor contactor does not release the material conveyor as they are effectively by-passed by contacts MCR4 of the material conveyor relay on the one hand and by contacts MCER2 of the material conveyor empty relay and contacts 2MFR11 of the material feed completed relay on the other hand. Normally open contacts MHGR7 of the material hopper gate relay prepare a circuit for the closing coil MSCRCC of a material skip charge relay. As material flows out of the check weigh hopper into the skip each of the limit switches LS3 and LS2 and LS1 in turn will be operated momentarily but the operation of none of the limit switches effects the material check weigh relays. When the hopper is empty as detected by the weighing mechanism 108 the limit switch 110 is reoperated and contacts MZLS are closed to complete a circuit to coil MZR of a material hopper empty relay. Contacts MZR1 (FIG. 5C) complete a circuit to coil MSCRCC and the material skip charge relay operates and latches closed. Normally closed contacts MSCR1 now open to disconnect the coils MHG and MHGR of the material hopper gate contactor and relay; the opening of contacts MHGR2 and MHGR8 (FIG. 5C) disconnects the solenoid 346 and causes the operator 106 to close the hopper gate 105. Since at this time the moving contacts of the material programme switch will have been advanced to the next position corresponding to the sequence in which the next charge of material is to be delivered to the north skip one or more of the north material bin relays will have been operated. A circuit will now be completed through contacts MHGR7, MSCR2, and normally closed contacts 1MCCR4 and 2MCCR4 of the material counting relays, neither of which is operated at this stage and one or more of contacts 1NMBR7, 2NMBR7, 3NMBR7, 4NMBR7, 5NMBR7, and 6NMBR7 to trip coil 2MFRTC of the material feed completed relay which is now released.

The release of the material feed completed relay completes a circuit from line 319 (FIG. 5D) through contacts 2MFR2 to the closing coil 2MCCRCC of the second material charge counting relay which now operates and latches.

Referring now to FIG. 5B the closing of contacts 2MCCR2 and contacts 2MFR3 prepares a circuit for coil MSR of the material start relay but the energisation of this coil is dependent upon the closing of contacts MHGPR3 of the material hopper gate proving relay. If the hopper gate closes directly then switch 107 closes contact MHGLS to operate the material hopper gate proving relay and permit reoperation of the material start relay. If, on the other hand, the closing of the hopper gate is delayed through, for example, a piece of material being jammed therein, a circuit is completed through normally closed contacts MSR2 (FIG. 5B) normally open contacts MSCR3, and normally closed contacts MHGR3 to coil 1MHGR of a first hopper gate jigging relay. After a short time delay contacts 1MHGR1 complete a circuit to coil 2MHGR of a second hopper gate jigging relay. Normally open contacts 2MHGR1 in series with normally closed contacts 2MHGR2, which normally closed contacts open after a short time delay, provide a holding circuit for the second hopper gate jigging relay for a short duration while contacts 2MHGR3 (FIG. 5C) re-energise coil MHG of the material hopper gate contactor whose contacts MHG1 re-energise coil MHGR of the material hopper gate relay. The solenoid 346 is re-energised and the first and second material hopper gate jigging relays interact with one another and with the material hopper gate relay to energise and de-energise alternately the solenoid 346 until the hopper gate is closed. Upon operation of the material hopper gate closing relay when the hopper is closed contacts MHGPR3 (FIG. 5B) complete a circuit to coil MSR of the material start relay and contacts MSR2 open and prevent re-operation of the first material hopper gate jigging relay.

Referring now to the bell counting switch and bell sequence switch, normally open contacts MSR3 (FIG.

4D) in series with normally open contacts MSCR4 provide a start signal and on receipt of a similar signal from the water charging control the skip hoist is started. Through contacts MSR1 (FIG. 5B) the reoperation of material start relay MSR reoperates the relief relay to start the next feed of material into the check weight hopper. On completion of hoisting of the north skip the south skip is in the pit and limit switch 86 is operated. Contacts SS19 (FIG. 5C) complete a circuit through contacts MSCR5 to trip coil MSCRTC of the material skip charge relay which is then released. Referring now to FIG. 7B, upon operation of No. 6 north material bin relay and the material start relief relay a circuit is completed through contact 6NMBR3, MSRA6 to coil 6RCR of the recommerce counting relay and the vibratory feeder with No. 6 north material bin is operated and stopped in substantially the same manner as that described hereinbefore in respect of the No. 1 north material bin and a similar sequence of operations ensues ending with the reoperation of the material feed completed relay 2MFR.

END OF PROGRAMME

In the present instance with the programme being described for the sake of illustration when the contacts of the material programme switch are moved from their fourth to their fifth position. The second moving contact 307, engages the fifth fixed contact in the second column and is extended to contacts of switches C7 and C8. As the eighth sequence is the last sequence in the programme switch C8 has been operated so that moving contact 307 (FIG. 5E) is no longer connected to line 320 but instead is connected to line 347 to extend a circuit through normally closed contacts PRFR2 (FIG. 5D) to closing coil MPRRCC of material programme reset relay which operates and latches.

Contacts MPRR8 interrupt the circuit to the material programme switch forward drive contactor coil MPSF, and contacts MPRR5 prepare a circuit through normally closed contacts MPSF4 of the material programme switch forward drive contactor to coil MPSR of material programme switch reverse drive contactor. Contacts MPRR6 (FIG. 5E) render the north material bin relays and the check zone relays inoperative and contacts MPRR7 (FIG. 5D) prepare a circuit for the trip coil MPRRTC of the material programme reset relay. When subsequently the material feed completed relay is released when the last material charge has been deposited into the skip from the check weigh hopper, contacts 2MFR12 close to energise the coil MPSR of the material programme switch reverse contactor which operates and through contacts MPSR2, MPSR3 and MPSR4 (FIG. 5A) energises the motor 303 for rotation in the reverse direction to drive the moving contacts of the material programme switch backwards towards their first, home or starting position. When the moving contacts reach the home or starting position a circuit is extended from moving contact 308 to the first fixed contact in the third column and thence through line 321 and normally closed contact PRPR1 and contacts MPRR7 to the trip coil MPRRTC of the material programme reset relay to release that relay. Contacts MPRR5 open to disconnect the coil MPSR of the material programme switch forward drive contactor and disconnect motor 303.

The first material charge counting relay now operates; contacts MPRR6 restore circuit to the north material bin relay coils and to the check weight zone relay coils. A circuit will now be extended via moving contact 309 to the contacts of switch A1 and if this switch is set for an automatic material charge the relays concerned with whichever material bins have been selected will be operated in the manner previously described. If, on the other hand, the switch A1 is set for an automatic coke charge none of the material bin relays will be operated and the circuit will be extended from line 320 to coil MPSF of the material programme switch forward contactor to energise motor 303 and drive the moving contacts to search for the first position in which a material charge has been selected.

MANUAL CHARGE

In any sequence of the programme for which a manual charge is selected, the moving contact of the appropriate A switch will be moved into its centre position, so that when the moving contact 309 (FIG. 5E) is connected to the moving contact of the switch A, it is extended to line 332, and thence to coil MECR (FIG. 5D) of a manual charge relay. Contacts MECR1 (FIG. 5D) interrupt the circuit from line 320 to the coil MPSF of the material programme switch forward drive contactor to halt the moving contacts of the material programme switch at the position concerned. When the previous charge of material in the check weigh hopper has been discharged into the skip by the opening of the hopper gate in the manner previously described, completion of discharge is detected by the closing of the hopper empty limit switch 110 and contacts MZR1 (FIG. 5C) complete a circuit to the closing coil MSCRCC of the material skip charge relay. Since at this time both of the material charge counting relays are released, contacts MSCR2 prepare a circuit for the trip coil 2MFRTC of the material feed completed relay. Since the moving contacts of the material programme switch are now standing on a position in which the moving contact 310 is not connected to the moving contacts 309, none of the north material bin relays are operated, but contacts MECR2 complete a circuit to the trip coil 2MFRTC, to release that relay and, as hereinbefore described, lead to a skip hoist starting signal. The manual material charge is now delivered, such as by means of a dumper wagon and discharged into the material check weight hopper 25. As the weight of material in the hopper builds up, first the limit switch 110 is opened and then when the weight reaches the value corresponding to the first of pre-set limit switches 112, contacts LS1 (FIG. 5A) momentarily change over and would normally interrupt the circuit to the coil 1MWCR of the first material weight check relay, but the release of this relay is prevented by contacts MECR3 which complete a circuit in parallel with contacts LS1, LS2, LS3, LS4 and LS5. Only the contacts LS6 of the last of these switches 112 is in circuit and provided that the weight of material dumped into the check weigh hopper is not so great as to operate these contacts LS6, coil 1MWCR will remain energised. As none of the check weigh zone relays are operated no circuit is completed to coil 2MWCR of the second material weight check relay which remains released. Moreover, as none of the north material bin relays is operated there is no circuit to the timer 344 and consequently no circuit is completed to coil MFTR of the material feed timing relay which remains released.

With contacts 2MWCR2 (FIG. 5B) open, and contacts MFTR2 open, the normal circuit to the closing coil 2MFRCC of the material feed completed relay is broken, and an alternative circuit to this coil must be completed. When the moving contacts of the bell counting switch are moved to a position corresponding to the sequence for which a manual material charge has been preselected for the north skip, a north manual charge selector relay is operated and contacts NMCSR1 prepare a circuit for a manual charge switch 349 which must now be operated manually when the north skip is in the pit to receive the charge. Switch 349 extends a circuit through contacts NS12 of the limit switch 85, contacts MCER4 and normally closed contacts EMFR8 to the coil 2 MFRCC to operate and latch the material feed completed relay.

The operation of the material feed completed relay causes the moving contacts of the material programme to be advanced to their next position and the sequence continues in the manner hereinbefore described.

INACCURATE WEIGHT (a) *Insufficient weight.*—If the weight of material does not reach the lower limit of the zone prescribed, the coil 2MWCR (FIG. 5A) of the second material weight check relay will not be energised as the appropriate limit switch 112 will not have been operated. Since the contacts 2MWCR2 (FIG. 5B) will not be closed to complete a circuit to the closing coil 2MFRCC of the material feed completed relay, in order to release the charge of material and to permit the skip to be hoisted, a switch 348 must be operated manually at the time when that material charge is scheduled, and when the north skip is in the pit. On operation of the switch 348 a circuit is established through normally open contacts AMCSR2 of the automatic material charge selector relay, normally open contacts NSI2 of the limit switch 85, timed closing contacts MCER4 of the material conveyor empty relay and normally closed contacts EMFR8 to the closing coil 2MFRCC of the material feed completed relay, which operates and latches to enable the hopper gate to be opened in the manner hereinbefore described.

(b) *Excess weight.*—If the weight of material fed into the check weigh hopper should be too great, the first material weigh check relay will be released by deenergisation of the coil 1MWCR. In any charge, whether fed manually or automatically, this will occur if the limit switch 111 should be operated and its contacts MOLLS (FIG. 5A) opened; during an automatic material charge, this may arise due to operation of one or more of the limit switches 112 above the zone prescribed. During the feed of a manual charge, this may arise due to operation of the uppermost of the limit switches 112 and the operation of its contacts LS6. The release of the first material weigh check relay establishes alarm conditions. Since, in the case of an automatic material charge, material may still be in process of being fed to the check weigh hopper, the material conveyor contactor is released as contacts 1MWCR2 interrupt the circuit to coil MC and the conveyor stops. Contacts MC4 (FIG. 5B) open and interrupt the circuit to coil MCR of the material conveyor relay. Contacts MCR1 open and disconnect coil MCER of the material conveyor empty relay to release it in the event that it had already operated if the feed of the material by the conveyor had been completed and contacts MCLLS of the material level limit switch 104 been closed. Contacts MCR3 open and disconnect the timer 344 and the coil MFTR of the material feed timing relay.

With contacts MFTR2 open (FIG. 5B), the normal circuit to the closing coil 2MFRCC of the material feed completed relay is broken, and an alternative circuit to this coil must be completed, by manual operation of the switch 348 as hereinbefore described. Since, at this time, the material conveyor empty relay is released, contacts MCER2 are open, but are by-passed by contacts MCR5. The material feed completed relay operates and latches to enable the hopper gate to be opened in the manner hereinbefore described.

If the release of the first material weigh check relay occurs during a manual charge, the switch 349 would be operated in place of the switch 348 to bring about operation of material feed completed relay.

When the material feed completed relay is operated, contacts 2MFR9 prepare a circuit for the re-energisation of 1MWCR and when the material had been discharged from the check weigh hopper to an extent sufficient to bring about the reclosing of contacts MOLLS, the alarm conditions can be cancelled with the closing of contacts CAR (FIG. 5A) and the re-operation of the first material weigh check relay.

When the material feed completed relay is subsequently released, the hopper gate closed, and the No. 1 material weigh check relay reoperated, a circuit is established for the re-operation of the material conveyor contactor by energisation of the coil MC on operation of the start switch 154. The material conveyor is then run up to speed, and each of the weigh feeder conveyors re-started generally in the manner previously described.

EXTRA MATERIAL CHARGE

If it should be desired to interrupt the programme and introduce an extra charge of material from a north material bin, a north extra material switch is operated to a position to select the bin from which the extra material is to be drawn. Contacts NEM2 (FIG. 5E) of this switch connect with each of the coils of the north material bin relays and contacts NEM1 (FIG. 5D) prepare a circuit to coil EMFRCC of an extra material feed relay. To initiate an extra material charge the extra material programme relay in the bell counting circuit and bell sequence circuit is operated as hereinbefore described and, upon operation of the material feed completed relay in the north programme control contacts 2MFR13 (FIG. 5D), its contacts EMPR1 complete a circuit through contacts BELR13 of the bell extra load relay, switch NEM1 to the closing coil EMFRCC of the extra material feed relay which operates and latches. Contacts EMFR1, EMFR2, EMFR3, EMFR4, EMFR5, EMFR6 disconnect the coils of the north material bin relays from their normal operating circuits and contacts EMFR7 extend a circuit through switch NEM2 to the coil of whichever of the north material bin relays has been selected. If, for example, No. 1 north material bin has been selected coil 1NMBR of No. 1 north material bin relay is energised and that relay operates. Since the closing of the material feed completed relay completed a circuit to coil MPSF of the material programme switch forward drive contactor through contacts 2MFR8, the motor 303 drives the moving contacts to their next position whereupon whichever of the material charge counting relays was operated is tripped by energisation of its trip coil from line 318 or 319 and the opening of contacts 1MCCR3 or 2MCCR3 breaks the circuit to the coil MPSF. Since No. 1 north material bin relay is now operated, contacts 1NMBR1 prevent re-operation of the material programme switch forward drive contactor. Since a charge of material will already be in the material check weigh hopper when the material feed completed relay operates no further action can ensue until that charge has been fed from the hopper into the skip and the control circuit functions in the manner hereinbefore described with the opening and closing of the material hopper gate, the operation of the material skip charge relay, and the release of the material feed completed relay. The start signal for the skip hoist is sent to the bell sequence control, the material start relay is reoperated and the starting of the vibratory feeder associated with No. 1 north material bin and the feed of the material into the material check weigh hopper takes place as hereinbefore described.

When the north skip next reaches the pit the bell extra load relay is operated in the bell counting circuit. Contacts BELR1 (FIG. 5D) prepare a circuit for the trip coil EMFRTC of the extra material feed relay. Contacts EMFR9 (FIG. 5A) complete a circuit for coil 1MWCR of the first material weigh check relay as did contacts MECR3 in the case of a manual charge. The second material weight check relay remains released and with contacts 2MWCR2 (FIG. 5B) and EMFR8 open, the normal circuit to coil 2MFRCC is broken. An alternative circuit is prepared by contacts EMFR10, BELR3 and NSI12 and is extended to coil 2MFRCC upon closure of contacts MFTR2 and MCER4 of the material feed timing relay and material conveyor empty relay as hereinbefore described. On the operation of the material feed completed relay, contacts 2MFR13 (FIG. 5D) complete the circuit through contacts BELR1 to the trip coil EMFRTC of the extra material feed relay which releases. Since at this time one or other of the material charge counting relays would be operating to provide a circuit to the material programme switch forward drive contactor coil MPSF and the moving contacts would thereby be driven to their next position, the circuit to the coil is interrupted by contacts BELR4. On release of the extra material feed relay contacts EMFR1, EMFR2, EMFR3, EMFR4, EMFR5, EMFR6 reconnect the coils of the north material bin relays to the D switches and if the position in which the moving contacts now stand corresponds to a sequence in the programme for which an automatic material charge has been selected the moving contact 309 will be connected to the moving contact 310 and one or other of the north material bin relays will be operated to break the circuit to the coil MPSF. In the bell counting circuit the automatic material charge selector relay will have been operated and contacts AMCSR1 (FIG. 5C) coupled with contact NSI1 provide for the operation of the material hopper gate contactor by its coil MHG and the discharge of the extra material charge into the skip in the manner hereinbefore described. When the material skip charge relay is operated, the material feed complete relay released, the material start relay re-operated, and a starting signal sent to the bell counting control and the skip hoist started, the feed of the next selected material charge to the check weigh hopper commences. In order that the programme interrupted by the extra material charge can be resumed the skip hoist must be operated again to hoist an empty skip whereupon the bell extra load relay is released as hereinbefore described.

PROGRAMME RE-SET

In order to enable a fresh programme to be selected the programme re-set switch is operated manually and includes contacts 350 (FIG. 5D), the opening of which disconnects the coil and MPSR of the material programme switch reverse drive contactors. On operation of the programme reset switch a programme reset preselector relay is operated in the bell counting switch circuit. When the material feed completed relay is operated and contacts 2MFR13 of the programme reset preselector relay are closed (FIG. 5D) a circuit is extended through contacts PRPR2 to the closing coil PRFRCC of the reset relay indicating that the feeding of a material charge into the check weigh hopper has been completed. When the charge has been discharged into the skip and the material feed completed relay released, a signal is sent to the bell counting circuit (between points 289 and 290 in FIG. 4G) to enable the bell counting switch to be reset. In the north programme control, contacts PRFR1 extend a circuit to the coil MPRRCC of the material programme reset relay which operates and latches. When all material charges in the material check weigh hoppers which are in process of being fed to the material check weigh hoppers at the time of operating the programme reset switch have been delivered to the appropriate skip the A, B, C, D and E switches are operated to preselect a new programme and the programme reset switch is released. On release of this switch contacts 350 restore the circuit to the coil MPSR of the material programme switch reverse drive contactor; the coil MPSR is energised through contacts MPRR5 and the moving contacts driven in the reverse direction back to their home or starting position wherein a circuit is extended from line 321 through contacts PRPR1 to the trip coil MPRRTC to release the material programme reset relay. The trip coil PRFRTC is energised by contacts PRR1 in the bell counting circuit to release that relay.

The south material programme switch is similar to the north material programme switch with the exception that as can be seen from FIG. 3, the A, C, D, and E switches relating to the even numbered sequences in the programme are substituted for those relating to the odd numbered sequences and that contacts of the limit switch 86 are substituted for contacts of the limit switch 85 and vice versa.

COKE CONTROL

A detailed circuit diagram of the north charging coke control is illustrated in FIGS. 8A and 8B. The limit switch 127 of the weighing mechanism 126 associated with the coke check weigh hopper has contacts CZLS in series with coil CZR of a coke hopper empty relay. The pre-set limit switch 129 has normally closed contacts CFLS in series with coil 1CFR of a coke hopper full relay. The limit switch 128 has contacts COLLS which are in series with coil CWCR of a coke weigh check relay. The release of this relay establishes alarm conditions in a manner similar to that described in connection with the first material weigh check relay in FIG. 5A. On cancellation of the alarm, contacts 2CAR are closed and coil CWCR can be re-energised, provided limit switch 128 is closed. Contacts CWCR1 provide a holding circuit for the coil CWCR. The coke hopper gate limit switch 133 has contacts CHGLS in series with coil COSR of a coke start relay. As an additional feature, the coke check weigh hopper 24 may also be provided with means responsive to the volume of coke in the hopper reaching a predetermined amount or level. A direct current supply derived from a transformer T1 and a rectifier R1 is impressed across coil 1CVR of a first coke volume relay, one side of which is connected to electrode 401 extended to a predetermined level inside the hopper, to the body of which is connected the other side of the coil. The coke volume relay has contacts 1CVR1 in series with coil 2CVR of a second coke volume relay. The contacts CFLS of the limit switch 129 are normally closed and are opened when the weight reaches a preselected value so that with the coke hopper empty, coil 1CFR is energised and, additionally, the second coke volume relay is operated. With the coke check weigh hopper empty and the hopper gate closed, a circuit is initially established through contacts 1CFR1 of the coke hopper full relay, normally closed contacts 2CFR1 of a coke feed completed relay, contacts CWCR2 of the coke weigh check relay, contacts 2CVR1 of the second coke volume relay and contacts CHGLS to the coil COSR of the coke start relay. Provided that the breeze conveyor 34 is running, contacts BCR1 (FIG. 8B) are closed and a circuit is completed through contacts COSR1 to coil CSM of a coke screen motor contactor. Contacts CSM1, CSM2 and CSM3 (FIG. 8A) extend a supply to the motor 124 to drive the coke screen 29. Contacts CSM4 complete a circuit to coil CSMR of a coke screen motor relief relay. Contacts CSMR1 prepare a circuit for coil 2CFRCC of the coke feed completed relay. Coke is now fed into the check weigh hopper. The selection of the quantity of coke may be by weight or by volume according to the position of a manual selector switch having contacts 402, 403, 404 and 405; the switch has its moving contacts in their diagrammatically upper position for selection by weight or in their lower positions, for selection by volume. For selection by volume contacts 402 short-circuit contacts 1CFR1. When the weight of coke reaches the pre-set value, the limit switch 129 is operated and contacts CFLS are opened to disconnect coil 1CFR and release the coke full relay. When the volume or level of the coke in the check weigh hopper 24 reaches a pre-set value, coil 1CVR will be effectively by-passed by the electrode 401 and the hopper 24 and the first coke volume relay having coil 1CVR, will be released and, through contacts 1CVR1, the second coke volume relay will be released. If the quantity of coke is being selected by weight, the volume or level of the coke in the check weigh hopper will normally be less than that at which the coke volume relays are released, and contacts 1CFR1 will normally open before contacts 2CVR1. With the opening of one or other of contacts 1CFR1 or 2CVR1, depending primarily on whether the selection is by weight or volume, the coil COSR of the coke start relay is disconnected. Contacts COSR1 disconnect the coil CSM of the coke screen motor contactor which releases to stop the coke screen, and disconnect coil CSMR. Before contacts CSMR1 open contacts 1CFR2 (in the case of selection by weight), or contacts 2CVR2 (in the case of selection by volume), complete a circuit through contacts CSMR1 to the coil 2CFRCC of the coke feed completed relay which operates and latches. Contacts 2CFR4 of the coke feed completed relay complete a circuit to coil 1CPTR of a first coke print timing relay (FIG. 8B). After a short time interval, contacts 1CPTR1 close and in series with contacts CSM5, complete a circuit to coil 2CPTR of a second coke print timing relay.

Normally open contacts 2CPTR1, in series with normally closed delayed opening contacts 2CPTR2 (FIG. 8A) provide a pulse on lines 406, 407, to initiate operation of the weight recorder 130. On completion of the recording or printing operation, contacts CPCLS close and coil CPCR of a coke printing completed relay is energised (FIG. 8A).

A charge of coke is now in the check weigh hopper, its weight has been recorded and it is awaiting discharge into the skip.

Contacts CPCR1 of the coke printing completed relay, contacts 2CPTR2 of the second coke print timing relay, contacts 2CFR2 of the coke feed completed relay, in series with normally closed contacts COSCR1 of a coke skip charged relay have prepared a circuit (FIG. 8B) for coil CHG of a coke hopper gate contactor. When a sequence in a programme has been reached wherein a coke charge is pre-selected for the north skip, and the north skip is in the pit ready to receive such a charge, the automatic coke charge selector relay in the bell counting circuit is operated and its contacts ACCSR7 are closed, the limit switch 85 is operated and contacts NSI13 are closed and contacts MSCR6 (of the north material control and which are closed at this time) complete the circuit to the coil CHG of the coke hopper gate contactor which operates. After a short time delay contacts CHG1 close and complete a circuit to coil CHGR of the coke hopper gate relay. Contacts CHGR1 and CHGR2 complete a circuit to solenoid coil 408 of the hopper gate operator 132 to bring about opening of the coke hopper gate, and coke is delivered from the check weigh hopper into the skip.

If the selection of coke has been by weight, the completion of the delivery of the coke into the skip is detected by the closing of contacts CZLS (FIG. 8A) of the coke hopper empty limit switch 127 to energise coil CZR of the coke hopper empty relay. A circuit is then completed (FIG. 8B) through contacts CHGR5 of the coke hopper gate relay, switch contacts 405, and contacts CZR1 to closing coil COSCRCC of the coke skip charged relay, which operates and latches. If, however, the selection is by volume, switch contacts 403 (FIG. 8A) prepare a circuit for a coke empty timer 409 which is energised through contacts CHG2 on operation of the hopper gate contactor. After a predetermined time interval, contacts 410 close to complete a circuit to coil CETR of a coke empty timer relay, whereupon the circuit to the coil COSCRCC (FIG. 8B) is completed through contacts CETR1. Contacts COSCR2 complete a circuit to trip coil 2CFRTC to release the coke feed completed relay. Contacts 2CFR2 break the operating circuit to coil CHG and contacts 2CFR3 in series with contacts CHGR3 break a holding circuit to coil CHG and the coke hopper gate contactor and the coke hopper gate relay both release. A circuit is re-established (FIG. 8A) through contacts 1CFR1, 2CFR1, CWCR2, 2CVR1 to the coil COSR of the coke start relay when the coke hopper gate is fully closed and contacts CHGLS of the limit switch 133 are closed. If the closing of the hopper gate is prevented, as might be the case if a piece of coke were jammed therein, a circuit would be completed through contacts COSR2, COSCR3 and CHGR4, to coil 1CHGR of a first coke hopper gate jigging relay which co-operates with a second coke hopper gate jigging relay having a coil 2CHGR to cause the coke hopper gate to be opened and closed repeatedly until it is completely closed. When the hopper gate is completely closed the coke start relay re-operates to enable a fresh charge of coke to be delivered by the coke screen into the check weigh hopper in the manner previously described. When the coke start relay has re-operated, contacts COSR3, in series with contacts COSCR4 (FIG. 4D) provide a start signal to the bell counting circuit for initiating operation of the skip hoist. At the completion of the skip hoisting operation, the south skip is in the pit and limit switch 86 is operated, contacts SSI13 complete a circuit to trip coil COSCRTC of the coke skip charge relay which is then released.

In the event of the quantity of coke fed being incorrect, the normal operating circuit for coil 2CFRCC (FIG. 8B) through contacts 1CFR2 or 2CVR2 is not completed. If the quantity is insufficient contacts 1CFR2 or 2CVR2 will not be closed depending on whether selection was by weight or volume: if the quantity was in excess of the maximum value determined by the limit switch 128 on the coke check weight hopper weighing mechanism contacts COLLS would be opened and coil CWCR of the coke weigh check relay disconnected to release that relay set up alarm conditions and release the coke start relay and coke screen motor contactor to stop the feed of coke to the hopper. In either event a manual switch 411 must be operated to release the charge of coke into the skip. The switch 411 is only effective when the north skip is in the pit and an automatic coke charge is scheduled, as it is connected in series with contats NSI14 of limit switch 85 and contacts ACCSR8 of the automatic coke charge selection relay. When the coke has been fed to the skip, if limit switch 128 had been operated, the alarm must be cancelled to enable coil CWCR to be re-energised to permit re-operation of the coke start relay as hereinbefore described.

An indicator LF controlled by contacts COSR4 indicates when a coke charge has been initiated, an indicator lamp LG controlled by contacts CSMR2 indicates when the coke screen is running, and an indicator lamp LH controlled by contacts 2CFR5 indicates when the feed of coke to the hopper is completed.

WATER CONTROL

A detailed circuit diagram of one form of water control is illustrated in FIG. 9. A north water valve contactor has a coil NWV and contacts NWV1, NWV2, NWV3 controlling a supply to the thrust member 143 for opening the valve 142. A south water valve contactor has a coil SWV and contacts SWV1, SWV2, SWV3 controlling a supply to the thrust member 146 for opening the valve 145. A manually operable switch is provided for selecting whether water is to be supplied or not, and whether water is to be added with coke charges or with material charges or with all charges. This switch is a four-position switch and has contacts 501 which are shown in FIG. 9 and also contacts 502 which are shown in FIG. 4D. If no water is to be supplied at all, the moving contacts of each of the sets of contacts 501, 502 are in their diagrammatically uppermost positions. If water is to be supplied to coke charges, the moving contacts are in the first position clockwise therefrom; if water is to be supplied to material charges, the moving contacts will be in their second positions clockwise therefrom, and if water is to be supplied to all charges, the moving contacts will be in their third positions clockwise therefrom. In series with the moving contact of contact set 501 (FIG. 9) are contacts NSI10 of the limit switch 85 in parallel with contacts SSI10 of the limit switch 86, in series with normally closed contacts 2WTR1 of a second water timing relay. In the uppermost or "off" position the moving contact of the contact set 501 are disconnected: in the first clockwise position therefrom it is connected through contacts ACCSR10 of the automatic coke charge selection relay and through contacts (N)CHGR6 of the coke hopper gate relay of the north coke control in parallel with similar contacts (S)CHGR6 of the south coke control in parallel with contacts 1WTR1 of a first water timing relay to the line 503. In the second position clockwise from the "off" position, which corresponds to a water charge with a material charge, the moving contact is connected through contacts AMCSR10 of the automatic material charge selector relay and contacts (N)MHGR5 of the material hopper gate relay of the north material control in parallel with similar contacts (S)MHGR5 of the south material control in parallel with contacts 1WTR2 of the first water timing relay to the line 503. In the third position clockwise from the "off" position, which corresponds to a water charge with all charges, the moving contact of the contact set 501 is extended directly to the line 503. The line 503 is extended by contacts NSI11 of the limit switch 85 to the coil NWV of the north water contactor, and is also extended by contacts SSI11 to the coil SWV of the south water contactor.

For the sake of illustration let it be supposed that a water charge is to be added with each material charge and that the north skip is in the pit, so that limit switch 85 is operated. When the hopper gate of the north material check weigh hopper is opened, contacts (N)MHGR5 are closed and a circuit is established through contacts NSI10, 2WTR1, switch contacts 501, contact AMCSR10, line 503, contacts NSI11 to the coil NWV. The north water valve contactor operates and contacts NWV1, NWV2 and NWV3, extend a supply to the thrust member 143 to open the valve 142. At the same time contacts NWV4 complete a circuit to coil 1WTR of the first water timing relay which operates and contacts 1WTR2 by-pass contacts (N)MGHR5 to hold the north water valve contactor operated in the event of the hopper gate being closed before the full water charge has been delivered; contacts 1WTR3 extend a circuit to a timer 504 which serves to control the time during which the water valve is opened. Contacts 1WTR4 provide a holding circuit for the first water timing relay. After a predetermined time interval contacts 505 are closed to complete a circuit to coil 2WTR of a second water timing relay, which operates and its contacts 2WTR1 disconnect the circuit to the moving contact of the contact set 501 and release the north water valve contactor; the thrust member 143 is released and the valve 142 is closed. If additional water is required, over and above that quantity which would be provided as a result of the time delay provided by the timer 504, a manual extra water switch may be operated; such switch has contacts 509 which extend a supply independently to the line 503 for operation of the appropriate water valve contactor.

A pilot light LK controlled by contacts NWV6 in parallel with contacts SWV6 of the water valve contactors indicates when water is being fed.

Referring now to FIG. 4D, the moving contact of contact set 502 is connected to line 506, to which are connected the closing coil BSSRCC and the trip coil BSSRTC of the skip hoist starting relay, and is also extended through normally open contacts 1WTR5 of the first water timing relay, normally closed contacts NWV5 in series with normally closed contacts SWV5 of the north and south water valve contactors to the line 280.

In the uppermost or "off" position, the moving contact of contact set 502 connects line 506 directly to line 280. In the first position clockwise therefrom, corresponding to a charge of water with a coke charge, the moving contact of the contact set 502 is extended to the line 280 through normally closed contacts ACCRS9 of the automatic coke charge selector relay. In the second position clockwise from the "off" position, the moving contact is extended to line 280 through normally closed contacts AMCSR9 of the automatic material charge selection relay. In the third position clockwise from the "off" position, which corresponds to a water charge with every charge, the moving contact of contact set 502 is disconnected. Since, for the sake of illustration, water is being delivered with material charges, line 506 will be disconnected from line 280 by contacts AMCSR9 during a material charge sequence: when the first water timing relay has operated and the north water valve contactor subsequently released, a circuit will be re-established through contacts 1WTR5, NWV5 and SWV5 to permit the energisation of either of the coils BSSRCC, BSSRTC of the skip hoist starting relay.

POWER SUPPLIES AND MISCELLANEOUS FEATURES

In the accompanying circuit diagrams of FIGS. 4 to 9, the line 601 denotes generally a power supply line for the operation of motors and the like and lines 602 and 603 denote control supply lines for the contactors, relays and the like. Since several of the figures of the circuit diagrams have been broken into several parts, such as FIGS. 4A, 4B, 4C, etc., lines extending from one part to another and not otherwise identified by reference numerals are identified by reference numerals prefixed with the index "X." Thus reference indicia "X1," "X2," "X3," etc., serve to identify corresponding lines in the different parts of a figure. The distribution of power supplies to the various motors and the like and of the control supplies to the relays, contactors and the like, are controlled by switches, fuses, fuse switches, isolators or circuit breakers in a well known manner, as it is believed will be obvious to one skilled in the art, and for the sake of clarity such supply arrangements are not illustrated in detail and they have not been described in detail. Each motor is protected by conventional overload releases which, though included in the circuit diagrams, are believed to be obvious to one skilled in the art and have not, therefore, for the sake of clarity, been described. Any or all of the motors driving the switches, the small bell and the large bell are preferably provided with electromagnetically released brakes.

Provision is included for enabling the skip hoist to be started for observation or test purposes without charges being fed to the skips. The automatic charging is switched off by operation of an auto-charge on-off switch having contacts 604 (FIG. 4H) which break the circuit to the coils AMCSR, ACCSR, SMCSR and NMCSR of the charge selection relays, thereby preventing the feed of material or coke to the skips, and also having contacts 605 (FIG. 4D) to complete a circuit to some contacts 606, 607, 608 of an extra double skip run start switch 609, and also contacts 610 (FIG. 4J) to extend a circuit to other contacts 611 of the switch 609. Upon manual operation of the switches contacts 606, 607 complete a circuit to the closing coil BSSRCC or the trip coil BSSRTC of the skip hoist starting relay, dependent upon whether the north skip or the south skip is in the pit. Contacts 611 (FIG. 4J) extend a circuit to the closing coil BELRCC of the bell extra load relay. As soon as the skip hoist has started contacts 608 (FIG. 4D) extend a circuit through contacts NSI19 and SSI19 to closing coil EDSRCC of an extra double skip run relay which operates and latches. The bell programme switch is now advanced from one position to another in the manner hereinbefore described. When the moving contacts are in their third or eighth position, the closing coil SSRRCC (FIG. 4J) of the skip sequence reset relay is energised through contacts BPS3C or BPS8C, BELR12, EDSR1, PRR16 and SBOR7. At the completion of hoisting of one skip, trip coil EDSRTC of the extra double skip run relay is energised through NSI15 or SSI15 and that relay is released. As the skip sequence reset relay is operated, the skip hoist is started again to hoist the other skip whereupon the skip sequence reset relay is released.

Facilities may be provided for the local testing of individual parts of the apparatus or of the equipment such, for example, as the small bell, the large bell, the material conveyors, the vibratory feeders, the weigh feeders, the hopper gates, coke screens, breeze conveyors, distributor, bell counting switch, bell programme switch, north material programme switch and south material programme switch. In many cases local control panels may be provided near to apparatus concerned, together with appropriate isolator and/or change over switches to enable the control of any particular apparatus to be transferred from the automatic control system to manual control. Indicator lamps may be provided on such local control panels and also at a central location to indicate the condition obtaining, especially during operation under automatic control; such indicator lamps in conjunction with an alarm system can also be helpful in fault tracing. Electromagnetically operated counters may be included, similarly to those shown in FIGS. 6 and 7, for recording the number of coke charges, the number of material charges, and the number of skips hoisted. A counter responsive to the number of programmes executed can be included; such counter is preferably presettable and is arranged to give an audible and/or visual signal when a preselected number of programmes have been executed. For the sake of clarity all such local control panels and isolator and/or change-over switches, and all the indicator lights and all the counters have not been included in the circuit diagrams or described.

The control system may be extended to effect timely operation of pressure relief and equaliser valves in relation to and in sequence with the opening and closing of the small bell and large bell so that the blast furnace can be operated at any desired working pressure therewithin.

Some variations in the circuitry of the bell programme switch may be made in practice. For example, in order to obviate any water charges being placed into an otherwise empty skip whilst an extra skip is being hoisted in order to restore the sequence of skip, following an extra material charge or an extra coke charge, additional normally open contacts of the skip reset relay can be provided to by-pass the water charging interlock provided by contacts 1WTR5, contacts NWV5, contacts SWV5 (FIG. 4D), and additional normally closed contacts of the skip sequence reset relay can be inserted in the water charging control (FIG. 9) in series with parallel connected contacts NSI10, SSI11.

Furthermore in order to avoid opening the small bell during the resetting of the sequence of skips further normally closed contacts of the skip sequence reset relay can be inserted in series with contacts LBCR1 in the circuit of coil SBO of the small bell open contactor in FIG. 4F.

Whilst the distributor is normally caused to operate after the small bell has been opened and closed it may be desirable for the distributor to operate after the large bell has been opened and closed. For this purpose a manually operable switch can be provided to by-pass contacts 2DB12 in FIG. 4E and contacts 2DB11 in FIG. 4F and to insert further normally closed contacts of the second distributor interlock relay between bell sequence switch contacts BPS5B and BPS10B and contacts SBCR2 in the circuit to coil LBO of the large bell open contactor in FIG. 4G, to enable bell sequence switch to be stepped generally as described.

In order to allow the bell sequence switch to be stepped in the usual manner when it is not desired to tip a charge of scrap on to the small bell when closed, normally closed contacts SCR1 of the scrap charge relay which will then be operated may be omitted from the circuit to coil BPSR from contacts BPS3C and BPS8C in FIG. 4E in which they are in series with contacts SBOR2 and contacts SSRR6, and inserted in FIG. 4F in series between bell sequence switch contacts BPS4B, BPS9B and limit switch contacts SBVOLS2 to interrupt the circuit to coil SBC of the small bell closing contactor.

If it is desired to interlock the starting of the skip hoist with the closing of the small bell during normal automatic operation additional normally open contacts of the small bell closed relay can be placed in series with contacts SSRR1 in FIG. 4D in the feed to contacts NMCSR5, SMCSR5, AMCSR4, and ACCSR1 whilst the feed to contacts 605 of the auto charge ON OFF switch remains unchanged.

In the material charging control one form of weighing control is illustrated by way of illustration and the circuitry is capable of modification and adaptation to other forms of weighing control and/or weight recording as may be desirable or necessary without departure from the spirit of the invention.

Reference will now be made to the second embodiment which is illustrated in FIGS. 10 to 19 of the accompanying drawings.

In these figures where appropriate, the same reference characters have been used for the same parts in the embodiments of FIGS. 1 to 9.

Referring initially to FIGS. 10 and 11, the position occupied by the north skip when in the pit 22 is indicated at 23 in FIG. 1, whilst that occupied by the south skip is indicated at 21. Associated with the north skip 23 is a coke weigh hopper 24 into which coke is fed from a bin 28 by a coke screen 29 beneath which is a breeze disposal conveyor 34. In like manner a second bin, screen and weigh hopper are provided for feeding coke into the south skip 21.

Additional bins for charging other materials to the skips are provided and are arranged in two groups designated respectively left and right. The left group includes three bins designated 11L, 12L, 13L respectively. The right group includes two sub-bins 11RA, 11RB, forming effectively part of one bin referred to generally as bin 11R and two further bins 12R, 13R. Associated with the left group of bins is a weigh hopper 535 into which material withdrawn from hopper 13L by vibro feeder 574 can be fed directly, material withdrawn from bin 12L by vibro feeder 554 can be fed by conveyor 551 and material withdrawn from bin 11L by vibro feeder 534 can be fed by conveyor 531. Associated with the right group of bins is a weigh hopper 545 into which material withdrawn from bin 13R by a vibro feeder 557 can be fed directly, material withdrawn from bin 12R by vibro feeder 558 can be fed by conveyor 559, material withdrawn from sub-bin 11RA by vibro feeder 601 and/or material withdrawn from sub-bin 11RB by vibro feeder 602 can be fed by conveyor 603. Associated with each of the weigh hoppers 535, 545, is a hopper gate such as that illustrated at 544 in FIG. 11, to enable material to be discharged, as required therefrom, into a transfer chute 543. The transfer chute is displaceable by an operator 541 so as to bring it into register either with the north skip 23 or the south skip 21 so as to enable material from either of the weigh hoppers 535, 545, to be discharged into whichever of the skips is in the pit to receive it.

It will be understood that the total number of bins provided may be varied, as desired, and that the number of bins in either the left and right group can either be the same or can be different. Additional bins may well be provided, if required.

In operation when a charge of material is to be prepared from the left group of bins for either of the skips, the vibro feeder 534 and the conveyor 531 or the vibro feeder 554 and the conveyor 551 or the vibro feeder 574 are or is operated to withdraw material from the appropriate bin and feed it to the weigh hopper 535. As the quantity of material received by the weigh hopper approaches the preselected quantity, the vibro feeder and conveyor or vibro feeder alone is or are first slowed down and later stopped when the preselected quantity has been received. A pre-selected charge may include some material from one hopper and some material from another hopper in the same group and if such a double charge is required one of the preselected hoppers is treated as first choice and the appropriate vibro feeder and conveyor or vibro feeder alone is started, slowed down and stopped under the control of the weigher, and thereafter the other preselected hopper is treated as second choice and the appropriate vibro feeder and conveyor or vibro feeder are or is then started and a second predetermined quantity of material fed into the weigh hopper, whereupon the vibro feeder and conveyor or vibro feeder is or are stopped.

When the sequence in the programme at which any such material charge is required has been reached, the transfer chute 543 is positioned by the operator 541 in accordance with whichever of the skips is in the pit and, when so positioned, the hopper gate is opened to discharge material from the weigh hopper through the transfer chute into the skip.

Material from one or more of the bins in the right group of bins is withdrawn, fed into the weigh hopper 545 and discharged through transfer chute 543 in like manner.

Water may be added into the skips, if required, by pipes 144, 147, controlled by valves 142, 145.

One form of control system suitable for controlling the operations of this charging apparatus in conjunction with the operation of the small bell, large bell, distributor and stock lines, is illustrated schematically in FIG. 12. It will be noted that towards the top of the figure there is illustrated parts of the upper part of a blast furnace generally at 67 including the distributor 68, the small bell 70, the large bell 73, together with their associated limit switches and operators, and the stock lines 78, 81, together with their winches 79, 82, and limit switches 80, 83. At the lower part of FIG. 12 the positions of the north and south skips, when in the pit, are indicated diagrammatically in broken lines at 23 and 21 respectively and they are operated by a skip hoist indicated generally at 84. The skip hoist includes two limit switches 585, 586, which are operated respectively when the north skip is in the pit and when the south skip is in the pit.

The control system can be sub-divided into a number of units including a left material charging programme control, as delineated by the block 587, a north coke charging control delineated by the block 88, a water charging control delineated by the block 89, a south coke charging control delineated by the block 90, a right material charging programme control delineated by the block 591, a distributor programme control delineated by the block 92, and the remainder which may be described as a bell counting and sequence control. Parts which in FIG. 12 have the same reference characters as parts in FIG. 3 are substantially the same and operate in like manner and it is believed that further description of such similar parts and their operation will not be necessary save in as far as reference thereto is necessary for explanation of the arrangement and operation of the left and right material charging programme controls, as it is believed that their operation will be apparent to one skilled in the art from the foregoing description of FIG. 3. For example the bell sequence control switch 93, the small bell control 95, the stock line and large bell control 96, and the distributor control 92, operate in substantially the same manner as in the control illustrated in FIG. 3.

The bell counting control also includes a step-by-step bell counting switch 594 which operates in substantially the same manner as the bell counting switch 94 in FIG. 3 but has a different number of positions and arrangement of selector switches. Each of the material programme controls includes a step-by-step material programme switch 597, 598, which operates in the same manner as the material programme switches 97, 98 in FIG. 3 but also has different numbers of position and arrangement of selector switches. As in the case of FIG. 3, each of the step-by-step switches is preferably of the type described and illustrated in FIGS. 4 and 5 of British patent specification No. 693,205 but for the sake of simplicity and clarity, the fixed contacts are illustrated diagrammatically in FIG. 12 and in FIGS. 13 and 14 as being disposed in columns and rows with the moving contacts moving in rectilinear paths.

LEFT MATERIAL PROGRAMME CONTROL

Vibro feeder 534 for delivering material from bin 11L is driven by an electric operator 533 and the associated conveyor 531 can be driven by a motor 530 which can drive it at a high speed or by motor 536 which can drive it at a low speed. Vibro feeder 554 for withdrawing material from bin 12L is driven by an electric operator 553 and the associated conveyor 551 is driven by a first motor 550 for driving it at high speed and a second motor 556 for driving it at low speed. The vibro feeds 574 for withdrawing material from bin 13L is driven by an electric operator 573. Associated with the weigh hopper 535 is a weigher 500 with which is associated a recorder 537, and the weigh hopper is provided with a hopper gate 544 which is normally in closed position and can be opened by a hopper gate solenoid 540. A limit switch 542 is adapted to be operated when the hopper gate is closed.

RIGHT MATERIAL PROGRAMME CONTROL

In like manner the right material charging programme control 591 includes electric operator 560 driving vibro feeder 557 for withdrawing material from bin 13R; electric operator 561 driving vibro feeder 558, high speed motor 562, low speed motor 563, and conveyor 559 associated with the withdrawal of material from bin 12R; electric operators 563 and 565 driving vibro feeders 601, 602 respectively; high speed motor 604, low speed motor 605 and the conveyor 603 for the withdrawal of material from sub-bins 11RA, 11RB; weigher 622, recorder 567, hopper gate 568, operating solenoid 569 and limit switch 570 associated with the weigh hopper 545.

The north coke charging control 88, the south coke charging control 90 and the water charging control 89 are substantially the same as those described and as illustrated in FIG. 3 and in detail in FIGS. 8A and 8B and 9 respectively.

PROGRAMME SET UP

The control system to be described provides for a programme of up to 32 sequences. The bell counting switch 594 includes 33 positions, that is to say one more than the number of possible sequences in the programme. Each of the material programme switches 597, 598 includes 32 positions, that is to say one for each possible sequence in the programme. It is not necessary for a programme to include every one of the 32 possible sequences and the control includes switching means whereby a programme can be ended at any desired sequence whereupon both the bell counting switch and the material programme switches will be returned to their starting positions and the programme will be recommenced.

For each possible sequence in the programme a number of switches are provided. For each sequence one switch, which will be designated switch G, can be pre-set to select an automatic material charge from the left group of bins, an automatic material charge from the left group of bins coupled with a charge of scrap, an automatic coke charge, an automatic charge of material from the right group of bins coupled with a charge of scrap, or an automatic charge of material from the right group of bins. Each of these switches G is a multi-pole switch and has one set of contacts associated with the bell counting switch 594, another set associated with the left material programme switch 597 and a third set associated with the right material programme switch 598. For each sequence, a second switch, which is designated switch F, can be set to determine whether, at that sequence, the large bell should be opened to dump charges into the furnace after the small bell has been opened and closed, whether the programme is to continue without opening of the large bell, or whether that sequence shall determine the end of the programme. Each of these switches F is a multi-pole switch having one set of contacts associated with the bell counting switch 594, another set associated with the left material programme switch 597 and a third switch associated with the right material programme switch 598. For each sequence of the programme there is provided a third switch which will be designated switch H and which can be pre-set to determine from which bins material shall be drawn if an automatic material or a material charge and scrap material charge is called for in the sequence to which it relates. Each of the third switches comprises a plurality of switches each individual to one of the material bins and each having three positions. One position is an OFF position indicating that no material is to be drawn from that bin to which it relates, a second position corresponding to a first weight of material and a third position corresponding to a second weight of material to be withdrawn from the bin to which it relates. A weigher associated with a weigh hopper into which material in a group of bins can be delivered can be preset so that either of the first or second weights of material withdrawn from any bin can be a predetermined desired value and it is not necessary for the first weight or the second weight of material drawn from all the bins to be the same, so each weight can be individually predetermined.

As in the case of the control illustrated in FIG. 3, the bell sequence switch, 93 has five positions and is driven sequentially from one position to the next serving to relate the various operations into timed relationship with one another.

The moving contacts of the bell counting switch 594 are driven step by step, by an electric motor 595 and are always driven step by step in the same direction. At the start of the programme they are in their first position and are then driven step by step until they reach a position where the switch F associated with that position has been operated to indicate the end of the programme whereupon they are driven forward in the same direction until they return to their first or starting position. The moving contacts of the left and right material programme switches 597, 598 are driven by electric motors 503, 599 respectively. At the beginning of a programme the moving contacts are in their first positions and are each advanced step by step independently of one another as the programme is executed. When they reach a position at which the switch F associated with that position has been operated to indicate the end of the programme, they are driven forward in the same direction until they return to their first or starting position.

SEQUENCE OF OPERATIONS

By way of example, and purely for the sake of illustration, let it be assumed that a programme of a sequence of eight charges is to be operated. In each of the first and second sequences a charge of coke is to be delivered, in the third sequence a first weight charge of material is to be delivered from bin 11L, in the fourth sequence a second weight charge of material from bin 13L, in each of the fifth and sixth sequences a charge of coke, in the seventh sequence a first weight charge of material from bin 12R combined with a charge of scrap material, and in the eighth sequence a double charge of material is to be drawn as a second weight charge from bin 11R, that is to say from sub-bins 11RA and 11RB, and a first weight charge from bin 13R. The large bell is to be opened after the opening of the small bell in the fourth and eighth sequences and the eighth sequence is to be the end of the programme. Let it also be supposed that at the start of the programme the north skip is in the pit.

The north and south coke controls 88, 90 are initially started by manually operating the starting switch 157 to energise motor 125 driving the breeze conveyor 34 and then to energise the motor driving the breeze conveyor associated with the south coke control. When both breeze conveyors have been run up to speed the starting switch 157 can be released.

In accordance with the programme taken by way of illustration, switch G relating to the first sequence in the programme and which has been designated G1, will have been operated into a position corresponding to a coke charge. In like manner switch G2 will have been operated into a position corresponding to a coke charge, switches G3 and G4, into positions corresponding to left material charges, switches G5 and G6 into positions corresponding to coke charges, switch G7 into a position corresponding to a right material charge and a scrap material charge, and switch G8 into a position corresponding to a right material charge. Switches F1, F2, F3, F5, F6 and F7 will have been operated into their normal positions, switch F4 into its position corresponding to a large bell dump, and switch F8 into its position corresponding to the end of the programme. Switch H3 will have been operated into a position corresponding to a first weight of material from bin 11L, switch H4 into a position corresponding to a second weight of material from bin 13L, switch H7 into a position corresponding to first weight of material from bin 12R, and switch H8 into a position corresponding to a second weight of material from bins 11RA and 11RB and a first weight of material from bin 13R.

PRELIMINARY FEED TO WEIGH HOPPERS

The moving contacts of the left material programme switch 597 are initially standing in their first position. As switch G1 has been set to the position indicating a coke charge for this sequence, switch H1 is ineffective and a circuit is completed to the driving motor 503 to step the moving contacts into their second position. As switch G2 has also been set to indicate a coke charge for this sequence, switch H2 is ineffective and the driving motor 503 is energised again to step the moving contacts into their third position. Switch G3 has been set to indicate a charge drawn from one of the left bins and renders switch H3 effective, and a signal is sent to control switches 610 on one of leads 611 indicating that a first weight of material is to be drawn from bin 11L. The drive circuit to the motor 503 is interrupted and the control switches 610, through some of leads 612, condition weigher 500 to allow a first weight of material from bin 11L to be received in the weigh hopper 535. The control switches send a start signal on lead 613 to control switches 614 which control the operator 533 of the vibro feeder 534 and the motors 530, 536 driving the conveyor 531. The motor 530 is energised to drive the conveyor at high speed and when the conveyor has been run up to speed the operator 533 is started and accelerated and a corresponding signal sent to the weigher 500 on lead 617. Material is withdrawn from hopper 11L and fed into the weigh hopper 535. As the predetermined weight is approached, the weigher 500 sends a signal on lead 615 to the control switches 614, and also on one of leads 616 to the control switches 610. Control switches 614 slow down the operator 533, disconnect motor 530 and connect motor 536 to drive the conveyor 531 at low speed. When the preselected weight of material is received in the weigh hopper 535 the weigher 500 sends a stop signal on lead 615 to the control switches 614, which disconnect the operator 533 and the motor 536 and apply a brake to the conveyor. Weigher 500 sends a start signal on lead 618 to the recorder 537 which records the weight and, on completion of this, sends a weight recording completed signal to the weigher on lead 619, and this signal is passed to the control switches 610 on one of leads 616. The appropriate preselected charge of material is now in the weigh hoper 535 ready to be discharged at the appropriate sequence.

In a similar manner the moving contacts of the right material programme switch 598 are initially standing on their first position and as switches G1 and G2 are both in positions indicating coke charges for the first and second sequences, the moving contacts are driven from their first position, through their second position, into their third position. At this position switch G3 is not in a position corresponding to the preselection of material from a right bin and the moving contacts will be driven into the fourth position where similar conditions obtain with switch G4. As switches G5 and G6 correspond to coke charges at the sequences to which they relate, the moving contacts will be driven through their fifth and sixth positions into their seventh position. In the seventh position switch G7 is in its position corresponding to a scrap and material charge from one or more of the right bins and renders switch H7 effective. Switch H7 is in a position corresponding to a first weight of material from bin 12R and sends a corresponding signal to control switches 620 on one of leads 621, and the drive circuit to the motor 599 is interrupted. Control switches 620 send a signal to weigher 622 on one of leads 623 indicating that a first weight of material is to be withdrawn from bin 12R, and a start signal is sent on lead 624 to control switches 625 controlling the operator 561 of the vibro feeder 558 and the motors 562, 563, driving the conveyor 559. The conveyor 559 is started at high speed and the vibro feeder 558 started and accelerated, and a corresponding signal is sent to the weigher on lead 627. Material is withdrawn from bin 12R and fed into weigh hopper 536, in the manner hereinbefore described for the left material programme switch. The appropriate quantity of material from the appropriate bin is now in the weigh hopper 536 awaiting discharge at the appropriate sequence.

Both the north and south coke controls 88, 90 operate in the manner previously described in connection with FIG. 3 to feed the predetermined quantities of coke into each of the coke weigh hoppers 24, 26.

START OF PROGRAMME

The moving contacts of the bell counting switch 594 are initially in their first position and contacts of switch G1 associated with the bell counting switch are rendered operative. As this switch will have been operated to call for an automatic coke charge, automatic coke charge selector relay 170 is operated. From this relay a starting signal is sent to each of the coke charging control switches 168, 169, by leads 171, 172. Neither of these starting signals, however, is effective of itself, but as, for the purpose of illustration, it is assumed that the north skip is in the pit at the start of the programme, limit switch 585 will be operated, but not limit switch 586. A signal from the limit switch 585 on lead 173 completes the starting signal to the north coke control which then discharges coke into the north skip 23 as hereinbefore described in connection with FIG. 3. In addition water may be fed into the north skip by the water charge controller 89, as hereinbefore described.

SKIP HOISTING AND BELL SEQUENCE

Upon re-closure of the hopper gate valve beneath the coke hopper 24, a start signal is sent on lead 177 to the skip hoist starting circuit 178, which has been previously conditioned by the automatic coke charge selector relay by a signal on lead 630. When any water charge, if pre-selected, has been completed a start signal is sent from the water charge control 89 along lead 179 to the starting circuit 178 and on receipt of both these starting signals, the skip hoist 84 is started over lead 180. At the same time a signal is passed on lead 181 to the bell sequence switch 93. The ensuing operation of the bell sequence switch 93, the distributor 92, the small bell operator, the advancing of the moving contacts of the bell counting switch into their next position, namely the second position, and the interlocking of the completion of operation of the skip hoist with the closing of the small bell, follows substantially as hereinbefore described in connection with FIG. 3 with the exception that switch F fulfills the purpose of switches B and C as to whether the large bell is to be opened and as to whether the first sequence was the end of the programme.

SECOND SEQUENCE

When the moving contacts of the bell counting switch reach their second position some of the contacts of switch G2 are rendered operative and as this switch has been set to correspond to an automatic choke charge, the automatic coke charge selector relay 170 is re-operated, and as the north skip previously charged with coke has been hoisted and the south skip is now in the pit, the south coke charging control 90 operates similarly to the north coke charging control and discharges coke into the south skip. On completion of any water charging operations, start signals are sent to the starting circuit 178 on leads 206 and 179, whereupon the sequence of starting the skip hoist, stepping of the bell sequence switch, the distributor, the bell counting switch, operating the small bell control and the large bell control, is completed as substantially as hereinbefore described.

THIRD SEQUENCE

As the third sequence in the programme is to be a charge of material from bin 11L of the left group of bins, when the moving contacts of the bell counting switch 594 are advanced to their third position, some of the contacts of switch G3 are rendered effective, and an automatic left material charge selected relay 678 is operated. This relay sends a conditioning signal on lead 631 to the starting circuit 178 and also signals on leads 632 and 629 to left and right material release controls 633, 634, and to transfer chute control 635. The signal on lead 629 to right material release control 634 prevents the release of material from the weigh hopper 536 and the signal received by the transfer chute control 635 in conjunction with signals received on leads 636, 637, from the limit switches 585 and 586, indicates that the transfer chute must be brought into register with the north skip which is now in the pit. If the transfer chute is not so positioned, solenoid 638 is energized over lead 639 to move it into the desired position. When the transfer chute is correctly positioned a signal from transfer chute limit switch 640 is passed on lead 641 to the release control 633 and this in conjunction with the signal on lead 642 from the limit switch 585 and the signal on lead 632, causes a material release signal to be sent on lead 643 to the control switches 610 in the left material control. The solenoid 540 is now energized over lead 644 to open the hopper gate 544 to discharge material from the weigh hopper 535 through the transfer chute 543 into the north skip. The completion of the discharge of the material is detected by the weigher 500 which then sends a hopper empty signal on one of leads 616 to the control switches 610.

On receipt of this signal the motor 503 is re-energised to drive the moving contacts of the left material programme switch 597 into their fourth position. As switch G4 has been operated to indicate a material charge from the left group of hoppers at this fourth sequence to which it relates, switch H4 is rendered effective and a signal is sent on one of the leads 611 to the control switches 610 indicating that the second weight of material is to be withdrawn from bin 13L. At the same time the solenoid 540 is de-energised to enable the hopper gate 544 to be closed. The closure of the hopper gate is detected by limit switch 542 and if the hopper gate does not close at the first attempt the solenoid 542 is re-energised for a short period of time to open the gate and close it again. When the hopper gate is closed a start signal is sent over leads 645 and 646 to the starting circuit 178, to enable the skip hoist to be started on completion of any water charging operation. At the same time the weigher 500 is conditioned to indicate that the second weight of material from bin 13L is to be received by the weigh hopper 535 and a start signal is sent on lead 647 to control switches 648 controlling the operator 573 of the vibro feeder 574, which then feeds material in a manner similar to that already described in connection with the feeding material from bin 11L into the weigh hopper 535.

With the starting of the skip hoist, the bell sequence control is stepped once more and functions in the manner perviously described and in timed relationship with the stepping thereof the moving contacts of the bell counting switch 594 are advanced to their fourth position.

FOURTH SEQUENCE

As the fourth sequence requires a charge of material from bin 13L in the left group, switch G4 will have been operated into the same position as switch G3 and the left material charge selected relay 678 will be operated once more. The transfer chute control 635 receives a signal over lead 629 indicating a material charge from the left group, and also receives a signal over lead 637 indicating that the south skip is in the pit at the completion of operation of the skip hoist. The solenoid 638 is now energised over lead 848 to bring the transfer chute 543 into register with the south skip 21. The left material release control 633 receiving signals on lead 632 from the left material selected relay 678, on lead 649 from limit switch 650 which is operated when the transfer chute is in register with the south skip, and on lead 651 from the limit switch 586 when the south skip is in the pit, sends a material release signal on lead 643 to the control switches 610 and enables material in the weigh hopper 535, when of the correct weight, and when its weight has been recorded by recorder 537, to be released through the hopper gate 544 and transfer chute 543 into the south skip 21. When the hopper gate is closed a start signal is sent to the starting circuit 178 over lead 645 and on completion of any water-charging operation, the skip hoist is started as hereinbefore described.

With the closing of the hopper gate 544 motor 503 is re-energised to drive the moving contacts of the material programme switch 597 into their fifth position. Since a coke charge has been pre-selected for the fifth sequence and for the sixth sequence a material charge (with scrap) from the right group of bins for the seventh sequence and a double material charge from bins in the right group for the eighth sequence in the programme, the moving contacts will not be arrested in any of the fifth, sixth, seventh and eighth positions and will be advanced into their ninth position. When the moving contacts are advanced into their ninth position some of the contacts of switch F8 are rendered effective and as this switch has been operated to indicate that the eighth sequence has been selected as the last sequence in the programme, an alternative circuit is provided by the control switches 610 and the motor 503 continues to be energised to drive the moving contacts through their remaining positions until they are returned to their first or starting position. When the moving contacts are in their first position the alternative drive circuit is discontinued and a test is made by the control switches 610 to determine whether or not a material charge from any one of the left group of bins has been pre-selected for that sequence. If not, as in the example chosen, the motor 503 continues to be energised and the moving contacts are advanced until they are in a position corresponding to a sequence for which a material charge from the left group of bins has been pre-selected. In the programme taken for illustration, the third sequence is the first such sequence and the moving contacts will, therefore, be moved into their third position, whereupon the left material charge control operates again as previously described.

When a starting signal is sent by starting circuit 178 to the skip hoist 134 a similar signal is sent to the bell sequence switch 93 whose moving contacts are then advanced step by step as hereinbefore described. When, in due course, in timed relationship with the advance of the moving contacts of the bell sequence switch, the moving contacts of the bell counting switch 594 are advanced to their next position namely the fifth position, some of the contacts of switch F4 are rendered effective. As this switch has been operated to indicate that the large bell is to be opened a conditioning signal is sent to the large bell control 96 over lead 218.

In due course the large bell is opened and closed by the operator 71 in the manner hereinbefore described in connection with FIG. 3.

FIFTH AND SIXTH SEQUENCES

As coke charges have been pre-selected for each of these sequences, the procedure is substantially the same as that described in conjunction with the first and second sequences and it is believed that further detailed description will not be necessary to one skilled in the art but will be apparent from the foregoing description.

SEVENTH SEQUENCE

A charge of material from bin 12R and scrap material has been pre-selected for this sequence and when the moving contacts of the bell counting switch are advanced into their seventh position some of the contacts of switch G7 are rendered effective and a right material and scrap charge selected relay 652 is operated. This relay sends a signal on lead 653 to the left material release control 633 to prevent the release of material from the weigh hopper 535, a signal on lead 654 to the left material release control 634 to prepare for the release of material from the weigh hopper 545 and a signal to the transfer chute control 635 indicating that a charge of material is to be withdrawn from weigh hopper 545. In conjunction with the signal received on lead 654 and a signal received on lead 636 that the north skip is in the pit, the transfer chute solenoid 638 is energised over lead 639 to bring the transfer chute into the register with the north skip. When the right material release control 634 receives a signal from limit switch 640 over lead 655, indicating that the transfer chute is in register with the north skip, and a signal from limit switch 585 over lead 656 indicating that the north skip is in the pit, a material release signal is sent over lead 657 to the control switches 620 to cause those switches to energise hopper gate solenoid 569 to open the hopper gate 568 and permit discharge of material already in the weigh hopper 545 through the transfer chute 543 into the north skip 23. When the discharge of material has been detected by the weigher 622, the solenoid 569 is de-energised to permit the hopper gate 568 to close. Upon closure of the hopper gate as detected by the limit switch 570, a starting signal is sent out by the control switches 620 on lead 658.

With an ordinary material charge the starting signal on lead 658 would be passed on to lead 659 to the starting circuit 178 but this is prevented by a transfer switch 660. Upon operation of the left material and scrap charge selected relay 652, a signal was sent on lead 661 to operate the transfer switch 660, to a similar transfer switch 662 associated with the left material control, to condition an additional starting circuit 663, and to prepare north and south scrap hopper controls 664, 665. The north scrap control 664 receives a signal on line 666 from the limit switch 585 rendering it operative as the north skip is in the pit. If the south skip had been in the pit, the south scrap control 665 would have received a signal on lead 667 indicating that the south skip was in the pit and rendering it operative. Upon manual depression of a push-button switch in the north scrap control 664, a solenoid 668 is energised over lead 669 to open a hopper gate 670 and permit scrap material to be discharged from a north scrap material hopper 671 into the north skip 23. Upon release of the push-button switch the solenoid 668 is de-energised and the hopper gate 670 is closed. Closure of the hopper gate 670 is detected by limit switch 672 and a starting signal is sent on leads 673 to the starting circuit 663. Upon manual operation of a start push-button switch the starting circuit 663 sends a starting signal over lead 180 to the skip hoist 84, whereupon the normal sequence of operations ensues as hereinbefore described.

EIGHTH SEQUENCE

When the moving contacts of the right material programme switch 598 are advanced into their eighth position switch G8 will be in its position corresponding to a material charge and switch H8 will be rendered effective and, over some of the leads 621, will send signals to the control switches 620 indicating that the material charge is to be withdrawn from sub-bins 11RA and 11RB to the second weight, together with a charge to the first weight withdrawn from bin 13R. The control switches 620 are conditioned for a dual material feed and select one of the pre-selected material charges to be treated as first choice and the other to be treated as second choice. A charge from sub-bins 11RA, 11RB has priority over a charge from bin 12R which itself has priority over a charge from bin 13R. The control switches 620 condition the weigher 622 over some of leads 623 to indicate that the weigh hopper 545 is to receive material from sub-bins 11RA and 11RB and that the weight of such material is to be the second pre-selected weight. The control switches 620 also send a start signal on lead 674 to control switches 675 controlling the operators 564, 565, driving the vibro feeders 601, 602, and the motors 604, 605 driving the conveyor 603. The conveyor starts up at high speed followed by the vibro feeders and material is withdrawn from the sub-bins and fed into the weigh hopper 545. The vibro feeders and conveyor are subsequently slowed down and then stopped when the predetermined weight of material is in the hopper 545 and that weight is then recorded by the recorder 567. A signal that recording has been completed is sent to the control switches 620 on one of leads 628 whereupon the control switches 620 re-condition the weigher 622 over some of the leads 623 to the effect that the weigh hopper 545 is to receive a charge from bin 13R and that such charge is to be the first of the pre-selected weights for that bin. The control switches also send a signal on lead 676 to control switches 677 controlling the operator 560 driving the vibro feeder 557 which is then started and is subsequently slowed down and stopped when the appropriate weight of further material has been received by the weigh hopper 545.

The material is released from the weigh hopper 545 through the hoppper gate 568 in the manner previously described when the south skip is in the pit and the transfer chute is in register therewith. When the moving contacts of the right material programme switch 598 are subsequently advanced into their ninth position some of the contacts of switch F8 are effective and as this switch has been moved into its position indicating that the eighth sequence has been selected as the last sequence in the programme, the moving contacts are advanced into their starting position in the manner similar to that described in connection with the left material charging control and are thereafter advanced to the appropriate position corresponding to the first sequence in the programme for which a material charge from the right group of bins has been pre-selected.

When the moving contacts of the bell counting switch 594 are advanced from their eighth position to their ninth position in the normal manner, some of the contacts of switch F8 become effective and as this switch has been operated into its position denoting that the eighth sequence has been selected to be the last sequence of the programme, appropriate signals are sent to the bell counting switches 185 and also to the large bell operator 96 over lead 218 to bring about the opening of the large bell under the control of the bell sequence switch 93. The moving contacts of the bell counting switch 594 are subsequently driven through their remaining positions until they reach their first or starting position once more. Thereafter the sequence of operations hitherto described is repeated.

EXTRA CHARGES OF MATERIAL OR COKE

The control system may also provide for the interruption of the programme at any time should it be desired to insert an extra charge of material from either the left group of bins or the right group of bins. Each of the material charging controls 587, 591 is preferably provided with a manually operable selector switch for selecting the bins or bins from which an extra charge of material is to be drawn. Since material from either group of bins can be delivered into either of the skips as a result of the provision of the transfer chute, it is not necessary for an empty skip to be subsequently hoisted in order to restore the sequence of skips as is necessary in the case of the control system illustrated in FIG. 3. The control system also enables an extra charge of coke to be delivered, as required, by north coke charging control 88 or south coke charging control 90 into the north and south skips respectively.

PROGRAMME RE-SET

The control system also preferably includes means to enable an entire programme to be readily re-set. For this purpose the feeding of any further charges of coke to either skip is interrupted by preventing operation of the automatic coke charge selected relay 170. In addition the normal drive circuits to the motors 503, 599, associated with the moving contacts of the left and right material programme switches 597, 598, are interrupted. Any materials in the weigh hoppers 535, 536 are discharged into the skips and when the last material charge is being hoisted by the skip hoist the bell counting switch 594 is driven to its first or starting position. The switches F, G and H can then be re-adjusted in order to set up a fresh programme. The moving contacts of the material programme switches are subsequently driven through their remaining positions back to their first or starting positions and a fresh programme can be commenced.

CONTROL SYSTEM

The features described above and additional features of the control system will, it is believed, be clearly understood and apparent from the following more detailed description of the circuit diagrams in FIGS. 13, 14, 15, 16, 17, 18 and 19 which are circuit diagrams of a preferred form of the control system illustrated in FIG. 12, embodying electromagnetic switches in the form of relays and contactors, though it is to be understood that as hereinbefore stated in connection with FIGS. 4, 5, 6, 7, 8 and 9 the invention is not limited to the use of such relays and contactors. One suitable form of bell counting switch, bell sequence switch, small bell control and large bell control will be described by way of example by reference to the circuit diagram of FIG. 13.

The bell counting switch 594 (FIGS. 13E and 13F) comprises a set of moving contacts 710. Of these one, 711, engages a bus contact 712 which is extended by lead X110 to one side of a D.C. control supply line 703. A second contact 713 co-operates with a first column of fixed contacts of which alternate contacts are connected to common leads 714, 715, the contacts in the odd-numbered rows being connected to lead 714 and those in the even-numbered rows to the lead 715. The fixed contacts are arranged in 33 rows so that the moving contacts have 33 possible positions and the number of positions is equal to one more than the total number of possible sequences in the programme for which it is desired to cater. In the control system illustrated the programme may have up to 32 sequences and for this reason 33 rows of fixed contacts are provided in the bell counting switch.

For each sequence in the programme there is associated one switch designated switch F, which determines whether that sequence requires that the large bell should be opened and also whether that sequence has been selected to be the last sequence in the programme since it is not necessary for all 32 possible sequences to be utilized in any one programme.

There is also provided for each sequence in the programme a switch designated switch G for selecting whether at that sequence material is to be drawn from the left group of bins, or whether a charge of material from the left group of bins is to be combined with a charge of scrap, or whether a charge of coke is required, or whether a charge of material from the right group of bins is to be combined with a charge of scrap, or whether a charge of material from the right group of bins is required. The switch F relating to the first possible sequence in a programme is designated F1, that relating to the second possible sequence in a programme F2, and so on, so that switch F32 relates to the last possible sequence in any programme. In like manner the switch G relating to the first possible sequence in the programme is designated switch G1, that relating to the second possible sequence as switch G2, and so on, so that the switch G32 relates to the 32nd sequence or the last possible sequence in any programme. The switch G relating to any particular sequence in the programme is associated with the correspondingly numbered rows of fixed contacts of the bell counting switch and of the material programme switches which will be described hereinafter, whilst the switch F relating to that sequence is associated with the following row of fixed contacts.

The third moving contact 716 co-operates with a second column of fixed contacts. The first contact in the second column of fixed contacts is connected to a common lead 717 and each of the contacts in the other rows in this column are connected to the moving contacts of the appropriate switches F1 to F32. Thus though switch F1 relates to the first sequence it is actually associated with the second position of the moving contacts of the bell counting switch. Similarly switch F32, which relates to the 32nd sequence, is associated with the 33rd position. Each of the F switches is a multi-pole switch and includes one pole in each of the material programme controls as will be subsequently described, that in the left material control being designated F1, and those associated with the bell counting switch being designated F1A, F1B, F1C. The moving contacts of switches F1A to F32A are connected each to the appropriate fixed contact in the second column of the bell counting switch. The moving contacts of switches F1B to F32B are each connected to a common lead X112 which is extended to a low voltage A.C. supply on supply line 704. The moving contacts of switches F1C to F32C are each connected to the appropriate fixed contact in the third column of the bell counting switch with which a third moving contact 718 co-operates. Each of the F switches has three positions, one corresponding to the opening of the large bell at the sequence to which it relates, and denoted by the legend LB, another relating to a normal sequence and denoted by the legend N, and a third indicating that the sequence to which it relates has been selected as the last sequence in the programme and denoted by the legend PR. All the fixed contacts designated N and PR associated with the moving contacts F1A to F32A are connected to the common lead 717. An individual indicator lamp, such as L1, is connected between each of the fixed contacts designated LB and associated with the moving contacts F1B to F32B and to a common lead X113 which is extended to the other side of the low voltage A.C. supply on supply line 704. The first contact in the third column of the bell counting switch is connected to a common lead 719 and the fixed contacts designated LB and N associated with each of the moving contacts F1C to F32C are also connected to the lead 719. Each of the fixed contacts designated PR associated with each of the moving contacts F1C to F32C is connected to a common lead 720. The first contact in the fourth column of fixed contacts with which moving contact 721 co-operates is connected to a lead 722 and each of the remaining fixed contacts in the 1st to 32nd positions inclusive is connected to a further common lead 723.

Each of the switches G1 to G32 is a multi-pole switch and has one pole associated with the bell counting switch and one pole associated with each of the material charging controls. Those associated with the left material charging control, which will be hereinafter described, are designated G1 to G32 and the poles associated with the bell counting switch are designated G1A to G32A. The moving contacts of switches G1A to G32A are connected individually to the 1st to 32nd fixed contacts in the fifth column of the bell counting switch and with which moving contact 724 co-operates. Each of the switches G1A to G32A has five fixed contacts designated respectively LM, LSM, AC, RSM and RM and these are connected to common leads 725, 726, 727, 728, 729, respectively and correspond to the selection at any particular sequence of a material charge from the left group of bins, a material charge from the left group of bins combined with a scrap material charge, an automatic coke charge, a material charge from the right group of bins combined with a scrap material charge, and a material charge from the right group of bins respectively The moving contacts 710 of the bell counting switch are driven by an electric motor 730. The bell counting switch may conveniently be of the type described and illustrated in FIGS. 4 and 5 of British Patent No. 693,205.

The bell sequence switch 93 (FIG. 13C) is substantially the same as that illustrated in FIG. 4, and comprises three sets of moving contacts, 269 and 270, 271 and 272, 273, 275 and 276, moving contacts 273 making permanent connection with a contac tstrip 274. The fixed contacts are likewise designated by the legend BPS and are identified by the indicia 1A, 1B, 1C, 2A, 2B, 2C, 3A, 3B, 3C, etc., and contacts associated with the first two and some of those associated with the third set of moving contacts of the bell programme switch are also illustrated on the detached contact principle in the relevant parts of FIG. 13, with which they are concerned.

It is believed that the operation of the bell counting switch and associated circuits in FIG. 13 can best be described with reference to the programme described in connection with FIG. 12. Initially, the north skip is in the pit, switches G1, G2, G5 and G6 have each been set to select an automatic coke charge, switches G3 and G4 to select left material charges, switch G7 to select a right material charge combined with a scrap charge and switch G8 to select a right material charge. Switches F1, F2, F3, F5, F6 and F7 will have been set to indicate normal sequences, switch F4 to indicate a large bell dump and switch F8 to indicate a last sequence of the programme. At the commencement of the programme, the moving contacts of the bell programme switch are in their first position and the moving contacts of the bell counting switch are also in their first position.

FIRST SEQUENCE

In the bell counting switch a circuit is extended from lead X110 through bus contact 712 (FIG. 13E), moving contacts 711 and 724 to the moving contact of switch G1A and thence via fixed contact designated AC, lead 727, normally closed contacts BELR5 (FIG. 13G), of a bell extra load relay, normally closed contacts PRPR4 of a programme re-set proving relay, normally closed contacts LAMCSR2 of a left material charge selected relay, normally closed contacts RAMCSR2 of a right material charge selected relay, normally closed contacts LSMCSR2 of a left material and scrap charge selected relay, normally closed contacts RSMCSR2 of a right material and scrap charge selected relay, and normally closed contacts PRR2 of a programme re-set relay to coil ACCSR of an automatic coke charge selected relay, which then operates. Contacts of the coke charge selected relay enable the north coke charge control to feed a charge of coke into the north skip. Contacts ACCSR1 (FIG. 13B) prepare a circuit to closing coil BSSRCC of a skip hoist starting relay.

In the bell counting switch a circuit is also extended from lead X110 through bus contact 712 (FIG. 13E) and moving contacts 711 and 716, to lead 717, and thence through normally closed contacts PRR3 (FIG. 13H) to coil BDI of a bell dump interlock relay. As the bell programme switch 93 is also in its first position a circuit is also established between leads X110 and 717 by bell programme switch contacts BPS1C. The bell dump interlock relay operates. At this sequence the north skip is in the pit and limit switch 585 is operated so that contacts NSI4 (FIG. 13B) are closed. As no scrap has been added during this charge the hopper gate 670 beneath the north scrap hopper 671 should be closed and limit switch 672 operated so that its contacts NSHGLS1 are closed. When delivery of the charge of coke into the north skip has been completed a circuit is completed between points 731, 732 by contacts COSR3 in series with contacts COSCR4.

Provision is made for a charge of water to be added to either skip, as required; such charges of water can be added with each coke charge or with each material charge or with every charge, or can be omitted. A water charge selector switch WCS is provided having four positions designated OFF, COKE, MATERIAL, and ALL. If water charges are omitted, switch WCS connects point 733 to point 734 and thence to lead XIII. If water is required during coke charges switch WCS connects point 733 to lead XIII through normally closed contacts ACCSR9 of the automatic coke charge selecting relay, which is operated during a coke charge, so that the circuit between 733, 734 is dependent on contacts 1WTR5 and normally closed contacts NWV5 and SWV5 in the water charging control illustrated and herein before described in and with reference to FIG. 9. When a water charging operation has been completed, if selected to occur with a coke charge, a circuit is then extended from lead X110 through contacts BDI4, contacts ACCSR1, points 731, 732, contacts NSI4, contacts NSHGLS1 to closing coil BSSRCC of the skip hoist starting relay and from point 733 to lead XIII. The skip hoist starting relay which is of the latching type operates and latches. Contacts of this relay are associated with the skip hoist 84 and start operation of the skip hoist to hoist the north skip. As soon as the skip is hoisted out of the pit, the limit switch 585 is released and contacts NSI4 are opened to disconnect the closing coil BSSRCC.

Contacts BSSR1 (FIG. 13C) complete a circuit from lead X110, contact strip 274, moving contacts 273, 276, to coil BPSR of a bell sequence switch drive relay which operates, and through contacts BPSR1, BPSR2, BPSR3 (FIG. 13A), connects the motor 735 to supply line 701 and this motor drives the moving contacts of the bell sequence switch 93 to their second position. As the moving contacts of the bell counting switch are in their first position a circuit is now extended from lead X110, contact strip 712 (FIG. 13E), moving contacts 711 and 713 to lead 714 and thence through bell sequence switch contact BPS2A (FIG. 13D) and normally closed contacts BELR9 to closing coil 1BCCC of a No. 1 bell counting relay which is of the latching type and operates and latches in the closed position. Operation of the distributor 68 was initiated by limit switch 585 at the end of the previous skip hoisting operation and completion of operation of the distributor is indicated by the closing of contacts IDBI1 (FIG. 13C) of a first distributor interlock relay. Upon closing of these contacts a circuit is extended from moving contact 276 of the bell sequence switch, contacts 1BC1 and contacts 1DBI1 to the coil BPSR of the bell sequence switch drive relay which re-operates to enable motor 735 to advance the moving contacts into their third position.

With the moving contacts and the bell sequence switch in their third position contacts BPS3A (not shown in detail) bring about operation of a relay associated with the distributor angle switch 192 to cause it to advance to its next position. Since, at this time, the large bell is closed, the limit switch 76 associated therewith is operated and contacts LBCLS1 are closed to complete a circuit to coil LBCR of a large bell closed relay which operates. When the distributor angle switch has stepped to its next position a second interlock relay is operated and contacts 2DBI1 (FIG. 13D) are closed so that a circuit is extended through bell sequence switch contacts BPS3B, contacts 2DBI1, LBCR1, contacts PCR1 of a programme counting relay which will be hereinafter described, and contacts SBVOLS1 of a small bell operator limit switch to coil SBO of the small bell valve operator 74, which now operates to open the small bell. When the small bell is fully open limit switch contacts SBOLS1 complete a circuit to coil SBOR of a small bell open relay.

Upon operation of the small bell open relay a circuit is completed from the lead X110, contact strip 712, moving contacts 711 and 718, lead 719, contacts SBOR1 and IBC2 to coil BCSSR (FIG. 13D) of a bell counting switch relay, which now operates, and through contacts BCSSR1, BCSSR2, BCSSR3 (FIG. 13A), connects the electric motor 730 to supply line 701. The motor 730 advances the moving contacts 710 of the bell counting switch from their first into their second position. In the second position, the moving contact 713 is disconnected from lead 714 and is connected to lead 715 from which a circuit is extended through contacts 1BC3 (FIG. 13D) to trip coil 1BCTC of the No. 1 bell counting relay which is then released. A circuit is extended by moving contacts 716 and 718 of the bell counting switch to the moving contacts F1A and F1C of switch F1 associated with the first sequence and which now determines whether or not the large bell is to be opened and whether or not the first sequence was to be the last sequence in the programme. If the large bell is not to be opened at this sequence, switch contacts F1A connect with lead 717 and the large bell dump interlock remains operated through continued energisation of its coil BDI. If the sequence is not the last sequence in the programme, switch contacts F1C are extended to lead 719 to provide for subsequent energisation of the coil BCSSR of the bell counting switch relay, as previously described.

Contacts SBOR2 now complete a circuit from moving contact 276 of the bell programme switch to coil BPSR of the bell sequence switch relay, which operates to re-connect motor 735 to drive the moving contacts into their fourth position.

With the moving contacts and the bell sequence switch in their fourth position, a circuit is extended through bell sequence switch contacts BPS4B, limit switch contacts SBVOLS2 to coil SBC of a small bell closing relay which operates to cause the small bell valve operator 74 to close the small bell. When the small bell is in its fully closed position, coil SBCR of the small bell closed relay is re-energised and that relay operates.

When the appropriate operation of the distributor has taken place subsequent to the closing of the small bell, the second distributor interlock relay is released and contacts 2DBI2 are closed; when the bell counting switch has been stepped to its next position, as described, both Nos. 1 and 2 bell counting relays are released. Accordingly when the small bell has been closed a circuit is established from moving contact 276 of the bell sequence switch through contacts SBCR1, 1BC4, 2BC4, 2DBI2, to coil BPSR (FIG. 13C) of the bell sequence switch relay, which operates, to enable motor 735 to advance the moving contacts into their fifth position.

Since switch F1 has been so set to indicate that opening and closing of the large bell is not required at the end of the first sequence, and accordingly the large bell dump interlock relay has remained operated, a circuit is now extended from moving contact 276 of the bell sequence switch, through contacts LBCR2, BDI2, and normally closed contacts PRR4 of the programme re-set relay to coil BPSR on the bell sequence switch relay which operates, and motor 735 is energised to drive the moving contacts into their sixth position. As at this time the skip hoist starting relay is latched in its operated position, contacts BSSR3 are open and further advance of the moving contacts of the bell sequence switch is arrested until the skip hoist has been re-started.

SECOND SEQUENCE

When the moving contacts of the bell counting switch were advanced into their second position, the moving contact of switch G1A was disconnected and the coil ACCSR of the automatic coke charge selected relay de-energised, and the moving contact of switch G2A was rendered effective. Since switch G2 has been set to pre-select an automatic coke charge into the south skip, its moving contact is in the position denoted AC and coil ACCSR (FIG. 13G) of the automatic coke charge selected relay is re-energised and that relay re-operates. On completion of operation of the skip hoist the south skip will be in the pit, limit switch 586 will be operated but not limit switch 585. Contacts of the automatic coke charge selected relay, in combination with contacts of the limit switch 586, cause coke to be fed into the south skip from the south coke charging control. The sequence of operations in the bell counting control follows substantially that described in connection with the first sequence with the exception that contacts NSI4 are open and contacts SSI4 are closed, the moving contacts of the bell sequence switch move from their sixth, through their tenth and into their first position. On completion of the coke charging operation, a circuit is completed between points 736 and 737 (FIG. 13B) by contacts COSR3 and contacts COSCR4 of the the south coke charging control, and trip coil BSSRTC is subsequently energised in place of closing coil BSSRCC of the skip hoist starting relay. When the skip hoist starting relay is released the skip hoist is started and the closing of contacts BSSR3 enables a circuit from moving contact 276 of the bell sequence switch to be extended to coil BPSR of the bell sequence switch relay, which operates, to cause motor 735 to drive the moving contacts into their seventh position. The sequence of operations, with the moving contacts of the bell sequence switch in their seventh, eighth, ninth and tenth positions, is the same as that which has already been described when the moving contacts were in their second, third, fourth, fifth and sixth positions, respectively. At the appropriate stage in the advancement of the moving contacts of the bell sequence switch, the bell counting switch relay is operated and the moving contacts of the bell counting switch are driven by motor 730 out of their second and into their third position. It will be appreciated that when the moving contacts of the bell counting switch are in their even-numbered positions moving contact 713 is extended to lead 715 and not to lead 714 and, as a consequence No. 2 bell counting relay is operated and released through its coils 2BCCC and 2BCTC in place of No. 1 bell counting relay and that contacts 2BC1, 2BC2, 2BC3, perform the same functions as contacts 1BC1, 1BC2, 1BC3.

THIRD SEQUENCE

When the moving contacts of the bell counting switch are advanced to their third position, moving contact 724 renders the moving contact of switch G3A (FIG. 13E) effective and as this switch has been operated into its position LM as a charge of material from bin in the left group of bins has been pre-selected, a circuit is extended to lead 725 instead of to lead 727, as occurs during the first and second sequences. Lead 725 extends a circuit through normally closed contacts BELR16 (FIG. 139), normally closed contacts PRPR5, and contacts PRR2 to coil LAMCSR of the left material charge selected relay, which operates. Contacts of the left material charge selected relay, in conjunction with contacts of the limit switch 585 which will, in due course, be operated when the north skip is in the pit on completion of skip hoisting, prepare a circuit in the left material charging control for the release of material from the weigh hopper 535 when the transfer chute 543 has been brought into register with the north skip. Contacts LAMCSR3 (FIG. 13K) extend a circuit from lead X110 to contacts NSI20 and contacts SSI20 of the limit switches 585, 586. Limit switch 640, which is operated when the transfer chute is in register with the north skip has contacts NTCLS1 and the limit switch 650, which is operated when the transfer chute is in register with the south skip, has contacts STCLS1. If, at this stage, the transfer chute is in register with the south skip, a circuit will be completed between leads X110 and X111 through contacts STCLS1, normally closed contacts NTCPR2 of a transfer chute to north skip proving relay to coil STCPR of a transfer chute to south skip proving relay, which will operate. Contacts STCPR1 will be opened to prevent energisation of the coil NTCPR. A circuit will now be extended through contacts LAMCSR3, contacts NS120, contacts NTCPR3, contacts STC2, to coil NTC of a transfer chute to north skip contactor, which operates and, through contacts NTC1, completes a circuit to solenoid 738 of the operator 638 to move the transfer chute into register with the north skip. When the transfer chute has moved out of its position in register with the south skip, limit switch contacts STCLS1 are opened and the transfer chute to the south skip proving relay released. When the transfer chute is in register with the north skip, limit switch contacts NTCLS1 are closed to energise coil NTCPR of the transfer chute to north skip proving relay, which operates, and through contacts NTCPR2, disconnects coil NTC of the transfer chute to north skip contactor which releases, and through contacts NTC1, disconnects solenoid 738.

As will be hereinafter described in connection with FIG. 14G, the operation of the transfer chute to north skip proving relay through contacts NTCPR1, in conjunction with contacts LAMCSR1 of the left material charge selected relay and contacts NSI1 of the north skip in pit limit switch 585, provide a material release signal to the left material charging control and a hopper gate contactor therein is operated to open the hopper gate 544. When the material has been discharged from the hopper a circuit is completed between points 740, 741, by contacts MHG7 and contacts MHER13 in the left material charging control, and thence through contacts NTCPR4 to closing coil NMSCRCC of a north skip charged relay of the latching type, which operates.

On completion of any water charging operation, the circuit between point 733 and lead X111, which was broken by contacts LAMCR7 if a water charge had been preselected to occur with a material charge, is restored, as hereinbefore described, and when the hopper gate 544 below the weigh hopper 535 has been re-closed, and the hopper gate 568 beneath the right material weigh hopper 545 has been proved to be closed, a circuit is extended between points 742, 743, and by contacts MHGPR3 of the left material charging control, contacts MHGPR3 of the right material charging control. A circuit is then extended through contacts BDI4, contacts LAMCSR4, points 742, 743, contacts NMSCR2, contacts NSI4, north skip scrap hopper gate limit switch contacts NSHGLS1, to closing coil BSSRCC of the skip hoist start relay, which then operates and starts the skip hoist. The normal sequence of operations of the bell sequence switch and the operations controlled thereby, and the stepping of the moving contacts of the bell counting switch then ensue, substantially as hereinbefore described.

FOURTH SEQUENCE

When the moving contacts of the bell counting switch are advanced into their fifth position, switch G3A is disconnected with the consequent release of the left material charge selected relay and the moving contact of switch G4A is rendered operative by moving contact 724. As this switch has been operated into the position designated LM, lead X110 is extended again to lead 725 with the consequent energisation of coil LAMCSR and reoperation of the left material charge selected relay and the same sequence of operations occurs as has been described in connection with the third sequence, with the exception that at the end of the skip hoisting operation initiated during the third sequence, the south skip will be in the pit and that the transfer chute must be brought into register with the south skip. Contacts SSI22 (FIG. 13K) complete a circuit to trip coil NMSCRTC of the north skip charged relay which releases. A circuit is extended from lead X110 through contacts LAMCSR3, contacts SSI20, contacts STCPR3, contacts NTC2 to coil STC of the transfer chute to the south skip contactor. Contacts STC1 energise solenoid 739 of the operator 638 to move the transfer chute into register with the south skip. Contacts NTCLS1 open as the transfer chute starts to move and disconnect coil NTCPR. When the transfer chute is in register with the south skip contacts STCLS1 close, to energise coil STCPR of the transfer chute to south skip proving relay, which operates and, through contacts STCPR2, releases the transfer chute to south skip contactor which disconnects solenoid 739 through its contacts STC1. As contacts STCPR4 are now closed and contacts NTCPR4 open, when the charge of material has been discharged from the weigh hopper 535, and a circuit completed between point 740 and point 741, coil SMSCRCC of a south skip charged relay is energised and that relay operates. Subsequently when circuits are established between points 742 and 743 (FIG. 13B), and between point 733 and lead X111, as hereinbefore described, a circuit is completed through contacts SMSCR2, contacts SSI4, contacts SSHGLS1 of a limit switch associated with the south skip scrap hopper SSH, to trip coil BSSRTC of the skip hoist starting relay, instead of to its closing coil BSSRCC. The sequence of operations of the bell sequence switch then ensues substantially as hereinbefore described, until the point where the moving contacts 710 of the bell counting switch 594 are advanced into their fifth position.

When the moving contacts of the bell counting switch are in their fifth position, moving contacts of switches F4A and F4C are rendered operative by moving contacts 716 and 718. As this switch, which relates to the fourth sequence, has been operated to indicate that the large bell is to be opened at this sequence, the moving contacts will be in their positions designated LB. Through moving contacts F4C, a circuit from lead X110 is still extended to lead 719 to enable the programme to continue, but moving contacts F4A no longer extend lead X110 to lead 717. When the moving contacts of the bell sequence switch are in their eighth position, a holding circuit for coil BDI (FIG. 13A) of the large bell dump interlock relay is no longer provided by bell sequence switch contacts BPS1C, BPS2C, BPS6C, BPS7C, and an alternative holding circuit was provided by contacts BDI3 in series with parallel connected contacts 1BC5, 2BC5, SBOR3 and BELR5. The No. 2 bell counting relay was operated when the moving contacts of the bell sequence switch were in their second position, but this relay was released when the moving contacts of the bell counting switch were advanced into their fifth position, so that both contacts 1BC5 and 2BC5 are now open. Furthermore, since contacts SBOR1 are in series with the coil BCSSR of the bell counting switch relay, making it necessary for the small bell to be opened before the moving contacts of the bell counting switch can be advanced, contacts SBOR3 are now open, and coil BDI is no longer energised as contacts BELR5 of the bell extra load relay are opened as that relay has not been operated at this stage.

When the bell dump interlock relay is released contacts BDI1 prepare a circuit through normally closed contacts LBDR1 of a large bell dump relay to coil SLR of a stock line relay. In this circuit are contacts 1DILS1, 2DILS1 and 3DILS1 of three dump interlock limit switches; each of these limit switches has its contacts closed only if a stock line with which it is associated has descended through a predetermined distance and these collectively serve to indicate whether the level of burden in the furnace is sufficiently low to allow additional charges to be added to the furnace by opening of the large bell. Whilst only two stock lines are illustrated in FIG. 12, it is to be understood that any desired number of stock lines may be provided. Furthermore though only one limit switch is illustrated in FIG. 13 as being associated with each stock line, a plurality of limit switches may be provided, each adapted to correspond to a different level of burden as detected by its associated stock line and manually operable switch means may be provided for selecting corresponding limit switches for all stock lines or each limit switch individually for each stock line. Two such limit switches are illustrated diagramatically at 80 and 83 in FIG. 12, in connection with the two stock lines 78, 81.

The completion of a skip hoisting operation by the skip hoist is made dependent upon the moving contacts of the bell sequence switch having been moved into their fifth or tenth position and the advance of such moving contacts from their fourth or ninth position is dependent upon the small bell having been closed, as indicated by contacts SBCR1, and the completion of operation of the distributor control as indicated by contacts 2DBI2. Since completion of operation of the distributor control is itself dependent upon the opening and closing of the large bell when that is called for in the programme, if the skip hoist were to be started as soon as the skip in the pit were charged, operation of the skip hoist would have to be interrupted with the skip being hoisted being in an intermediate position if the level of the burden in the furnace were not sufficiently low to enable further material to be added by opening the large bell. Such interruption of operation of the skip hoist can be obviated by the inclusion of contacts BDI4 (FIG. 13B) in the circuits to coils BSSRCC and BSSRTC of the skip hoist starting relay. If or when the level of the burden is sufficiently low as selected, a circuit is completed to coil SLR of the stock line relay, which operates, and through contacts SLR1, by-passes the stock line limit switches. Contacts SLR3 by-pass contacts BDI4 and allow starting of the skip hoist. Operation of the stock line relay causes the stock line switches, such as 79, 82, to be operated to raise the stock lines fully. When the stock lines are fully withdrawn, additional limit switches associated with the stock lines are operated and their contacts 1SLHLS1, 2SLHLS1, 3SLHLS1 are closed to prepare a circuit to coil LBO of a large bell open contactor associated with the large bell operator 71.

After the opening of the small bell, moving contacts of the bell sequence switch are stepped into their ninth position and bring about the closing of the small bell. When the small bell is closed, the small bell closed relay is operated and the moving contacts of the bell sequence switch are advanced into their tenth position. At the same time contacts SBCR2 complete a circuit through contacts BDI1, contacts LBDR1, bell sequence switch contacts BPS1OB, contacts SLR2, limit switch contacts 1SLHLS1, 2SLHLS1, 3SLHLS1, to the coil LBO of a large bell open contactor through contacts LBVOLS1 of a large bell operator limit switch to lead X116 and thence through an overload release to lead X111. On operation of the large bell contactor contacts LBO1, LBO2, LBO3 energise the large bell operator 71 to open the large bell. As the large bell operator moves, contacts LBVOLS2 of the associated limit switch are closed and as it completes its travel, contacts LBVOLS1 are opened to disconnect coil LBO.

Completion of opening of the large bell is detected by operation of an associated limit switch to close its contacts LBOLS1 (FIG. 13L), and complete a circuit to coil LBOR of a large bell open relay, which operates, and, through its contact LBOR1 (FIG. 13H), extends a circuit in series with normally closed contacts LBCR4 of a large bell closed relay to coil LBDR of the large bell dump relay, which operates, and provides a holding circuit through its contacts LBDR2, against the opening of contacts LBOR1. Contacts LBDR4 provide a re-operate circuit for coil BDI of the bell dump interlock relay through normally closed contacts PRR3, and since, at this stage, the small bell has been closed, and the small bell open relay has been released, a holding circuit for coil BDI is provided by contacts BDI3 and SBOR3. Contacts LBDR3 extend a circuit through limit switch contacts LBVOLS2 to coil LBC of a second contactor associated with the large bell operator. This second contactor operates and provides a holding circuit for itself through contacts LBC4, whilst contacts LBC1, LBC2, LBC3 re-energised operator 71 to close the large bell. When the operator completes its travel in the closing direction, contacts LBVOL2 are opened to disconnect coil LBC. As soon as the large bell was moved from its open position, limit switch contacts LBOLS1 (FIG. 13L) were opened to release the large bell open relay and when the large bell is completely closed, a further limit switch is operated to close contacts LBCLS1 and energise coil LBCR of a large bell closed relay. Contacts LBCR4 open to disconnect coil LBDR and release the large bell dump relay. Since the bell dump interlock relay has been re-operated to close contacts LBCLS1 and energize coil (FIG. 13C) of the bell sequence switch through contact LBCR2, BDI2, PRR4, to coil BPSR of the bell sequence switch relay, which re-operates, to cause the motor 735 to drive the moving contacts into their tenth position.

FIFTH AND SIXTH SEQUENCES

As in the example selected for illustration, coke charges have been pre-selected for each of the fifth and sixth sequences, operations therein will be substantially the same as those for the first and second sequences.

SEVENTH SEQUENCE

Since a charge of material from a bin in the right group of bins combined with a scrap material charge, has been pre-selected for the seventh sequence, in which the north skip will be in the pit, when the moving contacts of the bell counting switch are advanced into their seventh position, switch G7A will be rendered effective by moving contact 724. The moving contact of switch G7A will be in its position designated RSM and a circuit will be extended from lead X110 to lead 728 and thence through normally closed contacts BELR17 (FIG. 13G) of the bell extra load relay, normally closed contacts LAMCSR6, normally closed contacts RAMCSR6, LSMCSR5 and contacts PRR2 to coil RSMCSR of a right material charge and scrap selected relay, which operates.

Contacts RSMCSR3 (FIG. 13K) prepare a circuit to the coil NTC of the transfer chute to north skip contactor which functions in the manner previously described, to bring the transfer chute into register with the north skip. When the transfer chute is so registered, a material discharge signal is provided to the right material control to cause the hopper gate 568 beneath the weigh hopper 545, to be opened to allow a charge of material to pass through the transfer chute into the north skip. On completion of the discharge of material, a circuit is established between points 744 and 745 by contacts MHG7 in series with contacts MHER13 in the right material charging control, as previously described in connection with the left material charging control in connection with the third sequence, and a circuit is then extended through contacts NTCPR5, to the closing coil NMSCRCC of the north skip charged relay, which then operates. Contacts RSMCSR4 prepare a circuit through contacts NSI21 for coil 746 of solenoid 668 controlling the hopper gate 670 beneath the north scrap hopper 671 which circuit is completed upon manual operation of a scrap hopper gate open push-button switch having contacts 748. This push-button switch is operated manually by an operator to enable the required quantity of scrap to be discharged into the north skip whereupon it is released. With a combined material and scrap charge, automatic starting of the skip hoist does not take place and, in order to start the skip hoist upon completion of any water charging operation, it is necessary to operate a skip hoist start switch having contacts 750 (FIG. 13B) when the north skip is in the pit, or a skip hoist start push-button switch having contacts 751 when the south skip is in the pit. Upon closure of contact 750 a circuit is extended from lead X110, contacts BDI4, contacts RSMCSR8, contacts NMSCR3, contacts MHGPR4 of the hopper gate providing relay of the material charging control, to contacts NSI4 and thence through contacts NSHGLS1 which are closed when the hopper gate 670, beneath the north scrap hopper 671 is closed, to closing coil BSSRCC of the skip hoist starting relay, which then operates to initiate the normal sequence of events, as hereinbefore described.

EIGHTH SEQUENCE

When the moving contacts of the bell counting contacts are advanced to their eighth position, switch G8A is rendered operative by moving contact 724 and as this switch will have been pre-selected in the example chosen for illustration to pre-select a charge of material from the right group of bins, its moving contact will engage with the fixed contact designated RM and a circuit will be extended to lead 729, and thence through contacts BELR19 (FIG. 13G), contacts PRPR6 and contacts PRR2 to coil RAMCSR of a right material charge selected relay, which operates. Substantially the same sequence of operations then ensues upon operation of the left material charge selected relay as in either of the third or fourth sequences, with the difference that the transfer chute is brought into register with the south skip and that material is released from the weigh hopper 545 of the right material charging control. In due course, a circuit is established to the trip coil BSSRTC of the trip coil starting relay and the skip hoist starts to hoist the south skip.

END OF PROGRAMME

When the moving contacts of the bell counting switch are advanced into their ninth position under the control of the bell sequence switch, moving contact 718 is extended to the moving contact of switch F8C. Since the eighth sequence has been selected to be the last sequence in the programme, the moving contact of switch F8A will continue to extend moving contact to lead 717, but moving contact 718 will be extended to lead 720 instead of to lead 719. Lead 720 extends a circuit through normally closed contacts PRPR7 (FIG. 13H) to closing coil PRRCC of a programme re-set relay of the latching type, which operates, and latches. Contacts PRR3 open and disconnect coil BDI of the bell dump interlock relay, which releases to bring about opening of the large bell after closure of the small bell in the manner hereinbefore described. Since lead 719 has been disconnected by switch F8C the normal circuit to coil BCSSR of the bell counting switch relay is no longer available and an alternative circuit is provided through contacts PRR5 (FIG. 13D) so that, upon operation of the large bell dump relay a circuit is extended to coil BCSSR through contacts LBDR5 in series with contacts PRR5 so that, when the large bell has been opened, the motor 735 is energised to drive the moving contacts of the bell counting switch through their remaining positions and back to their first or starting position. When the moving contacts of the bell counting switch reach their first or starting position a circuit is extended by moving contacts 721 to lead 722 and thence through contacts PRR6 (FIG. 13H) to trip coil PRRTC of the programme reset relay which is then released. Thereafter a fresh programme is commenced in substantially the same manner. As switches G, relating to other sequences later than that which is chosen to be the last in the programme, will be rendered operative by moving contacts 724 as the moving contacts of the bell counting switch are driven forward to their first or starting position, contacts PRR2 (FIG. 13G) prevent the operation of any of the charge selected relays during the return of the moving contacts.

SCRAP MATERIAL

If, whilst a charge containing scrap material is being hoisted, it is desired that it should not be dumped on to the small bell when in the closed postion, a manually operable switch having contacts 752 (FIG. 13B) may be operated such that upon operation of either of the skip hoist start switches to close their contacts 753 or 754, when either of the skips is in the pit, a circuit is extended through contacts NSI23 or SSI23 to closing coil SCRCC of a scrap charge relay of the latching type, which operates and latches. Contacts SCR1 (FIG. 13D) in series with bell sequence switch contacts BPS4B and BPS9B prevent the energisation of the coil SBC to close the small bell subsequent to its having been opened. Since the completion of operation of the skip hoist is normally interlocked with the closing of the small bell contacts SCR2 (FIG. 13L) in series with contacts SBOR8 provide an alternative circuit between points 281 and 282 whilst the north skip is being hoisted and contacts SCR3 in series with contacts SBCR5 provide a similar alternative circuit between points 282 and 283, whilst the south skip is being hoisted, and enable completion of operation of the skip hoist to be effected with consequent dumping of the load whilst the small bell is open, even though stepping of the moving contact of the bell sequence switch from their fourth position is restrained by contacts SBCR1. Upon completion of the skip hoisting operation a circuit is provided through either contacts NSI25 (FIG. 13B) or contacts SSI25, contacts SCR2 and contacts SBOR6 to trip coil SCRTC to release the scrap charge relay. Upon closure of contacts SCR1, coil SBC is energised to bring about closing of the small bell and the further stepping of the moving contacts of the bell sequence switch in the manner previously described.

PROGRAMME COUNTING

In order to provide an indication or to stop the apparatus after a predetermined number of programmes had been executed, a counter 755 (FIG. 13D) is provided. Since at one stage during the re-setting of the moving contacts of the bell counting switch, the programme re-set relay and the large bell dump relay are both operated, contacts PRR7, in series with contacts LBDR6, provide a pulse to the counter 755 at the end of each programme. Counter 755 may be pre-set to open contacts PC1 after a predetermined number of pulses. The opening of contacts PC1 disconnects coil PCR of a programme count relay and contacts PCR1 prevent energisation of coil SBO to open the small bell. The counter may readily be rendered out of action by operating a manual switch having contacts 756 in series with the circuit to the counter and to the coil PCR, and contacts 757 to by-pass contacts PCR1.

EXTRA MATERIAL CHARGE

If, at any time during a programme, it is desired to insert an extra material charge, an extra material switch associated with either the left material charge control or the right material charge control is pre-set to select a bin or bins in a group from which extra material is required. Upon pre-setting any one of the extra material switches of the left material charging control, a circuit is established between points 758 and 759 (FIG. 13J), and likewise on pre-setting any one of the extra material switches associated with the right material charging control a circuit is established between points 760 and 761. If an extra material charge from one or more of the bins from the left group is required a manually operable switch having contacts 762 is operated to extend a circuit from lead X110 through normally closed contacts PRPR8 and ECPR2, points 758 and 759, normally closed contacts REMPR4 to coil LEMPRCC of a left extra material relay of the latching type, which operates. Contacts of this relay prepare the left material charging control, which will be hereinafter described, to insert the charge of extra material as preselected by the extra material switches associated with that charging control. Should a material charge already be in the hopper 535 or in process of being delivered to that hopper the left material charging control allows that charge to continue and as soon as that charge of material has been discharged from the hopper 535 arranges for the extra material charge as preselected to be delivered thereinto. Thus the extra material charge from the left group of bins is inserted in the programme at the next available opportunity.

When the delivery of the selected extra charge of material into the weigh hopper commences a circuit is established between points 763 and 764 by contacts EMIR10 and MHER14 in the left material charging control and upon completion of any previously started skip hoisting operation a circuit is extended from lead X110 through contacts PRPR8, contacts NSI15 in series with contacts NMSCR4 or contacts SSI15 in series with contacts SMSCR4, contacts LEMPR3, point 763, point 764 to closing coil BELRCC of a bell extra load relay which is of the latching type and which operates and latches. The presence of contacts NMSCR4 and SMSCR4 in this circuit prevents the feeding of an extra material charge into a skip which is already charged. Since it is necessary for the left material charge selected relay to be operated in order to enable the left material charging control to release material from the weigh hopper 535, contacts BELR14 (FIG. 13G) in series with contacts LEMPR2 provide an alternative circuit to coil LAMCSR of the left material charge selected relay which operates and enables the extra material charge to be delivered into the appropriate skip. Contacts BELR9 and BELR10 (FIG. 13D) disconnect the coils 1BCCC and 2BCCC of the No. 1 and No. 2 bell counting relays and thus prevent the stepping of the moving contacts of the bell counting switch which is not required during the extra material charge. Contacts BELR5, contacts BELR16, contacts BELR17, contacts BELR18 and contacts BELR19 (FIG. 13G) disconnect the normal operating circuits for coils ACCSR, LAMCSR, RSMCSR, LSMCSR and RAMCSR from leads 727, 725, 728, 726 and 729 respectively thus preventing operation of any of the charge selected relays in accordance with the sequence of the programme preselected for the position of the moving contacts of the bell counting switch which they now occupy. Since it is necessary for the bell sequence switch to be stepped when the skip hoist is started to hoist the extra material charge and neither of the No. 1 and No. 2 bell counting relays will be operated, contacts BELR11 (FIG. 13C) provide an alternative circuit in parallel with contacts 1BC1 and 2BC1. Furthermore since it is not desired that the large bell should be opened at this stage contacts BELR5 (FIG. 13H) in parallel with contacts 1BC5 and contacts 2BC5 provide an alternative holding circuit for coil BDI of the bell dump interlock relay.

When the extra charge of material has been passed into the appropriate skip the closing coil NMSCRCC of the north skip charged relay or the closing coil SMSCRCC of the south skip charged relay will be energised and one or other of those relays will be operated. When, subsequent to starting of the skip hoist, the moving contacts of the bell sequence switch reach their third or eighth position a circuit is extended through bell sequence switch contacts BPS3C or BPS8C (FIG. 13J) contacts BELR12, and contacts LEMPR7 to trip coil LEMPRTC of the left extra material relay which then releases. When the moving contacts of the bell sequence switch reach their fifth or tenth position a circuit is extended through bell sequence switch contacts BPS5C, or contacts BPS10C, and contacts BELR13 to trip coil BELRTC of the bell extra load relay which then releases. The opening and closing of the various contacts of the left extra material and bell extra load relays restore normal working condition in the control and there then follows the appropriate charge as preselected for the sequence corresponding to the position now occupied by the moving contacts of the bell counting switch.

If an extra material charge is required from one of the bins in the right group of bins, a right extra material push button switch having contacts 767 is operated. Provided an extra material charge has already been preselected from the right material charging control, a circuit exists between points 760 and 761, and provided that a left extra material charge has not been called for nor an extra coke charge, a circuit is established through contacts PRPR8, contacts ECPR2, points 760 and 761, contacts LEMPR4 to closing coil REMPRCC of a right extra material relay of the latching type which operates and latches. The ensuing sequence of operations is similar to that described for a left extra material charge with the exception that the coil RAMCSR is energised through contacts REMPR2 and contacts BELR20 instead of coil LAMCSR. Trip coil REMPRTC is energised through contacts REMPR7 in place of trip coil LEMPRTC. As the material is drawn from the right material charging control, the circuit to coil BELRCC is completed between points 767 and 768 by contacts EMIR10 and MHER14 in the right material charging control.

EXTRA COKE CHARGE

A manually operable switch 769 and an extra coke relay are also provided to enable an extra coke charge to be inserted in any desired place in a programme. When the switch 769 is operated momentarily a circuit is extended to closing coil ECPRCC of the extra coke relay, provided that no extra material charge has already been called for and contacts LEMPR5 and contacts REMPR5 are closed. When either of the north and south skips is in the pit and neither has been charged with material and no charge of material from either the left or the right material charging control is in process of being delivered into the skip is the pit, a circuit exists between points 770 and 771 by contacts MHGR2 in the left material charging control and between points 772 and 773 by contacts MHGR2 in the right material charging control, and it will then be appropriate for the extra charge of coke to be fed to the skip in the pit. A circuit is therefore extended from lead X110, through contacts PRPR8, either through contacts NSI15 in series with contacts NMSCR4 or through contacts SSI15 and contacts SMSCR4, contacts ECPR3, points 770 and 771, points 772 and 773 to the closing coil BELRCC of the bell extra load relay. Contacts ECPR4 in series with contacts BELR15 (FIG. 13G) provide an alternative circuit for coil ACCSR of the coke charge selected relay. The ensuing sequence of operation is similar to that for an extra material charge. At a subsequent stage when the moving contacts of the bell sequence switch reach their third or eighth position a circuit is established through contacts BPS3C or BPS8C (FIG. 13J), contacts BELR12, and contacts ECPR5 to trip coil ECPRTC of the extra coke relay. The bell extra load relay is subsequently released as hereinbefore described.

PROGRAMME RESET

When it is desired to reset the sequences in a programme in order to establish a new programme, a manually operable switch is operated into a reset position. This switch has contacts 774 (FIG. 13G) which upon operation of the switch into a RESET position complete a circuit to coil PRPR of a programme reset proving relay which now operates provided that at this stage contacts ECPR6, LEMPR6 and REMPR6 are all closed indicating that no extra material charge or extra coke charge has been called for. Contacts PRPR4 open in the normal circuit to coil ACCSR of the automatic coke charge selected relay, and should a coke charge be in process at the time of operation of the switch, an alternative holding circuit for coil ACCSR is provided by contacts ACCSR5 in series with parallel connected contacts NSI16 and SSI16 of the limit switches 585 and 586 so as to enable the feeding of a coke charge already in progress to be completed. Contacts ACCSR10 in series with contacts PRPR9 prevent operation of either of the left or right material charge selected relays if a coke charge is in process. Contacts PRPR5 and PRPR6 disconnect the normal operating circuits for coils LAMCSR and RAMCSR from lines 725 and 729 respectively. On completion of any such coke charge and the starting of the skip hoist, contacts NSI16 and SSI16 will both be opened and the coil ACCSR disconnected.

After any such coke charge has been hoisted provision is made for any material charges waiting in either of the left or right material weigh hoppers to be delivered to the next skips. When the north skip is in the pit a circuit is established through contacts PRPR9, contacts ACCSR10, and contacts NSI26 to coil LAMCSR of the left material charge selected relay to enable any charge from the left material weight hopper 535 to be fed into the north skip and similarly when the south skip is in the pit circuit is established through contacts PRPR9, contacts ACCSR10 and contacts SSI26 to coil RAMCSR of the right material charge selected relay to enable any charge in the right material weight hopper to be fed into the south skip.

When the last material charge has been discharged from the left material charging control and the moving contacts of its material programme switch have been driven to their first or starting position, a circuit is established between points 775 and 776 (FIG. 13H). In like manner under similar circumstances a circuit is established between points 777 and 778 by the right material charging control. When the skip hoist has been started with the last material charge, both of the limit switches 585, 586 will be released, and when the small bell has been opened and the small bell relay operated, a circuit is established from lead X110 contact strip 712 in the bell counting switch, moving contacts 711, 721 to lead 723 and thence through contacts SBOR7, contacts PRPR8, contacts NSI27, contacts SSI27, points 775 to 776, points 777 to 778 to closing coil PRRCC of the programme reset relay which then operates. Operation of the programme reset relay bring about opening of the large bell and the subsequent return of the moving contacts of the bell counting switch to their first or starting position as previously described. Thereupon the trip coil PRRTC of the programme reset relay is energised and the programme reset relay released. The selector or presetting switches F, G, and those designated H and which will be subsequently described in connection with the material charging control can now be reset to establish a new programme. Thereupon the programme reset switch can be restored to its OFF position and contacts 774 (FIG. 13G) opened to disconnect coil PRPR of the programme reset proving relay which then releases and restores conditions to normal and enables the normal sequence of operations to be followed automatically.

MATERIAL CHARGING CONTROL

Referring now to FIGS. 14, 15, 16, 17 and 18, the material programme control includes a material programme switch which may be of the type described and illustrated in FIGS. 4 and 5 of British patent specification No. 693,205. The switch involves two sets of moving contacts 501, 502 which can be driven by an electric motor 503. The first set of moving contacts 501 (FIGS. 14B and 14C) includes a main contact 504, engaging a common contact bar 505 and also includes additional moving contacts 506, 507, 508. The second set of moving contacts 502 comprises a feed contact 510 and bin selector contacts 511, 512, 513. Each of the moving contacts 506, 507, 508, 510, 511, 512, 513 cooperates with an individual set of fixed contacts which it will be understood are disposed along arcs about a common centre, but for the sake of convenience on the circuit diagram, the arcs are indcated in columns and rows. The moving contact 506 co-operates with fixed contacts in a first column, moving contact 507 with contacts in the second column, and so on.

The fixed contacts in the first, third, fifth and other odd-numbered rows in the first column are connected to lead 518, and the contacts in the second, fourth, sixth and other even-numbered rows in the first column are connected to a common lead 519. A lead 520 is connected directly to the first contact in the second column and each of the other contacts in that column can be connected through end of programme selector switches F1 to F31, each of which is associated with an individual contact in that column in the row succeeding that of the sequence to which it relates, to that lead 520 or to a lead 547. The fixed contact in the first row of the third column is connected to lead 521. Each of the fixed contacts in the fourth column is connected to contacts in a charge selector switch G1 to G32, the moving contacts of all these switches being connected through lead X114 to a direct current control supply on power supply line 703.

The control system provides for a programme of up to 32 skip charges and there are, therefore, 32 fixed contacts in each column of the material programme switch. Since the charge for any skip can, by virtue of the transfer chute, be drawn from either the left or right group of bins, it is necessary to provide 32 bin selector switches for each material programme switch. As there are three bins in the left group and three bins in the right group, in each material programme switch each such switch takes the form of three switches for each position, each switch being individual to a bin. Each of the switches is a three-position switch having an OFF position and two ON positions. In order to enable either of two weights of material to be fed selectively to the weigh hopper from each bin, one of the ON positions, designated W1, corresponds to the first weight of material and the other, designated W2, to a second weight of material. There is no necessity for the first and second weight of material from any one bin to be the same as the first and second weights of material from another bin and the weighing mechanism associated with the weigh hopper can be adapted to provide for up to six differing weights of material to be fed therein.

The bin selector switch H1 associated with the first position comprises three switches H1A, H1B, H1C. The switch H32 associated with the 32nd position comprises three switches H32A, H32B, H32C. Each of the switches designated H1A to H32A can connect the associated fixed contact in the fifth column to the common line 522 for a first weight or to line 523 for a second weight from the first bin designated 11L. Likewise each of the switches H1B to H32B can connect their associated fixed contact in the sixth column selectively to common lead 524 for a first weight, or to line 525 for a second weight from the second bin designated 12L, and each of the switches H1C to H32C can connect their associated fixed contact in the seventh column selectively to common line 526 for a first weight or to common line 527 from a second weight from the third bin designated 13L.

MATERIAL FROM BIN 11L

If, as has been suggested, it is assumed that the first position of the material programme switch associated with the left group of bins requires a first weight charge of material from bin 11L, switch G1 will have its moving contact in the position denoted by the letter M. Switch H1A will have its moving contact in the position designated W1 connected with lead 522 and switches H1B and H1C will have their moving contacts in their OFF positions and will connect with neither of the two common leads, 524 and 525, 526 and 527 respectively.

With the moving contacts 501, 502 in the first position a circuit exists from lead X114 through the contacts of switch G1, moving contacts 510, 511, contacts of switch H1A to lead 522, through normally closed contacts EMIR1 (FIG. 14D) of an extra material interlock relay to coil 11W1MSR of a bin 11L first weight material selector relay, normally closed contacts MPRR1 of a material programme re-set relay to lead X115. Upon operation of the bin 11L first weight material selection relay contacts 11LW1MSR1 (FIG. 14E) complete a circuit between leads X114 and X115 for coil 11LMSR of a bin 11L material start relay which operates and contacts 11LMSR1, through normally closed contacts 12LMSR3 and 13LMSR4 of bin 12L and bin 13L material start relays respectively, and normally closed contacts MDCSR1 of a material double charge selected relay to coil MSCSR of a material single charge selected relay which then operates. A circuit also exists from lead X114 through common contact bar 505, moving contacts 504, 506, lead 518, normally closed contacts MHFR1, of a material hopper full relay to closing coil 1MCCRCC of a first material charge counting relay. This relay is of the latching type and upon energisation of its closing coil operates and is latched in the operated position until its trip coil 1MCCRTC is energised. Contact 1MCCR1 disconnects a circuit to the trip coil 2MCCRTC of a second material charge counting relay which is also of the latching type.

Referring now to FIG. 16, as the weigh hopper is initially empty, interlock contacts Z1 of the weighing device indicated generally at 500 are closed, and complete a circuit through normally closed contacts MMRS1 of a material master start relay to closing coil MHERCC of a materal hopper empty relay of the latching type. In addition the hopper gate is closed and contacts MHGLS (FIG. 14F) of a material hopper gate limit switch are closed to complete a circuit to coil MHGPR of a material hopper gate proving relay. Upon operation of the first material charge counting relay, contatcs 1MCCR2 complete a circiut through normally closed contacts MEFR1 of a material emergency full relay, normally closed contacts MHFR3 of the material hopper full relay, normally closed contacts MCSR1 material check selection relay, normally closed contacts MRCR1 of a material weight recording completed relay, normally closed contacts MTER1 of a material weight tolerance exceeded relay and now closed contacts MHGPR1 of the material hopper gate proving relay to coil MMSR of a material master start relay which now operates.

It will be noted that when a circuit was extended from switch H1A to coil 11LW1MSR, a circuit was also extended through de-coupling rectifiers and normally closed contacts 11LW1MSR2 to coil MCSR (FIG. 14D) of the material check selection relay. If the bin 11L first weight material selection relay does not operate, the coil MCSR will be energised and its contacts MCSR1 would prevent the operation of the material master start relay. It will be observed that similar circuits exist from the other common leads 523, 524, 525, 526, 527, to the coil MCSR to enable the material check selection relay to check that the selected bin weight selection relays have operated.

Upon operation of the material master start relay contacts MMSR2 (FIG. 14H), in series with contacts MHER1 complete a circuit to the trip coil MHERTC of the material hopper empty relay, which then releases and, through contacts MHER2, (FIG. 14F) extends a circuit through normally closed contacts 12LMSR6 in parallel with contacts 13LMSR8 of the 12L and 13L bin material start relays, normally closed contacts MDFTR1 of material double feed timing relay, contacts MRCR2 in parallel with contacts MSCSR2 and contacts 11LMSR9 to coil 11LMFIR of an 11L bin material feed initiate relay which operates. Contacts 11LMFIR1 (FIG. 15) complete a circuit through contacts 11LWIMSR3 to coil 11LW1MWCR. Contacts 11LW1MWCR1, 11LW-1LMCR2, 11LW1MWCR3, 11LW1MWCR2 provide interlock signals the weighing mechanism 500, indicating that the first weight of material from bin 11L is to be fed to the weigh hopper.

Contacts 11LMFIR2 (FIG. 17A) complete a circuit through contacts MMSR3 and normally closed contacts MHER3 to coil 11LMFSR of bin 11L material feed start relay which operates and through its normally open contacts 11LMFSR1 in series with timed opening normally closed contacts 11LMFSR2 and normally closed contacts MSDR1 of a material slow down relay completes a circuit to coil 11LMCHS of a bin 11L material conveyor high speed contactor which operates. Contacts 11LMCHS1, 11LMCHS2, 11LMCHS3 (FIG. 14A) extend a circuit from power line 701 to a motor 530 to drive the conveyor 531 at high speed. Contacts 11LMFSR3, 11LMFSR4 (FIG. 17A) complete a circuit to coil 11LMCB of brake release solenoid to release the brake 532 on the conveyor 531.

Contacts 11LMCHS4 complete circuit to coil 11LMCRHS of a relief relay and when the conveyor has run up to a predetermined speed, contacts 11LMCSS of a centrifugal switch complete a circuit to coil 11LMCSSR of a bin 11L material conveyor speed relay which operates and through contacts 11LMCSSR1, in series with contacts 11LMCHS5 provide a holding circuit for coil 11LMCHS against the opening of contacts 11LMFSR2. Contacts 11LMCSSR2 (FIG. 17B) complete a circuit to coil 11LMVSR of a bin 11L material vibro feeder start relay which operates and, after a short time delay, closes contacts 11LMVSR1 to complete a circuit through contacts 11LMFSR5 to coil 11LMVF of a bin 11L material vibro feeder contactor which operates and through contacts 11LMVF1 and, 11LMVF2 (FIG. 14A), connects driving unit 533 of the vibro feeder 534 to power lines 701 through resistors R1 and R2, and through contacts 11LMVF4, 11LMVF5, 11LMVF6 and 11LMVF7 (FIG. 15) sends signals to the weigher 500 to indicate that the vibro feeder is operating. Contacts 11LMVF3 (FIG. 17B) complete a circuit to coil 11LMVAR of an accelerating relay which operates and, after a short time delay, closes contacts 11LMVAR1 to complete a circuit through normally closed contacts MSDR2 to coil 11LMVFHS of an accelerating contactor which operates and through contacts 11LMVFHS1, 11LMCFHS2, (FIG. 14A) short-circuits the resistors R1 and R2 to bring the vibro feeder 534 up to a high speed.

Material is now withdrawn from the bin 11L by the vibro feeder 534 and conveyed by the conveyor 531 into the weigh hopper 535. When the weight of material in the hopper approaches the selected first weight for material from bin 11L, contacts 11L1 (FIG. 16) in the weigher 500 are closed and complete a circuit through contacts MMSR4 to closing coil MSDRCC of a slow-down relay of the latching type. The slow-down relay operates and through contacts MSDR1 (FIG. 17A) interrupts the circuit to coil 11LMCHS which releases, and through contacts

11LMCHS1, 11LMCHS2, 11LMCHS3

(FIG. 14A), disconnects the motor 530 and, through contacts 11LMCHS4 (FIG. 17A) disconnects coil 11LMCRHS of the conveyor relay, which releases. Also contacts MSDR2 open to disconnect the coil 11LMVFHS of the vibro feeder high speed contactor which releases to reinsert resistors R1 and R2 in circuit and slow down the vibro feeder 534. After a short time delay contacts 11LMCRHS1 close and, through contacts MSDR3, complete a circuit to coil 11LMCSRLS of a bin 11L material conveyor low speed start relay which operates. In series with contacts 11LMFSR6 normally open contacts 11LMCSRLS1, in series with timed opening normally closed contacts 11LMCSRLS2 complete a circuit to coil 11LMCLS of a bin 11L material conveyor low speed contactor which operates. Contacts 11LMCLS1, 11LMCLS2, 11LMCLS3 (FIG. 14A) connect motor 536 to power line 701 to drive the conveyor 531 at a low speed. Contacts 11LMCLS4 (FIG. 17A), in series with contacts 11LMCSSR3 provide a holding circuit for coil 11LMCLS against the opening of the contacts 11LMCSRLS2. Contacts 11LMCLS5 (FIG. 17B) complete a circuit to coil 11LMCRLS of a conveyor low speed relay.

The vibro feeder 534 is now operating at a reduced speed and the conveyor 531 is being driven at a low speed and material continued to be passed into the weigh hopper 535. When sufficient weight of material is in the weigh hopper, contacts 11L2 (FIG. 16) in the weigher 500 are closed and, through contacts MMSR5, complete a circuit to coil MHFRCC of a hopper filled relay of the latching type which operates. Contacts MHFR3 (FIG. 14F) open the disconnect the circuit to coil MMSR of the material master start relay which releases slowly. Contacts MMSR3 (FIG. 17A) disconnect the circuit to coil 11LMFSR of the material feed start relay which releases and, through contacts 11LMFSR6, disconnects the coil 11LMCLS of the conveyor low speed contactor to stop the conveyor 531. On the release of this contactor, contacts 11LMCLS5 (FIG. 17B) disconnect the coil 11LMCRLS of the conveyor low speed relay, which releases, and opens its contacts 11LMCRLS1, 11LMCR-LS2, (FIG. 17A) which are in parallel with contacts 11LMFSR3, 11LMFSR4 respectively, to re-apply the brake after the motor 536 has been disconnected. Contacts 11LMFSR5 (FIG. 17B) disconnect the circuit to coils 11LMVF and 11LMVAR of the vibro feeder contactor and accelerating relay respectively, both of which release to stop the vibro feeder 534. A recorder 537 associated with the weigher 500 is now operated to record the weight of material in the weigh hopper 535. When the weight recording is completed contacts 11L3 (FIG. 16) are closed to complete a circuit through contacts MHFR4 to coil MRCRCC of a recording completed relay of the latching type, and which operates. The material in the hopper is now ready to be discharged into a skip and contacts MRCR3 (FIG. 14G) in series with contacts MHFR5 prepare a circuit to coil MHGR of a material hopper gate relay and coil MHG of a material hopper gate contactor.

RELEASE OF MATERIAL FROM WEIGH HOPPER

When a skip is in the pit and the transfer chute has been operated into the position appropriate to the skip which is in the pit, and the bell counting switch is in the position corresponding to the sequence at which this material is required, a circuit is completed between points 538 and 539 (FIG. 14G). Such circuit comprises normally closed contacts NCSCR1, in series with normally closed contacts SCSCR1 of the north skip and south skip coke skip charging relays associated with the north and south coke charging controls, contacts LAMCSR1 in parallel with contacts LSMCSR1 of left group automatic material and scrap and material charge selecting relays in the bell counting circuit, and normally closed contacts NMSCR1 of a north skip scrap and material charge relay, in series with contacts NTCPR1 of a transfer chute to north skip proving relay (both in the bell counting control) and in series with contacts NSI1 of the limit switch 585 associated with the skip hoist and which is operated when the north skip is in the pit, or normally closed contacts SMSCR1 of a south skip scrap and material charge relay in series with contacts CTCPR1 of a south skip scrap charge relay and a transfer chute to south skip proving relay (both in the bell counting circuit) in series with contacts SSI1 of limit switch 586 associated with the skip hoist and which is operated when the south skip is in the pit. Upon completion of the circuit between points 538 and 539 a circuit is extended to coil MHGR of a material hopper gate contactor. After a short time delay contacts MHGR1 close to complete a circuit to coil MHG of a material hopper gate contactor which then operates. Contacts MHG1 in series with contacts MHFR6 provide a holding circuit for the coils MHGR and MHG and contacts MHG2 and MHG3 complete a circuit to the solenoid 540 controlling the operator which now opens the hopper gate 542 to permit material to be discharged from the weight hopper 535 through the transfer chute 543 into the appropriate skip.

STEPPING OF MATERIAL PROGRAMME SWITCH

When the material has been discharged from the weigh hopper 535 and the hopper is empty, contacts Z1 (FIG. 16) in the weigher 500 associated therewith are closed to complete a circuit through contacts MMSR1 to the closing coil MHERCC of the material hopper empty relay which operates and latches. Contacts MHER2 (FIG. 14F) disconnect the circuit to coil 11LMFIR of the bin 11L material feed initiating relay. A circuit is now completed from line 520 (FIG. 14E) through normally closed contacts MDFTR2, contacts MHFR7, contacts MHER4, contacts 1MCCR3, normally closed contacts MPRR2, and normally closed interlock contacts BELR1 and PRPR1 in the bell counting circuit to coil MPSR of the material programme switch relay, which operates. Contacts MPSR1, MPSR2, MPSR3 (FIG. 14A) extend the motor 503 to supply line 701 and contacts MPSR4 (FIG. 14E) complete a circuit to coil 544 of a brake release mechanism associated therewith, to drive the moving contacts of the material programme switch from their first position to their second position. When the moving contacts reach their next position the moving contact 506 (FIG. 14B) is disconnected from common lead 518 and is connected to common lead 519 and a circuit is extended through normally closed contacts 2MCCR1 (FIG. 14E) to trip coil 1MCCRTC of the first material charge counting relay which then releases and through contact 1MCCR3 disconnects the previous circuit to coil MPSR of the material programme switch relay which releases and disconnects the driving motor 503 and reapplies the brake. In addition the circuit previously extended through switch G1 and switch H1A to coil 11LW1MSR is broken and this relay is no longer held over the original circuit. If no material charge is pre-selected for the second sequence, circuits will not be provided by the switches G2 and H2 to any of the common lines 522 to 527 and none of the coils 11LW1MSR, 11LW2MSR, 12LW1MSR, 12LW2MSR, 13LW1MSR, 13LW2MSR and MCSR (FIG. 14D) will be energized, and as a result, none of the coils 11LMSR, 12LMSR, 13LMSR (FIG. 14E) will be energized. As a consequence a fresh circuit will be established to coil MPSR of the material programme switch relay through moving contact 507, switch F2 (provided its moving contacts are in either of the top and middle positions designated LB and N respectively), lead 520, normally closed contacts MCSR2, 11LMSR3, 12LMSR5, 13LMSR6, MPRR2, BEL1, PRPR1 and that relay will operate to reconnect the motor 503 and drive the moving contacts of the material programme switch to their third position.

The moving contacts of the material programme switch will thus be advanced from one position to another and each position will be tested to see whether a material charge has been pre-selected for that position and the moving contacts will advance until they reach a position at which a material charge has been pre-selected from a bin in the group of bins with which it is associated.

START OF NEXT MATERIAL REQUIRED

When the moving contacts of the material programme switch have reached the next position at which a material charge has been pre-selected from a bin in the relevant group, the hopper gate will still be open but the hopper empty. A circuit will then be completed (FIG. 14G) through contacts MHG4, MHER5, 1MCCR4, 2MCCR4, one or more of contacts 11LMSR10, 12LMSR10, 13LMRS9 to trip coils MHFRTC and MSDRTC of the material hopper full and slow down relays, respectively, both of which will release. Upon release of the material hopper full relay, contacts MHFR5 disconnect the original operating circuit to coils MHGR and MHG and contacts MHFR6 interrupt the holding circuit for those coils so that the material hopper gate relay and material hopper gate contactor release and, through contacts MHG2 and MHG3, to enable the operator 540 to close the gate 542. When the gate is again closed the limit switch is re-operated and the hopper gate proving relay re-operated. Contacts of this relay provide an interlock starting signal to the bell counting circuit to re-start the skip hoist.

With the release of the material hopper full relay, contacts MHFR11 (FIG. 14H) complete a circuit through contacts MRCR4, normally closed contacts MTER3, contacts MHER11 and normally closed contacts MTER4 to the trip coil MRCRTC of the recording completed relay which now releases.

Upon release of the material hopper full relay contacts MHFR1 and MHFR2 (FIG. 14E) are closed to permit energisation of the closing coil 1MCCRCC or the closing coil 2MCCRCC of the material charge counting relays dependent upon whether the moving contacts of the material programme switch are in an odd-numbered position or an even-numbered position. Upon operation of either of these counting relays a circuit is completed (FIG. 14F) through contacts MEFR1, either contacts 1MCCR2 or contacts 2MCCR2, in series with contacts MHFR3, MCSR1, MRCR1, MTER1, MHGPR1 to the coil MMSR of the material master start relay which operates and enables a further charge of material of appropriate weight to be withdrawn from the appropriate bin and delivered direct or by means of the appropriate conveyor into the weighing hopper in a manner similar to that previously described. Additionally contacts MMSR2 (FIG. 14H) complete a circuit through contacts

83

MHER1 to trip coil MHERTC of the hopper empty relay to release it.

MATERIAL FROM BIN 12L

If, in the first position as hereinbefore described, the material to be charged had been pre-selected to be withdrawn from bin 12L, the moving contacts of switch H1B being in the appropriate position, the procedure would have been similar to that described with the exception that motor 550 would have been energised to drive conveyor 551 at high speed, brake 552 being released and that operator 553 would have been energised to drive vibro feeder 554 at high speed and that subsequently motor 556 would have been energised to drive the conveyor 531 at low speed and the operator 533 retarded by insertion of resistors R3 and R4 to deliver the desired charge of material into the weigh hopper 535, the motors 550 and 556 and the operator 553 being controlled in a manner substantially the same as that discolsed in FIG. 17.

MATERIAL FROM BIN 13L

If, however, the material charge were to be withdrawn from bin 13L the procedure is slightly different as no conveyor is needed for such material charge as the vibro feeder 574 driven by operator 573 discharges directly into the weigh hopper 535. The control of the vibro feeder 574 is illustrated in FIG. 18.

When a charge from bin 13L is pre-selected one or other of the common lines 526, 527 (FIG. 14B) will be connected to lead X114 through the appropriate switch G, moving contacts 510, 513 and the appropriate switch H so that either coil 13LW1MSR or coil 13LW2MSR (FIG. 14D) will be energised, and one or other of the bin 13L first weight or second weight material selected relays will operate and, through contacts 13LW1MSR1 or contacts 13LW2MSR1 (FIG. 14E) complete a circuit to coil 13LMSR of 13G bin material start relay. If, at this time, material is only to be drawn from bin 13L, a circuit is extended through contacts 13LMSR2 and normally closed contacts 12LMSR4, 11LMSR2 and contacts MDCSR1 to coil MSCSR of the material single charge selected relay which then operates in the manner previously described. Upon operation of the material master start relay and the subsequent release of the material hopper empty relay, a circuit is extended through contacts 11LMSR4, in parallel with contacts 12LMSR6, contacts MHER2, MDFTR1, MSCR2, normally closed contacts 11LMSR6 and 12LMSR8 and contacts 13LMSR7 to coil 13LMFIR of the bin 13L material feed initiate relay. In a manner analogous to that illustrated in FIG. 17 in connection with the withdrawal of material from bin 11L upon operation of the bin 13L material feed initiate relay, appropriate signals are sent to the weighing unit 500 associated with the weigh hopper 535 indicating that material is to be drawn from bin 13L and whether it is to be the first or the second weight.

Referring now to FIG. 18 a circuit is now extended through contacts MMSR6, normally closed contacts MHER6, contacts 13LMFIR2 to coil 13LMVF of the bin 13L vibro feeder contactor which operates and through contacts 13LMVF1, 13LMVF2 (FIG. 14A), connects the driving unit 573 of the vibro feeder 574 to line 701. Contacts 13LMVF3 (FIG. 18) in series with normally closed contacts MSDR4 complete a circuit to coil 13LMVFHS of bin 13L vibro feeder high speed relay which operates to speed up the vibro feeder by short circuiting series resistors R5, R6 (FIG. 14A), through contacts 13LMVFHS1, 13LMFHS2. As the vibro feeder operates, material is discharged directly into the weigh hopper 535 and as the predetermined desired weight of material in the hopper is approached contacts 13L1 in the weigher 500 are closed to complete a circuit to the closing coil MSDRCC of the slow-down relay, which operates, and through the opening of its contacts MSDR4, releases the vibro feeder high speed relay to slow down the vibro feeder. When the predetermined weight of material has been received in the weigh hopper 535, contacts 13L2 in the weigher 500 close and through contacts MMSR5, complete a circuit to the closing coil MHFRCC of the material hopper full relay which operates and latches. The opening of contacts MHFR3 disconnect the coil MMSR of the material master start relay which releases and, through contacts MMSR6, disconnects coil 13LMVF of the vibro feeder contactor which itself releases to stop the vibro feeder. The sequence of operations is subsequently substantially as previously described.

RIGHT GROUP MATERIAL CHARGING CONTROL

The material charging control illustrated in FIGS. 14, 15, 16, 17 and 18 by way of example, is that concerned with the left group of bins and the material charging control associated with the right group of bins is similar and operates in substantially the same manner with the exception that, as will be noted from FIGS. 10, 11 and 12 in the right group of bins that designated 11R effectively comprises two sub-bins 11RA and 11RB, each having its own vibro feeder 601, 602, both the vibro feeders discharging to common conveyor 603. A suitable control circuit for the drive to the conveyor 603 and the operators of the vibro feeders 601, 602, is illustrated in FIG. 19.

In the description which follows it is to be understood that contacts and coils, without the prefix "11R" refer to relays and contacts of the material charging control associated with the right group of bins and which will correspond to those in the material charging control associated with the left group of bins but, in order to prevent confusion, since the designations of such relays are similar to one another, the suffix number included in the reference to a set of contacts has wherever possible been increased by ten.

The start of the withdrawal of material from bin 11R is initiated by the operation of the bin 11R material feed initiating feed relay and its contacts 11RMFIR1 complete a circuit through contacts MMSR13 and normally closed contacts MHER13 to coil 11RMFSR of a bin 11R material feed start relay which operates. In series with normally closed contacts MSDR11 of the slow-down relay normally open contacts 11RMFSR1, in series with timed opening normally closed contacts 11RMFSR2 of the material feed start relay complete a circuit to coil 11RMCHS of the bin 11R material conveyor high speed contactor which operates and connects to power line 701, a motor 604, to drive the conveyor 603 at high speed. Contacts 11RMFSR3 and 11RMFSR4 complete a circuit to coil 11RMCB to release the brake on the conveyor. Contacts 11RMCHS4 complete a circuit to coil 11RMCRHS of a conveyor high speed relay and, when the conveyor has run up to a predetermined speed, contacts 11RMCSS of a centrifugal switch, close to complete a circuit to coil 11RMCSSR of a conveyor speed relay which operates and, through contacts 11RMCHS5 in series with contacts 11RMSHS5, provides a holding circuit for the conveyor high speed contactor and, in addition, contacts 11RMCSSR2 complete a circuit to coil 11RMVSR of a vibro feeder start relay, which operates. After a short time delay contacts 11RMVSR1 close and, in series with contacts 11RMFSR5, extend a circuit to two moving contacts of a double-pole selector switch SS to enable either or both of the vibro feeders to be used. With moving contacts in their diagrammatically upper position only one vibro feeder is used; with the moving contacts in their diagrammatically middle position, only the other vibro feeder is used whilst, with the moving contacts in their diagrammatically lower positions, both feeders are used. When both feeders are in use a circuit is extended from switch SS to coil 11RMVFA of a bin 11RA vibro feeder contactor which operates to connect the operator of vibro feeder 601 to power line 701 through series resistors. Contacts 11RMVFA3 complete a circuit to coil 11RMVARA of an accelerating relay which operates, and after a short time interval, through contacts 11RMVARA1 in series with contacts MSDR12, extends a circuit to coil 11RMVFAHS of an accelerating contactor which operates to short-circuit the series resistors and enable the vibro feeder 601 to be operated at full speed. In a similar manner a circuit is extended from switch SS to coil 11RMVFV of a bin 11RB vibro feeder contactor, which operates to connect the operator of vibro feeder 602 to power line 701. Contacts 11RMVFB3 complete a circuit to coil 11RMVARB of an accelerating relay which operates. After a short time delay contacts 11RMVARB1 close and in series with contacts MSDR14 complete a circuit to coil 11RMVFBHS of a vibro feeder high speed contactor which operates to short-circuit resistors in series with the operator of vibro feeder 602 and enable them to operate at full speed. As the weight of material in the weigh hopper approaches the predetermined weight the slow-down relay is operated as through contacts MSDR12 and MSDR14 releases the vibro feeder high speed contactors to reinsert the series resistors in circuit with the operators of the vibro feeders and reduce the speed thereof. The opening of contacts MSDR11 disconnects the circuit to coil 11RMCHS and the conveyor high speed contactor releases to disconnect the motor 604, contacts 11RMCHS4 open to release the conveyor high speed relay. After a short time delay contacts 11RMCRHS1 close and in series with contacts MSDR13 complete a circuit to coil 11RMCSRLS of a conveyor low-speed relay which operates. In series with contacts 11RMFSR6 normally open contacts 11RMCSRLS1 in series with timed opening normally closed contacts 11RMCSRLS2 complete a circuit to coil 11RMCLS of a bin 11R conveyor low-speed contactor which operates, to connect to power line 701 the motor 605 to drive the conveyor 603 at a low speed. Contacts 11RMCLS5 complete a circuit to coil 11RMCRLS of a conveyor low-speed relay which operates and through contacts 11RMCLS1 and 11RMCLS2, provide a holding circuit for the brake release coil 11RMCB. Contacts 11RMCLS4 in series with contacts 11RMCSSR3 provide a holding circuit for the conveyor low speed contactor against the opening of contacts 11RMCSRLS2.

When the predetermined selected weight of material has been received on the weigh hopper, the material hopper full relay is operated as previously described, to release the material master start relay. The opening of contacts MMSR13 releases the material feed start relay, and the opening of contacts 11RMFSR5 results in the release of the vibro feeder contactors, the vibro feeder accelerating relays and vibro feeder accelerating contactors to stop the vibro feeders. The opening of contacts 11RMFSR6 results in the opening of the conveyor low-speed contactor to disconnect motor 605 and subsequent reapplication of the brake to the conveyor 603.

DOUBLE MATERIAL CHARGE

The material charge control makes provision for a material charge to be drawn from more than one bin at any one sequence and, in the event of charges from two bins being preselected, for the charge from one bin to be fed into the weigh hopper 535 until the selected weight of material has been received and then for the other to be delivered until the selected weight of the material from the second bin has been received. If, for the sake of example, the second sequence in the programme required a second weight of material from bin 12L and a first weight of material from bin 13L, switch G2 would have its moving contact in its diagrammatically centre position, switch H2A would have its moving contact in its diagrammatically middle position, switch H2B its moving contact in its diagrammatically lower position and switch H2C its moving contact in its upper position. When the moving contacts were advanced to their second position, circuits would be established between lead X114 and common leads 525 and 527 and thence to the coils 12LW2MSR and 13LW1MSR (FIG. 14D) of bin 12L second weight material selector relay and bin 13L first weight material selector relay respectively, both of which should operate. Circuits are established by contacts 12LW2MSR1 and contacts 13LW1MSR1 (FIG. 14E) to coils 12LMSR and 13LSMR of bin 12L material selector relay and bin 13L material selector relay respectively, both of which relays operate. The circuit from lead X114 to coil MSCSR of the material single charge selector relay is broken by contacts 12LMSR3 and 13LMSR4 and by contacts 13LMSR3 and by contacts 12LMSR4, but instead a circuit is completed through contacts 12LMSR1 and contacts 13LMSR1 through normally closed contacts MSCSR1 to coil MDCSR of a material double charge selector relay, which operates. It will be appreciated that the circuit would be completed to this coil MDCSR in similar manner if any other two of the three material start relays had been operated. Upon the release of the material hopper empty relay, as previously described, a circuit is completed (FIG. 14F) through normally closed contacts 11LMSR4, contacts MHER2, normally closed contacts MDFTR1 and normally closed contacts MRCR2, normally closed contacts 11LMSR5 and contacts 12LMSR7 to coil 12LMFIR of bin material feed initiate relay, which operates. The operation of the bin 12L material feed initiate relay results in the appropriate signals being sent to the weigher 500 associated with the weigh hopper 535 and the initiation of the drive to conveyor 551 and vibro feeder 554 associated with bin 12L substantially as hitherto described.

As the predetermined selected weight is approached, contacts 12L1 (FIG. 16) in the weigher 500 are closed to operate the material slow-down relay and bring about reduction of speed of operation of the vibro feeder 554 and conveyor 551. When the preselected weight of material has been received in the weigh hopper contacts 12L2 in the weigher 500 are closed to bring about energisation of the coil MHFRCC of the material hopper full relay. The opening of contacts MHFR3 (FIG. 14E) disconnects the coil MMSR of the material master start relay which releases to stop the vibro feeder 554 and the conveyor 551. The weight of material is now recorded in the recorder 357 and, upon completion of the recording, contacts 12L3 (FIG. 16) in the weigher 500 are closed to energise the closing coil MRCRCC of the recording-completed relay.

Contacts MRCR2 (FIG. 14F) now open and disconnect the coil 12LMFIR of the bin 12L material feed initiate relay which releases. Contacts MRCR4 (FIG. 14H) now extend a circuit through normally closed contacts MTER3, contacts MDCSR3, normally closed contacts MHER7, normally closed contacts MDFTR3, normally closed contacts MHG5, lead X116, to the trip coils MHFRTC and MSDRTC (FIG. 14G) of the material hopper full and slow-down relays respectively, both of which release.

Upon release of the material hopper full relay a circuit is extended from contacts MDCSR3 (FIG. 14H) through normally closed contacts MHER8, normally closed contacts MHFR8 and normally closed contacts MSDR5 to closing coil MDFTRCC of a material double feed transfer relay which now operates and latches. It will be appreciated that whereas, under normal single charge working, a circuit would have been prepared for coil MHGR of the material hopper gate relay, on operation of the material hopper full relay and material recording completed relay, through their contacts MHFR5 and MRCR3, such circuit is interrupted by contacts MSCSR3 which are open, as the material single charge relay is not operated. Upon operation of the double feed transfer relay contacts MDFTR5 complete a circuit through normally closed contacts MTER4 to trip coil MRCRTC of the recording-completed relay, which releases.

With the operation of the double feed transfer relay, contacts MDFTR1 (FIG. 14F) are opened and contacts MDFTR6 are closed and a circuit is extended through normally closed contacts 11LMSR4, normally closed contacts MHER2, contacts MDCSR2, contacts MDFTR6, normally closed contacts MRCR5, contacts 12LMSR9, and contacts 13LMSR7 to coil 13LMFIR of the bin 13L material feed initiate relay, which operates. The operation of the bin 13L material feed initiate relay causes appropriate signals to be sent to the weigher 500 to indicate that material is to be fed from bin 13L and that the weight of such material is to be the first weight for that bin and the vibro feeder 574 is operated initially at high speed to deliver material into the weigh hopper 535.

As the selected weight of material is approached, contacts 13L1 (FIG. 16) in the weigher 500 are closed to bring about operation of the slow-down relay as a result of which the vibro feeder 574 is operated at reduced speed.

When the predetermined weight of material has been received in the check weigh hopper, contacts 13L2 are operated to bring about operation of the material hopper full relay. The opening of contacts MHFR2 disconnects the circuit to coil MMSR of the material master start relay and results in the stopping of the vibro feeder 574. The weight of material is now recorded in the recorder 537 and when the recording is complete contacts 13L3 are closed to energise coil MRCRCC of the recording-completed relay. The circuit to coil MHGR (FIG. 14G) of the material hopper gate relay is now prepared from lead X114 through contacts MTER2, MHFR5, MDFTR4, MDCSR4, and MRCR3 to point 538 and will be extended to point 539 when the transfer chute is in the required position, the appropriate skip is in the pit and the bell counting circuit indicates that the sequence corresponding to the position of the material programme switch has been reached. Thereupon the material hopper gate relay and hopper gate contactor will be operated as previously described to open the hopper gate and deliver the material through the transfer chute into the appropriate skip.

When the weigh hopper 535 is empty contacts Z1 in the weigher 500 are closed to energise the closing coil MHERCC of the material hopper empty relay which then operates. Contacts MHER9 (FIG. 14H) in series with contacts MDFTR7 complete a circuit to trip coil MDFTRTC of the material double feed transfer relay, which then releases. With the release of the material double feed transfer relay contacts MDFTR2 (FIG. 14E) are closed and a circuit is extended to coil MPSR of the material programme switch relay to energise the motor 503 and drive the moving contact of the programme switch on to the next position at which a material charge is selected and the sequence of operations is thereafter as previously described.

It will be noted that contacts 11LMSR4, 12LMSR6, and 13LMSR8 are connected in parallel with one another in the circuit to the coils 11LMFIR, 12LMFIR and 13LMFIR of the material feed initiate relays and thereby prevent charges from more than two bins being delivered at any one sequence.

HOPPER GATE JIGGING

If, when the solenoid 540 is disconnected, with a view to closing the hopper gate, the complete closure of the hopper gate should be prevented, for example by reason of an obstruction therein, the material charging control provides for the solenoid to be repeatedly re-energised to open and close the hopper gate with a view to removing such obstruction. To this end the hopper gate contactor and the hopper gate relay co-operate with first and second hopper gate jigging relays having coils 1MHGR and 2MHGR respectively substantially in the same manner as that hereinbefore described and it is believed that this will be readily apparent to one skilled in the art without further description.

WEIGHING FAILURES—INCORRECT WEIGHT

Since the closing of contacts 11L2, 12L2, or 13L2 (FIG. 16) in the weigher 500 when the predetermined weight has been reached, initiates the stopping of the feed of material by stopping the vibro feeder and relevant conveyor, it is possible that during the stopping some additional material may be fed into the weigh hopper and it is advisable to check that the total weight of material in the weigh hopper does not exceed a predetermined tolerance above the predetermined weight. If the weight should exceed such tolerance, contacts 11L4, 12L4, or 13L4 of the weigher 500 are closed dependent upon the bin from which the material has been withdrawn. These contacts complete a circuit through contacts MMSR8 in parallel with contacts MHFR9 to closing coil MTERCC of a material tolerance exceeded relay of the latching type, which closes. Normally closed contacts MTER2 (FIG. 14G) open and interrupt the normal circuit from lead X114 to point 538 for the subsequent operation of the material hopper gate relay and material hopper gate contactor.

If, at such sequence in the programme at which the tolerance is exceeded, only a single charge of material has been pre-selected, the hopper gate will not be automatically opened at such time as the circuit is completed between point 538 and 539 as hereinbefore described, and it is necessary for a tolerance release push-button switch to be operated manually to close contacts 606 and by-pass contacts MTER2 and MHFR5 to provide a circuit to coils MHGR and MHG of the material hopper gate relay and contactor respectively. The contacts 606 must be closed for a sufficient length of time for the hopper gate contactor to operate and provide a holding circuit through contacts MHG1 in series with contacts MHFR6. The sequence of subsequent operations ensues as hereinbefore described.

If the tolerance should be exceeded in the first charge of material in a sequence in which material charges from two bins have been pre-selected, the circuits to the closing coil MDFTRCC of the double feed transfer relay and to the trip coils MHFRTC and MSDRTC of the hopper full and slow-down relays, are interrupted at contacts MTER3 (FIG. 14H) these relays cannot be automatically operated and released respectively as soon as necessary to enable the second charge to be fed into the weigh hopper as hereinbefore described. In order to enable the second charge to be fed into the weigh hopper it is necessary to operate the tolerance release push-button manually and by-pass contacts MTER3 by contacts 607 on that push-button switch, whereupon circuits are completed to coils MDFTRCC, MHFRTC and MSDRTC to operate the double feed transfer relay and release the hopper full and slow-down relays respectively. The sequence of operations then follows as hereinbefore described.

If the tolerance should be exceeded on the second charge of material in a sequence in which two charges of material have been pre-selected, the normal operating circuit for the hopper gate relay and hopper gate contactor will be interrupted by contacts MTER2 and, in order to obtain continuing operations, the tolerance release push-button must be operated to close contacts 606 as hereinbefore described for a single charge.

Operation of the tolerance exceeded relay provides an alarm at a central alarm panel and such alarm must be cancelled to bring about the closure of contacts CAR21. At a subsequent stage when the hopper gate has been opened and the material discharged through the transfer chute into the appropriate skip, contacts Z1 in the weigher 500 are closed and the hopper empty relay is operated contacts MHER11 in series with normally closed contacts MHFR10, and contacts CAR21, complete a circuit to the trip coil MTERTC to release the tolerance exceeded relay.

SHORT WEIGHT OR RECORDING FAILURE

If, for example, owing to shortage of material in a bin, it is not possible to deliver the selected predetermined weight of material from that bin into the weigh hopper 535, none of the contacts 11L2, 12L2, 13L2 (FIG. 16) in the weigher 500 will be operated and, as a result, the material hopper full relay will not be operated. Since, in the operation of the weigher 500 it is necessary for the predetermined weight to have been reached before the recording of the weight can take place, none of contacts 11L3, 12L3, 13L3 will subsequently be closed and the recording completed relay will not be operated. In the circuit between lead X114 (FIG. 14G) and point 538, contacts MHFR5 and MRCR3 will be open and the normal circuit to coils MHGR and MHG of the material hopper gate relay and hopper gate contactor will not be able to be completed. Similarly if the predetermined weight of material were to be reached, but the recorder should fail to record the weight of material, contacts 11L3, 12L3, 13L3 would not be closed and as a consequence the recording completed relay would not be operated. Under such circumstances contacts MHFR5 would be closed and contacts MRCR3 open and the circuit to coils MHGR and MHG would not be able to be completed. In order to allow for such material in the weigh hopper 535 to be fed into the appropriate skip, a manually operable recording failure and/or short weight release push-button switch is provided. Upon manual operation of such push-button switch contacts 608 are closed to by-pass contacts MHFR5 and MRCR3 by connecting point 538 to lead X114 and enable the hopper gate contactor to be operated as hereinbefore described.

If the recorder should fail to record the first charge of material in a sequence at which a double charge of material has been pre-selected, the non-operation of the recording completed relay will prevent the second charge being fed to the weigh hopper. As has been hereinbefore described it is necessary to operate the material double feed transfer relay in order to re-set the weigher and initiate the feed of the second charge to the weigh hopper. In series with the circuit to coil MDFTRCC are normally open contacts MRCR4 and these serve to prevent the energisation of this coil. Under these circumstances it is only possible for the first charge of material to be delivered into the skip and for this it is necessary to operate the recording failure and/or short weight release push-button to close contacts 608 to provide a circuit between lead X114 and point 538 to the coils MHGR and MHG of the material hopper gate relay and material contactor respectively, as hereinbefore described.

EMERGENCY FULL INTERLOCK

The weigher 500 includes additional contacts 11L5, 12L5, 13L5 (FIG. 16) which are closed if the weight of material in the hopper should exceed that which can safely be fed into the skip. Upon closure of any one of the contacts 11L5, 12L5, 13L5, a circuit is extended through contacts MMSR9 in parallel with contacts MHFR10 to coil MEFRCC of a material emergency full relay of the latching type, which then operates. Normally closed contacts MEFR1 (FIG. 14F) open and disconnect the coil MMSR of the material master start relay which releases and, through its contacts such as MMSR3, MMSR6, MMSR13, stops any vibro feeders or conveyors which may then be operating to feed material into the weigh hopper. By the presence of contacts MMSR9 (FIG. 16) in series with coil MEFRCC, the material emergency full relay can be operated whilst material is being charged into the hopper. By the presence of contacts MHFR10 in series with the coil, the emergency full relay can be operated even after the feed of material has been stopped as a result of operation of the material hopper full relay. The latter condition is particularly applicable to those sequences of the programme at which a scrap and material charge has been pre-selected since the addition of scrap to an existing material charge in the hopper may result in the overall weight of material and scrap exceeding that which may be safely fed to a skip. Operation of the material emergency full relay provides an alarm at a central alarm panel and such alarm must be cancelled to bring about closure of the contacts CAR22 (FIG. 44H). At a subsequent stage when the hopper gate is opened to discharge material into a skip and the moving contacts of the material programme switch have been advanced to the next position at which a material charge has been pre-selected and the material hopper full and slow-down relays have been released, a circuit is extended through contacts MRCR4, METR3, MHER11, normally closed contacts MHFR11, contacts CAR22 to trip coil MEFRTC to release the material emergency full relay.

SCRAP AND MATERIAL CHARGE

The bell counting control and material charging control provide for a combined charge of material and scrap being preselected for any sequence of the programme. For such a combined charge the switch G appropriate to that sequence will have its moving contact in the lower position to provide a connection from lead X114 to the moving contact 510 of the material programme switch when the moving contacts are in the position with which it is associated. The material charging control operates substantially as hereinbefore described and the pre-selected weight of material from the or each bin pre-selected, is fed into the weigh hopper 535 and is subsequently discharged into the skip but the starting of the skip hoist does not immediately follow upon closure of the hopper gate. As hereinbefore described scrap material is fed from a separate bin individual to the skip which is then in the pit and is delivered in response to manual control by an operator, and operation of an additional manually operable START push-button is necessary to bring about starting of the skip hoist.

EXTRA MATERIAL CHARGE

When an extra material charge is required it is necessary first to preselect the bin from which the material is to be withdrawn and which of the two weights of material from that bin is required. An extra material switch EM is provided and includes three three-position switches EMA, EMB, EMC (FIG. 14D) in the material charging control for the left bins. The diagrammatically upper and lower fixed contacts of the switches EMA, EMB, EMC, are connected respectively to the coils 11LW1MSR, 11LW2MSR, 12LW1MSR, 12LW2MSR, 13LW1MSR, 13LW2MSR of the bin 11L, 12L and 13L first and second weight material start relays. The moving contacts of the switches EMA, EMB, EMC are connected to lead X114 through normally open contacts EMIR7, EMIR8, EMIR9, of an extra material initiate relay. At the time when the extra material is required a circuit is established between points 528, 529 (FIG. 14H), through normally closed contacts BELR2 of the bell extra load relay and normally open contacts EMPR1 of an extra material programme relay in the bell counting control. When the weigh hopper has been emptied of any material charge which may have already been therein and is, therefore, ready to receive a fresh charge of material, the hopper empty relay is operated and contacts MHER12 complete a circuit to closing coil EMIRCC of the extra material initiate relay which then operates and latches. Contacts EMIR1, EMIR2, EMIR3, EMIR4, EMIR5, EMIR6, disconnect coils of the bin first and second weight start relays from the common leads 522, 523, 524, 525, 526, 527 and contacts EMIR7, EMIR8, EMIR9 connect the moving contacts of switches EMA, EMB, EMC to lead X114. One or more of the bin first and second weight material start relays should then operate in accordance with the setting of the switch EM and the material charging control then operates substantially as hereinbefore described to effect the operation of the relevant vibro feeder or feeders, conveyor or conveyors to deliver the pre-selected extra material charge into the weigh hopper 535 under the control of the weigher 500. When the next skip is in the pit and the hopper empty relay has been released in the normal manner, the bell extra load relay in the bell counting control is operated and the opening of normally closed contacts BELR1 (FIG. 14H) in the circuit to coil MPSR of the material programme switch relay prevents the operation of that relay and interrupt the normal drive of the moving contacts of the material programme switch which would normally occur upon operation of the material hopper full relay, as hereinbefore described. In due course the hopper gate is opened and the material discharged from the weigh hopper 535 into the skip in the pit.

When the hopper is empty, contacts Z1 in the weigher 500 are closed and the hopper empty relay is operated. Under normal operation at this stage the moving contacts of the material programme switch would be advanced to their next position at which a material charge was pre-selected and both of the material charge counting relays would be released. Since the moving contacts of the material programme switch are not advanced at this stage during an extra material charge sequence, one or other of the material charging counting relays is operated and an alternative circuit has to be provided for releasing the hopper full and slow-down relays. Contacts BELR3 (FIG. 14G) of the bell extra load relay in the bell counting circuit are connected in parallel with normally closed contacts 1MCCR4 in series with normally closed contacts 2MCCR4 and in conjunction with contacts MHG4, MHER5, and at least one of the contacts 11LMSR10, 12LMSR10, 13LMSR9 complete a circuit to trip coils MHFRTC and MSDRTC of the hopper full relay and slow-down relay respectively, both of which relays are released and enable the normal sequence of operations to continue substantially as hereinbefore described. Upon operation of the material hopper empty relay a circuit is completed through contacts MHER12 (FIG. 14H) and contacts BELR4 of the bell extra load relay in the bell counting control to trip coil EMIRTC of the extra material initiate relay which then releases. Upon release of the extra material initiate relay the moving contact to the switches EMA, EMB, EMC are disconnected from the lead X114 and the common leads 522, 523, 524, 525, 526, 527 are restored and, since the moving contacts of the material programme switch are already in a position at which a material charge has been pre-selected, one or more of the bin first and second weight material start relays will operate to initiate action of the material charging control substantially as hereinbefore described. When the small bell has been opened and closed, the bell extra load relay in the bell counting control is released and contacts BELR1 (FIG. 14E) restore the normal operating circuit for the coil MPSR of the material programme switch relay to enable the moving contacts to be advanced to the next position at which a material charge has been pre-selected at the appropriate point in the cycle of operations.

COKE CHARGE

Where a coke charge is required at any particular sequence the G switch associated with that sequence will have its moving contact in the upper position so that when the moving contacts of the material programme switch are in the position corresponding to that sequence, there will be no circuit from lead X114 to the moving contact 510, with the result that the coil MCSR of the material check selection relay and none of the coils 11LMSR, 12LMSR, 13LMSR of the bin starting relays will be energised when the moving contacts are in that position. Normally closed contacts MCSR2, 11LMSR3, 12LMSR5, and 13LMSR6 (FIG. 14E) maintain a holding circuit for coil MPSR of the material programme switch relay which remains operated and enables the motor 503 to drive the moving contacts through that position and on to the next.

END OF PROGRAMME

Through the moving contacts of the material programme switch for 32 positions, it is not necessary for a programme always to involve 32 sequences and any desired number of sequences may be utilized. Switch F is utilised to denote the last sequence in a programme and in order to permit execution of whichever sequence is to be the last the contacts of each switch F are associated with the row of fixed contacts of the material programme switch following the row which corresponds to the sequence to which it relates. Thus switch F1 is connected to the second fixed contact in the second column, switch F2 to the third, and so on. The switch F relating to the sequence which marks the end of the programme is operated to bring its moving contact into its position designated PR. When the moving contacts of the material programme switch are advanced into the position corresponding to the sequence which follows that selected to be the last sequence in the programme, a circuit is no longer established from lead X114, moving contacts 504 and 507, to lead 520 (FIG. 14B), but instead, is extended to lead 547 and thence through normally closed contacts PRFR1 (FIG. 14H) to closing coil MPRRCC of a material programme re-set relay, of the latching type, which operates. Contacts MPRR2 (FIG. 14E) disconnect the normal operating circuit for coil MPSR, and contacts MPRR3 extend a circuit from lead X114 through contacts PRPR1 of a programme re-set relay in the bell counting circuit to coil MPSR of the material programme switch relay which operates to connect motor 503 to power line 701 and drive the moving contacts of the material programme switch through their remaining positions. During such movement the first and second weight material start relays and the material check selection relay are rendered inoperative by contacts MPRR1. When the moving contacts return to their first position, moving contact 508 extends a circuit from lead X114 to lead 521 and thence through contacts PRPR3 (FIG. 14E) of the programme re-set relay in the bell counting control, contacts MPRR4 to trip coil MPRRTC of the material programme re-set relay which then releases. If a material charge has been pre-selected for the group of bins with which the material programme switch is concerned at that sequence, the moving contacts are arrested, or if no such pre-selection has been made for that sequence, are advanced to the next succeeding position at which such a pre-selection has been made. Thereafter the material charging control operates in the normal manner.

PROGRAMME RE-SET

When it is desired to re-set the programme of charges, it is desirable to return the moving contacts of the material programme switch to their first position, but it is not possible to do so until any sequence already in progress has been completed. For re-setting the programme, a programme re-set relay in the bell counting control is operated and contacts PRPR2 (FIG. 14H) are closed to prepare a circuit to closing coil PRFRCC of a programme re-set feed relay which circuit is completed by contacts MHER12 when any charge already in the weigh hopper 535 has been discharged into a skip and the material hopper empty relay has been operated. In addition normally closed contacts PRPR1 (FIG. 14E) in the bell counting control are opened and disconnect the circuit of the coil MPSR of the material programme switch relay and prevent further advance of the moving contacts of the material programme switch. Upon operation of the programme re-set feed relay, contacts PRFR2 complete a circuit to the closing coil MPRRCC of the material programme re-set relay which operates and latches. When the various switches have been operated to set up a new programme, a switch in the bell counting control is released to release the programme re-set relay. Contacts PRPR2 open to disconnect the closing coils PRFRCC and MPRCC and the closing of contacts PRPR1 completes a circuit through contacts MPRR3 to coil MPSR of the material programme switch relay, which then causes the motor 503 to drive the moving contacts of the material programme switch to their first position wherein moving contacts 508 extend to lead X114 to lead 521 to energise the trip coil MPRRTC (FIG. 14E) through normally closed contacts PRPR3 and MPRR4. The material programme re-set relay releases and disconnects the coil MPSR of the material programme switch relay. At a subsequent stage when material has been delivered into the weigh hopper 535 associated with the left group of bins and also into the weigh hopper associated with the right group of bins, a re-set relay is operated in the bell counting circuit and contacts PRR1 (FIG. 14H) complete a circuit to trip coil PRFRTC of the programme re-set feed relay.

We claim:

1. Apparatus for charging a blast furnace, comprising a skip, a skip hoist for hoisting said skip, means for automatically feeding to said skip predetermined quantities of coke, a first bin for receiving a supply of ore, a check weigh hopper, a discharge gate for said hopper and leading to said skip, means for withdrawing ore from said first bin and delivering it to said hopper, weighing means responsive to withdrawal of a preselected quantity of ore from said first bin for automatically controlling the stopping of said withdrawal means, a second bin for receiving a supply of flux, means for withdrawing flux from said second bin and feeding it to said hopper, a second weighing means responsive to withdrawal of a pre-selected quantity of flux from said second bin for automatically controlling the stopping of said second withdrawal means, and control means for automatically starting and stopping said feeding means and for automatically starting said first and second withdrawal means singly and in combination in a predetermined sequence programme and for automatically controlling said gate and for automatically initiating successive operations of said skip hoist upon completion of each sequence in said programme.

2. Apparauts for charging a blast furnace, comprising a skip, a skip hoist for hoisting said skip, means for automatically feeding to said skip predetermined quantities of coke, a check weigh hopper, a discharge gate for said hopper leading to said skip, a first bin for receiving a supply of ore, means for withdrawing ore from said first bin and delivering it to said hopper, weighing means responsive to withdrawal of a preselected quantity of ore from said first bin for automatically controlling the stopping of said withdrawal means, a second bin for receiving a supply of flux, means for withdrawing flux from said second bin and feeding it to said hopper, a second weighing means responsive to withdrawal of a preselected quantity of flux from said second bin for automatically controlling the stopping of said second withdrawal means, a third bin for receiving a supply of sinter, a third withdrawal means for withdrawing sinter from said third bin and feeding it to said hopper, a third weighing means responsive to withdrawal of a preselected quantity of sinter from said third bin for automatically controlling stopping of said third withdrawal means, and control means for automatically starting and stopping said feeding means, and for automatically starting said first, second and third withdrawal means singly and in combination in a predetermined sequence programme and for automatically controlling said gate and for automatically initiating successive operations of said skip hoist upon completion of each sequence in said programme.

3. Apparatus for charging a blast furnace, comprising a skip, a skip hoist for hoisting said skip, means for automatically feeding to said skip predetermined quantities of coke, a check weigh hopper, a discharge gate for said hopper leading to said skip, a first bin for receiving a supply of ore, means for withdrawing ore from said first bin and delivering it to said hopper, weighing means responsive to withdrawal of a preselected quantity of ore from said first bin for automatically controlling the stopping of said withdrawal means, a second bin for receiving a supply of flux, means for withdrawing flux from said second bin and feeding it to said hopper, a second weighing means responsive to withdrawal of a pre-selected quantity of flux from said second bin for automatically controlling the stopping of said second withdrawal means, a third bin for receiving a supply of sinter, a third withdrawal means for withdrawing sinter from said third bin and feeding it to said hopper, a third weighing means responsive to withdrawal of a preselected quantity of sinter from said third bin for automatically controlling stopping of said third withdrawal means, a fourth bin for receiving a supply of another material such as scrap metal, fourth withdrawal means for withdrawing said another material from said fourth bin and feeding it to said hopper, a fourth weighing means responsive to withdrawal of a preselected quantity of said another material from said fourth bin for automatically controlling stopping of said fourth withdrawal means, and control means for automatically starting and stopping said feeding means, and for automatically starting said first and second, third and fourth withdrawal means singly and in combination in a predetermined sequence programme, and for automatically controlling said gate and for automatically initiating successive operations of said skip hoist upon completion of each sequence in said programme.

4. Apparatus for charging a blast furnace comprising a skip, a skip hoist for hoisting said skip, means for feeding to said skip predetermined quantities of coke, a weigh hopper, a discharge gate for said hopper leading to said skip, a first bin for receiving a supply of ore, first withdrawal means for withdrawing ore from said first bin and feeding it to said hopper, a second bin for receiving a supply of flux, second withdrawal means for withdrawing flux from said second bin and feeding it to said hopper, a third bin for receiving sinter, third withdrawal means for withdrawing sinter from said third bin and feeding it to said hopper, weighing means responsive to the feed to said hopper of any pre-selected quantity from any of said bins for controlling the stopping of each of said withdrawal means and control means for automatically rendering said feeding means operative and for automatically starting each of said withdrawal means in a pre-selected sequence programme and for automatically controlling said gate and for automatically initiating successive operations of said skip hoist.

5. Apparatus for charging a blast furnace, comprising a skip, a skip hoist for hoisting said skip, a coke bin for receiving coke, means for withdrawing coke from said coke bin and feeding it to said skip, coke weighing means responsive to the withdrawal of a predetermined quantity of coke from said coke bin for stopping said coke withdrawal means, a plurality of bins for receiving supplies of other materials, a check weigh hopper, a plurality of material withdrawal means, each associated with one of said other bins for withdrawing material therefrom and feeding it to said hopper, weighing means responsive to the feed of pre-selected quantities of other materials from said other bins into said hopper for automatically controlling the stopping of said material withdrawal means, means for discharging material from said hopper into said skip, and control means for automatically starting said coke withdrawal means and for automatically starting said material withdrawal means singly and in combination and for automatically controlling said discharging means in a pre-selected sequence programme and for automatically initiating successive operations of said skip hoist upon completion of each sequence in said programme.

6. Apparatus for charging a blast furnace, comprising a skip, a skip hoist for hoisting said skip, at least one coke bin for receiving coke, means for withdrawing coke from said at least one coke bin and feeding it to said skip, coke weighing means responsive to the withdrawal of a predetermined quantity of coke from said at least one coke bin for stopping said coke withdrawal means, a plurality of bins for receiving supplies of a first other material, a plurality of bins for receiving supplies of further materials, a check weigh hopper, a plurality of material withdrawal means each associated with one of said material bins for withdrawing material therefrom and feeding it to said hopper, weighing means responsive to the feed of pre-selected quantities of said first other material and to the feed of pre-selected quantities of further materials from their bins into said hopper for automatically controlling the stopping of each of said withdrawal means, means for discharging material from said hopper into said skip and control means, for automatically starting said coke withdrawing means and each of said material withdrawal means and for automatically controlling said discharge means in a pre-selected sequence programme and for automatically initiating successive operations of said skip hoist.

7. Apparatus for charging a blast furnace comprising at least one skip, a skip hoist for hoisting said skip, means for feeding to a skip predetermined quantities of coke, a plurality of bins for receiving individually supplies of ore, flux and other materials, delivery means for withdrawing material from each of said plurality of bins, weighing means associated with and individual to each of said bins and responsive to delivery of a preselected quantity of material from the bin with which it is associated for automatically stopping said delivery means, a check weigh hopper for receiving materials from said delivery means, means for discharging materials from said hopper to a skip, weighing means responsive to the weight of materials in said hopper for providing a stop signal when a predetermined weight is exceeded, and control means for automatically selectively rendering operative said coke feeding means and for automatically starting each delivery means in a pre-selected sequence programme and for automatically initiating sucessive operations of said skip hoist.

8. Apparatus for charging a blast furnace, comprising a skip, a skip hoist for hoisting said skip, a plurality of coke bins for receiving coke, means for withdrawing coke from each of said coke bins and feeding it to said skip, coke weighing means responsive to the withdrawal of a predetermined quantity of coke from any of said coke bins for controlling the stopping of coke withdrawal means, a check weigh hopper, a first plurality of bins for receiving ore material, a plurality of ore withdrawing means each associated with one bin in said first plurality of bins for withdrawing ore material therefrom and delivering it to said hopper, a second plurality of bins for receiving limestone material, a second plurality of limestone material withdrawing means each associated with one bin in said second plurality of bins for withdrawing limestone material therefrom and delivering it to said hopper, a third plurality of bins for receiving sinter material, a plurality of sinter material withdrawing means each associated with one bin of said third plurality of bins for withdrawing sinter material therefrom and delivering it to said hopper, weighing means responsive to the delivery of any pre-selected quantity of material from any bin of said first, second and third pluralities of bins into said hopper for automatically controlling the stopping of each of said withdrawing means, means for discharging material from said hopper into said skip, and control means for automatically rendering said coke feeding means operative and for automatically starting each of said withdrawing means and controlling said discharging means in a predetermined selected sequence programme.

9. Apparatus for charging a blast furnace, comprising a skip, a skip hoist for hoisting said skip, a coke bin for receiving coke, means for withdrawing coke from said coke bin and feeding it to said skip, coke weighing means responsive to the withdrawal of a predetermined quantity of coke from said coke bin and controlling the stopping of said coke withdrawing means, a plurality of other bins for receiving supplies of other materials, a material weigh hopper, a plurality of material withdrawing means each associated with one of said other bins for withdrawing material therefrom and feeding it to said hopper, weighing means associated with each of said material withdrawing means and each comprising a continuously movable conveyor for receiving material from a withdrawing means, weight responsive means carrying at least a part of said conveyor, tachometric means responsive to the speed of said conveyor, and switching means responsive to said weight responsive means and said tachometric means for providing a delivery means stopping signal when a preselected quantity of material has been passed, weighing means associated with said hopper for providing a stop signal when a predetermined weight of material in said hopper is exceeded, and control means for automatically starting said coke withdrawing means and for automatically starting each of said material withdrawing means in a pre-selected sequence programme and for automatically initiating successive operations of said skip hoist upon completion of each sequence in said programme.

10. Apparatus for charging a blast furnace, comprising a skip, a skip hoist for hoisting said skip, a coke bin for receiving coke, means for withdrawing coke from said coke bin and feeding it to said skip, weighing means responsive to the withdrawal of a predetermined quantity of coke from said coke bin for stopping said coke withdrawal means, a plurality of other bins for receiving supplies of other materials, a check weigh hopper, a plurality of material withdrawing means each associated with one of said other bins for withdrawing material therefrom, conveyor means for feeding material so withdrawn to said check weigh hopper, weighing means associated with each of said material withdrawing means and comprising a continuously movable conveyor for receiving material from a material withdrawing means, and feeding it to said conveyor means, weight responsive means carrying at least a part of said conveyor, tachometric means responsive to the speed of said conveyor and switching means responsive to said weight responsive means and to said tachometric means for providing a withdrawing means stopping signal when a pre-selected quantity of material has been passed, a discharge gate for said material check weigh hopper, opening and closing means for said gate, control means for automatically starting said coke feeding means and each of said material withdrawing means singly and in combination in a pre-selected sequence programme and for automatically controling said gate opening and closing means for discharge of material from said check weigh hopper into the skip upon its descent into registration therewith and for automatically initiating a hoisting operation of the skip hoist.

11. Apparatus for charging a blast furnace, comprising a skip, a skip hoist for hoisting said skip, a coke bin for receiving coke, means for withdrawing coke from said coke bin and feeding it to said skip, coke weighing means responsive to the withdrawal of a predetermined quantity of coke from said coke bin for stopping said coke withdrawing means, a plurality of other bins for receiving supplies of other materials, a material weigh hopper, a discharge gate for said material weigh hopper, means for opening and closing said gate, a plurality of material withdrawing means each associated with one of said other bins, for withdrawing material therefrom and feeding it to said material weigh hopper, weight responsive means associated with said material weigh hopper, switch means responsive to said weight responsive means for providing a material withdrawing means stopping signal when a selected pre-selected quantity of material has been received in said material weigh hopper, control means for automatically starting said coke withdrawing means and for automatically starting each of said material withdrawing means and for automatically initiating said gate opening and closing means for opening said gate to discharge material from said material weigh hopper into the skip upon its descent into registration therewith and for closing said gate, and for automatically initiating hoisting operations of said skip hoist in a preselected sequence programme.

12. Apparatus for charging a blast furnace, comprising a double skip hoist having a first skip and a second skip, the skips being hoisted alternately, a pair of coke bins for receiving coke, one being associated with the first skip and the other being associated with the second skip, means for withdrawing coke from one coke bin and feeding it to the first skip, coke weighing means responsive to withdrawal of a predetermined quantity of coke from said one coke bin and controlling the stopping of said coke withdrawing means, means for withdrawing coke from the other coke bin and feeding it to the second skip, coke weighing means responsive to the withdrawal of a predetermined quantity of coke from said other coke bin and controlling the stopping of said coke withdrawing means, a first group of other bins for receiving supplies of other materials, a first check weigh hopper, means for withdrawing material from each bin in said first group and feeding it to said first check weigh hopper, weighing means associated with, and individual to, each material withdrawing means and responsive to the withdrawal of a pre-selected quantity of material therefrom, a discharge gate for said first material check weigh hopper, a second group of bins for receiving supplies of other materials, a second check weigh hopper, material withdrawing means associated with each of the bins in said second group for withdrawing material therefrom and feeding it to said second check weigh hopper, weighing means associated with and individual to each withdrawal means associated with a bin in said second group and responsive to withdrawal of a preselected quantity of material therefrom for controlling the stopping of said withdrawing means, a discharge gate for said second material check weigh hopper, control means for starting each of said coke material withdrawing means associated with each group of bins singly and in combination in a pre-selected sequence programme, means responsive to said control means and said skip hoist for opening the first check weigh hopper gate for discharge of material from the first check weigh hopper into the first skip upon its descent into registration therewith and for closing said gate, means responsive to said control means and said skip hoist for opening said second check weigh hopper gate for discharge of material into said second skip upon its descent into registration therewith and for closing said gate in predetermined relationship with the feeding of coke from the first and second coke bins into said skips, and means responsive to said control means for initiating successive hoisting operations of the skip hoist.

13. Apparatus for charging a blast furnace, comprising a double skip hoist having a first skip and a second skip, the skips being hoisted alternately, means for feeding predetermined quantities of coke to each of said skips, two groups of bins for receiving other materials, two weigh hoppers, means for withdrawing predetermined quantities of materials from each of the bins in one group and feeding them to one weigh hopper, means for withdrawing predetermined quantities of materials from bins in the other group and feeding them to the other weigh hopper, discharge gates to each of the weigh hoppers, a transfer chute for receiving material from either of the weigh hoppers, means for moving the transfer chute into a position in register with whichever of the skips is to receive material therefrom, and control means for selectively rendering said coke feeding means and each of said material withdrawing means operative and for controlling said transfer chute driving means and for controlling said hopper gates to feed coke and materials in a preselected sequence programme into the skips and for initiating successive operations of said skip hoist.

14. Charging apparatus for a blast furnace, comprising a double skip hoist having a first skip and a second skip, the skips being hoisted alternately, a first coke hopper, means for withdrawing a predetermined quantity of coke from said first coke hopper and feeding it to said first skip, a second coke hopper, means for withdrawing a predetermined quantity of coke from said second coke hopper and feeding it to said second skip, a plurality of bins for receiving other materials and arranged in a first group and a second group, means associated with each individual bin in said first group for withdrawing a predetermined quantity of material therefrom and passing it to a first check weigh hopper, means associated with each individual bin in said second group for withdrawing a predetermined quantity of material therefrom and passing it to a second check weigh hopper, first control means for rendering each of said withdrawing means associated with bins in said first group operatively singly and in combination in a predetermined sequence programme, second control means for rendering each of said withdrawing means associated with bins in said second group operative singly and in combination in a predetermined sequence programme, discharge gates for said first and second hoppers for controlling the discharge of material therefrom into said first and second skips respectively, means for detecting the presence of the first skip and the presence of the second skip in positions to receive coke and material, and programme control means responsive to said detecting means for selectively controlling said coke withdrawing means and said discharge gates in a predetermined sequence programme.

15. Apparatus according to claim 14 in which said first control means includes a step by step switch means having a plurality of positions, each position corresponding to one sequence in a charging programme, a plurality of manually operable switch means, each associated with an individual position of the step by step switch means and with one sequence in the charging programme for preselecting the nature of the charge to be fed during that sequence, and drive means for advancing the step by step switch means from one position to another in timed relationship with charge feeding operations.

16. Charging apparatus according to claim 14 in which said second control means includes step by step switch means having a plurality of positions, each position corresponding to one sequence in a charging programme, a plurality of manually operative switch means, each associated with an individual position of the step by step switch means and with one sequence in the charging programme for pre-selecting the nature of the charge to be fed during that sequence, and drive means for advancing the step by step switch means from one position to another in timed relationship with charge feeding operations.

17. Charging apparatus according to claim 14 in which said programme control includes a bell counting switch in the form of a step by step switch and having drive means for advancing it from one position to another, switch means associated individually with each position other than a starting position and selectively operable for causing said drive means to advance the bell counting switch to its home or starting position from any selected position, and in which each of said first and second control means includes a step by step switch each having a plurality of positions, each position corresponding to one sequence in said sequence programme, drive means for advancing each step by step switch means from one position to another, said bell counting switch having a number of positions equal to one more than the sum of the number of positions of both of the step by step switches in said first and second control means.

18. Charging apparatus for a blast furnace, comprising a double skip hoist having a first skip and a second skip, the skips being hoisted alternately, a first coke hopper, a first coke weigh hopper, first withdrawing means for withdrawing coke from said first coke hopper and feeding it to said first coke weigh hopper, weighing means associated with said first coke weigh hopper and responsive to the recipt of a predetermined quantity of coke by said first coke weigh hopper for controlling the stopping of said first withdrawing means, a gate for controlling the discharge of coke from said first coke weigh hopper into said first skip, a second coke hopper, a second coke weigh hopper, second withdrawing means for withdrawing coke from said second coke hopper and feeding it to said second coke weigh hopper, weighing means associated with said second coke weigh hopper and responsive to the receipt of a predetermined quantity of coke by said second coke weigh hopper for controlling the stopping of said second withdrawing means, a gate for controlling the discharge of coke from said second coke weigh hopper into said second skip, a plurality of bins for receiving other materials and arranged in a first group and a second group, a first material weigh hopper, material withdrawing means associated individually with each of the bins in said first group for withdrawing material from the bin with which it is associated and feeding it to said first material weigh hopper, weighing means associated with said first material weigh hopper for controlling the stopping of each withdrawing means when a predetermined quantity of material has been received by said first material weigh hopper, a second material weigh hopper, material withdrawing means associated individually with each of the bins in said second group for withdrawing material from the bin with which it is associated and feeding it to said second material weigh hopper, weighing means associated with said second material weigh hopper for controlling the stopping of each withdrawing means when a predetermined quantity of material has been received by said second material weigh hopper, first control means for starting said withdrawing means associated with bins in said first group individually singly and in combination as part of a predetermined sequence programme, second control means for starting said withdrawing means associated with bins in said second group individually singly and in combination as a further part of said predetermined sequence programme, a tansfer chute, gates for controlling the discharge of material from the first and second material weigh hoppers into said transfer chute, means for selectively placing said transfer chute in register with the first skip when the first skip is in a position to receive material therefrom and in register with the second skip when the second skip is in position to receive material therefrom, means for detecting the presence of the first skip and the presence of the second skip in position to receive material and coke, and programme control means responsive to said detecting means for selectively controlling the opening and closing of the discharge gates in a predetermined sequence to supply coke and material to said skips in a predetermined programme.

19. Apparatus according to claim 18 in which said first control means includes step by step switch means having a plurality of positions, each position corresponding to one sequence in a charging programme, a plurality of manually operable switch means, each associated with an individual position of the step by step switch means and with one sequence in the charging programme for preselecting the nature of the charge to be fed during that sequence, and drive means for advancing the step by step switch means from one position to another in timed relationship with charge feeding operations.

20. Charging apparatus according to claim 18, said second control means including step by step switch means having a plurality of positions, each position corresponding to one sequence in a charging programme, a plurality of manually operable switch means, each associated with an individual position of the step by step switch means and with one sequence in the charging programme for preselecting the nature of the charge to be fed during that sequence, and drive means for advancing the step by step switch means from one position to another in timed relationship with charge feeding operations.

21. Charging apparatus according to claim 18, in which said programme control means includes a bell counting switch in the form of a step by step switch having a plurality of positions, drive means for advancing it from one position to another, and in which each of said first and second control means includes step by step switch means having a plurality of positions, each position corresponding to one sequence in a charging programme, a plurality of manually operable switch means, each associated with an individual position of the step by step switch means and with one sequence in the charging programme for pre-selecting the nature of the charge to be fed during that sequence, and drive means for advancing the step by step switch means from one position to another in timed relationship with charge feeding operations.

22. Apparatus according to claim 21 in which the step by step means in said first and second control means have the same number of positions and the step by step switch forming said bell counting switch has a number of positions equal to one more than each of the step by step switches in the first and second control means.

23. Charging apparatus for a blast furnace, comprising a double hoist having a first skip and a second skip, the skips being hoisted alternately, a first coke hopper, a first coke weigh hopper, first withdrawing means for withdrawing coke from said first coke hopper and feeding it to said first coke weigh hopper, first coke weighing means associated with said first coke weigh hopper and responsive to the receipt of a predetermined quantity of coke by said first coke weigh hopper for controlling the stopping of said first withdrawing means, a first coke gate for controlling the discharge of coke from said first coke weigh hopper into the first skip, a second coke hopper, a second coke weigh hopper, second withdrawing means for withdrawing coke from said second coke hopper and feeding it to said second coke weigh hopper, second coke weighing means associated with said second coke weigh hopper and responsive to the receipt of a predetermined quantity of coke by said second coke weigh hopper for controlling the stopping of said second withdrawing means, a second coke gate for controlling the discharge of coke from said second coke weigh hopper into said second skip, a plurality of bins for receiving other materials and arranged in a first group and a second group, a first material conveyor, a first material check weigh hopper, a first plurality of material withdrawing means associated individually with each of the bins in said first group for withdrawing material from the bin with which it is associated and feeding it to said first material conveyor, said first material conveyor being adapted to feed material to said first material check weigh hopper, a first plurality of material weighing means associated individually with each of the material withdrawing means associated with each bin in said first group, switching means responsive to each of said first plurality of weighing means for controlling the stopping of the material withdrawing means with which its associated weighing means is associated when a predetermined quantity of material has been withdrawn from its associated bin, first check weighing means associated with said first material check weigh hopper, a first plurality of switching means, said first plurality of switching means being associated with said first check weighing means and including a switch responsive to the first material check weigh hopper being empty of material, a switch responsive to the first material check weigh hopper containing a predetermined maximum weight of material and a plurality of further switches each responsive to the first material check weigh hopper containing preselected weights of material, a first material gate for controlling the discharge of material from said first material check weigh hopper into said first skip when said first skip is in register therewith, first control means for starting each of said first plurality of withdrawing means associated with bins in said first group individually singly and in combination as part of a predetermined sequence programme, a second material conveyor, a second material check weigh hopper, a second plurality of material withdrawing means associated individually with each of the bins in said second group for withdrawing material from the bin with which it is associated and feeding it to said second material conveyor, said second material conveyor being adapted to convey material to said second material check weigh hopper, a second plurality of material weighing means associated individually with each of the material withdrawing means associated with each bin in said second group, switching means responsive to each of said first plurality of weighing means for controlling the stopping of the material withdrawing means with which its associated weighing means is associated when a predetermined quantity of material has been withdrawn from its associated bin, second check weighing means associated with said second material check weigh hopper, a second plurality of switching means, said second plurality of switching means being associated with said second check weighing means and including a switch responsive to the second material check weigh hopper being empty, of material, a switch responsive to the second material check weigh hopper containing a predetermined maximum weight of material and a plurality of further switches each responsive to the second material check weigh hopper containing preselected weights of material, a second material gate for controlling the discharge of material from said second material check weigh hopper into said second skip when said second skip is in register therewith, second control means for starting each of said second plurality of withdrawing means associated with bins in said second group individually singly and in combination as part of a predetermined sequence programme, means for detecting the presence of said first skip in register with said first coke and first material gates, means for detecting the presence of said second skip in register with said second coke and second material gates, programme control means responsive to both of said detecting means for selectively controlling the opening and closing of each of said gates in a predetermined sequence to supply coke and material to said skips in a predetermined programme and for initiating successive operations of said skip hoist.

24. Apparatus according to claim 23 in which each of said first and second check weighing means comprises a continously moveable conveyor, weight responsive means carrying at least a part of said continuously moveable conveyor, tachometric means responsive to the speed of said continously moveable conveyor and switching means responsive to said weight responsive means and to said tachometric means for providing a withdrawing means stopping signal when a preselected quantity of material has been passed.

25. Apparatus according to claim 24, in which each of said first and second control means includes step by step switch means having a plurality of positions, each position corresponding to one sequence in said programme, a plurality of manual operable switch means each associated with an individual position of the step by step switch means and with one sequence in said programme for preselecting the nature of the charge to be fed during that sequence and drive means for advancing the step by step switch means from one position to another in timed relationship with operation of the association material gates.

26. Charging apparatus according to claim 25, in which said programme control means includes step by step switch means having a plurality of positions, each position corresponding to one sequence in said programme, a second plurality of manual operable switch means each associated with an individual position of said last mentioned step by step switch means and with one sequence in said programme, each of said first mentioned step by step switch means having the same number of positions and said last mentioned step by step switch means having a number of positions equal to one more than twice the number of positions of each of said first mentioned step by step switch means.

27. Charging apparatus for a blast furnace, comprising a double skip hoist having a first skip and a second skip, drive means for the skip hoist for hoisting the skips alternatively, a pit wherein each of the skips is located when the other is fully hoisted, a small bell valve, a distributor, a large bell valve, a small bell valve operator for opening and closing the small bell valve, a large bell valve operator for opening and closing the large bell valve, operating means for the distributor, control means for the distributor operating means, a plurality of stock lines, at least one set of positional limit switches responsive to the positions of the stock lines, winches for hoisting and lowering said stock lines, control means for said winches, a first coke hopper, a first coke weigh hopper, first coke withdrawing means for withdrawing coke from said first coke hopper and feeding it to said first coke weigh hopper, weighing means associated with said first coke weigh hopper and responsive to the receipt of a predetermined quantity of coke by said first coke weigh hopper for controlling the stopping of said first coke withdrawing means, a first coke gate for controlling the discharge of coke from said first coke weigh hopper into said first skip, a second coke hopper, a second coke weigh hopper, second coke withdrawing means for withdrawing coke from said second coke hopper and feeding it to said second coke weigh hopper, weighing means associated with said second coke weigh hopper and responsive to the receipt of a predetermined qauntity of coke by said second coke weigh hopper for controlling the stopping of said second coke withdrawing means, a second coke gate for controlling the discharge of coke from said second coke weigh hopper into said second skip, a plurality of bins for receiving other materials and arranged in a first group and a second group, a first material conveyor, a first material check weigh hopper, a first plurality of material withdrawing means each associated individually with one of the bins in said first group for withdrawing material from the bin with which it is associated and feeding it to said first material conveyor, said first material conveyor being adapted to convey material to said first material check weigh hopper, a first plurality of material weighing means each associated individually with one of the material withdrawing means associated with each bin in said first group, first switching means each responsive to one of said first plurality of weighing means for controlling the stopping of the material withdrawing means with which it is associated when a predetermined quantity of material has been withdrawn from its bin, first check weighing means associated with said first material check weigh hopper, a first plurality of switching means associated with said first check weighing means including a switch responsive to said first material check weigh hopper being empty of material, a switch responsive to said first material check weigh hopper containing a predetermined maximum weight of material and a plurality of further switches each responsive to said first material check weigh hopper containing preselected weights of material, a first material gate for controlling the discharge of material from said first material check weigh hopper into said first skip when said first skip is in said pit and in register therewith, first control means for starting each of said first plurality of withdrawing means associated with bins in said first group individually singly and in combination as part of a predetermined sequence programme, a second material conveyor, a second material check weigh hopper, a second plurality of material withdrawing means each associated individually with one of the bins in said second group for withdrawing material from the bin with which it is associated and feeding it to said second material conveyor, said second material conveyor being adapted to convey material to said second material check weigh hopper, a second plurality of material weighing means each associated individually with one of the material withdrawing means associated with a bin in said second group, second switching means each responsive to one of said second plurailty of weighing means for controlling the stopping of the material withdrawing means with which it is associated when a predetermined qauntity of material has been withdrawn from its bin, second check weighing means associated with said second material check weigh hopper, a second plurality of switching means associated with said second check weighing means including a switch responsive to said second material check hopper being empty of material, a switch responsive to said second material check weigh hopper containing a predetermined maximum weight of material and a plurality of further switches each responsive to said second material check weigh hopper containing preselected weights of material, a second material gate for controlling the discharge of material from said second material check weigh hopper into said second skip when said second skip is in said pit and in register therewith, second control means for starting each of said second plurality of withdrawing means associated with bins in said second group individually singly an in combination as part of a predetermined sequence programme, means for detecting the presence of said first skip in said pit and for detecting the presence of second skip in said pit, programme control means response to said detecting means for selectively controlling the opening and closing of each of said gates in a predetermined sequence to supply coke and material to said skips in a predetermined programme and for initiating said skip hoist drive means in response to the closing of an opened gate to hoist whichever skip was in the pit when said gate was opened, and third control means responsive to the starting of said drive means for controlling said small bell valve operator, said distributor control means, said stock line winches control means and said large bell valve operator in a predetermined sequence programme.

28. Charging apparatus according to claim 27, including pipe means for feeding water selectively to said first skip and to said second skip, electrically operated valve means in said pipe means, switch means responsive to said programme control means for causing opening of said valve means, and time responsive means for effecting closing of said valve means.

29. Charging apparatus according to claim 27, in which said first control means includes first step by step switch means having a plurality of positions each corresponding to an odd-numbered sequence in said programme, second drive means for advancing said first step by step switch means from one position to another, and in which said second control means includes second step by step switch means having a plurality of positions each corresponding to an even-numbered sequence in said programme, third drive means for advancing said second step by step switch means from one position to another, a first plurality of switch means including switches associated individually one with each position of the first step by step switch means and with each position of the second step by step switch means for selecting whichever material withdrawal means is to be started at each corresponding sequence in the programme, and a second plurality of switch means including switches each associated individually with a position of said first step by step switch means and with a position of said second step by step switch means for determining whether each particular sequence is to be the last in the programme, each of said drive means being responsive to said last-mentioned switch means for advancing each of said step by step switch means to a predetermined position in response to said last-mentioned switch means.

30. Apparatus according to claim 29 in which said programme control means includes third step by step means having a number of positions equal to one more than the sum of the number of positions of the first step by step switch means and the number of positions of the second step by step switch means, each position, of said third step by step switch means except the last position thereof corresponding to a particular sequence in said programme, fourth drive means for said third step by step switch means, a third plurality of switch means including switches associated individually one with each position of said third step by step switch means except the last position, thereof, for selecting whichever of coke and material is required at each corresponding sequence in the programme, said second plurality of switch means including switches associated individually one with each position of said third step by step switch means except the first position thereof, and said fourth drive means being responsive to switches in said second plurality of switch means for advancing said third step by step switch means to its first position.

31. Charging apparatus according to claim 30 in which said third control means includes a fourth step by step switch means.

32. Charging apparatus according to claim 30 including a fourth plurality of switch means including switches associated individually one with each position of said third step by step switch means except the first position thereof for selecting those sequences in a programme at which the large bell valve operator is to be operative to open and close the large bell valve.

33. Charging apparatus for a blast furnace, comprising a double skip hoist having a first skip and a second skip drive means for the skip hoist for hoisting the skips alternatively, a pit wherein each of the skips is located when the other is fully hoisted, a small bell valve, a distributor, a large bell valve, a small bell valve operator for opening and closing the small bell valve, a large bell valve operator for opening and closing a large bell valve, operating means for the distributor, control means for the distributor operating means, a plurality of stock lines, at least one set of positional limit switches responsive to the positions of the stock lines, winches for hoisting and lowering said stock lines, control means for said winches, a first coke hopper, a first coke weigh hopper, first coke withdrawing means for withdrawing coke from said first coke hopper and feeding it to said first coke weigh hopper, weighing means associated with said first coke weigh hopper and responsive to the receipt of a predetermined quantity of coke by said first coke weigh hopper for controlling the stopping of said first coke withdrawing means, a first coke gate for controlling the discharge of coke from said first coke weigh hopper into said first skip, a second coke hopper, a second coke weigh hopper, second coke withdrawing means for withdrawing coke from said second coke hopper and feeding it to said second coke weigh hopper, weighing means associated with said second coke weigh hopper and responsive to the receipt of a predetermined quantity of coke by said second coke weigh hopper for controlling the stopping of said second coke withdrawing means, a second coke gate for controlling the discharge of coke from said second coke weigh hopper into said second skip, a plurality of bins for receiving other materials and arranged in a first group and a second group, a first material weigh hopper, a first plurality of material withdrawing means each associated individually with one of the bins in the first group for withdrawing material therefrom and feeding it to said first weigh hopper, first material weighing means associated with said first material weigh hopper, first switching means responsive to said first material weighing means and including a switch responsive to said first material weigh hopper being empty of material, a switch responsive to said first material weigh hopper containing a predetermined maximum weight of material and a plurality of switches each responsive to the addition of a preselected weight of material to said first material weigh hopper for providing a stopping signal for each of said material withdrawing means associated with bins in said first group when a preselected weight of material has been fed by it to said first material weigh hopper, a transfer chute, a first material gate for controlling the discharge of material from said first material weigh hopper into said transfer chute, a second material weigh hopper, a second plurality of material withdrawing means each associated individually with one of the bins in said second group for withdrawing material therefrom and feeding it to said second material weigh hopper, second material weighing means associated with said second material weigh hopper, second switching means responsive to said second material weighing means and including a switch responsive to said second material weigh hopper being empty of material, a switch responsive to said second material weigh hopper containing a predetermined maximum weight of material and a plurality of switches each responsive to the addition of a preselected weight of material to said second material weigh hopper for providing a stopping signal for each of said material withdrawing means associated with bins in said second group when a preselected weight of material has been fed by it to said second material weigh hopper, a second material gate for controlling the discharge of material from said second weigh hopper into said transfer chute, means for detecting the presence of said first skip in said pit and for detecting the presence of said second skip in said pit, operating means for said transfer chute, first control means for starting each of said first plurality of material withdrawing means associated with bins in said first group individually singly and in combination as part of a predetermined sequence programme, second control means for starting each of said second plurality of material withdrawing means associated with bins in said second group as a part of a predetermined programme, programme control means responsive to said detecting means for selectively controlling the opening and closing of said coke discharge gates when charges of coke are called for in said programme, for controlling said transfer chute operating means to bring said transfer chute into register with whichever skip is in the pit and thereafter opening and closing a preselected one of said material discharge gates when charges of material are called for in said programme, and in response to closing of an opened discharge gate to initiate operation of said drive means to hoist whichever skip was in the pit when said closed gate was opened, and sequence control means for controlling said small bell valve operator, said distributor control means, said stock line winches control means and said large bell valve operator in a predetermined sequence programme.

34. Charging apparatus according to cliam 33, including pipe means for feeding water selectively to said first skip and to said second skip, electrically operated valve means in said pipe means, switch means responsive to said programme control means for causing opening of said valve means, and time responsive means for effecting closing of said valve means.

35. Charging apparatus according to claim 34, in which said first control means includes first step by step switch means having a plurality of positions, each position corresponding to a particular sequence in said programme, second drive means for advancing said first step by step switch means from one position to another, and in which said second control means includes second step by step switch means having a plurality of positions, each position corresponding to a particular sequence in said programme, third drive means for advancing said second step by step switch means from one position to another, a first plurality of switch means including switches associated individually one with each position of the first step by step switch means and with each position of the second step by step switch means for selecting whichever material withdrawal means is to be started at each corresponding sequence in the programme, and a second plurality of switch means including switches each associated one with each position of both the first and second step by step switch means for determining whether each particular sequence is to be the last in the programme, each of said second and third drive means being responsive to said last-mentioned switch means for advancing each of said step by step switch means to a predetermined position in response to said last-mentioned switch means.

36. Apparatus according to claim 35, in which said programme control means includes a third step by step switch means having a plurality of positions, each of said first and second step by step switch means having the same number of positions and said third step by step switch means having a number of positions equal to one more than said same number, each position of said third step by step switch means except the last position thereof corresponding to a particular sequence in said programme, fourth drive means for said third step by step switch means, a third plurality of switch means including switches associated individually one with each position of said third step by step switch means except the last position thereof, for selecting whichever of coke and material is required at each corresponding sequence in the programme, said second plurality of switch means including switches associated individually one with each position of said third step by step switch means except the first position thereof, and said fourth drive means being responsive to switches in said second plurality of switch means for advancing said third step by step switch means to its first position.

37. Charging apparatus according to claim 36 in which said third control means includes a fourth step by step switch means.

38. Charging apparatus according to claim 36 including a fourth plurality of switch means including switches associated individually one with each position of said third step by step switch means except the first position thereof for selecting those sequences in the programme at which the large bell valve operator is to be operative to open and close the large bell valve.

References Cited by the Examiner
UNITED STATES PATENTS

| | | | |
|---|---|---|---|
| 2,289,186 | 7/1942 | Flint | 198—37 |
| 2,962,172 | 11/1960 | Fath et al. | 214—19 X |
| 2,962,175 | 11/1960 | Fath et al. | 214—19 |

GERALD M. FORLENZA, *Primary Examiner.*

HUGO O. SCHULZ, MORRIS TEMIN, *Examiners.*

UNITED STATES PATENT OFFICE
CERTIFICATE OF CORRECTION

Patent No. 3,237,785                        March 1, 1966

Frank Richmond Holmes et al.

It is hereby certified that error appears in the above numbered patent requiring correction and that the said Letters Patent should read as corrected below.

Column 6, line 29, for "52" read -- 42 --; column 8, line 42, for "weight" read -- weigh --; column 12, line 13, for "effective" read -- ineffective --; column 13, line 18, after "completed" insert -- to the driving motor 152 to --; line 50, for "limestonee" read -- limestone --; line 63, for "hoper" read -- hopper --; column 17, line 24, for "releases" read -- release --; line 62, strike out "now", first occurrence; column 19, line 39, for "that the" read -- that that --; column 20, line 15, for "ofthe" read -- of the --; line 50, for "weight" read -- weigh --; column 21, line 22, for "1BCCC, 2BCCC" read -- 1BC CC, 2BC CC --; line 23, for "1BCTC, 2BCTC" read -- 1BC TC, 2BC TC --; column 22, line 30, for "BP5" read -- BPS --; column 23, line 45, for "1BC1" read -- 1BC 1 --; column 27, line 29, for "AMCRS" read -- AMCSR --; column 29, line 69, after "releases" insert a comma; column 30, line 13, after "be" insert -- in --; line 31, for "dischraged" read -- discharged --; column 32, line 28, for "the", first occurrence, read -- that --; line 64, for "MOLLS" read -- MOL-LS --; line 65, for "MEEWLS" read -- MEEW-LS --; line 75, for "MCLLS" read -- MCL-LS --; column 38, line 13, for "1MPSF" read -- MPSF --; column 39, line 10, for "feder" read -- feeder --; column 41, line 9, for "SS19" read -- SSI9 --; line 15, for "recommerce" read -- recommence --; column 49, line 72, for "ACCRS9" read -- ACCSR9 --; column 50, line 56, for "the" read -- these --; column 51, line 61, for "2DB12 in FIG. 4E and contacts 2DBI1" read -- 2DBI1 in FIG. 4E and contacts 2DBI2 --; column 54, line 20, for "feeds" read -- feeder --; column 57, line 3, for "hoper" read -- hooper --; column 59, line 47, for "operation" read -- operations --; column 64, line 47, for "contac tstrip" read -- contact strip --; column 65, lines 43, 45 and 57, for "XIII", each occurrence, read -- X111 --; column 66, line 55, after "interlock" insert -- relay --; column 68, line 42, for "NS120" read -- NSI20 --; column 70, line 69, for "switches" read -- winches --; column 71, lines 16 and 17, for "ascociated read -- associated --; line 47, for "clase" read -- close --; line 51, strike out "to close contacts LBCLS1 and 3,237,785 energize coil" and insert instead -- , a circuit now exists from moving contact 276 --; column 72, line 37, for "providing" read -- proving --; column 76, line 21, after "which" insert a comma; line 56, for "weight" read -- weigh --; line 75, for "bring" read -- brings --; column 77, line 34, for "indcated" read -- indicated --; column 78, line 66, for "materal" read -- material --; line 71, for "contatcs" read -- contacts --; column 79, line 34, for "1LMCR2" read -- 1MWCR2 --; same line 34, for "11LW1MWCR2" read -- 11LW1MWCR4 --; line 35, after "signals" insert -- to --; column 80, line 5, for "11LMCFHS2" read -- 11LMVFHS2 --; line 46, for "continued" read -- continues --; line 52, for "the", first occurrence, read -- and --; column 81, line 43, for "weight" read -- weigh --; column 82, line 18, for "BEL1" read -- BELR1 --; line 37, for "13LMRS9" read -- 13LMSR9 --; column 83, line 19, for "discolsed" read -- disclosed --; column 84, line 55, for "11RMCHS5" read -- 11RMCSSR1 --; line 56, for "11RMSHS5" read -- 11RMCHS5 --; lines 64 and 66, for "position", each occurrence, read -- positions --; column 86, line 4, for "13LSMR" read -- 13LMSR --; line 23, for "of bin" read -- of bin 12L --; column 88, line 62, for "operations" read -- operation --; column 89, line 25, for "MHGR and MHG" read -- MHGR MHG --; column 93, line 47, for "Apparauts" read -- Apparatus --; column 95, line 25, for "discharge" read -- discharging --; column 97, line 7, for "receiveed" read -- received --; line 24, after "to" insert -- the --; column 98, line 28, for "operatively" read -- operative --; column 101, line 35, after "empty" strike out the comma; lines 59 and 62, for "continously", each occurrence, read -- continuously --; column 102, line 2, for "association" read -- associated --; lines 19 and 20, for "alternatively" read -- alternately --; column 103, line 20, for "qauntity" read -- quantity --; line 36, for "an" read -- and --; line 40, for "response" read -- responsive --; column 104, line 44, for "alternatively" read -- alternately --; column 105, line 40, for "pit" read -- skip --; line 47, strike out "a"; line 56, for "11RMSHS5" read -- 11RMCS5 --; same column 105, line 64, for "cliam" read -- claim --; column 106, line 56, for "the programme" read -- a programme --.

Signed and sealed this 4th day of October 1966.

(SEAL)
Attest:

ERNEST W. SWIDER
Attesting Officer

EDWARD J. BRENNER
Commissioner of Patents